United States Patent
Kim et al.

(10) Patent No.: US 12,456,243 B2
(45) Date of Patent: Oct. 28, 2025

(54) TEXTURE-PRESERVING SHADOW REMOVAL IN DIGITAL IMAGES UTILIZING GENERATING INPAINTING MODELS

(71) Applicant: Adobe Inc., San Jose, CA (US)

(72) Inventors: Soo Ye Kim, Daejeon (KR); Zhe Lin, Fremont, CA (US); Scott Cohen, Sunnyvale, CA (US); Jianming Zhang, Campbell, CA (US); Luis Figueroa, San Jose, CA (US); Zhihong Ding, Fremont, CA (US)

(73) Assignee: Adobe Inc., San Jose, CA (US)

( * ) Notice: Subject to any disclaimer, the term of this patent is extended or adjusted under 35 U.S.C. 154(b) by 82 days.

(21) Appl. No.: 18/532,485

(22) Filed: Dec. 7, 2023

(65) Prior Publication Data

US 2024/0169631 A1 May 23, 2024

Related U.S. Application Data

(63) Continuation of application No. 18/460,150, filed on Sep. 1, 2023, which is a continuation-in-part of application No. 18/058,575, filed on Nov. 23, 2022.

(51) Int. Cl.
*G06T 5/77* (2024.01)
*G06F 3/0481* (2022.01)
(Continued)

(52) U.S. Cl.
CPC ............ *G06T 11/60* (2013.01); *G06F 3/0481* (2013.01); *G06F 3/04845* (2013.01);
(Continued)

(58) Field of Classification Search
CPC ... G06T 11/60; G06T 5/77; G06T 5/70; G06T 11/001; G06T 2200/24; G06T 2207/20092;
(Continued)

(56) References Cited

U.S. PATENT DOCUMENTS

| 6,204,840 B1 | 3/2001 | Petelycky et al. |
| 6,750,890 B1 | 6/2004 | Sugimoto |

(Continued)

FOREIGN PATENT DOCUMENTS

| CA | 3158287 A1 | 5/2021 |
| CN | 1512403 A | 7/2004 |

(Continued)

OTHER PUBLICATIONS

Wei et al. "Shadow Inpainting and Removal Using Generative Adversarial Networks with Slice Convolutions" 2019, p. 381-392 "Wei.pdf" (Year: 2019).*

(Continued)

*Primary Examiner* — Haoshian Shih
(74) *Attorney, Agent, or Firm* — Keller Preece PLLC

(57) ABSTRACT

The present disclosure relates to systems, methods, and non-transitory computer-readable media that modify digital images via scene-based editing to remove a shadow for an object. For instance, in one or more embodiments, the disclosed systems receive a digital image depicting a scene. The disclosed systems access a shadow mask of the shadow in a first location. Further, the disclosed systems generate the modified digital image without the shadow by generating a fill for the first location that preserves a visible location of the first location. Moreover, the disclosed systems generate the digital image without the shadow for the object by combining the fill with the digital image.

20 Claims, 90 Drawing Sheets

(51) Int. Cl.

| | | |
|---|---|---|
| *G06F 3/04845* | (2022.01) | |
| *G06F 3/0486* | (2013.01) | |
| *G06T 5/70* | (2024.01) | |
| *G06T 11/00* | (2006.01) | |
| *G06T 11/60* | (2006.01) | |

(52) U.S. Cl.
CPC ............ *G06F 3/0486* (2013.01); *G06T 5/70* (2024.01); *G06T 5/77* (2024.01); *G06T 11/001* (2013.01); *G06T 2200/24* (2013.01); *G06T 2207/20092* (2013.01); *G06T 2207/20212* (2013.01)

(58) Field of Classification Search
CPC ......... G06T 2207/20212; G06F 3/0481; G06F 3/04845; G06F 3/0486
See application file for complete search history.

(56) References Cited

U.S. PATENT DOCUMENTS

| | | |
|---|---|---|
| 8,125,492 B1 | 2/2012 | Wainwright et al. |
| 9,256,621 B2 | 2/2016 | Lessin |
| 9,405,463 B2 | 8/2016 | Won et al. |
| 10,192,129 B2 | 1/2019 | Price et al. |
| 10,249,044 B2 | 4/2019 | Cheung et al. |
| 10,460,214 B2 | 10/2019 | Lu et al. |
| 10,515,160 B1 | 12/2019 | Jarvis |
| 10,692,221 B2 | 6/2020 | Pao et al. |
| 10,748,324 B2 | 8/2020 | Shechtman et al. |
| 10,755,447 B2 | 8/2020 | Chhaya et al. |
| 11,055,566 B1 | 7/2021 | Pham et al. |
| 11,094,083 B2 | 8/2021 | Eisenmann et al. |
| 11,100,917 B2 | 8/2021 | Bui et al. |
| 11,107,219 B2 | 8/2021 | Cohen et al. |
| 11,126,890 B2 | 9/2021 | Lin et al. |
| 11,238,362 B2 | 2/2022 | Jin et al. |
| 11,373,390 B2 | 6/2022 | Zhao et al. |
| 11,462,040 B2 | 10/2022 | Lin et al. |
| 11,538,216 B2 | 12/2022 | Sunkavalli et al. |
| 11,568,627 B2 | 1/2023 | Price et al. |
| 11,676,390 B2 | 6/2023 | Tang et al. |
| 11,682,105 B2 | 6/2023 | Duan et al. |
| 12,026,845 B2 | 7/2024 | Pardeshi |
| 12,175,619 B2 | 12/2024 | Joachim |
| 12,210,800 B2 | 1/2025 | Soni et al. |
| 12,223,523 B2 | 2/2025 | Bhole et al. |
| 2008/0109717 A1 | 5/2008 | Krauter |
| 2009/0316957 A1 | 12/2009 | Chen et al. |
| 2013/0076773 A1 | 3/2013 | Chen et al. |
| 2013/0167087 A1 | 6/2013 | Tighe et al. |
| 2014/0081625 A1 | 3/2014 | Wilensky et al. |
| 2015/0356343 A1 | 12/2015 | Jain et al. |
| 2015/0365591 A1 | 12/2015 | Aronsson et al. |
| 2016/0180201 A1 | 6/2016 | Aubert et al. |
| 2017/0032551 A1 | 2/2017 | Fried et al. |
| 2017/0123641 A1 | 5/2017 | Lance |
| 2017/0347024 A1 | 11/2017 | Yanagi |
| 2017/0358092 A1 | 12/2017 | Bleibel et al. |
| 2019/0042871 A1 | 2/2019 | Pogorelik |
| 2019/0205643 A1 | 7/2019 | Liu et al. |
| 2019/0340798 A1 | 11/2019 | Garg |
| 2020/0042286 A1 | 2/2020 | Bui et al. |
| 2020/0051561 A1 | 2/2020 | Lai |
| 2020/0143838 A1 | 5/2020 | Peleg et al. |
| 2020/0151860 A1 | 5/2020 | Safdarnejad et al. |
| 2020/0160042 A1 | 5/2020 | Bui et al. |
| 2020/0302656 A1 | 9/2020 | Kumar et al. |
| 2020/0312298 A1 | 10/2020 | Bui et al. |
| 2021/0004576 A1 | 1/2021 | Bui et al. |
| 2021/0027448 A1 | 1/2021 | Cohen et al. |
| 2021/0027471 A1 | 1/2021 | Cohen et al. |
| 2021/0027497 A1 | 1/2021 | Ding et al. |
| 2021/0067344 A1 | 3/2021 | Drake et al. |
| 2021/0073267 A1 | 3/2021 | Chopra et al. |
| 2021/0103607 A1 | 4/2021 | Fisher |
| 2021/0142497 A1 | 5/2021 | Pugh et al. |
| 2021/0263962 A1 | 8/2021 | Chang et al. |
| 2021/0349674 A1 | 11/2021 | Britton |
| 2021/0374905 A1 | 12/2021 | Duan et al. |
| 2022/0058001 A1 | 2/2022 | Chang et al. |
| 2022/0068037 A1 | 3/2022 | Pardeshi |
| 2022/0129670 A1 | 4/2022 | Lin et al. |
| 2022/0129682 A1 | 4/2022 | Tang et al. |
| 2022/0237799 A1 | 7/2022 | Price et al. |
| 2022/0270215 A1 | 8/2022 | Lee |
| 2022/0284613 A1 | 9/2022 | Yin et al. |
| 2022/0337709 A1 | 10/2022 | Tsuruta |
| 2022/0383037 A1 | 12/2022 | Pham et al. |
| 2023/0103305 A1 | 4/2023 | Xu et al. |
| 2023/0127460 A1 | 4/2023 | Xie et al. |
| 2023/0147722 A1 | 5/2023 | Ramirez de Chanlatte et al. |
| 2023/0252752 A1 | 8/2023 | Cheng et al. |
| 2023/0326028 A1 | 10/2023 | Zhang et al. |
| 2024/0062345 A1* | 2/2024 | Kulshreshtha ......... G06V 20/70 |
| 2024/0135511 A1 | 4/2024 | Singh et al. |
| 2024/0153047 A1 | 5/2024 | Smith et al. |
| 2024/0169502 A1 | 5/2024 | Cohen et al. |
| 2024/0171848 A1 | 5/2024 | Figueroa et al. |
| 2024/0331322 A1 | 10/2024 | Smith |
| 2024/0346631 A1 | 10/2024 | Liba et al. |
| 2024/0355107 A1 | 10/2024 | Liba et al. |
| 2024/0378844 A1* | 11/2024 | Yu ........................ G06T 7/174 |
| 2024/0412458 A1 | 12/2024 | Jampani et al. |

FOREIGN PATENT DOCUMENTS

| | | |
|---|---|---|
| CN | 110033475 B | 12/2020 |
| GB | 2623620 A | 4/2024 |
| JP | 2014235553 A | 12/2014 |
| WO | 2023/027681 A1 | 3/2023 |
| WO | 2023/250088 A1 | 12/2023 |

OTHER PUBLICATIONS

Combined Search and Examination Report received in application No. GB2314323.3 dated Dec. 11, 2024.

"10 things we love about Affinity Photo 1.7", available on Jul. 25, 2021, pp. 1-6 https://web.archive.org/web/20210725082242/https://affinityspotlight.com/article/10-things-we-love-about-affinity-photo-17 / (Year: 2021).

U.S. Appl. No. 18/058,554, Dec. 6, 2024, Office Action.

U.S. Appl. No. 18/058,622, Oct. 8, 2024, Office Action.

U.S. Appl. No. 18/311,705, Dec. 6, 2024, Office Action.

U.S. Appl. No. 18/311,713, Nov. 21, 2024, Notice of Allowance.

B. AlBahar, J. Lu, J. Yang, Z. Shu, E. Shechtman, and J. Huang in Pose with Style: Detail-Preserving Pose-Guided Image Synthesis with Conditional StyleGAN, SIGGRAPH Asia 2021 (Pose with Style).

Bin Liao, Yao Zhu, Chao Liang, Fei Luo, Chunxia Xiao: "Illumination animating and editing in a single picture using scene structure estimation." Computers & Graphics (2019).

Bin Liu, Kun Xu, Ralph R. Martin: "Static scene illumination estimation from videos with applications." Journal of Computer Science and Technology (2017).

Daquan Liu, Chengjiang Long, Hongpan Zhang, Hanning Yu, Xinzhi Dong, Chunxia Xiao: "ARshadowGAN: Shadow generative adversarial network for augmented reality in single light scenes." CVPR (2020). In Proceedings of the IEEE Conference on Computer Vision and Pattern Recognition. pp. 8139-8148, 2020.

Daquan Liu, Chengjiang Long, Hongpan Zhang, Hanning Yu, Xinzhi Dong, Chunxia Xiao. (2020). "ARShadowGAN." [dataset]. The IEEE Conference on Computer Vision and Pattern Recognition (CVPR). https://github.com/ldq9526/ARShadowGAN.

F. Faghri et al., Vse++: Improving visual-semantic Embeddings with Hard Negatives, arXiv:1707.05612, 2017.

Fangneng Zhan, Shijian Lu, Changgong Zhang, Feiying Ma, Xuansong Xie: "Adversarial Image Composition with Auxiliary Illumination." ACCV 17 Pages. (2020).

(56) References Cited

OTHER PUBLICATIONS

G. Huang et al., Densely Connected Convolutional Networks, in IEEE Conference on Computer Vision and Pattern Recognition, 2016.
J. Ho, A. Jain, P Abbeel, Denoising Diffusion Probabilistic Models, arXiv:2006:11239.
Jaemin Cho et al., Fine-grained Image Captioning with CLIP Reward, arXiv:2205.13115, 2022.
Jiaming Song, et al. in Denoising diffusion implicit models. In ICLR, 2021.
Kevin Karsch, Kalyan Sunkavalli, Sunil Hadap, Nathan Carr, Hailin Jin, Rafael Fonte, Michael Sittig, David Forsyth: "Automatic scene inference for 3d object compositing." ACM Transactions on Graphics (2014).
Kevin Karsch, Varsha Hedau, David Forsyth, Derek Hoiem: "Rendering synthetic objects into legacy photographs." ACM Transactions on Graphics (2011).
Khoi Pham, Kushal Kafle, Zhe Lin, Zhihong Ding, Scott Cohen, Quan Tran, Abhinav Shrivastava; "Learning to Predict Visual Attributes in the Wild"; CVPR 2021.
Li Niu, Wenyan Cong, Liu Liu, Yan Hong, Bo Zhang, Jing Liang, Liqing Zhang: "Making Images Real Again: A Comprehensive Survey on Deep Image Composition." arXiv preprint arXiv:2106.14490 (2021).
Liang-Chieh Chen et al., Deeplab: Semantic Image Segmentation with Deep Convolutional Nets, Atrous Convolution, and Fully Connected CRFs, arXiv:1606.00915, 2016.
Liang-Chieh Chen et al., Rethinking Atrous Convolution for Semantic Image Segmentation, arXiv:1706.05587, 2017.
Lu Chi, Borui Jiang, and Yadong Mu in Fast Fourier convolution, Advances in Neural Information Processing Systems, 33 (2020).
Lucas Valença, Jinsong Zhang, Michaël Gharbi, Yannick Hold-Geoffroy, Jean-François Lalonde: "Shadow Harmonization for Realistic Compositing." SIGGRAPH Asia (2023) 12 Pages.
Ning Xu et al., "Deep GrabCut for Object Selection," published Jul. 14, 2017.
O. Ronneberger, P. Fischer, and T. Brox, in U-net: Convolutional networks for biomedical image segmentation, MICCAI (3), vol. 9351 of Lecture Notes in Computer Science, p. 234-250 (2015).
Office Action as received in CN Application No. 202311286113.8 dated Nov. 16, 2023.
Qingyang Liu, Jianting Wang, Li Niu. (2023). "Object Shadow Generation Dataset—DESOBAv2." Version 2. [dataset]. AAAI 2023. https://github.com/bcmi/Object-Shadow-Generation-Dataset-DESOBAv2.
Quanling Meng, Shengping Zhang, Zonglin Li, Chenyang Wang, Weigang Zhang, Qingming Huang: "Automatic Shadow Generation via Exposure Fusion." IEEE Transactions on Multimedia, vol. 25, pp. 9044-9056, 2023, doi: 10.1109/TMM.2023.3244398.
R. Rombach, A. Blattmann, D. Lorenz, P. Esser, and B. Ommer, in High-Resolution Image Synthesis with Latent Diffusion Models, arXiv:2112.10752v2.
Redmon, et al., You Only Look Once: Unified, Real-Time Object Detection, CVPR 2016.
S. Ren, K. He, R. Girshick, and J. Sun, Faster r-cnn: Towards real-time object detection with region proposal networks, NIPS, 2015.
Shuyang Zhang, Runze Liang, Miao Wang: "ShadowGAN: Shadow synthesis for virtual objects with conditional adversarial networks." Computational Visual Media (2019). vol. 5, No. 1, Mar. 2019, 105-115.
Taesung Park, Ming-Yu Liu, Ting-Chun Wang, and Jun-Yan Zhu in Semantic image synthesis with spatially-adaptive normalization, Proceedings of the IEEE Conference on Computer Vision and Pattern Recognition (2019).
Tero Karras, Samuli Laine, Miika Aittala, Janne Hellsten, Jaakko Lehtinen, and Timo Aila in Analyzing and improving the image quality of StyleGAN, Proc. CVPR (2020) (hereinafter StyleGan2).
Tianyanshi Liu, Yuhang Li, Youdong Ding: "Shadow Generation for Composite Image with Multi-level Feature Fusion." EITCE (2022).
Xiaohang Zhan, Xingang Pan, Bo Dai, Ziwei Liu, Dahua Lin, Chen Change Loy, "Self-Supervised Scene De-occlusion", arXiv:2004.02788v1, Apr. 6, 2020, 11 pages.
Xihui Liu, Zhe Lin, Jianming Zhang, Handong Zhao, Quan Tran, Xiaogang Wang, and Hongsheng Li; "Open-Edit: Open-Domain Image Manipulation with Open-Vocabulary Instructions"; arXiv:2008.01576v2[cs.CV] Apr. 21, 2021.
Xinhao Tao, Junyan Cao, Yan Hong, Li Niu: "Shadow Generation with Decomposed Mask Prediction and Attentive Shadow Filling." AAAI (2024).
Xinhao Tao, Junyan Cao, Yan Hong, Li Niu. "Rendered Shadow Generation Dataset—RDSOBA." [dataset] AAAI 2024. https://github.com/bcmi/Rendered-Shadow-Generation-Dataset-RdSOBA.
Y. Li, W. Ouyang, B. Zhou, Y. Cui, J. Shi, and X. Wang, Factorizable net: An efficient subgraph based framework for scene graph generation, ECCV, Jun. 29, 2018.
Yan Hong, Li Niu, Jianfu Zhang: "Shadow Generation for Composite Image in Real-world Scenes." AAAI arXiv:2104.10338v1 14 Pages. (2022).
Yan Hong, Li Niu, Jianfu Zhang. (2022). "Object Shadow Generation Dataset—DESOBA." [dataset]. AAAI 2022. https://github.com/bcmi/Object-Shadow-Generation-Dataset-DESOBA.
Yan Hong, Li Niu, Jianfu Zhang. "Shadow Generation for Composite Image in Real-World Scenes." AAAI. (2022). arXiv:2104.10338v3. 16 Pages.
Yichen Sheng, Jianming Zhang, Bedrich Benes: "SSN: Soft shadow network for image compositing." CVPR (2021). In Proceedings of the IEEE Conference on Computer Vision and Pattern Recognition. pp. 4380-4390, 2021.
Yichen Sheng, Jianming Zhang, Julien Philip, Yannick Hold-Geoffroy, Xin Sun, He Zhang, Lu Ling, Bedrich Benes: "PixHt-Lab: Pixel Height Based Light Effect Generation for Image Compositing." CVPR (2023).
Yichen Sheng, Yifan Liu, Jianming Zhang, Wei Yin, Oztireli Cengiz, He Zhang, Lin Zhe, Shechtman Eli, Bedrich Benes: "Controllable Shadow Generation Using Pixel Height Maps." ECCV (2022). arXiv:2207.05385v2. Jul. 15, 2022. 17 Pages.
U.S. Appl. No. 18/058,630, Nov. 15, 2023, Office Action.
U.S. Appl. No. 18/311,713, Jan. 4, 2024, Office Action.
U.S. Appl. No. 18/058,630, Feb. 28, 2024, Notice of Allowance.
Chen, Hsiang-Ting et al. ACM Digital Library: Data-driven adaptive history for image editing, published Feb. 27, 2016, pp. 1-9. https://dl.acm.org/doi/10.1145/2856400.2856417 (Year: 2016).
Combined Search and Examination Report received in application No. GB2314585.7 dated Feb. 28, 2024.
Combined Search and Examination Report received in application No. GB2314323.3 dated Feb. 28, 2024.
Combined Search and Examination Report received in application No. GB2316991.5 dated May 8, 2024.
Combined Search and Examination Report received in application No. GB2317196.0 dated May 21, 2024.
Dhamo H, Farshad A, Laina I, Navab N, Hager GD, Tombari F, Rupprecht C. "Semantic Image Manipulation Using Scene Graphs", 2020, IEEE/CVF Conf on Computer Vision and Pattern Recognition (CVPR), Jun. 13, 2020-Jun. 19, 2020, Seattle, WA, pp. 5212-5221.
Draftback Replays a Google Document's Changes in Video Format!, Published Sep. 27, 2019, pp. 1-10, https://web.archive.org/web/20220902104215/https://terrystechtipscchs.blogspot.com/2019/09/draftback-replays-google-documents.html (Year: 2019).
M. Choi, "Referring Object Manipulation of Natural Images with Conditional Classifier-free guidance", Computer Vision ECCV 2022. ECCV 2022, Lecture Notes in Computer Science, vol. 13696. Springer Cham. https://doi.org/.
P.K. Saha et al., "Data Augmentation Technique to Expand Road Dataset Using Mask RCNN and Image Inpainting," 2021 International Conference on Intelligent Technologies (CONIT), Hubli, India, 2021, pp. 1-6, doi: 10.1109/CONIT51480.2021.9498505.
U.S. Appl. No. 18/058,622, Mar. 21, 2024, Office Action.
U.S. Appl. No. 18/311,705, Mar. 27, 2024, Office Action.
Combined Search and Examination Report received in application GB 2403915.8 dated Aug. 9, 2024.
Search Report received in GB2402982.9 dated Jul. 10, 2024.
U.S. Appl. No. 18/058,538, Aug. 19, 2024, Office Action.

(56) References Cited

OTHER PUBLICATIONS

U.S. Appl. No. 18/058,554, Aug. 6, 2024, Office Action.
U.S. Appl. No. 18/311,705, Sep. 13, 2024, Office Action.
Combined Search and Examination Report received in application No. GB2317072.3 dated May 16, 2024.
Search Report received in GB2318128.2 dated Jun. 4, 2024.
Search Report received in GB2318199.3 dated Jun. 5, 2024.
Combined Search and Examination Report received in application No. GB2403106.4 dated Jul. 12, 2024.
U.S. Appl. No. 18/311,713, Jul. 5, 2024, Office Action.
U.S. Appl. No. 18/404,648, Jul. 17, 2024, Office Action.
Bin Ding, Chengjiang Long, Ling Zhang, Chunxia Xiao. "ARGAN: Attentive Recurrent Generative Adversarial Network for Shadow Detection and Removal." 2019 IEEE/CVF International Conference on Computer Vision (ICCV), 2019, pp. 10212-10221.
Chao Tan, Xin Feng. "Unsupervised Shadow Removal Using Target Consistency Generative Adversarial Network." arXiv preprint; arXiv:2010.01291v2, 14 pages, 2021.
Florin-Alexandru Vasluianu, Andres Romero, Luc Van Gool, and Radu Timofte. "Self-Supervised Shadow Removal." arXiv preprint; arXiv:2010.11619v1. 10 pages, 2021.
Haitian Zheng, Zhe Lin, Jingwan Lu, Scott Cohen, Eli Shechtman, Connelly Barnes, Jianming Zhang, Ning Xu, Sohrab Amirghodsi, and Jiebo Luo. "Image Inpainting with Cascaded Modulation GAN and Object-Aware Training". arXiv preprint, arXiv:2203.11947v3, 32 pp. 2022.
Hieu Le and Dimitris Samaras. "Physics-based Shadow Image Decomposition for Shadow Removal." IEEE Transactions on Pattern Analysis and Machine Intelligence. 14 Pages. 2021.
Hieu Le and Dimitris Samaras. "From Shadow Segmentation to Shadow Removal." In proceedings of the European Conference on Computer Vision. 18 pages, 2020.
Hieu Le, Dimitris Samaras. "Shadow Removal via Shadow Image Decomposition." International Conference on Computer Vision 2019. (ICCV). pp. 8578-8587. 2019.
Jiawei Liu; Qiang Wang; Huijie Fan; Jiandong Tian; Yandong Tang. "A Shadow Imaging Bilinear Model and Three-Branch Residual Network for Shadow Removal," in IEEE Transactions on Neural Networks and Learning Systems, doi: 10.1109/TNNLS.2023.3290078.
Jiawei Liu; Qiang Wang; Huijie Fan; Wentao Li; Liangqiong Qu; Yandong Tang. "A Decoupled Multi-Task Network for Shadow Removal," in IEEE Transactions on Multimedia, vol. 25, pp. 9449-9463, 2023, doi: 10.1109/TMM.2023.3252271.
Jifeng Wang, Xiang Li, Le Hui, Jian Yang. "Stacked Conditional Generative Adversarial Networks for Jointly Learning Shadow Detection and Shadow Removal." 2018 IEEE Conference on Computer Vision and Pattern Recognition (CVPR) pp. 10. 2018.
Jin Wan, Hui Yin, Zhenyao Wu, Xinyi Wu, Yanting Liu, and Song Wan. "Style-Guided Shadow Removal." In proceedings of European Conference on Computer Vision 2022. 17 Pages. 2022.
Jin Wan, Hui Yin, Zhenyao Wu, Xinyi Wu, Zhihao Liu, Song Wang. "CRFormer: A Cross-Region Transformer for Shadow Removal." arXiv preprint., arXiv:2207.01600v1. 11 Pages. 2022.
Kunpeng Niu; Yanli Liu; Enhua Wu; Guanyu Xing. "A Boundary-Aware Network for Shadow Removal." IEEE Transactions on Multimedia (vol. 25), pp. 6782-6793, 2022.
Lan Fu, Changqing Zhou, Qing Guo, Felix Juefei-Xu, Hongkai Yu, Wei Feng, Yang Liu, Song Wang. "Auto-Exposure Fusion for Single-Image Shadow Removal." Proceedings of the IEEE/CVF Conference on Computer Vision and Pattern Recognition (CVPR), 2021, pp. 10571-10580. 2021.
Lanqing Guo, Chong Wang, Wenhan Yang, Siyu Huang, Yufei Wang, Hanspeter Pfister, Bihan Wen. "ShadowDiffusion: When Degradation Prior Meets Diffusion Model for Shadow Removal." In CVPR 2023 pp. 14049-14058, 2023.
Lanqing Guo, Siyu Huang, Ding Liu, Hao Cheng, Bihan Wen. "ShadowFormer: Global Context Helps Image Shadow Removal." In Proceedings AAAI Conference on Artificial Intelligence, 9 pages, 2023.
Lei Zhu, Zijun Deng, Xiaowei Hu, Chi-Wing Fu, Xuemiao Xu, Jing Qin, and Pheng-Ann Heng. "Bidirectional Feature Pyramid Network with Recurrent Attention Residual Modules for Shadow Detection." Proceedings of the European Conference on Computer Vision (ECCV), 2018, pp. 121-136.
Liangqiong Qu, Jiandong Tian, Shengfeng He, Yandong Tang, Rynson W. H. Lau. "DeshadowNet: A Multi-Context Embedding Deep Network for Shadow Removal." 2017 IEEE Conference on Computer Vision and Pattern Recognition (CVPR) pp. 4067-4075. 2017.
Ling Zhang, Chengjiang Long, Xiaolong Zhang, Chunxia Xiao. "RIS-GAN: Explore Residual and Illumination with Generative Adversarial Networks for Shadow Removal." The Thirty-Fourth AAAI Conference on Artificial Intelligence (AAAI-20). pp. 12829-12836. 2020.
Lvmin Zhang, Jinyue Jiang, Yi Ji, Chunping Liu. "SmartShadow: Artistic Shadow Drawing Tool for Line Drawings." 2021 IEEE/CVF International Conference on Computer Vision (ICCV), Montreal, QC, Canada, 2021, pp. 5371-5380, doi: 10.1109/ICCV48922.2021.00534, 2021.
Mehmet Kerim Yucel, Valia Dimaridou, Bruno Manganelli, Mete Ozay, Anastasios Drosou, Albert Saa-Garriga. "LRA&LDRA: Rethinking Residual Predictions for Efficient Shadow Detection and Removal." IEEE/CVF Winter Conference on Applications of Computer Vision, pp. 4925-4935, 2023.
Mrinmoy Sen, Sai Pradyumna Chermala, Nazrinbanu Nurmohammad Nagori, Venkat Peddigari, Praful Mathur, B H Pawan Prasad, Moonhwan Jeong. "SHARDS: Efficient SHAdow Removal using Dual Stage Network for High-Resolution Images." IEEE/CVF Winter Conference on Applications of Computer Vision, pp. 1809-1817, 2023.
Naoto Inoue, Toshihiko Yamasaki. "Learning from Synthetic Shadows for Shadow Detection and Removal." IEEE Transactions on Circuits and Systems for Video Technology (vol. 31, Issue: 11, Nov. 2021), pp. 4187-4197, 2020.
Qianhao Yu, Naishan Zheng, Jie Huang, and Feng Zhao. "CNSNet: A Cleanness-Navigated-Shadow Network for Shadow Removal." European Conference on Computer Vision Workshop 2022. 18 pages. 2022.
Qingyuan Zheng, Zhuoru Li, Adam Bargteil. "Learning to Shadow Hand-Drawn Sketches". The IEEE/CVF Conference on Computer Vision and Pattern Recognition (CVPR), pp. 7436-7445, 2020.
Shengfeng He, Bing Peng; Junyu Dong; Yong Du, "Mask-ShadowNet: Toward Shadow Removal via Masked Adaptive Instance Normalization," in IEEE Signal Processing Letters, vol. 28, pp. 957-961, 2021, doi: 10.1109/LSP.2021.3074082.
Subhrajyoti Dasgupta, Arindam Das, Sudip Das, Andrei Bursuc, Ujjwal Bhattacharya and Senthil Yogamani. "UnShadowNet: Illumination Critic Guided Contrastive Learning For Shadow Removal." arXiv preprint arXiv: 2203.15441v1. 13 Pages. 2022.
Tianrun Chen, Lanyun Zhu, Chaotao Ding, Runlong Cao, Yan Wang, Zejian Li, Lingyun Sun, Papa Mao, Ying Zang. "SAM Fails to Segment Anything?—SAM-Adapter: Adapting SAM in Underperformed Scenes: Camouflage, Shadow, Medical Image Segmentation, and More." arXiv preprint, arXiv:2304.09148v3, 13 pages, 2023.
Tianyu Wang, Xiaowei Hu, Chi-Wing Fu, and Pheng-Ann Heng. "Single-Stage Instance Shadow Detection with Bidirectional Relation Learning." 2021 IEEE/CVF Conference on Computer Vision and Pattern Recognition (CVPR), 11 pages, 2021.
Tianyu Wang, Xiaowei Hu, Pheng-Ann Heng, Chi-Wing Fu. "Instance Shadow Detection with A Single-Stage Detector." Institute of Electrical and Electronics Engineers (IEEE), IEEE Transactions on Pattern Analysis and Machine Intelligence, 14 pages, 2023.
Tianyu Wang, Xiaowei Hu, Qiong Wang, Pheng-Ann Heng, and Chi-Wing Fu. "Instance Shadow Detection." In Proceedings of the IEEE/CVF Conference on Computer Vision and Pattern Recognition (pp. 1880-1889). 2021.
Xiaodong Cun, Chi-Man Pun, Cheng Shi. "Towards Ghost-Free Shadow Removal via Dual Hierarchical Aggregation Network and Shadow Matting GAN." Proceedings of the AAAI Conference on Artificial Intelligence, 34(07), 10680-10687. https://doi.org/10.1609/aaai.v34i07.6695, 2020.

(56) References Cited

OTHER PUBLICATIONS

Xiaowei Hu, Chi-Wing Fu, Lei Zhu, Jing Qin, and Pheng-Ann Heng. "Direction-aware Spatial Context Features for Shadow Detection and Removal." IEEE Transactions on Pattern Analysis and Machine Intelligence. 14 pages. 2019.

Xiaowei Hu, Lei Zhu, Chi-Wing Fu, Jing Qin, and Pheng-Ann Heng. "Direction-aware Spatial Context Features for Shadow Detection." 2018 IEEE/CVF Conference on Computer Vision and Pattern Recognition, pp. 7454-7462, 2018.

Xiaowei Hu, Yitong Jiang, Chi-Wing Fu, Pheng-Ann Heng, "Mask-ShadowGAN: Learning to Remove Shadows from Unpaired Data." 2019 IEEE/CVF International Conference on Computer Vision (ICCV), pp. 2472-2481, 2019.

Xuaner Cecilia Zhang, Jonathan T. Barron, Yun-Ta Tsai, Rohit Pandey, Xiuming Zhang, Ren Ng, and David E. Jacobs. "Portrait Shadow Manipulation." In SIGGRAPH, CoRR abs/2005.08925, 14 pages, 2020.

Yaojie Liu, Andrew Hou, Xinyu Huang, Liu Ren, Xiaoming Liu. "Blind Removal of Facial Foreign Shadows." In Proceedings of the British Machine Vision Conference 2022, 14 pages, 2022.

Yeying Jin, Aashish Sharma, and Robby T. Tan. "DC-ShadowNet: Single-Image Hard and Soft Shadow Removal Using Unsupervised Domain-Classifier Guided Network.". In Proceedings of the IEEE international conference on computer vision, pp. 5027-5036.

Yeying Jin, Wenhan Yang, Wei Ye, Yuan Yuan and Robby T. Tan. "ShadowDiffusion: Diffusion-based Shadow Removal using Classifier-driven Attention and Structure Preservation." arXiv preprint arXiv:2211.08089v3. 10 pages. 2022.

Yimin Xu, Mingbao Lin, Hong Yang, Fei Chao, Rongrong Ji. "Shadow-Aware Dynamic Convolution for Shadow Removal." arXiv preprint. arXiv:2205.04908v3. 10 Pages. 2022.

Yingqing He, Yazhou Xing, Tianjia Zhang, and Qifeng Chen. 2021. "Unsupervised Portrait Shadow Removal via Generative Priors." In Proceedings of the 29th ACM Int'l Conference on Multimedia (MM '21), Oct. 20-24, 2021, Virtual Event, 9 pages. https://doi.org/10.1145/3474085.3475663.

Yurui Zhu, Jie Huang, Xueyang Fu, Feng Zhao, Qibin Sun, Zheng-Jun Zha. "Bijective Mapping Network for Shadow Removal." 2022 IEEE Conference on Computer Vision and Pattern Recognition (CVPR). pp. 5627-5636. 2022.

Yurui Zhu, Xueyang Fu, Chengzhi Cao, Xi Wang, Qibin Sun, and Zheng-Jun Zha. 2022. "Single Image Shadow Detection via Complementary Mechanism." In Proceedings of the 30th ACM International Conference on Multimedia (MM'22), Oct. 10-14, 2022, 10 pages. https://doi.org/10.1145/3503161.3547904.

Yurui Zhu, Zeyu Xiao, Yanchi Fang, Xueyang Fu, Zhiwei Xiong, and Zheng-Jun Zha. (2022). Efficient Model-Driven Network for Shadow Removal. Proceedings of the AAAI Conference on Artificial Intelligence, 36(3), 3635-3643. https://doi.org/10.1609/aaai.v36i3.2027.

Zhenghao Xing, Tianyu Wang, Xiaowei Hu, Haoran Wu, Chi-Wing Fu, Pheng-Ann Heng. "Video Instance Shadow Detection." arXiv preprint, arXiv:2211.12827v1, 10 pages, 2023.

Zhihao Liu, Hui Yin, Xinyi Wu, Zhenyao Wu, Yang Mi, Song Wang. "From Shadow Generation to Shadow Removal." The IEEE / CVF Computer Vision and Pattern Recognition Conference (CVPR). 10 pages, 2021.

Zhihao Liu; Hui Yin; Yang Mi; Mengyang Pu; Song Wang. "Shadow Removal by a Lightness-Guided Network With Training on Unpaired Data," in IEEE Transactions on Image Processing, vol. 30, pp. 1853-1865, 2021, doi: 10.1109/TIP.2020.3048677.

Zipei Chen, Chengjiang Long, Ling Zhang, Chunxia Xiao. "CANet: A Context-Aware Network for Shadow Removal." International Conference on Computer Vision 2021 (ICCV2021). 13 Pages. 2021.

Combined Search and Examination Report received in application No. GB2417128.2 dated Mar. 13, 2025.

Tianyu Wang et al., "Instance Shadow Detection", In IEEE/CVF Conference on Computer Vision and Pattern Recognition (CVPR), pp. 1877-1886, 2020.

Tim Chen; Nonlinear Revision Control for Images, by Tim Chen Apr. 11, 2011, pp. 1-2 https://www.youtube.com/watch?v=RBL1cVzlQik (Year: 2011).

U.S. Appl. No. 18/058,538, Jan. 31, 2025, Notice of Allowance.
U.S. Appl. No. 18/058,554, Mar. 12, 2025, Notice of Allowance.
U.S. Appl. No. 18/058,575, Feb. 12, 2025, Office Action.
U.S. Appl. No. 18/058,622, Feb. 27, 2025, Office Action.
U.S. Appl. No. 18/320,664, Mar. 5 2025, Office Action.
U.S. Appl. No. 18/311,705, Mar. 28, 2025, Office Action.
U.S. Appl. No. 18/460,365, Feb. 28, 2025, Notice of Allowance.
U.S. Appl. No. 18/404,648, Jan. 30, 2025, Notice of Allowance.
Second Examination Report received in application No. GB2314585.7 dated May 20, 2025.

Song, Yizhi, et al. "ObjectStitch date infomation.pdf", publishing information for NPL "U", Abstract, (Year: 2023).

Song, Yizhi, et al. "ObjectStitch: Object Compositing with Diffusion Model" p. 18310-18319, "Objectstitch.pdf" (Year: 2023).

U.S. Appl. No. 18/058,575, Jun. 26, 2025, Notice of Allowance.
U.S. Appl. No. 18/460,150, Jul. 10, 2025, Office Action.
U.S. Appl. No. 18/460,150, Sep. 23, 2025, Notice of Allowance.

* cited by examiner

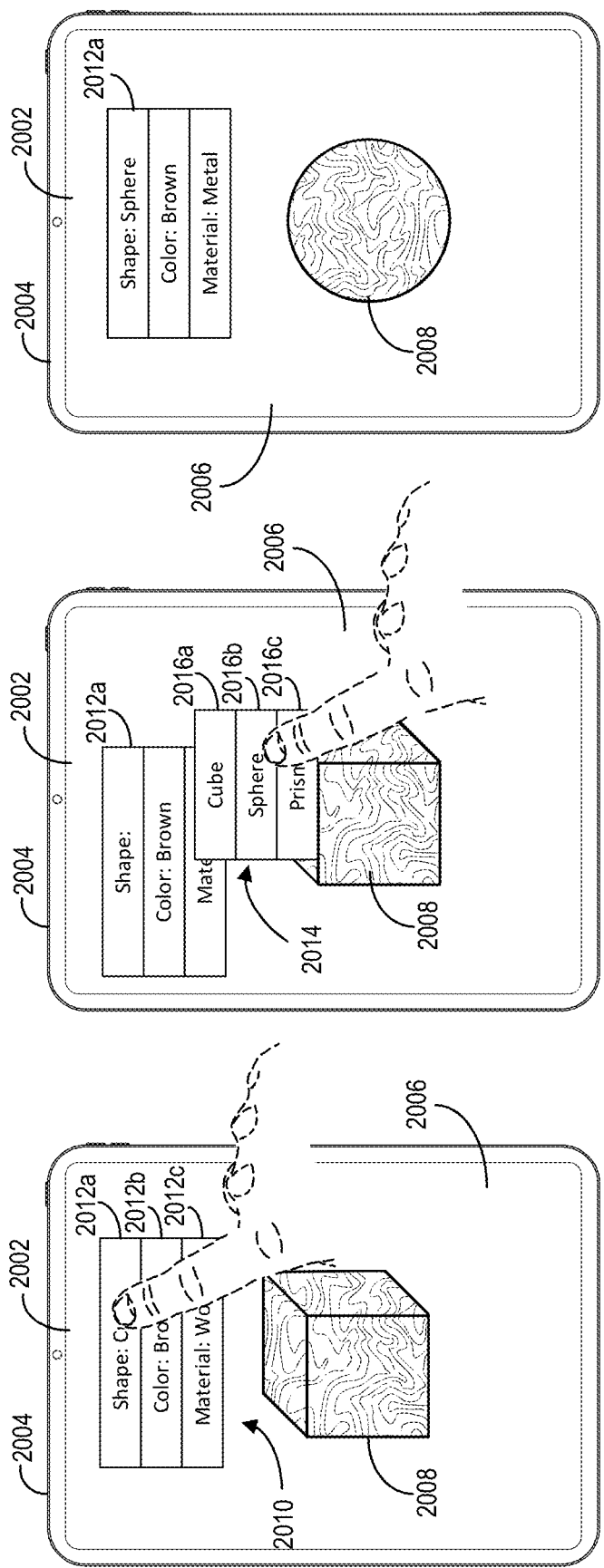

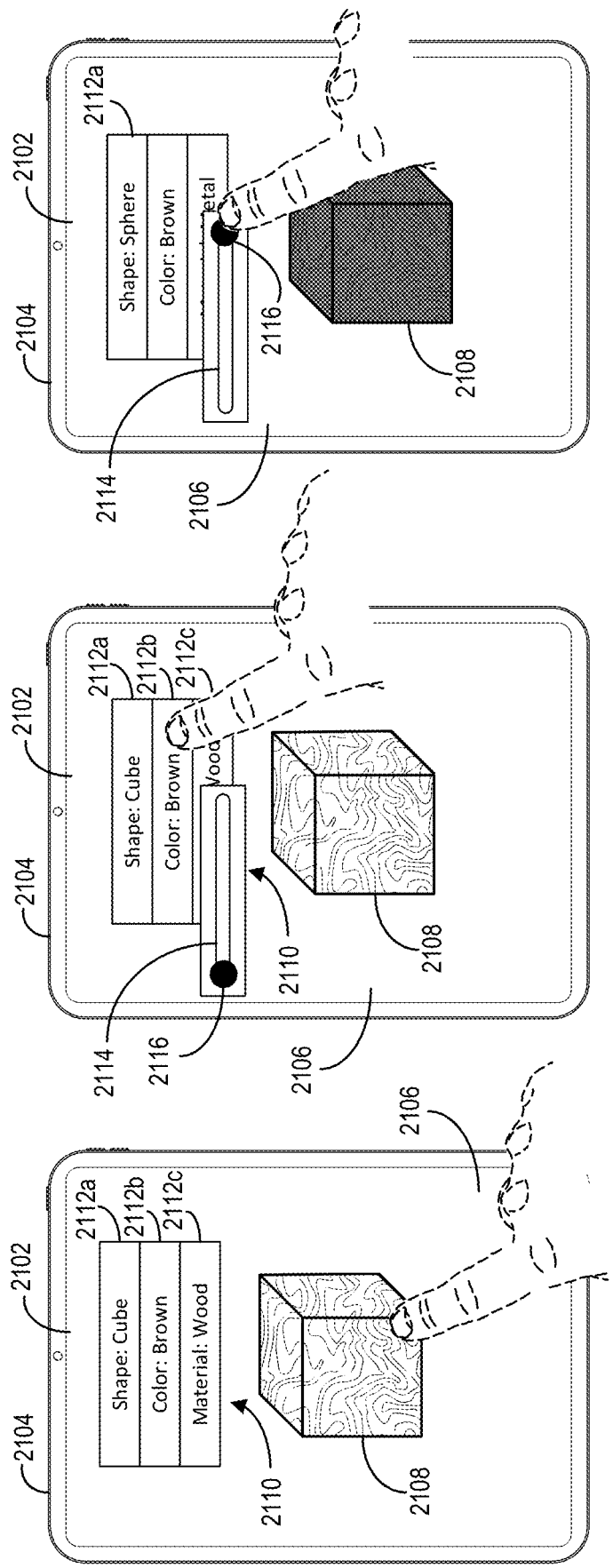

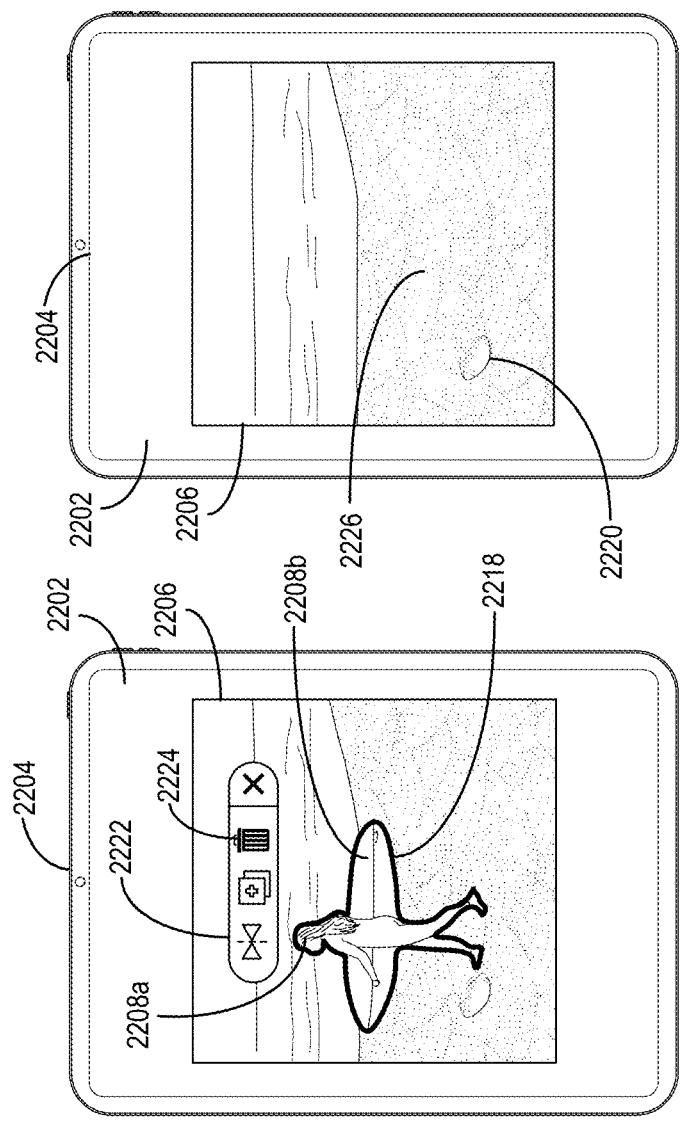
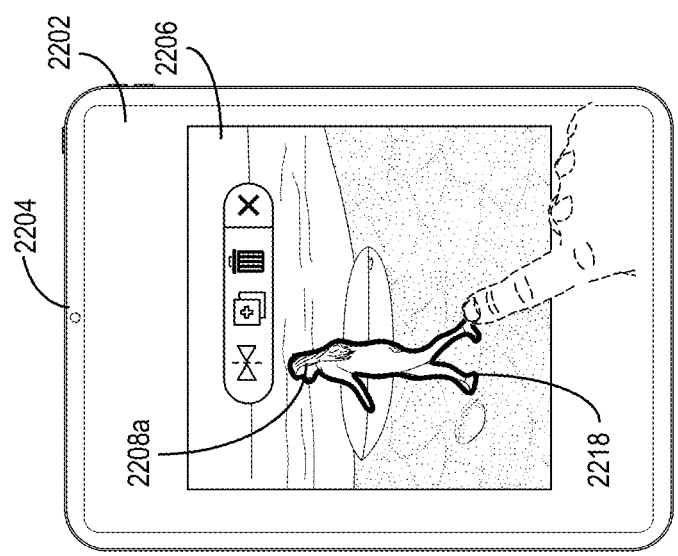
Fig. 22D
Fig. 22C
Fig. 22B

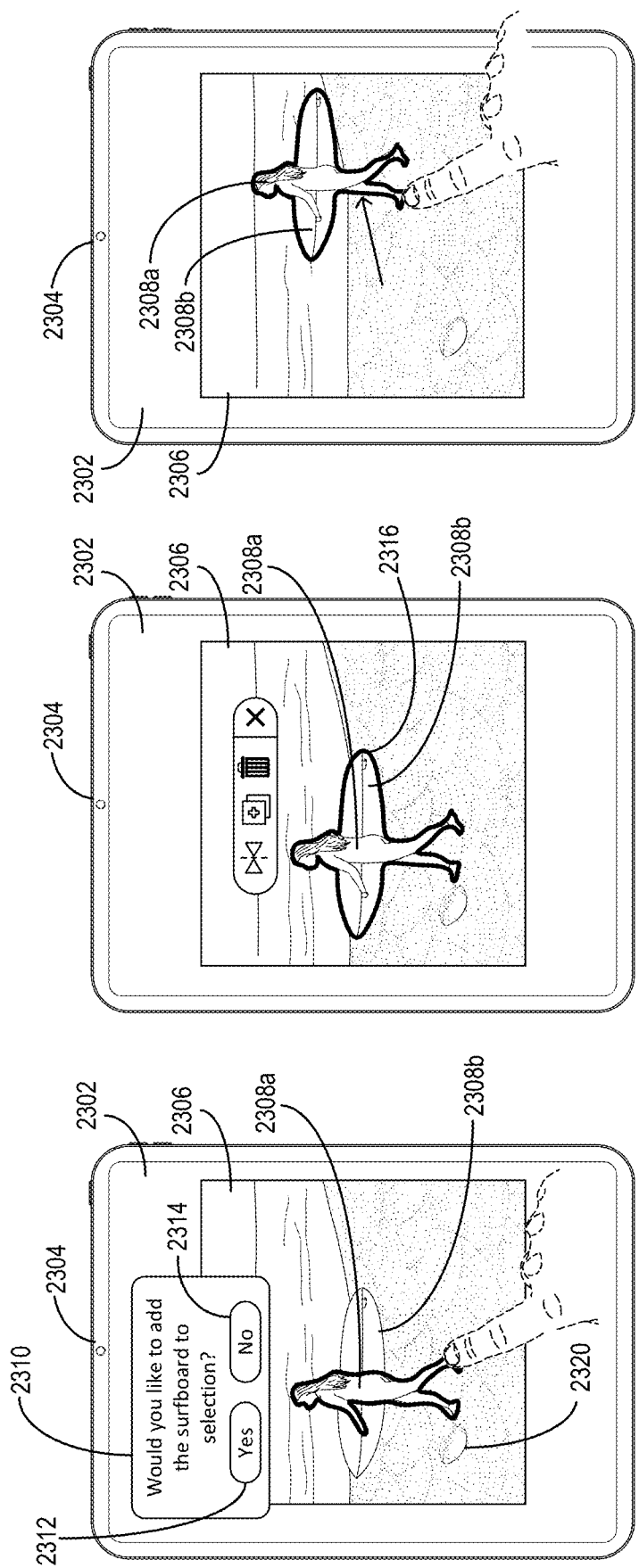

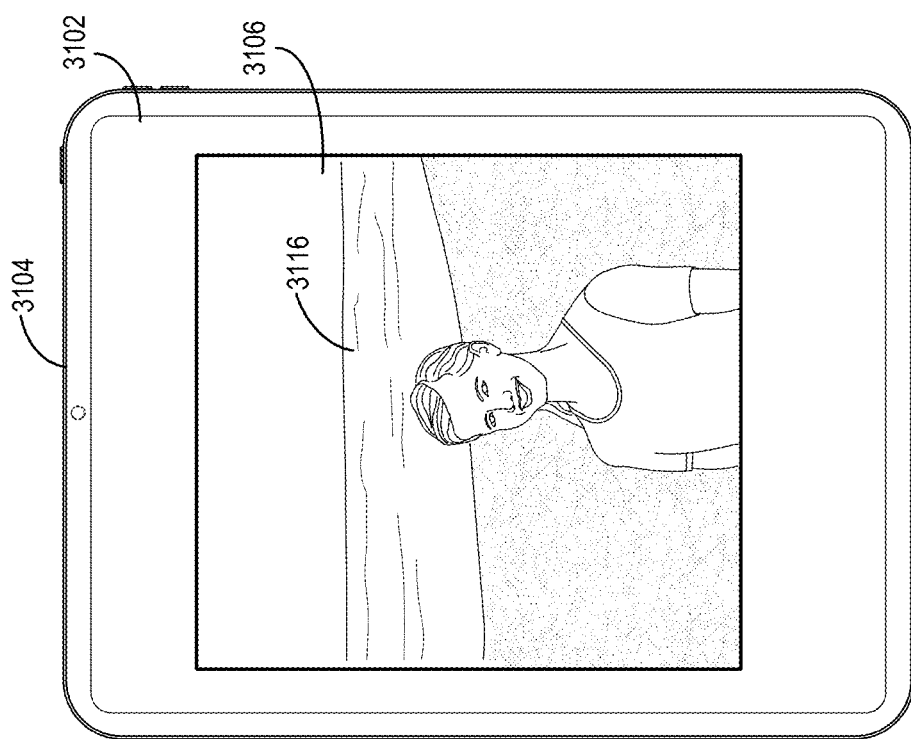

6700

Receiving A Digital Image Depicting A Scene Comprising An Object With A Shadow 6702

Accessing An Object Mask Of The Shadow 6704

Generating A Modified Digital Image Without The Shadow 6706

Generating, Utilizing A Generative Inpainting Neural Network, An Object Fill 6710

Combining The Object Fill For The First Location And The Digital Image Without The Shadow 6712

*Fig. 67*

TEXTURE-PRESERVING SHADOW REMOVAL IN DIGITAL IMAGES UTILIZING GENERATING INPAINTING MODELS

CROSS-REFERENCE TO RELATED APPLICATIONS

This application is a continuation of U.S. application Ser. No. 18/460,150 filed Sep. 1, 2023, which is a continuation-in-part of U.S. patent application Ser. No. 18/058,575 filed Nov. 23, 2022. The entire contents of the aforementioned patent applications are incorporated herein by reference.

BACKGROUND

Recent years have seen significant advancement in hardware and software platforms for performing computer vision and image editing tasks. Indeed, systems provide a variety of image-related tasks, such as object identification, classification, segmentation, composition, style transfer, image inpainting, etc.

SUMMARY

One or more embodiments described herein provide benefits and/or solve one or more problems in the art with systems, methods, and non-transitory computer-readable media that implement artificial intelligence models to facilitate flexible and efficient scene-based image editing. To illustrate, in one or more embodiments, a system utilizes one or more machine learning models to learn/identify characteristics of a digital image, anticipate potential edits to the digital image, and/or generate supplementary components that are usable in various edits. Accordingly, the system gains an understanding of the two-dimensional digital image as if it were a real scene, having distinct semantic areas reflecting real-world (e.g., three-dimensional) conditions. Further, the system enables the two-dimensional digital image to be edited so that the changes automatically and consistently reflect the corresponding real-world conditions without relying on additional user input. Thus, the system facilitates flexible and intuitive editing of digital images while efficiently reducing the user interactions typically required to make such edits.

Furthermore, in one or more embodiments, the system implements a shadow synthesis diffusion model to generate a shadow for an object within a digital image. Specifically, given an image with an object without a shadow, and a mask of the object, the system generates a shadow for the object without the shadow. For instance, the system receives a selection of a specific object within a digital image, and combines the object mask of the specific object, the digital image, and a noise representation to generate a combined representation. The system then denoises the combined representation in an iterative process to generate a modified image with a shadow for the object. Further, in some embodiments, the system generates. from the combined representation, a shadow of the object that is consistent with a scene portrayed within the digital image.

Furthermore, in one or more embodiments, the system implements a shadow removal model to remove a shadow within a digital image. For example, the system utilizes a generative inpainting neural network to make modifications to a digital image to replace pixels associated with a shadow. Moreover, in some embodiments the system in removing the shadow preserves a visible texture of a location where the shadow previously existed. Further, the system finetunes the generative inpainting neural network with specialized training datasets to enhance the shadow removal process and the preserving of visible textures corresponding with the shadow.

Furthermore, in one or more embodiments, the system receives various input from a client device to re-position an object within a digital image. For example, the system receives a selection to position an object casting a shadow in a different location within the digital image. Moreover, in some embodiments the system removes the initial shadow of the object and generates a proxy shadow for the object while the re-positioning is happening. Moreover, in some embodiments, upon completing the re-positioning, the system generates a new shadow for the object in the new location. Further, in some embodiments the system generates the new shadow and manages to preserve the visible texture underneath the new shadow. In some instances, the system also removes objects from a digital image along with shadows associated with the objects.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 20A-20C illustrate another graphical user interface implemented by the scene-based image editing system to facilitate modifying object attributes of objects portrayed in a digital image in accordance with one or more embodiments;

FIGS. 21A-21C illustrate yet another graphical user interface implemented by the scene-based image editing system to facilitate modifying object attributes of objects portrayed in a digital image in accordance with one or more embodiments;

FIGS. 22A-22D illustrate a graphical user interface implemented by the scene-based image editing system to facilitate a relationship-aware object modification in accordance with one or more embodiments;

FIGS. 23A-23C illustrate another graphical user interface implemented by the scene-based image editing system to facilitate a relationship-aware object modification in accordance with one or more embodiments;

FIGS. 31A-31C illustrate another graphical user interface implemented by the scene-based image editing system to identify and remove distracting objects from a digital image in accordance with one or more embodiments;

FIG. 67 illustrates a flowchart for a series of acts for generating a modified digital image with a shadow removed in accordance with one or more embodiments;

DETAILED DESCRIPTION

Figure 1:
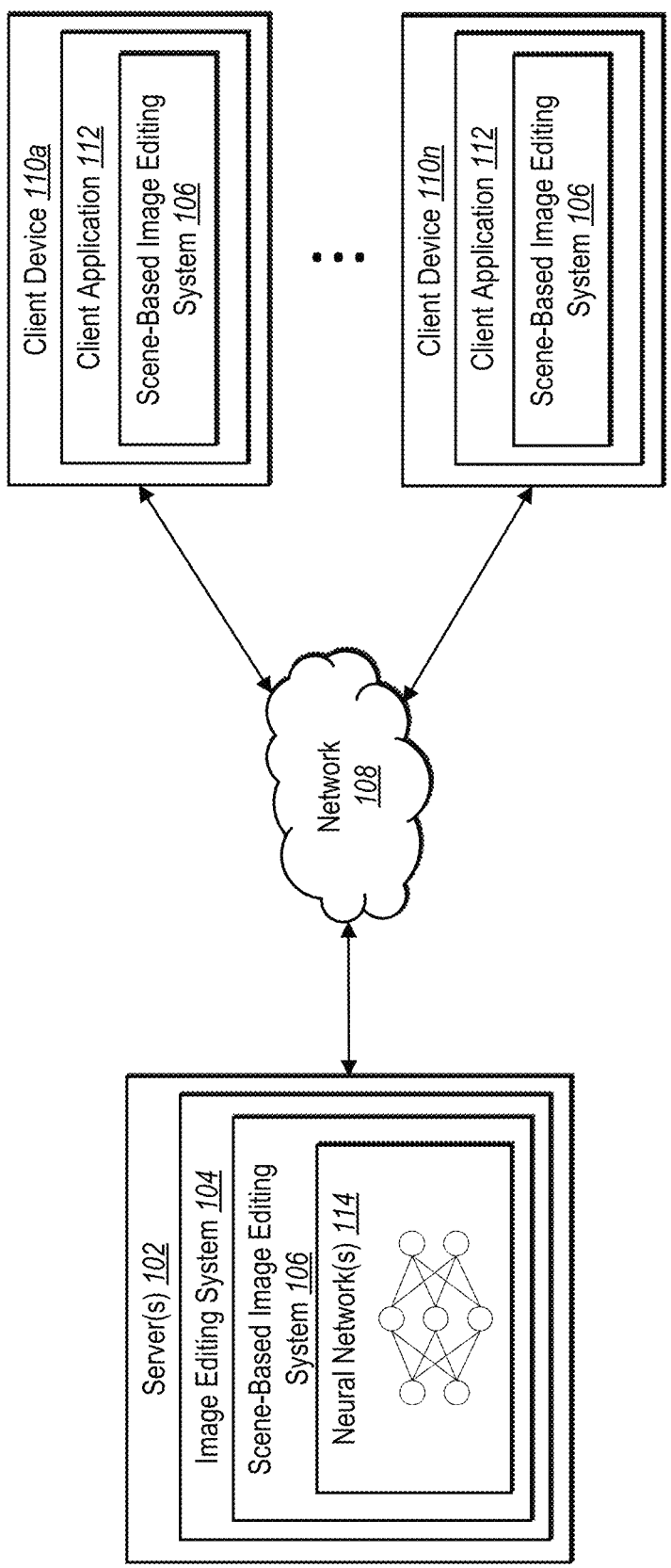
FIG. 1 illustrates an example environment in which a scene-based image editing system operates in accordance with one or more embodiments.

One or more embodiments described herein include a scene-based image editing system that implements scene-based image editing techniques using intelligent image understanding. Indeed, in one or more embodiments, the scene-based image editing system utilizes one or more machine learning models to process a digital image in anticipation of user interactions for modifying the digital image. For example, in some implementations, the scene-based image editing system performs operations that build a knowledge set for the digital image and/or automatically initiate workflows for certain modifications before receiving user input for those modifications. Based on the pre-processing, the scene-based image editing system facilitates user interactions with the digital image as if it were a real scene reflecting real-world conditions. For instance, the scene-based image editing system enables user interactions that target pre-processed semantic areas (e.g., objects that have been identified and/or masked via pre-processing) as distinct components for editing rather than target the individual underlying pixels. Further, the scene-based image editing system automatically modifies the digital image to consistently reflect the corresponding real-world conditions.

As indicated above, in one or more embodiments, the scene-based image editing system utilizes machine learning to process a digital image in anticipation of future modifications. In particular, in some cases, the scene-based image editing system employs one or more machine learning models to perform preparatory operations that will facilitate subsequent modification. In some embodiments, the scene-based image editing system performs the pre-processing automatically in response to receiving the digital image. For instance, in some implementations, the scene-based image editing system gathers data and/or initiates a workflow for editing the digital image before receiving user input for such edits. Thus, the scene-based image editing system allows user interactions to directly indicate intended edits to the digital image rather than the various preparatory steps often utilized for making those edits.

As an example, in one or more embodiments, the scene-based image editing system pre-processes a digital image to facilitate object-aware modifications. In particular, in some embodiments, the scene-based image editing system pre-processes a digital image in anticipation of user input for manipulating one or more semantic areas of a digital image, such as user input for moving or deleting one or more objects within the digital image.

To illustrate, in some instances, the scene-based image editing system utilizes a segmentation neural network to generate, for each object portrayed in a digital image, an object mask. In some cases, the scene-based image editing system utilizes a hole-filing model to generate, for each object (e.g., for each corresponding object mask), a content fill (e.g., an inpainting segment). In some implementations, the scene-based image editing system generates a completed background for the digital image by pre-filling object holes with the corresponding content fill. Accordingly, in one or more embodiments, the scene-based image editing system pre-processes the digital image in preparation for an object-aware modification, such as a move operation or a delete operation, by pre-generating object masks and/or content fills before receiving user input for such a modification.

Thus, upon receiving one or more user inputs targeting an object of the digital image for an object-aware modification (e.g., a move operation or a delete operation), the scene-based image editing system leverages the corresponding pre-generated object mask and/or content fill to complete the modification. For instance, in some cases, the scene-based image editing system detects, via a graphical user interface displaying the digital image, a user interaction with an object portrayed therein (e.g., a user selection of the object). In response to the user interaction, the scene-based image editing system surfaces the corresponding object mask that was previously generated. The scene-based image editing system further detects, via the graphical user interface, a second user interaction with the object (e.g., with the surfaced object mask) for moving or deleting the object. Accordingly, the moves or deletes the object, revealing the content fill previously positioned behind the object.

Additionally, in one or more embodiments, the scene-based image editing system pre-processes a digital image to generate a semantic scene graph for the digital image. In particular, in some embodiments, the scene-based image editing system generates a semantic scene graph to map out various characteristics of the digital image. For instance, in some cases, the scene-based image editing system generates a semantic scene graph that describes the objects portrayed in the digital image, the relationships or object attributes of those objects, and/or various other characteristics determined to be useable for subsequent modification of the digital image.

In some cases, the scene-based image editing system utilizes one or more machine learning models to determine the characteristics of the digital image to be included in the semantic scene graph. Further, in some instances, the scene-based image editing system generates the semantic scene graph utilizing one or more predetermined or pre-generated template graphs. For instance, in some embodiments, the scene-based image editing system utilizes an image analysis graph, a real-world class description graph, and/or a behavioral policy graph in generating the semantic scene.

Thus, in some cases, the scene-based image editing system uses the semantic scene graph generated for a digital image to facilitate modification of the digital image. For instance, in some embodiments, upon determining that an object has been selected for modification, the scene-based image editing system retrieves characteristics of the object from the semantic scene graph to facilitate the modification. To illustrate, in some implementations, the scene-based image editing system executes or suggests one or more additional modifications to the digital image based on the characteristics from the semantic scene graph.

As one example, in some embodiments, upon determining that an object has been selected for modification, the scene-based image editing system provides one or more object attributes of the object for display via the graphical user interface displaying the object. For instance, in some cases, the scene-based image editing system retrieves a set of object attributes for the object (e.g., size, shape, or color) from the corresponding semantic scene graph and presents the set of object attributes for display in association with the object.

In some cases, the scene-based image editing system further facilitates user interactivity with the displayed set of object attributes for modifying one or more of the object attributes. For instance, in some embodiments, the scene-based image editing system enables user interactions that change the text of the displayed set of object attributes or select from a provided set of object attribute alternatives. Based on the user interactions, the scene-based image editing system modifies the digital image by modifying the one or more object attributes in accordance with the user interactions.

As another example, in some implementations, the scene-based image editing system utilizes a semantic scene graph to implement relationship-aware object modifications. To illustrate, in some cases, the scene-based image editing system detects a user interaction selecting an object portrayed in a digital image for modification. The scene-based image editing system references the semantic scene graph previously generated for the digital image to identify a relationship between that object and one or more other objects portrayed in the digital image. Based on the identified relationships, the scene-based image editing system also targets the one or more related objects for the modification.

For instance, in some cases, the scene-based image editing system automatically adds the one or more related objects to the user selection. In some instances, the scene-based image editing system provides a suggestion that the one or more related objects be included in the user selection and adds the one or more related objects based on an acceptance of the suggestion. Thus, in some embodiments, the scene-based image editing system modifies the one or more related objects as it modifies the user-selected object.

In one or more embodiments, in addition to pre-processing a digital image to identify objects portrayed as well as their relationships and/or object attributes, the scene-based image editing system further pre-processes a digital image to aid in the removal of distracting objects. For example, in some cases, the scene-based image editing system utilizes a distractor detection neural network to classify one or more objects portrayed in a digital image as subjects of the digital image and/or classify one or more other objects portrayed in the digital image as distracting objects. In some embodiments, the scene-based image editing system provides a visual indication of the distracting objects within a display of the digital image, suggesting that these objects be removed to present a more aesthetic and cohesive visual result.

Further, in some cases, the scene-based image editing system detects the shadows of distracting objects (or other selected objects) for removal along with the distracting objects. In particular, in some cases, the scene-based image editing system utilizes a shadow detection neural network to identify shadows portrayed in the digital image and associate those shadows with their corresponding objects. Accordingly, upon removal of a distracting object from a digital image, the scene-based image editing system further removes the associated shadow automatically.

The scene-based image editing system provides advantages over conventional systems. Indeed, conventional image editing systems suffer from several technological shortcomings that result in inflexible and inefficient operation. To illustrate, conventional systems are typically inflexible in that they rigidly perform edits on a digital image on the pixel level. In particular, conventional systems often perform a particular edit by targeting pixels individually for the edit. Accordingly, such systems often rigidly require user interactions for editing a digital image to interact with individual pixels to indicate the areas for the edit. Additionally, many conventional systems (e.g., due to their pixel-based editing) require users to have a significant amount of deep, specialized knowledge in how to interact with digital images, as well as the user interface of the system itself, to select the desired pixels and execute the appropriate workflow to edit those pixels.

Additionally, conventional image editing systems often fail to operate efficiently. For example, conventional systems typically require a significant amount of user interaction to modify a digital image. Indeed, in addition to user interactions for selecting individual pixels, conventional systems typically require a user to interact with multiple menus, sub-menus, and/or windows to perform the edit. For instance, many edits may require multiple editing steps using multiple different tools. Accordingly, many conventional systems require multiple interactions to select the proper tool at a given editing step, set the desired parameters for the tool, and utilize the tool to execute the editing step.

The scene-based image editing system operates with improved flexibility when compared to conventional systems. In particular, the scene-based image editing system implements techniques that facilitate flexible scene-based editing. For instance, by pre-processing a digital image via machine learning, the scene-based image editing system allows a digital image to be edited as if it were a real scene, in which various elements of the scene are known and are able to be interacted with intuitively on the semantic level to perform an edit while continuously reflecting real-world conditions. Indeed, where pixels are the targeted units under many conventional systems and objects are generally treated as groups of pixels, the scene-based image editing system allows user interactions to treat whole semantic areas (e.g., objects) as distinct units. Further, where conventional systems often require deep, specialized knowledge of the tools and workflows needed to perform edits, the scene-based editing system offers a more intuitive editing experience that enables a user to focus on the end goal of the edit.

Further, the scene-based image editing system operates with improved efficiency when compared to conventional systems. In particular, the scene-based image editing system implements a graphical user interface that reduces the user interactions required for editing. Indeed, by pre-processing a digital image in anticipation of edits, the scene-based image editing system reduces the user interactions that are required to perform an edit. Specifically, the scene-based image editing system performs many of the operations required for an edit without relying on user instructions to perform those operations. Thus, in many cases, the scene-based image editing system reduces the user interactions typically required under conventional systems to select pixels to target for editing and to navigate menus, sub-menus, or other windows to select a tool, select its corresponding parameters, and apply the tool to perform the edit. By implementing a graphical user interface that reduces and simplifies user interactions needed for editing a digital image, the scene-based image editing system offers improved user experiences on computing devices-such as tablets or smart phone devices-having relatively limited screen space.

Additional detail regarding the scene-based image editing system will now be provided with reference to the figures. For example, FIG. 1 illustrates a schematic diagram of an exemplary system 100 in which a scene-based image editing system 106 operates. As illustrated in FIG. 1, the system 100 includes a server(s) 102, a network 108, and client devices 110a-110n.

Although the system 100 of FIG. 1 is depicted as having a particular number of components, the system 100 is capable of having any number of additional or alternative components (e.g., any number of servers, client devices, or other components in communication with the scene-based image editing system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 51). Moreover, the server(s) 102 and the client devices 110a-110n include one or more of a variety of computing devices (including one or more computing devices as discussed in greater detail with relation to FIG. 51).

As mentioned above, the system 100 includes the server(s) 102. In one or more embodiments, the server(s) 102 generates, stores, receives, and/or transmits data including digital images and modified digital images. In one or more embodiments, the server(s) 102 comprises a data server. In some implementations, the server(s) 102 comprises a communication server or a web-hosting server.

In one or more embodiments, the image editing system 104 provides functionality by which a client device (e.g., a user of one of the client devices 110a-110n) generates, edits, manages, and/or stores digital images. For example, in some instances, a client device sends a digital image to the image editing system 104 hosted on the server(s) 102 via the network 108. The image editing system 104 then provides options that the client device may use to edit the digital image, store the digital image, and subsequently search for, access, and view the digital image. For instance, in some cases, the image editing system 104 provides one or more options that the client device may use to modify objects within a digital image.

In one or more embodiments, the client devices 110a-110n include computing devices that access, view, modify, store, and/or provide, for display, digital images. For example, the client devices 110a-110n include smartphones, tablets, desktop computers, laptop computers, head-mounted-display devices, or other electronic devices. The client devices 110a-110n include one or more applications (e.g., the client application 112) that can access, view, modify, store, and/or provide, for display, digital images. For example, in one or more embodiments, the client application 112 includes a software application installed on the client devices 110a-110n. Additionally, or alternatively, the client application 112 includes a web browser or other application that accesses a software application hosted on the server(s) 102 (and supported by the image editing system 104).

To provide an example implementation, in some embodiments, the scene-based image editing system 106 on the server(s) 102 supports the scene-based image editing system 106 on the client device 110n. For instance, in some cases, the scene-based image editing system 106 on the server(s)

102 learns parameters for a neural network(s) 114 for analyzing and/or modifying digital images. The scene-based image editing system 106 then, via the server(s) 102, provides the neural network(s) 114 to the client device 110n. In other words, the client device 110n obtains (e.g., downloads) the neural network(s) 114 with the learned parameters from the server(s) 102. Once downloaded, the scene-based image editing system 106 on the client device 110n utilizes the neural network(s) 114 to analyze and/or modify digital images independent from the server(s) 102.

In alternative implementations, the scene-based image editing system 106 includes a web hosting application that allows the client device 110n to interact with content and services hosted on the server(s) 102. To illustrate, in one or more implementations, the client device 110n accesses a software application supported by the server(s) 102. In response, the scene-based image editing system 106 on the server(s) 102 modifies digital images. The server(s) 102 then provides the modified digital images to the client device 110n for display.

Indeed, the scene-based image editing system 106 is able to be implemented in whole, or in part, by the individual elements of the system 100. Indeed, although FIG. 1 illustrates the scene-based image editing system 106 implemented with regard to the server(s) 102, different components of the scene-based image editing system 106 are able to be implemented by a variety of devices within the system 100. For example, one or more (or all) components of the scene-based image editing system 106 are implemented by a different computing device (e.g., one of the client devices 110a-110n) or a separate server from the server(s) 102 hosting the image editing system 104. Indeed, as shown in FIG. 1, the client devices 110a-110n include the scene-based image editing system 106. Example components of the scene-based image editing system 106 will be described below with regard to FIG. 62.

Figure 2:
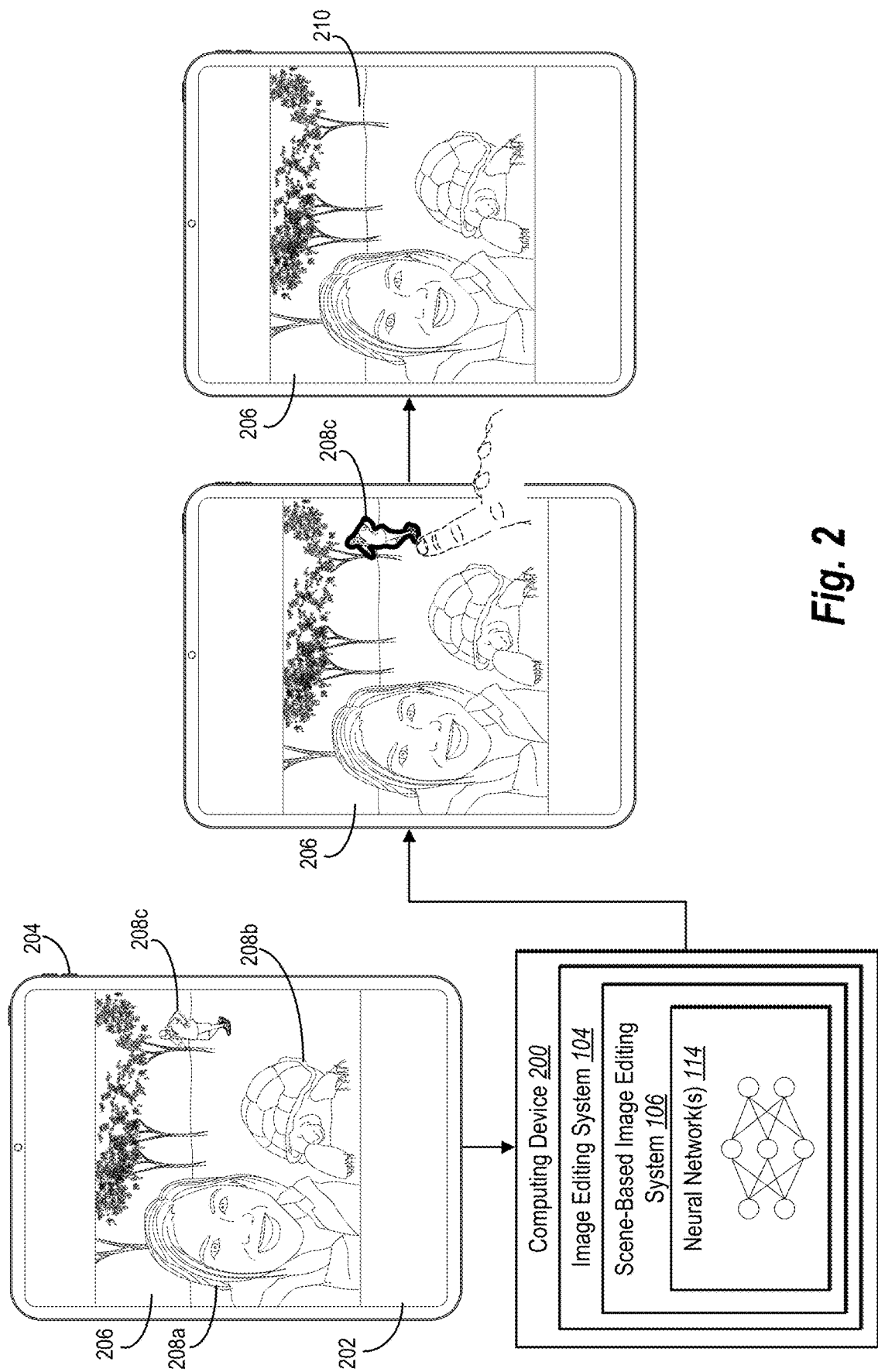
FIG. 2 illustrates an overview diagram of the scene-based image editing system editing a digital image as a real scene in accordance with one or more embodiments.

As mentioned, in one or more embodiments, the scene-based image editing system 106 manages a two-dimensional digital image as a real scene reflecting real-world conditions. In particular, the scene-based image editing system 106 implements a graphical use interface that facilitates the modification of a digital image as a real scene. FIG. 2 illustrates an overview diagram of the scene-based image editing system 106 managing a digital image as a real scene in accordance with one or more embodiments.

As shown in FIG. 2, the scene-based image editing system 106 provides a graphical user interface 202 for display on a client device 204. As further shown, the scene-based image editing system 106 provides, for display within the graphical user interface 202, a digital image 206. In one or more embodiments, the scene-based image editing system 106 provides the digital image 206 for display after the digital image 206 is captured via a camera of the client device 204. In some instances, the scene-based image editing system 106 receives the digital image 206 from another computing device or otherwise accesses the digital image 206 at some storage location, whether local or remote.

As illustrated in FIG. 2, the digital image 206 portrays various objects. In one or more embodiments, an object includes a distinct visual component portrayed in a digital image. In particular, in some embodiments, an object includes a distinct visual element that is identifiable separately from other visual elements portrayed in a digital image. In many instances, an object includes a group of pixels that, together, portray the distinct visual element separately from the portrayal of other pixels. An object refers to a visual representation of a subject, concept, or sub-concept in an image. In particular, an object refers to a set of pixels in an image that combine to form a visual depiction of an item, article, partial item, component, or element. In some cases, an object is identifiable via various levels of abstraction. In other words, in some instances, an object includes separate object components that are identifiable individually or as part of an aggregate. To illustrate, in some embodiments, an object includes a semantic area (e.g., the sky, the ground, water, etc.). In some embodiments, an object comprises an instance of an identifiable thing (e.g., a person, an animal, a building, a car, or a cloud, clothing, or some other accessory). In one or more embodiments, an object includes sub-objects, parts, or portions. For example, a person's face, hair, or leg can be objects that are part of another object (e.g., the person's body). In still further implementations, a shadow or a reflection comprises part of an object. As another example, a shirt is an object that can be part of another object (e.g., a person).

As shown in FIG. 2, the digital image 206 portrays a static, two-dimensional image. In particular, the digital image 206 portrays a two-dimensional projection of a scene that was captured from the perspective of a camera. Accordingly, the digital image 206 reflects the conditions (e.g., the lighting, the surrounding environment, or the physics to which the portrayed objects are subject) under which the image was captured; however, it does so statically. In other words, the conditions are not inherently maintained when changes to the digital image 206 are made. Under many conventional systems, additional user interactions are required to maintain consistency with respect to those conditions when editing a digital image.

Further, the digital image 206 includes a plurality of individual pixels that collectively portray various semantic areas. For instance, the digital image 206 portrays a plurality of objects, such as the objects 208a-208c. While the pixels of each object are contributing to the portrayal of a cohesive visual unit, they are not typically treated as such. Indeed, a pixel of a digital image is typically inherently treated as an individual unit with its own values (e.g., color values) that are modifiable separately from the values of other pixels. Accordingly, conventional systems typically require user interactions to target pixels individually for modification when making changes to a digital image.

As illustrated in FIG. 2, however, the scene-based image editing system 106 manages the digital image 206 as a real scene, consistently maintaining the conditions under which the image was captured when modifying the digital image. In particular, the scene-based image editing system 106 maintains the conditions automatically without relying on user input to reflect those conditions. Further, the scene-based image editing system 106 manages the digital image 206 on a semantic level. In other words, the digital image 206 manages each semantic area portrayed in the digital image 206 as a cohesive unit. For instance, as shown in FIG. 2 and as will be discussed, rather than requiring a user interaction to select the underlying pixels in order to interact with a corresponding object, the scene-based image editing system 106 enables user input to target the object as a unit and the scene-based image editing system 106 automatically recognizes the pixels that are associated with that object.

To illustrate, as shown in FIG. 2, in some cases, the scene-based image editing system 106 operates on a computing device 200 (e.g., the client device 204 or a separate computing device, such as the server(s) 102 discussed above with reference to FIG. 1) to pre-process the digital image 206. In particular, the scene-based image editing system 106 performs one or more pre-processing operations in anticipation of future modification to the digital image. In one or more embodiments, the scene-based image editing system 106 performs these pre-processing operations automatically in response to receiving or accessing the digital image 206 before user input for making the anticipated modifications have been received. As further shown, the scene-based image editing system 106 utilizes one or more machine learning models, such as the neural network(s) 114 to perform the pre-processing operations.

In one or more embodiments, the scene-based image editing system 106 pre-processes the digital image 206 by learning characteristics of the digital image 206. For instance, in some cases, the scene-based image editing system 106 segments the digital image 206, identifies objects, classifies objects, determines relationships and/or attributes of objects, determines lighting characteristics, and/or determines depth/perspective characteristics. In some embodiments, the scene-based image editing system 106 pre-processes the digital image 206 by generating content for use in modifying the digital image 206. For example, in some implementations, the scene-based image editing system 106 generates an object mask for each portrayed object and/or generates a content fill for filling in the background behind each portrayed object. Background refers to what is behind an object in an image. Thus, when a first object is positioned in front of a second object, the second object forms at least part of the background for the first object. Alternatively, the background comprises the furthest element in the image (often a semantic area like the sky, ground, water, etc.). The background for an object, in or more embodiments, comprises multiple object/semantic areas. For example, the background for an object can comprise part of another object and part of the furthest element in the image. The various pre-processing operations and their use in modifying a digital image will be discussed in more detail below with reference to the subsequent figures.

As shown in FIG. 2, the scene-based image editing system 106 detects, via the graphical user interface 202, a user interaction with the object 208c. In particular, the scene-based image editing system 106 detects a user interaction for selecting the object 208c. Indeed, in one or more embodiments, the scene-based image editing system 106 determines that the user interaction targets the object even where the user interaction only interacts with a subset of the pixels that contribute to the object 208c based on the pre-processing of the digital image 206. For instance, as mentioned, the scene-based image editing system 106 pre-processes the digital image 206 via segmentation in some embodiments. As such, at the time of detecting the user interaction, the scene-based image editing system 106 has already partitioned/segmented the digital image 206 into its various semantic areas. Thus, in some instances, the scene-based image editing system 106 determines that the user interaction selects a distinct semantic area (e.g., the object 208c) rather than the particular underlying pixels or image layers with which the user interacted.

As further shown in FIG. 2, the scene-based image editing system 106 modifies the digital image 206 via a modification to the object 208c. Though FIG. 2 illustrates a deletion of the object 208c, various modifications are possible and will be discussed in more detail below. In some embodiments, the scene-based image editing system 106 edits the object 208c in response to detecting a second user interaction for performing the modification.

As illustrated, upon deleting the object 208c from the digital image 206, the scene-based image editing system 106 automatically reveals background pixels that have been positioned in place of the object 208c. Indeed, as mentioned, in some embodiments, the scene-based image editing system 106 pre-processes the digital image 206 by generating a content fill for each portrayed foreground object. Thus, as indicated by FIG. 2, the scene-based image editing system 106 automatically exposes the content fill 210 previously generated for the object 208c upon removal of the object 208c from the digital image 206. In some instances, the scene-based image editing system 106 positions the content fill 210 within the digital image so that the content fill 210 is exposed rather than a hole appearing upon removal of object 208c.

Thus, the scene-based image editing system 106 operates with improved flexibility when compared to many conventional systems. In particular, the scene-based image editing system 106 implements flexible scene-based editing techniques in which digital images are modified as real scenes that maintain real-world conditions (e.g., physics, environment, or object relationships). Indeed, in the example shown in FIG. 2, the scene-based image editing system 106 utilizes pre-generated content fills to consistently maintain the background environment portrayed in the digital image 206 as though the digital image 206 had captured that background in its entirety. Thus, the scene-based image editing system 106 enables the portrayed objects to be moved around freely (or removed entirely) without disrupting the scene portrayed therein.

Further, the scene-based image editing system 106 operates with improved efficiency. Indeed, by segmenting the digital image 206 and generating the content fill 210 in anticipation of a modification that would remove the object 208c from its position in the digital image 206, the scene-based image editing system 106 reduces the user interactions that are typically required to perform those same operations under conventional systems. Thus, the scene-based image editing system 106 enables the same modifications to a digital image with less user interactions when compared to these conventional systems.

As just discussed, in one or more embodiments, the scene-based image editing system 106 implements object-aware image editing on digital images. In particular, the scene-based image editing system 106 implements object-aware modifications that target objects as cohesive units that are interactable and can be modified. FIGS. 3-9B illustrate the scene-based image editing system 106 implementing object-aware modifications in accordance with one or more embodiments.

Indeed, many conventional image editing systems are inflexible and inefficient with respect to interacting with objects portrayed in a digital image. For instance, as previously mentioned, conventional systems are often rigid in that they require user interactions to target pixels individually rather than the objects that those pixels portray. Thus, such systems often require a rigid, meticulous process of selecting pixels for modification. Further, as object identification occurs via user selection, these systems typically fail to anticipate and prepare for potential edits made to those objects.

Further, many conventional image editing systems require a significant amount of user interactions to modify objects portrayed in a digital image. Indeed, in addition to the pixel-selection process for identifying objects in a digital image-which can require a series of user interactions on its own-conventional systems may require workflows of significant length in which a user interacts with multiple menus, sub-menus, tool, and/or windows to perform the edit. Often, performing an edit on an object requires multiple preparatory steps before the desired edit is able to be executed, requiring additional user interactions.

The scene-based image editing system 106 provides advantages over these systems. For instance, the scene-based image editing system 106 offers improved flexibility via object-aware image editing. In particular, the scene-based image editing system 106 enables object-level-rather than pixel-level or layer level-interactions, facilitating user interactions that target portrayed objects directly as cohesive units instead of their constituent pixels individually.

Further, the scene-based image editing system 106 improves the efficiency of interacting with objects portrayed in a digital image. Indeed, previously mentioned, and as will be discussed further below, the scene-based image editing system 106 implements pre-processing operations for identifying and/or segmenting for portrayed objects in anticipation of modifications to those objects. Indeed, in many instances, the scene-based image editing system 106 performs these pre-processing operations without receiving user interactions for those modifications. Thus, the scene-based image editing system 106 reduces the user interactions that are required to execute a given edit on a portrayed object.

Figure 3:
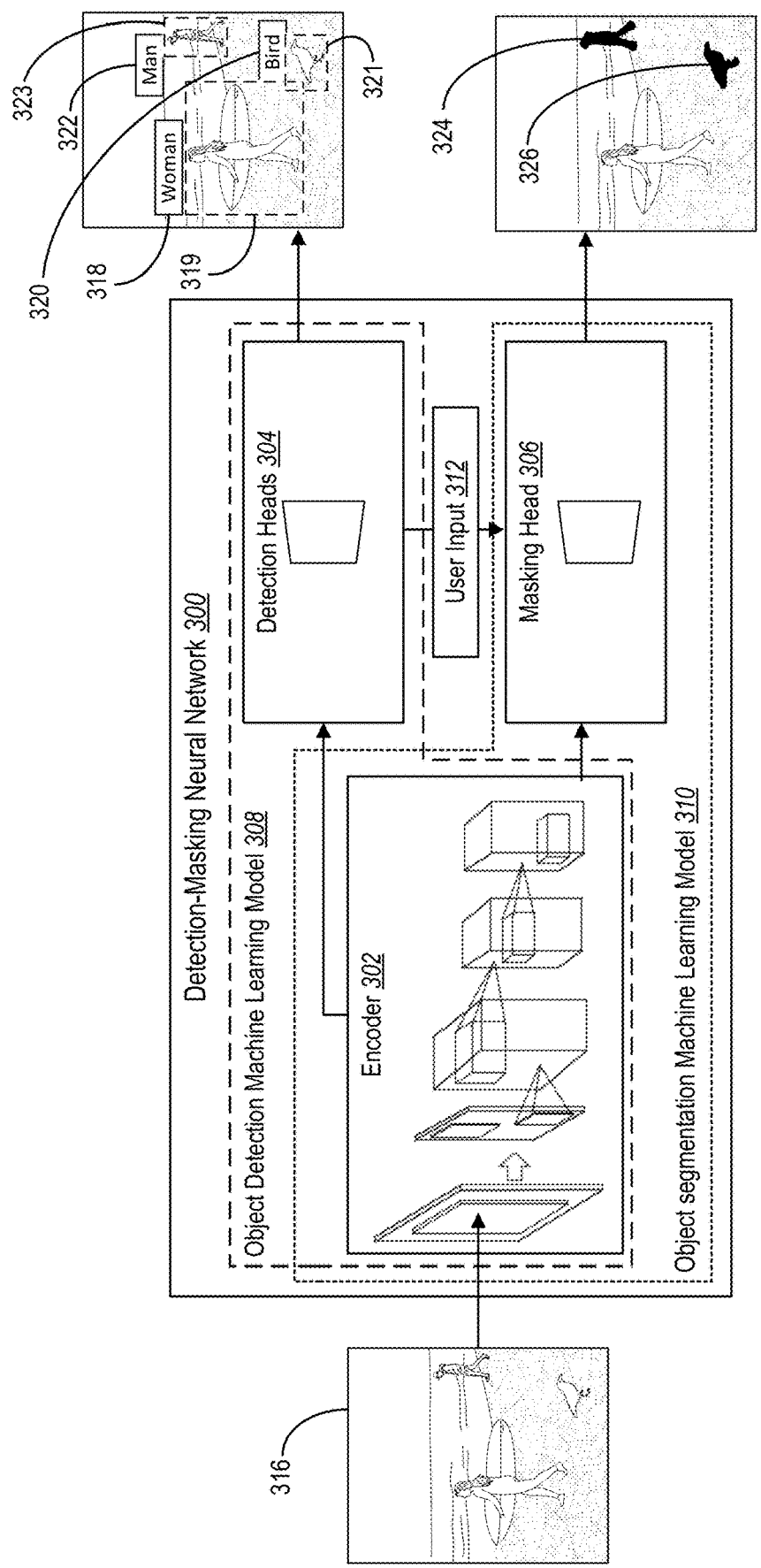
FIG. 3 illustrates a segmentation neural network utilized by the scene-based image editing system to generate object masks for objects in accordance with one or more embodiments.

In some embodiments, the scene-based image editing system 106 implements object-aware image editing by generating an object mask for each object/semantic area portrayed in a digital image. In particular, in some cases, the scene-based image editing system 106 utilizes a machine learning model, such as a segmentation neural network, to generate the object mask(s). FIG. 3 illustrates a segmentation neural network utilized by the scene-based image editing system 106 to generate object masks for objects in accordance with one or more embodiments.

In one or more embodiments, an object mask includes a map of a digital image that has an indication for each pixel of whether the pixel corresponds to part of an object (or other semantic area) or not. In some implementations, the indication includes a binary indication (e.g., a "1" for pixels belonging to the object and a "0" for pixels not belonging to the object). In alternative implementations, the indication includes a probability (e.g., a number between 1 and 0) that indicates the likelihood that a pixel belongs to an object. In such implementations, the closer the value is to 1, the more likely the pixel belongs to an object and vice versa.

In one or more embodiments, a machine learning model includes a computer representation that is tunable (e.g., trained) based on inputs to approximate unknown functions used for generating the corresponding outputs. In particular, in some embodiments, a machine learning model includes a computer-implemented model that utilizes algorithms to learn from, and make predictions on, known data by analyzing the known data to learn to generate outputs that reflect patterns and attributes of the known data. For instance, in some instances, a machine learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

In one or more embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

In one or more embodiments, a segmentation neural network includes a computer-implemented neural network that generates object masks for objects portrayed in digital images. In particular, in some embodiments, a segmentation neural network includes a computer-implemented neural network that detects objects within digital images and generates object masks for the objects. Indeed, in some implementations, a segmentation neural network includes a neural network pipeline that analyzes a digital image, identifies one or more objects portrayed in the digital image, and generates an object mask for the one or more objects. In some cases, however, a segmentation neural network focuses on a subset of tasks for generating an object mask.

As mentioned, FIG. 3 illustrates one example of a segmentation neural network that the scene-based image editing system 106 utilizes in one or more implementations to generate object masks for objects portrayed in a digital image. In particular, FIG. 3 illustrates one example of a segmentation neural network used by the scene-based image editing system 106 in some embodiments to both detect objects in a digital image and generate object masks for those objects. Indeed, FIG. 3 illustrates a detection-masking neural network 300 that comprises both an object detection machine learning model 308 (in the form of an object detection neural network) and an object segmentation machine learning model 310 (in the form of an object segmentation neural network). Specifically, the detection-masking neural network 300 is an implementation of the on-device masking system described in U.S. patent application Ser. No. 17/589,114, "DETECTING DIGITAL OBJECTS AND GENERATING OBJECT MASKS ON DEVICE," filed on Jan. 31, 2022, the entire contents of which are hereby incorporated by reference.

Although FIG. 3 illustrates the scene-based image editing system 106 utilizing the detection-masking neural network 300, in one or more implementations, the scene-based image editing system 106 utilizes different machine learning models to detect objects, generate object masks for objects, and/or extract objects from digital images. For instance, in one or more implementations, the scene-based image editing system 106 utilizes, as the segmentation neural network (or as an alternative to a segmentation neural network), one of the machine learning models or neural networks described in U.S. patent application Ser. No. 17/158,527, entitled "Segmenting Objects In Digital Images Utilizing A Multi-Object Segmentation Model Framework," filed on Jan. 26, 2021; or U.S. patent application Ser. No. 16/388,115, entitled "Robust Training of Large-Scale Object Detectors with Noisy Data," filed on Apr. 8, 2019; or U.S. patent application Ser. No. 16/518,880, entitled "Utilizing Multiple Object Segmentation Models To Automatically Select User-Requested Objects In Images," filed on Jul. 22, 2019; or U.S. patent application Ser. No. 16/817,418, entitled "Utilizing A Large-Scale Object Detector To Automatically Select Objects In Digital Images," filed on Mar. 20, 2020; or Ren, et al., *Faster r-cnn: Towards real-time object detection with region proposal networks*, NIPS, 2015; or Redmon, et al., *You Only Look Once: Unified, Real-Time Object Detection*, CVPR 2016, the contents of each of the foregoing applications and papers are hereby incorporated by reference in their entirety.

Similarly, in one or more implementations, the scene-based image editing system 106 utilizes, as the segmentation neural network (or as an alternative to a segmentation neural network), one of the machine learning models or neural networks described in Ning Xu et al., "Deep GrabCut for Object Selection," published Jul. 14, 2017; or U.S. Patent Application Publication No. 2019/0130229, entitled "Deep Salient Content Neural Networks for Efficient Digital Object Segmentation," filed on Oct. 31, 2017; or U.S. patent application Ser. No. 16/035,410, entitled "Automatic Trimap Generation and Image Segmentation," filed on Jul. 13, 2018; or U.S. Pat. No. 10,192,129, entitled "Utilizing Interactive Deep Learning To Select Objects In Digital Visual Media," filed Nov. 18, 2015, each of which are incorporated herein by reference in their entirety.

In one or more implementations the segmentation neural network is a panoptic segmentation neural network. In other words, the segmentation neural network creates object mask for individual instances of a given object type. Furthermore, the segmentation neural network, in one or more implementations, generates object masks for semantic regions (e.g., water, sky, sand, dirt, etc.) in addition to countable things. Indeed, in one or more implementations, the scene-based image editing system 106 utilizes, as the segmentation neural network (or as an alternative to a segmentation neural network), one of the machine learning models or neural networks described in U.S. patent application Ser. No. 17/495,618, entitled "PANOPTIC SEGMENTATION REFINEMENT NETWORK," filed on Oct. 2, 2021; or U.S. patent application Ser. No. 17/454,740, entitled "MULTI-SOURCE PANOPTIC FEATURE PYRAMID NETWORK," filed on Nov. 12, 2021, each of which are incorporated herein by reference in their entirety.

Returning now to FIG. 3, in one or more implementations, the scene-based image editing system 106 utilizes a detection-masking neural network 300 that includes an encoder 302 (or neural network encoder) having a backbone network, detection heads 304 (or neural network decoder head), and a masking head 306 (or neural network decoder head). As shown in FIG. 3, the encoder 302 encodes a digital image 316 and provides the encodings to the detection heads 304 and the masking head 306. The detection heads 304 utilize the encodings to detect one or more objects portrayed in the digital image 316. The masking head 306 generates at least one object mask for the detected objects.

As just mentioned, the detection-masking neural network 300 utilizes both the object detection machine learning model 308 and the object segmentation machine learning model 310. In one or more implementations, the object detection machine learning model 308 includes both the encoder 302 and the detection heads 304 shown in FIG. 3. While the object segmentation machine learning model 310 includes both the encoder 302 and the masking head 306. Furthermore, the object detection machine learning model 308 and the object segmentation machine learning model 310 are separate machine learning models for processing objects within target and/or source digital images. FIG. 3 illustrates the encoder 302, detection heads 304, and the masking head 306 as a single model for detecting and segmenting objects of a digital image. For efficiency purposes, in some embodiments the scene-based image editing system 106 utilizes the network illustrated in FIG. 3 as a single network. The collective network (i.e., the object detection machine learning model 308 and the object segmentation machine learning model 310) is referred to as the detection-masking neural network 300. The following paragraphs describe components relating to the object detection machine learning model 308 of the network (such as the detection heads 304) and transitions to discussing components relating to the object segmentation machine learning model 310.

As just mentioned, in one or more embodiments, the scene-based image editing system 106 utilizes the object detection machine learning model 308 to detect and identify objects within the digital image 316 (e.g., a target or a source digital image). FIG. 3 illustrates one implementation of the object detection machine learning model 308 that the scene-based image editing system 106 utilizes in accordance with at least one embodiment. In particular, FIG. 3 illustrates the scene-based image editing system 106 utilizing the object detection machine learning model 308 to detect objects. In one or more embodiments, the object detection machine learning model 308 comprises a deep learning convolutional neural network (CNN). For example, in some embodiments, the object detection machine learning model 308 comprises a region-based (R-CNN).

As shown in FIG. 3, the object detection machine learning model 308 includes lower neural network layers and higher neural network layers. In general, the lower neural network layers collectively form the encoder 302 and the higher neural network layers collectively form the detection heads 304 (e.g., decoder). In one or more embodiments, the encoder 302 includes convolutional layers that encodes a digital image into feature vectors, which are outputted from the encoder 302 and provided as input to the detection heads 304. In various implementations, the detection heads 304 comprise fully connected layers that analyze the feature vectors and output the detected objects (potentially with approximate boundaries around the objects).

In particular, the encoder 302, in one or more implementations, comprises convolutional layers that generate a feature vector in the form of a feature map. To detect objects within the digital image 316, the object detection machine learning model 308 processes the feature map utilizing a convolutional layer in the form of a small network that is slid across small windows of the feature map. The object detection machine learning model 308 further maps each sliding window to a lower-dimensional feature. In one or more embodiments, the object detection machine learning model 308 processes this feature using two separate detection heads that are fully connected layers. In some embodiments, the first head comprises a box-regression layer that generates the detected object and an object-classification layer that generates the object label.

As shown by FIG. 3, the output from the detection heads 304 shows object labels above each of the detected objects. For example, the detection-masking neural network 300, in response to detecting objects, assigns an object label to each of the detected objects. In particular, in some embodiments, the detection-masking neural network 300 utilizes object labels based on classifications of the objects. To illustrate, FIG. 3 shows a label 318 for woman, a label 320 for bird, and a label 322 for man. Though not shown in FIG. 3, the detection-masking neural network 300 further distinguishes between the woman and the surfboard held by the woman in some implementations. Additionally, the detection-masking neural network 300 optionally also generates object masks for the semantic regions shown (e.g., the sand, the sea, and the sky).

As mentioned, the object detection machine learning model 308 detects the objects within the digital image 316. In some embodiments, and as illustrated in FIG. 3, the detection-masking neural network 300 indicates the detected objects utilizing approximate boundaries (e.g., bounding boxes 319, 321, and 323). For example, each of the bounding boxes comprises an area that encompasses an object. In some embodiments, the detection-masking neural network 300 annotates the bounding boxes with the previously mentioned object labels such as the name of the detected object, the coordinates of the bounding box, and/or the dimension of the bounding box.

As illustrated in FIG. 3, the object detection machine learning model 308 detects several objects for the digital image 316. In some instances, the detection-masking neural network 300 identifies all objects within the bounding boxes. In one or more embodiments, the bounding boxes comprise the approximate boundary area indicating the detected object. In some cases, an approximate boundary refers to an indication of an area including an object that is larger and/or less accurate than an object mask. In one or more embodiments, an approximate boundary includes at least a portion of a detected object and portions of the digital image 316 not comprising the detected object. An approximate boundary includes various shape, such as a square, rectangle, circle, oval, or other outline surrounding an object. In one or more embodiments, an approximate boundary comprises a bounding box.

Upon detecting the objects in the digital image 316, the detection-masking neural network 300 generates object masks for the detected objects. Generally, instead of utilizing coarse bounding boxes during object localization, the detection-masking neural network 300 generates segmentations masks that better define the boundaries of the object. The following paragraphs provide additional detail with respect to generating object masks for detected objects in accordance with one or more embodiments. In particular, FIG. 3 illustrates the scene-based image editing system 106 utilizing the object segmentation machine learning model 310 to generate segmented objects via object masks in accordance with some embodiments.

As illustrated in FIG. 3, the scene-based image editing system 106 processes a detected object in a bounding box utilizing the object segmentation machine learning model 310 to generate an object mask, such as an object mask 324 and an object mask 326. In alternative embodiments, the scene-based image editing system 106 utilizes the object detection machine learning model 308 itself to generate an object mask of the detected object (e.g., segment the object for selection).

In one or more implementations, prior to generating an object mask of a detected object, scene-based image editing system 106 receives user input 312 to determine objects for which to generate object masks. For example, the scene-based image editing system 106 receives input from a user indicating a selection of one of the detected objects. To illustrate, in the implementation shown, the scene-based image editing system 106 receives user input 312 of the user selecting bounding boxes 321 and 323. In alternative implementations, the scene-based image editing system 106 generates objects masks for each object automatically (e.g., without a user request indicating an object to select).

As mentioned, the scene-based image editing system 106 processes the bounding boxes of the detected objects in the digital image 316 utilizing the object segmentation machine learning model 310. In some embodiments, the bounding box comprises the output from the object detection machine learning model 308. For example, as illustrated in FIG. 3, the bounding box comprises a rectangular border about the object. Specifically, FIG. 3 shows bounding boxes 319, 321 and 323 which surround the woman, the bird, and the man detected in the digital image 316.

In some embodiments, the scene-based image editing system 106 utilizes the object segmentation machine learning model 310 to generate the object masks for the aforementioned detected objects within the bounding boxes. For example, the object segmentation machine learning model 310 corresponds to one or more deep neural networks or models that select an object based on bounding box parameters corresponding to the object within the digital image 316. In particular, the object segmentation machine learning model 310 generates the object mask 324 and the object mask 326 for the detected man and bird, respectively.

In some embodiments, the scene-based image editing system 106 selects the object segmentation machine learning model 310 based on the object labels of the object identified by the object detection machine learning model 308. Generally, based on identifying one or more classes of objects associated with the input bounding boxes, the scene-based image editing system 106 selects an object segmentation machine learning model tuned to generate object masks for objects of the identified one or more classes. To illustrate, in some embodiments, based on determining that the class of one or more of the identified objects comprises a human or person, the scene-based image editing system 106 utilizes a special human object mask neural network to generate an object mask, such as the object mask 324 shown in FIG. 3.

As further illustrated in FIG. 3, the scene-based image editing system 106 receives the object mask 324 and the object mask 326 as output from the object segmentation machine learning model 310. As previously discussed, in one or more embodiments, an object mask comprises a pixel-wise mask that corresponds to an object in a source or target digital image. In one example, an object mask includes a segmentation boundary indicating a predicted edge of one or more objects as well as pixels contained within the predicted edge.

In some embodiments, the scene-based image editing system 106 also detects the objects shown in the digital image 316 via the collective network, i.e., the detection-masking neural network 300, in the same manner outlined above. For example, in some cases, the scene-based image editing system 106, via the detection-masking neural network 300 detects the woman, the man, and the bird within the digital image 316. In particular, the scene-based image editing system 106, via the detection heads 304, utilizes the feature pyramids and feature maps to identify objects within the digital image 316 and generates object masks via the masking head 306.

Furthermore, in one or more implementations, although FIG. 3 illustrates generating object masks based on the user input 312, the scene-based image editing system 106 generates object masks without user input 312. In particular, the scene-based image editing system 106 generates object masks for all detected objects within the digital image 316. To illustrate, in at least one implementation, despite not receiving the user input 312, the scene-based image editing system 106 generates object masks for the woman, the man, and the bird.

Figure 4:
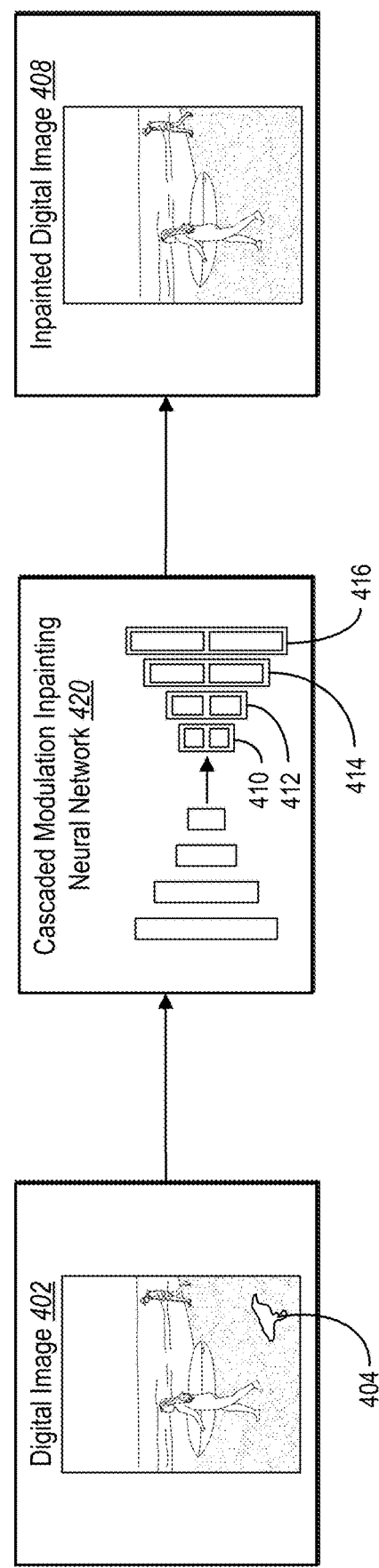
FIG. 4 illustrates utilizing a cascaded modulation inpainting neural network to generate an inpainted digital image in accordance with one or more embodiments.
Figure 5:
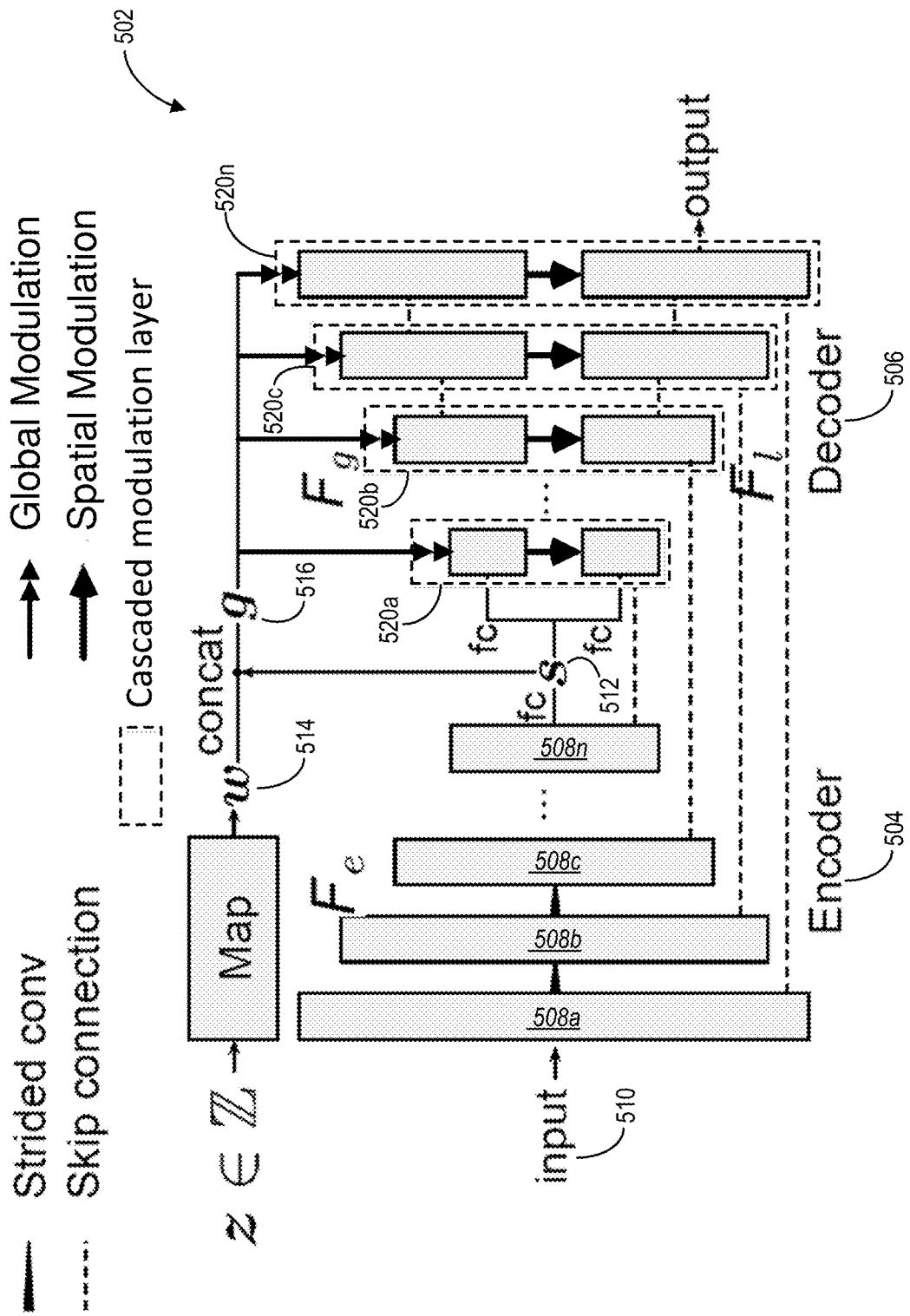
FIG. 5 illustrates an example architecture of a cascaded modulation inpainting neural network in accordance with one or more embodiments.
Figure 6:
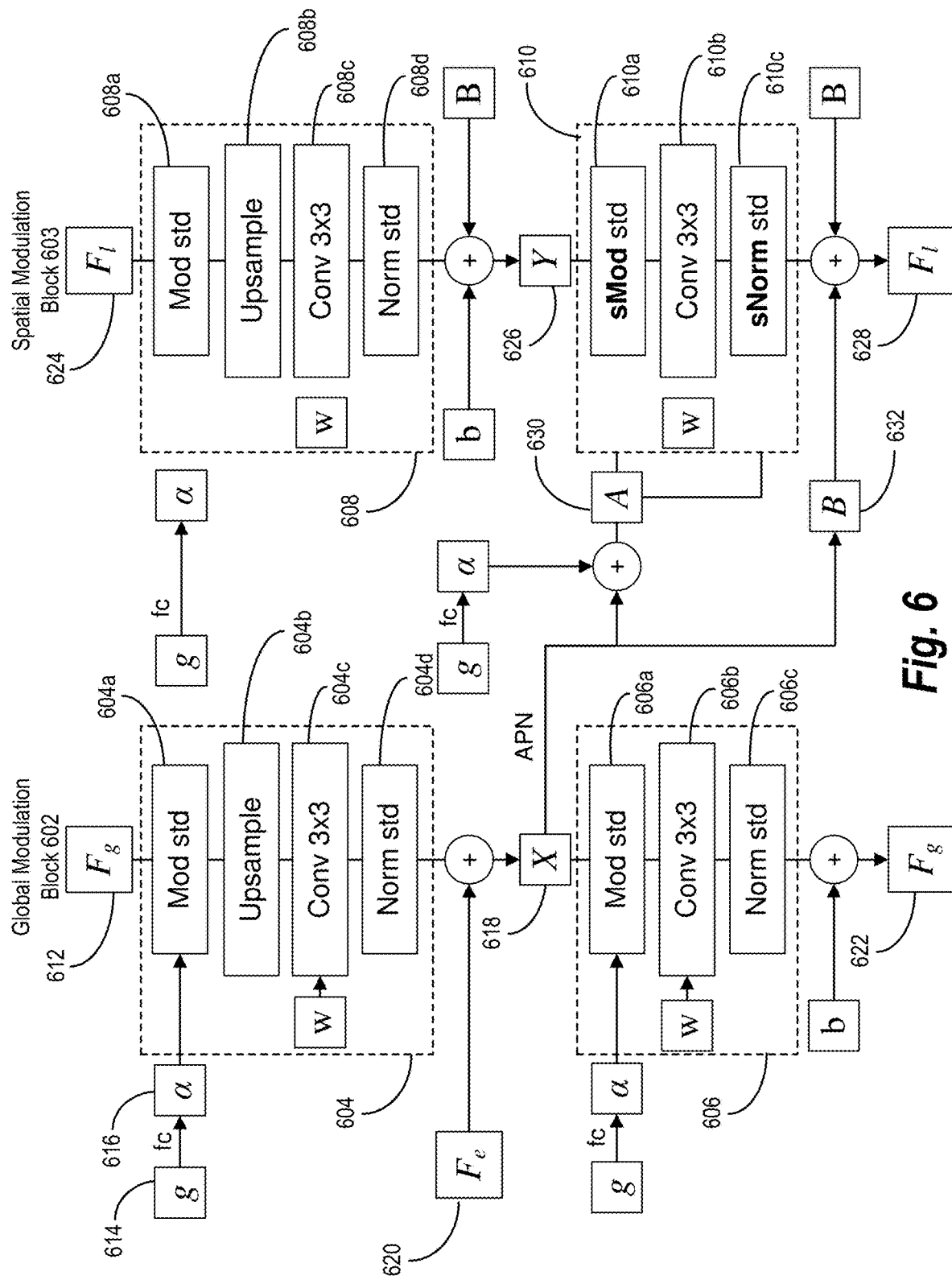
FIG. 6 illustrates global modulation blocks and spatial modulation blocks implemented in a cascaded modulation inpainting neural network in accordance with one or more embodiments.

In one or more embodiments, the scene-based image editing system 106 implements object-aware image editing by generating a content fill for each object portrayed in a digital image (e.g., for each object mask corresponding to portrayed objects) utilizing a hole-filing model. In particular, in some cases, the scene-based image editing system 106 utilizes a machine learning model, such as a content-aware hole-filling machine learning model to generate the content fill(s) for each foreground object. FIGS. 4-6 illustrate a content-aware hole-filling machine learning model utilized by the scene-based image editing system 106 to generate content fills for objects in accordance with one or more embodiments.

In one or more embodiments, a content fill includes a set of pixels generated to replace another set of pixels of a digital image. Indeed, in some embodiments, a content fill includes a set of replacement pixels for replacing another set of pixels. For instance, in some embodiments, a content fill includes a set of pixels generated to fill a hole (e.g., a content void) that remains after (or if) a set of pixels (e.g., a set of pixels portraying an object) has been removed from or moved within a digital image. In some cases, a content fill corresponds to a background of a digital image. To illustrate, in some implementations, a content fill includes a set of pixels generated to blend in with a portion of a background proximate to an object that could be moved/removed. In some cases, a content fill includes an inpainting segment, such as an inpainting segment generated from other pixels (e.g., other background pixels) within the digital image. In some cases, a content fill includes other content (e.g., arbitrarily selected content or content selected by a user) to fill in a hole or replace another set of pixels.

In one or more embodiments, a content-aware hole-filling machine learning model includes a computer-implemented machine learning model that generates content fill. In particular, in some embodiments, a content-aware hole-filling machine learning model includes a computer-implemented machine learning model that generates content fills for replacement regions in a digital image. For instance, in some cases, the scene-based image editing system 106 determines that an object has been moved within or removed from a digital image and utilizes a content-aware hole-filling machine learning model to generate a content fill for the hole that has been exposed as a result of the move/removal in response. As will be discussed in more detail, however, in some implementations, the scene-based image editing system 106 anticipates movement or removal of an object and utilizes a content-aware hole-filling machine learning model to pre-generate a content fill for that object. In some cases, a content-aware hole-filling machine learning model includes a neural network, such as an inpainting neural network (e.g., a neural network that generates a content fill-more specifically, an inpainting segment-using other pixels of the digital image). In other words, the scene-based image editing system 106 utilizes a content-aware hole-filling machine learning model in various implementations to provide content at a location of a digital image that does not initially portray such content (e.g., due to the location being occupied by another semantic area, such as an object).

FIG. 4 illustrates the scene-based image editing system 106 utilizing a content-aware machine learning model, such as a cascaded modulation inpainting neural network 420, to generate an inpainted digital image 408 from a digital image 402 with a replacement region 404 in accordance with one or more embodiments.

Indeed, in one or more embodiments, the replacement region 404 includes an area corresponding to an object (and a hole that would be present if the object were moved or deleted). In some embodiments, the scene-based image editing system 106 identifies the replacement region 404 based on user selection of pixels (e.g., pixels portraying an object) to move, remove, cover, or replace from a digital image. To illustrate, in some cases, a client device selects an object portrayed in a digital image. Accordingly, the scene-based image editing system 106 deletes or removes the object and generates replacement pixels. In some case, the scene-based image editing system 106 identifies the replacement region 404 by generating an object mask via a segmentation neural network. For instance, the scene-based image editing system 106 utilizes a segmentation neural network (e.g., the detection-masking neural network 300 discussed above with reference to FIG. 3) to detect objects with a digital image and generate object masks for the objects. Thus, in some implementations, the scene-based image editing system 106 generates content fill for the replacement region 404 before receiving user input to move, remove, cover, or replace the pixels initially occupying the replacement region 404

As shown, the scene-based image editing system 106 utilizes the cascaded modulation inpainting neural network 420 to generate replacement pixels for the replacement region 404. In one or more embodiments, the cascaded modulation inpainting neural network 420 includes a generative adversarial neural network for generating replacement pixels. In some embodiments, a generative adversarial neural network (or "GAN") includes a neural network that is tuned or trained via an adversarial process to generate an output digital image (e.g., from an input digital image). In some cases, a generative adversarial neural network includes multiple constituent neural networks such as an encoder neural network and one or more decoder/generator neural networks. For example, an encoder neural network extracts latent code from a noise vector or from a digital image. A generator neural network (or a combination of generator neural networks) generates a modified digital image by combining extracted latent code (e.g., from the encoder neural network). During training, a discriminator neural network, in competition with the generator neural network, analyzes a generated digital image to generate an authenticity prediction by determining whether the generated digital image is real (e.g., from a set of stored digital images) or fake (e.g., not from the set of stored digital images). The discriminator neural network also causes the scene-based image editing system 106 to modify parameters of the encoder neural network and/or the one or more generator neural networks to eventually generate digital images that fool the discriminator neural network into indicating that a generated digital image is a real digital image.

Along these lines, a generative adversarial neural network refers to a neural network having a specific architecture or a specific purpose such as a generative inpainting neural network. For example, a generative inpainting neural network includes a generative adversarial neural network that inpaints or fills pixels of a digital image with a content fill (or generates a content fill in anticipation of inpainting or filling in pixels of the digital image). In some cases, a generative inpainting neural network inpaints a digital image by filling hole regions (indicated by object masks). Indeed, as mentioned above, in some embodiments an object mask defines a replacement region using a segmentation or a mask indicating, overlaying, covering, or outlining pixels to be removed or replaced within a digital image.

Accordingly, in some embodiments, the cascaded modulation inpainting neural network 420 includes a generative inpainting neural network that utilizes a decoder having one or more cascaded modulation decoder layers. Indeed, as illustrated in FIG. 4, the cascaded modulation inpainting neural network 420 includes a plurality of cascaded modulation decoder layers 410, 412, 414, 416. In some cases, a cascaded modulation decoder layer includes at least two connected (e.g., cascaded) modulations blocks for modulating an input signal in generating an inpainted digital image. To illustrate, in some instances, a cascaded modulation decoder layer includes a first global modulation block and a second global modulation block. Similarly, in some cases, a cascaded modulation decoder layer includes a first global modulation block (that analyzes global features and utilizes a global, spatially-invariant approach) and a second spatial modulation block (that analyzes local features utilizing a spatially-varying approach). Additional detail regarding modulation blocks will be provided below (e.g., in relation to FIGS. 5-6).

As shown, the scene-based image editing system 106 utilizes the cascaded modulation inpainting neural network 420 (and the cascaded modulation decoder layers 410, 412, 414, 416) to generate the inpainted digital image 408. Specifically, the cascaded modulation inpainting neural network 420 generates the inpainted digital image 408 by generating a content fill for the replacement region 404. As illustrated, the replacement region 404 is now filled with a content fill having replacement pixels that portray a photorealistic scene in place of the replacement region 404.

As mentioned above, the scene-based image editing system 106 utilizes a cascaded modulation inpainting neural network that includes cascaded modulation decoder layers to generate inpainted digital images. FIG. 5 illustrates an example architecture of a cascaded modulation inpainting neural network 502 in accordance with one or more embodiments.

As illustrated, the cascaded modulation inpainting neural network 502 includes an encoder 504 and a decoder 506. In particular, the encoder 504 includes a plurality of convolutional layers 508a-508n at different scales/resolutions. In some cases, the scene-based image editing system 106 feeds the digital image input 510 (e.g., an encoding of the digital image) into the first convolutional layer 508a to generate an encoded feature vector at a higher scale (e.g., lower resolution). The second convolutional layer 508b processes the encoded feature vector at the higher scale (lower resolution) and generates an additional encoded feature vector (at yet another higher scale/lower resolution). The cascaded modulation inpainting neural network 502 iteratively generates these encoded feature vectors until reaching the final/highest scale convolutional layer 508n and generating a final encoded feature vector representation of the digital image.

As illustrated, in one or more embodiments, the cascaded modulation inpainting neural network 502 generates a global feature code from the final encoded feature vector of the encoder 504. A global feature code includes a feature representation of the digital image from a global (e.g., high-level, high-scale, low-resolution) perspective. In particular, a global feature code includes a representation of the digital image that reflects an encoded feature vector at the highest scale/lowest resolution (or a different encoded feature vector that satisfies a threshold scale/resolution).

As illustrated, in one or more embodiments, the cascaded modulation inpainting neural network 502 applies a neural network layer (e.g., a fully connected layer) to the final encoded feature vector to generate a style code 512 (e.g., a style vector). In addition, the cascaded modulation inpainting neural network 502 generates the global feature code by combining the style code 512 with a random style code 514. In particular, the cascaded modulation inpainting neural network 502 generates the random style code 514 by utilizing a neural network layer (e.g., a multi-layer perceptron) to process an input noise vector. The neural network layer maps the input noise vector to a random style code 514. The cascaded modulation inpainting neural network 502 combines (e.g., concatenates, adds, or multiplies) the random style code 514 with the style code 512 to generate the global feature code 516. Although FIG. 5 illustrates a particular approach to generate the global feature code 516, the scene-based image editing system 106 is able to utilize a variety of different approaches to generate a global feature code that represents encoded feature vectors of the encoder 504 (e.g., without the style code 512 and/or the random style code 514).

As mentioned above, in some embodiments, the cascaded modulation inpainting neural network 502 generates an image encoding utilizing the encoder 504. An image encoding refers to an encoded representation of the digital image. Thus, in some cases, an image encoding includes one or more encoding feature vectors, a style code, and/or a global feature code.

In one or more embodiments, the cascaded modulation inpainting neural network 502 utilizes a plurality of Fourier convolutional encoder layer to generate an image encoding (e.g., the encoded feature vectors, the style code 512, and/or the global feature code 516). For example, a Fourier convolutional encoder layer (or a fast Fourier convolution) comprises a convolutional layer that includes non-local receptive fields and cross-scale fusion within a convolutional unit. In particular, a fast Fourier convolution can include three kinds of computations in a single operation unit: a local branch that conducts small-kernel convolution, a semi-global branch that processes spectrally stacked image patches, and a global branch that manipulates image-level spectrum. These three branches complementarily address different scales. In addition, in some instances, a fast Fourier convolution includes a multi-branch aggregation process for cross-scale fusion. For example, in one or more embodiments, the cascaded modulation inpainting neural network 502 utilizes a fast Fourier convolutional layer as described by Lu Chi, Borui Jiang, and Yadong Mu in Fast Fourier convolution, Advances in Neural Information Processing Systems, 33 (2020), which is incorporated by reference herein in its entirety.

Specifically, in one or more embodiments, the cascaded modulation inpainting neural network 502 utilizes Fourier convolutional encoder layers for each of the encoder convolutional layers 508a-508n. Thus, the cascaded modulation inpainting neural network 502 utilizes different Fourier convolutional encoder layers having different scales/resolutions to generate encoded feature vectors with improved, non-local receptive field.

Operation of the encoder 504 can also be described in terms of variables or equations to demonstrate functionality of the cascaded modulation inpainting neural network 502. For instance, as mentioned, the cascaded modulation inpainting neural network 502 is an encoder-decoder network with proposed cascaded modulation blocks at its decoding stage for image inpainting. Specifically, the cascaded modulation inpainting neural network 502 starts with an encoder E that takes the partial image and the mask as inputs to produce multi-scale feature maps from input resolution to resolution 4×4:

$$F_e^{(1)}, \ldots F_e^{(L)} = E(x \odot (1-m), m),$$

where $F_e^{(i)}$ are the generated feature at scale $1 \leq i \geq L$ (and L is the highest scale or resolution). The encoder is implemented by a set of stride-2 convolutions with residual connection.

After generating the highest scale feature $F_e^{(L)}$, a fully connected layer followed by a $\ell_2$ normalization products a global style code s=fc($F_e^{(L)}$/||fc($F_e^{(L)}$)||$_2$ to represent the input globally. In parallel to the encoder, an MLP-based mapping network produces a random style code w from a normalized random Gaussian noise z, simulating the stochasticity of the generation process. Moreover, the scene-based image editing system 106 joins w with s to produce the final global code g=[s; w] for decoding. As mentioned, in some embodiments, the scene-based image editing system 106 utilizes the final global code as an image encoding for the digital image.

As mentioned above, in some implementations, full convolutional models suffer from slow growth of effective receptive field, especially at the early stage of the network. Accordingly, utilizing strided convolution within the encoder can generate invalid features inside the hole region, making the feature correction at decoding stage more challenging. Fast Fourier convolution (FFC) can assist early layers to achieve receptive field that covers an entire image. Conventional systems, however, have only utilized FFC at a bottleneck layer, which is computationally demanding. Moreover, the shallow bottleneck layer cannot capture global semantic features effectively. Accordingly, in one or more implementations the scene-based image editing system 106 replaces the convolutional block in the encoder with FFC for the encoder layers. FFC enables the encoder to propagate features at early stage and thus address the issue of generating invalid features inside the hole, which helps improve the results.

As further shown in FIG. 5, the cascaded modulation inpainting neural network 502 also includes the decoder 506. As shown, the decoder 506 includes a plurality of cascaded modulation layers 520a-520n. The cascaded modulation layers 520a-520n process input features (e.g., input global feature maps and input local feature maps) to generate new features (e.g., new global feature maps and new local feature maps). In particular, each of the cascaded modulation layers 520a-520n operate at a different scale/resolution. Thus, the first cascaded modulation layer 520a takes input features at a first resolution/scale and generates new features at a lower scale/higher resolution (e.g., via upsampling as part of one or more modulation operations). Similarly, additional cascaded modulation layers operate at further lower scales/higher resolutions until generating the inpainted digital image at an output scale/resolution (e.g., the lowest scale/highest resolution).

Moreover, each of the cascaded modulation layers include multiple modulation blocks. For example, with regard to FIG. 5 the first cascaded modulation layer 520a includes a global modulation block and a spatial modulation block. In particular, the cascaded modulation inpainting neural network 502 performs a global modulation with regard to input features of the global modulation block. Moreover, the cascaded modulation inpainting neural network 502 performs a spatial modulation with regard to input features of the spatial modulation block. By performing both a global modulation and spatial modulation within each cascaded modulation layer, the scene-based image editing system 106 refines global positions to generate more accurate inpainted digital images.

As illustrated, the cascaded modulation layers 520a-520n are cascaded in that the global modulation block feeds into the spatial modulation block. Specifically, the cascaded modulation inpainting neural network 502 performs the spatial modulation at the spatial modulation block based on features generated at the global modulation block. To illustrate, in one or more embodiments the cascaded modulation inpainting neural network 502 utilizes the global modulation block to generate an intermediate feature. The cascaded modulation inpainting neural network 502 further utilizes a convolutional layer (e.g., a 2-layer convolutional affine parameter network) to convert the intermediate feature to a spatial tensor. The cascaded modulation inpainting neural network 502 utilizes the spatial tensor to modulate the input features analyzed by the spatial modulation block.

For example, FIG. 6 provides additional detail regarding operation of global modulation blocks and spatial modulation blocks in accordance with one or more embodiments. Specifically, FIG. 6 illustrates a global modulation block 602 and a spatial modulation block 603. As shown in FIG. 6, the global modulation block 602 includes a first global modulation operation 604 and a second global modulation operation 606. Moreover, the spatial modulation block 603 includes a global modulation operation 608 and a spatial modulation operation 610.

For example, a modulation block (or modulation operation) includes a computer-implemented process for modulating (e.g., scaling or shifting) an input signal according to one or more conditions. To illustrate, modulation block includes amplifying certain features while counteracting/normalizing these amplifications to preserve operation within a generative model. Thus, for example, a modulation block (or modulation operation) includes a modulation layer, a convolutional layer, and a normalization layer in some cases. The modulation layer scales each input feature of the convolution, and the normalization removes the effect of scaling from the statistics of the convolution's output feature maps.

Indeed, because a modulation layer modifies feature statistics, a modulation block (or modulation operation) often includes one or more approaches for addressing these statistical changes. For example, in some instances, a modulation block (or modulation operation) includes a computer-implemented process that utilizes batch normalization or instance normalization to normalize a feature. In some embodiments, the modulation is achieved by scaling and shifting the normalized activation according to affine parameters predicted from input conditions. Similarly, some modulation procedures replace feature normalization with a demodulation process. Thus, in one or more embodiments, a modulation block (or modulation operation) includes a modulation layer, convolutional layer, and a demodulation layer. For example, in one or more embodiments, a modulation block (or modulation operation) includes the modulation approaches described by Tero Karras, Samuli Laine, Miika Aittala, Janne Hellsten, Jaakko Lehtinen, and Timo Aila in Analyzing and improving the image quality of StyleGAN, Proc. CVPR (2020) (hereinafter StyleGan2), which is incorporated by reference herein in its entirety. In some instances, a modulation block includes one or more modulation operations.

Moreover, in one or more embodiments, a global modulation block (or global modulation operation) includes a modulation block (or modulation operation) that modulates an input signal in a spatially-invariant manner. For example, in some embodiments, a global modulation block (or global modulation operation) performs a modulation according to global features of a digital image (e.g., that do not vary spatially across coordinates of a feature map or image). Thus, for example, a global modulation block includes a modulation block that modulates an input signal according to an image encoding (e.g., global feature code) generated by an encoder. In some implementations, a global modulation block includes multiple global modulation operations.

In one or more embodiments, a spatial modulation block (or spatial modulation operation) includes a modulation block (or modulation operation) that modulates an input signal in a spatially-varying manner (e.g., according to a spatially-varying feature map). In particular, in some embodiments, a spatial modulation block (or spatial modulation operation) utilizes a spatial tensor, to modulate an input signal in a spatially-varying manner. Thus, in one or more embodiments a global modulation block applies a global modulation where affine parameters are uniform across spatial coordinates, and a spatial modulation block applies a spatially-varying affine transformation that varies across spatial coordinates. In some embodiments, a spatial modulation block includes both a spatial modulation operation in combination with another modulation operation (e.g., a global modulation operation and a spatial modulation operation).

For instance, in some embodiments, a spatial modulation operation includes spatially-adaptive modulation as described by Taesung Park, Ming-Yu Liu, Ting-Chun Wang, and Jun-Yan Zhu in Semantic image synthesis with spatially-adaptive normalization, Proceedings of the IEEE Conference on Computer Vision and Pattern Recognition (2019), which is incorporated by reference herein in its entirety (hereinafter Taesung). In some embodiments, the spatial modulation operation utilizes a spatial modulation operation with a different architecture than Taesung, including a modulation-convolution-demodulation pipeline.

Thus, with regard to FIG. 6, the scene-based image editing system 106 utilizes a global modulation block 602. As shown, the global modulation block 602 includes a first global modulation operation 604 and a second global modulation operation 606. Specifically, the first global modulation operation 604 processes a global feature map 612. For example, the global feature map 612 includes a feature vector generated by the cascaded modulation inpainting neural network reflecting global features (e.g., high-level features or features corresponding to the whole digital image). Thus, for example, the global feature map 612 includes a feature vector reflecting global features generated from a previous global modulation block of a cascaded decoder layer. In some instances, the global feature map 612 also includes a feature vector corresponding to the encoded feature vectors generated by the encoder (e.g., at a first decoder layer the scene-based image editing system 106 utilizes an encoded feature vector, style code, global feature code, constant, noise vector, or other feature vector as input in various implementations).

As shown, the first global modulation operation 604 includes a modulation layer 604a, an upsampling layer 604b, a convolutional layer 604c, and a normalization layer 604d. In particular, the scene-based image editing system 106 utilizes the modulation layer 604a to perform a global modulation of the global feature map 612 based on a global feature code 614 (e.g., the global feature code 516). Specifically, the scene-based image editing system 106 applies a neural network layer (i.e., a fully connected layer) to the global feature code 614 to generate a global feature vector 616. The scene-based image editing system 106 then modulates the global feature map 612 utilizing the global feature vector 616.

In addition, the scene-based image editing system 106 applies the upsampling layer 604b (e.g., to modify the resolution scale). Further, the scene-based image editing system 106 applies the convolutional layer 604c. In addition, the scene-based image editing system 106 applies the normalization layer 604d to complete the first global modulation operation 604. As shown, the first global modulation operation 604 generates a global intermediate feature 618. In particular, in one or more embodiments, the scene-based image editing system 106 generates the global intermediate feature 618 by combining (e.g., concatenating) the output of the first global modulation operation 604 with an encoded feature vector 620 (e.g., from a convolutional layer of the encoder having a matching scale/resolution).

As illustrated, the scene-based image editing system 106 also utilizes a second global modulation operation 606. In particular, the scene-based image editing system 106 applies the second global modulation operation 606 to the global intermediate feature 618 to generate a new global feature map 622. Specifically, the scene-based image editing system 106 applies a global modulation layer 606a to the global intermediate feature 618 (e.g., conditioned on the global feature vector 616). Moreover, the scene-based image editing system 106 applies a convolutional layer 606b and a normalization layer 606c to generate the new global feature map 622. As shown, in some embodiments, the scene-based image editing system 106 applies a spatial bias in generating the new global feature map 622.

Furthermore, as shown in FIG. 6, the scene-based image editing system 106 utilizes a spatial modulation block 603. In particular, the spatial modulation block 603 includes a global modulation operation 608 and a spatial modulation operation 610. The global modulation operation 608 processes a local feature map 624. For example, the local feature map 624 includes a feature vector generated by the cascaded modulation inpainting neural network reflecting local features (e.g., low-level, specific, or spatially variant features). Thus, for example, the local feature map 624 includes a feature vector reflecting local features generated from a previous spatial modulation block of a cascaded decoder layer. In some cases, the global feature map 612 also includes a feature vector corresponding to the encoded feature vectors generated by the encoder (e.g., at a first decoder layer, the scene-based image editing system 106 utilizes an encoded feature vector, style code, noise vector or other feature vector in various implementations).

As shown, the scene-based image editing system 106 utilizes the global modulation operation 608 to generate a local intermediate feature 626 from the local feature map 624. Specifically, the scene-based image editing system 106 applies a modulation layer 608a, an upsampling layer 608b, a convolutional layer 608c, and a normalization layer 608d. Moreover, in some embodiments, the scene-based image editing system 106 applies spatial bias and broadcast noise to the output of the global modulation operation 608 to generate the local intermediate feature 626.

As illustrated in FIG. 6, the scene-based image editing system 106 utilizes the spatial modulation operation 610 to generate a new local feature map 628. Indeed, the spatial modulation operation 610 modulates the local intermediate feature 626 based on the global intermediate feature 618. Specifically, the scene-based image editing system 106 generates a spatial tensor 630 from the global intermediate feature 618. For example, the scene-based image editing system 106 applies a convolutional affine parameter network to generate the spatial tensor 630. In particular, the scene-based image editing system 106 applies a convolutional affine parameter network to generate an intermediate spatial tensor. The scene-based image editing system 106 combines the intermediate spatial tensor with the global feature vector 616 to generate the spatial tensor 630. The scene-based image editing system 106 utilizes the spatial tensor 630 to modulate the local intermediate feature 626 (utilizing the spatial modulation layer 610a) and generated a modulated tensor.

As shown, the scene-based image editing system 106 also applies a convolutional layer 610b to the modulated tensor. In particular, the convolutional layer 610b generates a convolved feature representation from the modulated tensor. In addition, the scene-based image editing system 106 applies a normalization layer 610c to convolved feature representation to generate the new local feature map 628.

Although illustrated as a normalization layer 610c, in one or more embodiments, the scene-based image editing system 106 applies a demodulation layer. For example, the scene-based image editing system 106 applies a modulation-convolution-demodulation pipeline (e.g., general normalization rather than instance normalization). In some cases, this approach avoids potential artifacts (e.g., water droplet artifacts) caused by instance normalization. Indeed, a demodulation/normalization layer includes a layer that scales each output feature map by a uniform demodulation/normalization value (e.g., by a uniform standard deviation instead of instance normalization that utilizes data-dependent constant normalization based on the contents of the feature maps).

As shown in FIG. 6, in some embodiments, the scene-based image editing system 106 also applies a shifting tensor 632 and broadcast noise to the output of the spatial modulation operation 610. For example, the spatial modulation operation 610 generates a normalized/demodulated feature. The scene-based image editing system 106 also generates the shifting tensor 632 by applying the affine parameter network to the global intermediate feature 618. The scene-based image editing system 106 combines the normalized/demodulated feature, the shifting tensor 632, and/or the broadcast noise to generate the new local feature map 628.

In one or more embodiments, upon generating the new global feature map 622 and the new local feature map 628, the scene-based image editing system 106 proceeds to the next cascaded modulation layer in the decoder. For example, the scene-based image editing system 106 utilizes the new global feature map 622 and the new local feature map 628 as input features to an additional cascaded modulation layer at a different scale/resolution. The scene-based image editing system 106 further utilizes the additional cascaded modulation layer to generate additional feature maps (e.g., utilizing an additional global modulation block and an additional spatial modulation block). In some cases, the scene-based image editing system 106 iteratively processes feature maps utilizing cascaded modulation layers until coming to a final scale/resolution to generate an inpainted digital image.

Although FIG. 6 illustrates the global modulation block 602 and the spatial modulation block 603, in some embodiments, the scene-based image editing system 106 utilizes a global modulation block followed by another global modulation block. For example, the scene-based image editing system 106 replaces the spatial modulation block 603 with an additional global modulation block. In such an embodiment, the scene-based image editing system 106 replaces APN (and spatial tensor) and corresponding spatial modulation illustrated in FIG. 6 with a skip connection. For example, the scene-based image editing system 106 utilizes the global intermediate feature to perform a global modulation with regard to the local intermediate vector. Thus, in some cases, the scene-based image editing system 106 utilizes a first global modulation block and a second global modulation block.

As mentioned, the decoder can also be described in terms of variables and equations to illustrate operation of the cascaded modulation inpainting neural network. For example, as discussed, the decoder stacks a sequence of cascaded modulation blocks to upsample the input feature map $F_e^{(L)}$. Each cascaded modulation block takes the global code g as input to modulate the feature according to the global representation of the partial image. Moreover, in some cases, the scene-based image editing system 106 provides mechanisms to correct local error after predicting the global structure.

In particular, in some embodiments, the scene-based image editing system 106 utilizes a cascaded modulation block to address the challenge of generating coherent features both globally and locally. At a high level, the scene-based image editing system 106 follows the following approach: i) decomposition of global and local features to separate local details from the global structure, ii) a cascade of global and spatial modulation that predicts local details from global structures. In one or more implementations, the scene-based image editing system 106 utilizes spatial modulations generated from the global code for better predictions (e.g., and discards instance normalization to make the design compatible with StyleGAN2).

Specifically, the cascaded modulation takes the global and local feature $F_g^{(i)}$ and $F_l^{(i)}$ from previous scale and the global code g as input and produces the new global and local features $F_g^{(i+1)}$ and $F_l^{(i+1)}$ at next scale/resolution. To produce the new global code $F_g^{(i+1)}$ from $F_g^{(i)}$, the scene-based image editing system 106 utilizes a global code modulation stage that includes a modulation-convolution-demodulation procedure, which generates an upsampled feature X.

Due to the limited expressive power of the global vector g on representing 2-d visual details, and the inconsistent features inside and outside the hole, the global modulation may generate distorted features inconsistent with the context. To compensate, in some cases, the scene-based image editing system 106 utilizes a spatial modulation that generates more accurate features. Specifically, the spatial modulation takes X as the spatial code and g as the global code to modulate the input local feature $F_l^{(i)}$ in a spatially adaptive fashion.

Moreover, the scene-based image editing system 106 utilizes a unique spatial modulation-demodulation mechanism to avoid potential "water droplet" artifacts caused by instance normalization in conventional systems. As shown, the spatial modulation follows a modulation-convolution-demodulation pipeline.

In particular, for spatial modulation, the scene-based image editing system 106 generates a spatial tensor $A_0$=APN (Y) from feature X by a 2-layer convolutional affine parameter network (APN). Meanwhile, the scene-based image editing system 106 generates a global vector $\alpha$=fc(g) from global code g with a fully connected layer (fc) to capture global context. The scene-based image editing system 106 generates a final spatial tensor A=$A_0$+$\alpha$ as the broadcast summation of $A_0$ and $\alpha$ for scaling intermediate feature Y of the block with element-wise product $\odot$:

$$\overline{Y}=Y\odot A$$

Moreover, for convolution, the modulated tensor $\overline{Y}$ is convolved with a 3×3 learnable kernel K, resulting in:

$$\hat{Y}=\overline{Y}*K$$

For spatially-aware demodulation, the scene-based image editing system 106 applies a demodularization step to compute the normalized output $\tilde{Y}$. Specifically, the scene-based image editing system 106 assumes that the input features Y are independent random variables with unit variance and after the modulation, the expected variance of the output is not changed, i.e., $\mathbb{E}_{\gamma \in \overline{\gamma}}[\text{Var}(\gamma)]=1$. Accordingly, this gives the demodulation computation:

$$\tilde{Y} = \hat{Y} \odot D,$$

where $D = 1/\sqrt{K^2 \odot \mathbb{E}_{a \in A}[a^2]}$ is the demodulation coefficient. In some cases, the scene-based image editing system 106 implements the foregoing equation with standard tensor operations.

In one or more implementations, the scene-based image editing system 106 also adds spatial bias and broadcast noise. For example, the scene-based image editing system 106 adds the normalized feature $\tilde{Y}$ to a shifting tensor B=APN(X) produced by another affine parameter network (APN) from feature X along with the broadcast noise n to product the new local feature $F_l^{i+1}$:

$$F_l^{(i+1)} = \tilde{Y} + B + n$$

Thus, in one or more embodiments, to generate a content fill having replacement pixels for a digital image having a replacement region, the scene-based image editing system 106 utilizes an encoder of a content-aware hole-filling machine learning model (e.g., a cascaded modulation inpainting neural network) to generate an encoded feature map from the digital image. The scene-based image editing system 106 further utilizes a decoder of the content-aware hole-filling machine learning model to generate the content fill for the replacement region. In particular, in some embodiments, the scene-based image editing system 106 utilizes a local feature map and a global feature map from one or more decoder layers of the content-aware hole-filling machine learning model in generating the content fill for the replacement region of the digital image.

Figure 7:
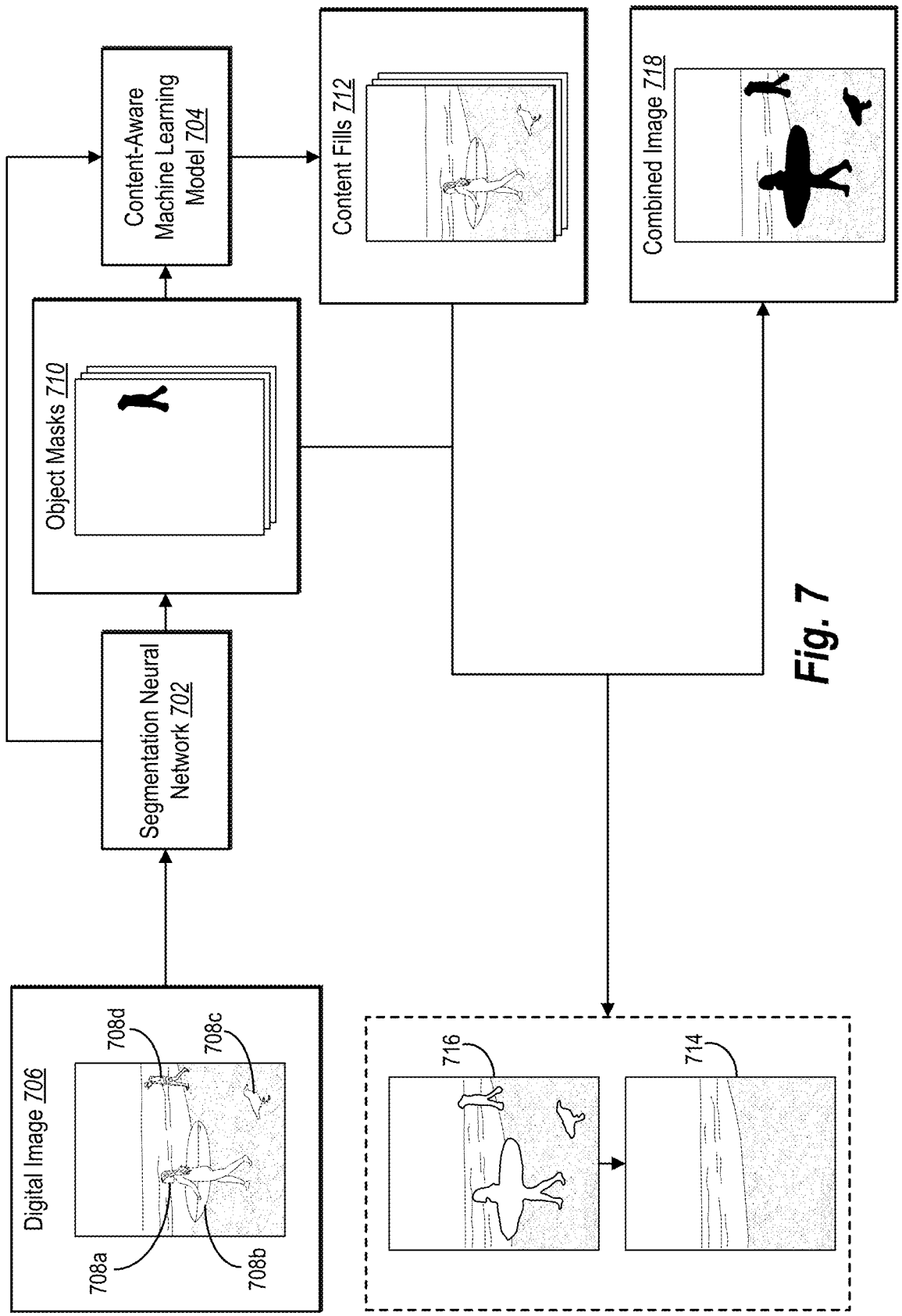
FIG. 7 illustrates a diagram for generating object masks and content fills to facilitate object-aware modifications to a digital image in accordance with one or more embodiments.

As discussed above with reference to FIGS. 3-6, in one or more embodiments, the scene-based image editing system 106 utilizes a segmentation neural network to generate object masks for objects portrayed in a digital image and a content-aware hole-filling machine learning model to generate content fills for those objects (e.g., for the object masks generated for the objects). As further mentioned, in some embodiments, the scene-based image editing system 106 generates the object mask(s) and the content fill(s) in anticipation of one or more modifications to the digital image-before receiving user input for such modifications. For example, in one or more implementations, upon opening, accessing, or displaying the digital image 706, the scene-based image editing system 106 generates the object mask(s) and the content fill(s) automatically (e.g., without user input to do so). Thus, in some implementations the scene-based image editing system 106 facilitates object-aware modifications of digital images. FIG. 7 illustrates a diagram for generating object masks and content fills to facilitate object-aware modifications to a digital image in accordance with one or more embodiments.

In one or more embodiments, an object-aware modification includes an editing operation that targets an identified object in a digital image. In particular, in some embodiments, an object-aware modification includes an editing operation that targets an object that has been previously segmented. For instance, as discussed, the scene-based image editing system 106 generates a mask for an object portrayed in a digital image before receiving user input for modifying the object in some implementations. Accordingly, upon user selection of the object (e.g., a user selection of at least some of the pixels portraying the object), the scene-based image editing system 106 determines to target modifications to the entire object rather than requiring that the user specifically designate each pixel to be edited. Thus, in some cases, an object-aware modification includes a modification that targets an object by managing all the pixels portraying the object as part of a cohesive unit rather than individual elements. For instance, in some implementations an object-aware modification includes, but is not limited to, a move operation or a delete operation.

As shown in FIG. 7, the scene-based image editing system 106 utilizes a segmentation neural network 702 and a content-aware hole-filling machine learning model 704 to analyze/process a digital image 706. The digital image 706 portrays a plurality of objects 708a-708d against a background. Accordingly, in one or more embodiments, the scene-based image editing system 106 utilizes the segmentation neural network 702 to identify the objects 708a-708d within the digital image.

In one or more embodiments, the scene-based image editing system 106 utilizes the segmentation neural network 702 and the content-aware hole-filling machine learning model 704 to analyze the digital image 706 in anticipation of receiving user input for modifications of the digital image 706. Indeed, in some instances, the scene-based image editing system 106 analyzes the digital image 706 before receiving user input for such modifications. For instance, in some embodiments, the scene-based image editing system 106 analyzes the digital image 706 automatically in response to receiving or otherwise accessing the digital image 706. In some implementations, the scene-based image editing system 106 analyzes the digital image in response to a general user input to initiate pre-processing in anticipation of subsequent modification.

As shown in FIG. 7, the scene-based image editing system 106 utilizes the segmentation neural network 702 to generate object masks 710 for the objects 708a-708d portrayed in the digital image 706. In particular, in some embodiments, the scene-based image editing system 106 utilizes the segmentation neural network 702 to generate a separate object mask for each portrayed object.

As further shown in FIG. 7, the scene-based image editing system 106 utilizes the content-aware hole-filling machine learning model 704 to generate content fills 712 for the objects 708a-708d. In particular, in some embodiments, the scene-based image editing system 106 utilizes the content-aware hole-filling machine learning model 704 to generate a separate content fill for each portrayed object. As illustrated, the scene-based image editing system 106 generates the content fills 712 using the object masks 710. For instance, in one or more embodiments, the scene-based image editing system 106 utilizes the object masks 710 generated via the segmentation neural network 702 as indicators of replacement regions to be replaced using the content fills 712 generated by the content-aware hole-filling machine learning model 704. In some instances, the scene-based image editing system 106 utilizes the object masks 710 to filter out the objects from the digital image 706, which results in remaining holes in the digital image 706 to be filled by the content fills content fills 712.

As shown in FIG. 7, the scene-based image editing system 106 utilizes the object masks 710 and the content fills 712 to generate a completed background 714. In one or more embodiments, a completed background image includes a set of background pixels having objects replaced with content fills. In particular, a completed background includes the background of a digital image having the objects portrayed within the digital image replaced with corresponding content fills. In one or more implementations, a completed background comprises generating a content fill for each object in the image. Thus, the completed background may comprise various levels of completion when objects are in front of each other such that the background for a first object comprises part of a second object and the background of the second object comprises a semantic area or the furthest element in the image.

Indeed, FIG. 7 illustrates the background 716 of the digital image 706 with holes 718a-718d where the objects 708a-708d were portrayed. For instance, in some cases, the scene-based image editing system 106 filters out the objects 708a-708d using the object masks 710, causing the holes 718a-718d to remain. Further, the scene-based image editing system 106 utilizes the content fills 712 to fill in the holes 718a-718d, resulting in the completed background 714.

In other implementations, the scene-based image editing system 106 utilizes the object masks 710 as indicators of replacement regions in the digital image 706. In particular, the scene-based image editing system 106 utilizes the object masks 710 as indicators of potential replacement regions that may result from receiving user input to modify the digital image 706 via moving/removing one or more of the objects 708a-708d. Accordingly, the scene-based image editing system 106 utilizes the content fills 712 to replace pixels indicated by the object masks 710.

Though FIG. 7 indicates generating a separate completed background, it should be understood that, in some implementations, the scene-based image editing system 106 creates the completed background 714 as part of the digital image 706. For instance, in one or more embodiments, the scene-based image editing system 106 positions the content fills 712 behind their corresponding object (e.g., as a separate image layer) in the digital image 706. Further, in one or more embodiments, the scene-based image editing system 106 positions the object masks 710 behind their corresponding object (e.g., as a separate layer). In some implementations, the scene-based image editing system 106 places the content fills 712 behind the object masks 710.

Further, in some implementations, the scene-based image editing system 106 generates multiple filled-in backgrounds (e.g., semi-completed backgrounds) for a digital image. For instance, in some cases, where a digital image portrays a plurality of objects, the scene-based image editing system 106 generates a filled-in background for each object from the plurality of objects. To illustrate, the scene-based image editing system 106 generates a filled-in background for an object by generating a content fill for that object while treating the other objects of the digital image as part of the background. Thus, in some instances, the content fill includes portions of other objects positioned behind the object within the digital image.

Thus, in one or more embodiments, the scene-based image editing system 106 generates a combined image 718 as indicated in FIG. 7. Indeed, the scene-based image editing system 106 generates the combined image having the digital image 706, the object masks 710, and the content fills 712 as separate layers. Though, FIG. 7 shows the object masks 710 on top of the objects 708a-708d within the combined image 718, it should be understood that the scene-based image editing system 106 places the object masks 710 as well as the content fills 712 behind the objects 708a-708d in various implementations. Accordingly, the scene-based image editing system 106 presents the combined image 718 for display within a graphical user interface so that the object masks 710 and the content fills 712 are hidden from view until user interactions that trigger display of those components is received.

Further, though FIG. 7 shows the combined image 718 as separate from the digital image 706, it should be understood that the combined image 718 represents modifications to the digital image 706 in some implementations. In other words, in some embodiments, to generate the combined image 718 the scene-based image editing system 106 modifies the digital image 706 by adding additional layers composed of the object masks 710 and the content fills 712.

In one or more embodiments, the scene-based image editing system 106 utilizes the combined image 718 (e.g., the digital image 706, the object masks 710, and the content fills 712) to facilitate various object-aware modifications with respect to the digital image 706. In particular, the scene-based image editing system 106 utilizes the combined image 718 to implement an efficient graphical user interface that facilitates flexible object-aware modifications. FIGS. 8A-8D illustrate a graphical user interface implemented by the scene-based image editing system 106 to facilitate a move operation in accordance with one or more embodiments.

Figure 8B:
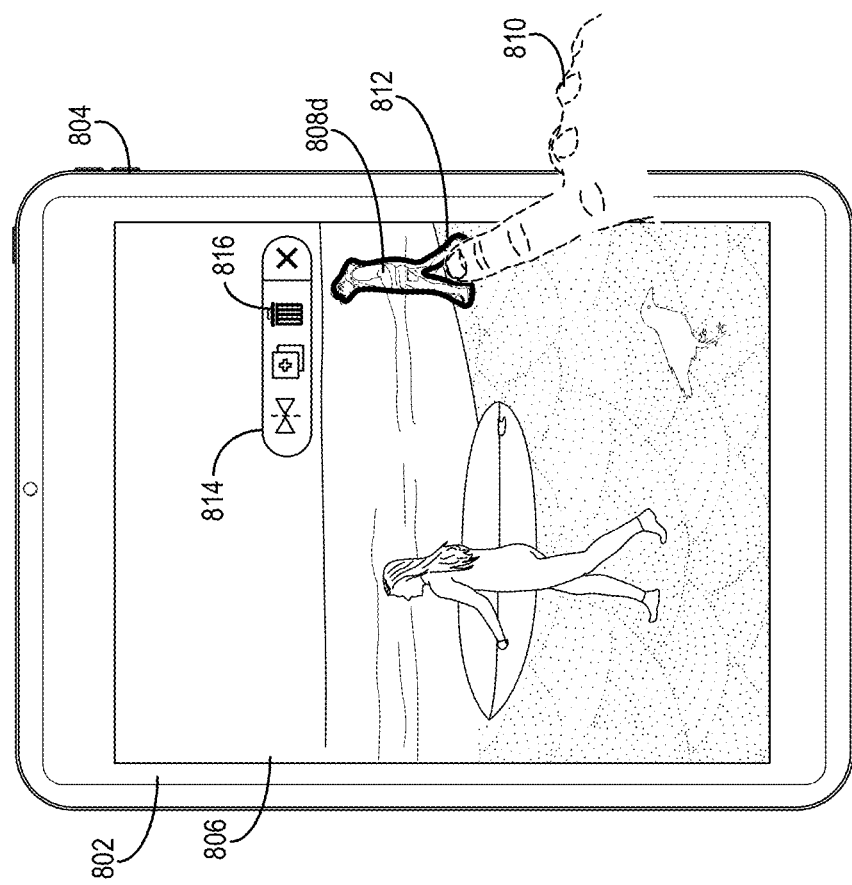
FIGS. 8A-8D illustrate a graphical user interface implemented by the scene-based image editing system to facilitate a move operation in accordance with one or more embodiments.
Figure 8A:
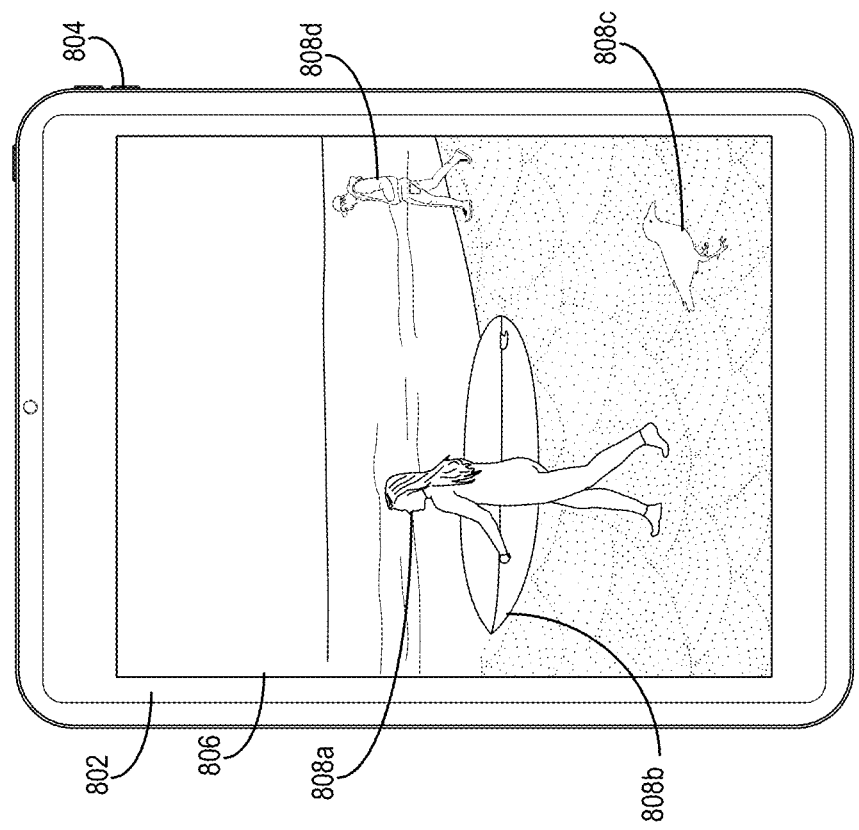

Indeed, as shown in FIG. 8A, the scene-based image editing system 106 provides a graphical user interface 802 for display on a client device 804, such as a mobile device. Further, the scene-based image editing system 106 provides a digital image 806 for display with the graphical user interface.

It should be noted that the graphical user interface 802 of FIG. 8A is minimalistic in style. In particular, the graphical user interface 802 does not include a significant number of menus, options, or other visual elements aside from the digital image 806. Though the graphical user interface 802 of FIG. 8A displays no menus, options, or other visual elements aside from the digital image 806, it should be understood that the graphical user interface 802 displays at least some menus, options, or other visual elements in various embodiments—at least when the digital image 806 is initially displayed.

As further shown in FIG. 8A, the digital image 806 portrays a plurality of objects 808a-808d. In one or more embodiments, the scene-based image editing system 106 pre-processes the digital image 806 before receiving user input for the move operation. In particular, in some embodiments, the scene-based image editing system 106 utilizes a segmentation neural network to detect and generate masks for the plurality of objects 808a-808d and/or utilizes a content-aware hole-filling machine learning model to generate content fills that correspond to the objects 808a-808d. Furthermore, in one or more implementations, the scene-based image editing system 106 generates the object masks, content fills, and a combined image upon loading, accessing, or displaying the digital image 806, and without, user input other than to open/display the digital image 806.

As shown in FIG. 8B, the scene-based image editing system 106 detects a user interaction with the object 808d via the graphical user interface 802. In particular, FIG. 8B illustrates the scene-based image editing system 106 detecting a user interaction executed by a finger (part of a hand 810) of a user (e.g., a touch interaction), though user interactions are executed by other instruments (e.g., stylus or pointer controlled by a mouse or track pad) in various embodiments. In one or more embodiments, the scene-based image editing system 106 determines that, based on the user interaction, the object 808*d* has been selected for modification.

The scene-based image editing system 106 detects the user interaction for selecting the object 808*d* via various operations in various embodiments. For instance, in some cases, the scene-based image editing system 106 detects the selection via a single tap (or click) on the object 808*d*. In some implementations, the scene-based image editing system 106 detects the selection of the object 808*d* via a double tap (or double click) or a press and hold operation. Thus, in some instances, the scene-based image editing system 106 utilizes the second click or the hold operation to confirm the user selection of the object 808*d*.

In some cases, the scene-based image editing system 106 utilizes various interactions to differentiate between a single object select or a multi-object select. For instance, in some cases, the scene-based image editing system 106 determines that a single tap is for selecting a single object and a double tap is for selecting multiple objects. To illustrate, in some cases, upon receiving a first tap on an object, the scene-based image editing system 106 selects the object. Further, upon receiving a second tap on the object, the scene-based image editing system 106 selects one or more additional objects. For instance, in some implementations, the scene-based image editing system 106 selects one or more additional object having the same or a similar classification (e.g., selecting other people portrayed in an image when the first tap interacted with a person in the image). In one or more embodiments, the scene-based image editing system 106 recognizes the second tap as an interaction for selecting multiple objects if the second tap is received within a threshold time period after receiving the first tap.

In some embodiments, the scene-based image editing system 106 recognizes other user interactions for selecting multiple objects within a digital image. For instance, in some implementations, the scene-based image editing system 106 receives a dragging motion across the display of a digital image and selects all object captured within the range of the dragging motion. To illustrate, in some cases, the scene-based image editing system 106 draws a box that grows with the dragging motion and selects all objects that falls within the box. In some cases, the scene-based image editing system 106 draws a line that follows the path of the dragging motion and selects all objects intercepted by the line.

In some implementations, the scene-based image editing system 106 further allows for user interactions to select distinct portions of an object. To illustrate, in some cases, upon receiving a first tap on an object, the scene-based image editing system 106 selects the object. Further, upon receiving a second tap on the object, the scene-based image editing system 106 selects a particular portion of the object (e.g., a limb or torso of a person or a component of a vehicle). In some cases, the scene-based image editing system 106 selects the portion of the object touched by the second tap. In some cases, the scene-based image editing system 106 enters into a "sub object" mode upon receiving the second tap and utilizes additional user interactions for selecting particular portions of the object.

Returning to FIG. 8B, as shown, based on detecting the user interaction for selecting the object 808*d*, the scene-based image editing system 106 provides a visual indication 812 in association with the object 808*d*. Indeed, in one or more embodiments, the scene-based image editing system 106 detects the user interaction with a portion of the object 808*d*—e.g., with a subset of the pixels that portray the object—and determines that the user interaction targets the object 808*d* as a whole (rather than the specific pixels with which the user interacted). For instance, in some embodiments, the scene-based image editing system 106 utilizes the pre-generated object mask that corresponds to the object 808*d* to determine whether the user interaction targets the object 808*d* or some other portion of the digital image 806. For example, in some cases, upon detecting that the user interacts with an area inside the object mask that corresponds to the object 808*d*, the scene-based image editing system 106 determines that the user interaction targets the object 808*d* as a whole. Thus, the scene-based image editing system 106 provides the visual indication 812 in association with the object 808*d* as a whole.

In some cases, the scene-based image editing system 106 utilizes the visual indication 812 to indicate, via the graphical user interface 802, that the selection of the object 808*d* has been registered. In some implementations, the scene-based image editing system 106 utilizes the visual indication 812 to represent the pre-generated object mask that corresponds to the object 808*d*. Indeed, in one or more embodiments, in response to detecting the user interaction with the object 808*d*, the scene-based image editing system 106 surfaces the corresponding object mask. For instance, in some cases, the scene-based image editing system 106 surfaces the object mask in preparation for a modification to the object 808*d* and/or to indicate that the object mask has already been generated and is available for use. In one or more embodiments, rather than using the visual indication 812 to represent the surfacing of the object mask, the scene-based image editing system 106 displays the object mask itself via the graphical user interface 802.

Additionally, as the scene-based image editing system 106 generated the object mask for the object 808*d* prior to receiving the user input to select the object 808*d*, the scene-based image editing system 106 surfaces the visual indication 812 without latency or delay associated with conventional systems. In other words, the scene-based image editing system 106 surfaces the visual indication 812 without any delay associated with generating an object mask.

As further illustrated, based on detecting the user interaction for selecting the object 808*d*, the scene-based image editing system 106 provides an option menu 814 for display via the graphical user interface 802. The option menu 814 shown in FIG. 8B provides a plurality of options, though the option menu includes various numbers of options in various embodiments. For instance, in some implementations, the option menu 814 includes one or more curated options, such as options determined to be popular or used with the most frequency. For example, as shown in FIG. 8B, the option menu 814 includes an option 816 to delete the object 808*d*.

Thus, in one or more embodiments, the scene-based image editing system 106 provides modification options for display via the graphical user interface 802 based on the context of a user interaction. Indeed, as just discussed, the scene-based image editing system 106 provides an option menu that provides options for interacting with (e.g., modifying) a selected object. In doing so, the scene-based image editing system 106 minimizes the screen clutter that is typical under many conventional systems by withholding options or menus for display until it is determined that those options or menus would be useful in the current context in which the user is interacting with the digital image. Thus, the graphical user interface 802 used by the scene-based image editing system 106 allows for more flexible implementation on computing devices with relatively limited screen space, such as smart phones or tablet devices.

Figure 8D:
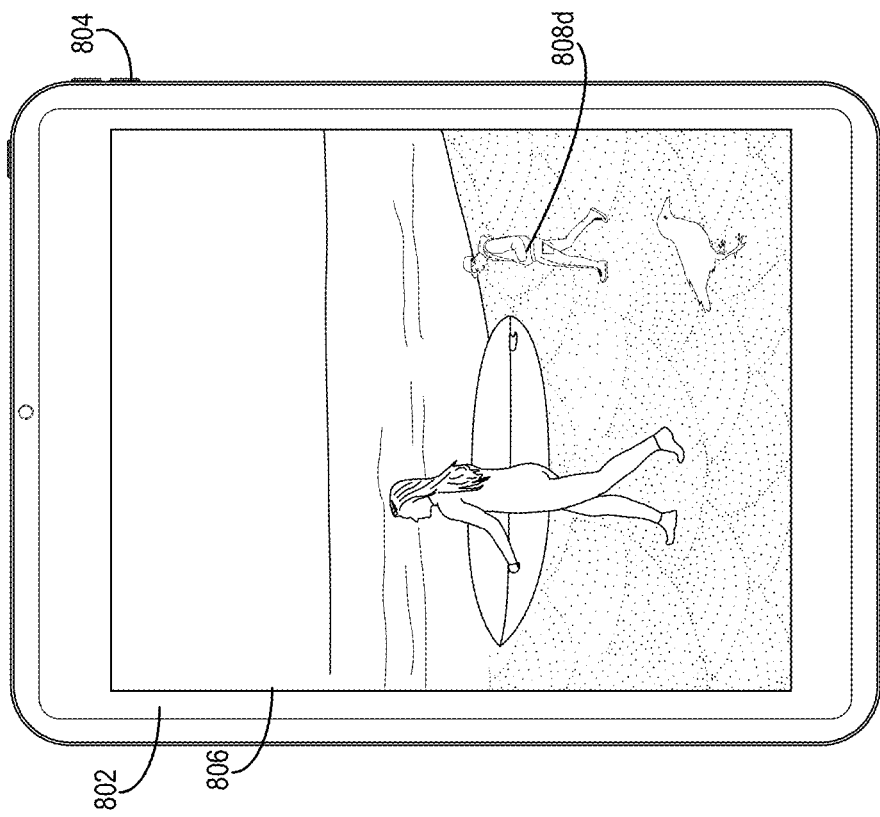
Figure 8C:
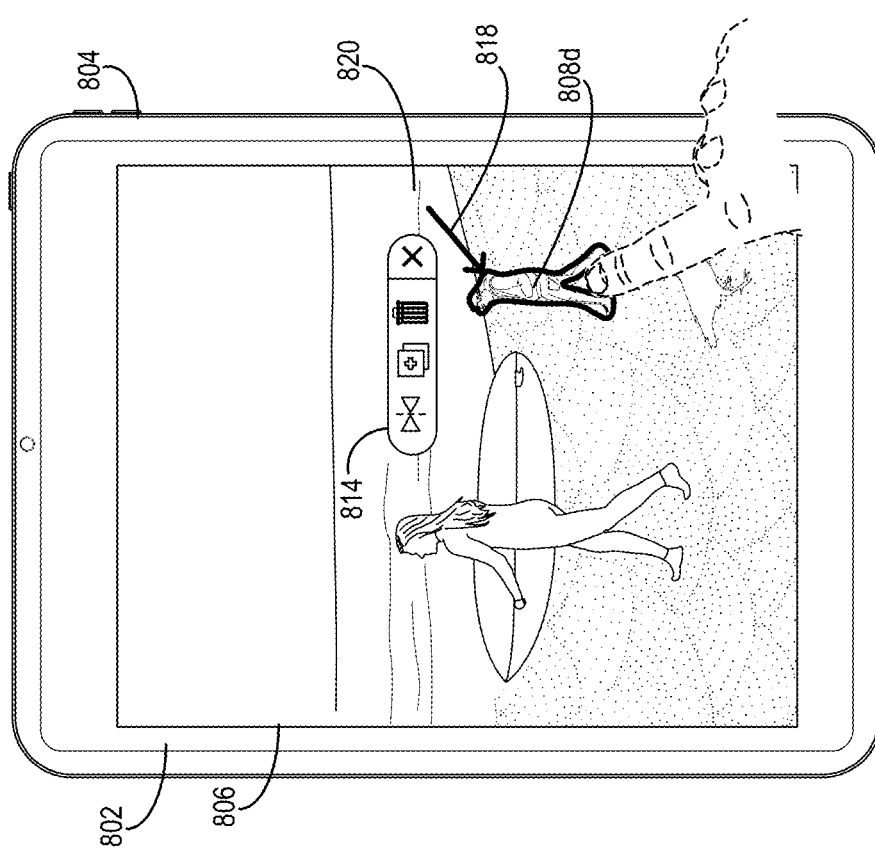

As shown in FIG. 8C, the scene-based image editing system 106 detects, via the graphical user interface 802, an additional user interaction for moving the object 808d across the digital image 806 (as shown via the arrow 818). In particular, the scene-based image editing system 106 detects the additional user interaction for moving the object 808d from a first position in the digital image 806 to a second position. For instance, in some cases, the scene-based image editing system 106 detects the second user interaction via a dragging motion (e.g., the user input selects the object 808d and moves across the graphical user interface 802 while holding onto the object 808d). In some implementations, after the initial selection of the object 808d, the scene-based image editing system 106 detects the additional user interaction as a click or tap on the second position and determines to use the second position as a new position for the object 808d. It should be noted that the scene-based image editing system 106 moves the object 808d as a whole in response to the additional user interaction.

As indicated in FIG. 8C, upon moving the object 808d from the first position to the second position, the scene-based image editing system 106 exposes the content fill 820 that was placed behind the object 808d (e.g., behind the corresponding object mask). Indeed, as previously discussed, the scene-based image editing system 106 places pre-generated content fills behind the objects (or corresponding object masks) for which the content fills were generated. Accordingly, upon removing the object 808d from its initial position within the digital image 806, the scene-based image editing system 106 automatically reveals the corresponding content fill. Thus, the scene-based image editing system 106 provides a seamless experience where an object is movable without exposing any holes in the digital image itself. In other words, the scene-based image editing system 106 provides the digital image 806 for display as if it were a real scene in which the entire background is already known.

Additionally, as the scene-based image editing system 106 generated the content fill 820 for the object 808d prior to receiving the user input to move the object 808d, the scene-based image editing system 106 exposes or surfaces the content fill 820 without latency or delay associated with conventional systems. In other words, the scene-based image editing system 106 exposes the content fill 820 incrementally as the object 808d is moved across the digital image 806 without any delay associated with generating content.

As further shown in FIG. 8D, the scene-based image editing system 106 deselects the object 808d upon completion of the move operation. In some embodiments, the object 808d maintains the selection of the object 808d until receiving a further user interaction to indicate deselection of the object 808d (e.g., a user interaction with another portion of the digital image 806). As further indicated, upon deselecting the object 808d, the scene-based image editing system 106 further removes the option menu 814 that was previously presented. Thus, the scene-based image editing system 106 dynamically presents options for interacting with objects for display via the graphical user interface 802 to maintain a minimalistic style that does not overwhelm the displays of computing devices with limited screen space.

Figure 9C:
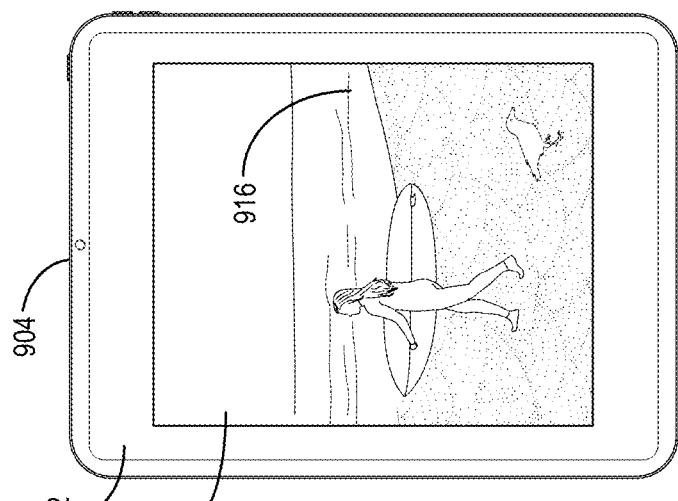
FIGS. 9A-9C illustrate a graphical user interface implemented by the scene-based image editing system to facilitate a delete operation in accordance with one or more embodiments.
Figure 9B:
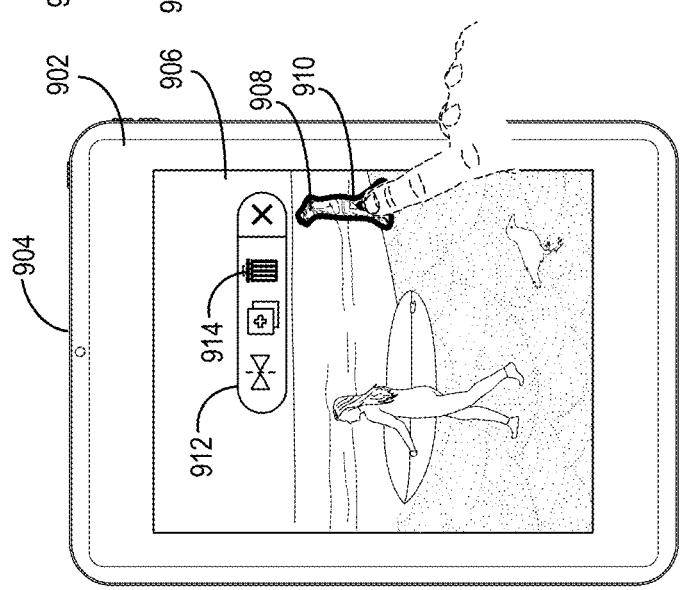
Figure 9A:
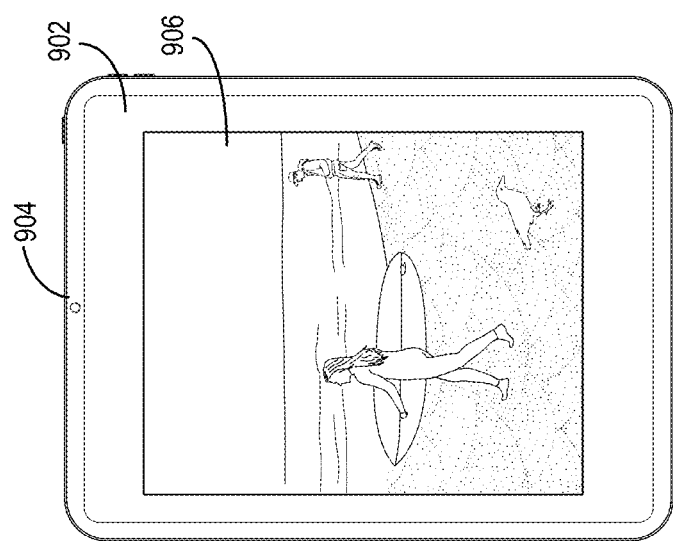

FIGS. 9A-9C illustrate a graphical user interface implemented by the scene-based image editing system 106 to facilitate a delete operation in accordance with one or more embodiments. Indeed, as shown in FIG. 9A, the scene-based image editing system 106 provides a graphical user interface 902 for display on a client device 904 and provides a digital image 906 for display in the graphical user interface 902.

As further shown in FIG. 9B, the scene-based image editing system 106 detects, via the graphical user interface 902, a user interaction with an object 908 portrayed in the digital image 906. In response to detecting the user interaction, the scene-based image editing system 106 surfaces the corresponding object mask, providing the visual indication 910 (or the object mask itself) for display in association with the object 908, and provides the option menu 912 for display. In particular, as shown, the option menu 912 includes an option 914 for deleting the object 908 that has been selected.

Additionally, as shown in FIG. 9C, the scene-based image editing system 106 removes the object 908 from the digital image 906. For instance, in some cases, the scene-based image editing system 106 detects an additional user interaction via the graphical user interface 902 (e.g., an interaction with the option 914 for deleting the object 908) and removes the object 908 from the digital image 906 in response. As further shown, upon removing the object 908 from the digital image 906, the scene-based image editing system 106 automatically exposes the content fill 916 that was previously placed behind the object 908 (e.g., behind the corresponding object mask). Thus, in one or more embodiments, the scene-based image editing system 106 provides the content fill 916 for immediate display upon removal of the object 908.

While FIGS. 8B, 8C, and 9B illustrate the scene-based image editing system 106 providing a menu, in or more implementations, the scene-based image editing system 106 allows for object-based editing without requiring or utilizing a menu. For example, the scene-based image editing system 106 selects an object 808d, 908 and surfaces a visual indication 812, 910 in response to a first user interaction (e.g., a tap on the respective object). The scene-based image editing system 106 performs an object-based editing of the digital image in response to second user interaction without the use of a menu. For example, in response to a second user input dragging the object across the image, the scene-based image editing system 106 moves the object. Alternatively, in response to a second user input (e.g., a second tap), the scene-based image editing system 106 deletes the object.

The scene-based image editing system 106 provides more flexibility for editing digital images when compared to conventional systems. In particular, the scene-based image editing system 106 facilitates object-aware modifications that enable interactions with objects rather than requiring targeting the underlying pixels. Indeed, based on a selection of some pixels that contribute to the portrayal of an object, the scene-based image editing system 106 flexibly determines that the whole object has been selected. This is in contrast to conventional systems that require a user to select an option from a menu indicating an intention to selection an object, provide a second user input indicating the object to select (e.g., a bounding box about the object or drawing of another rough boundary about the object), and another user input to generate the object mask. The scene-based image editing system 106 instead provides for selection of an object with a single user input (a tap on the object).

Further, upon user interactions for implementing a modification after the prior selection, the scene-based image editing system 106 applies the modification to the entire object rather than the particular set of pixels that were selected. Thus, the scene-based image editing system 106 manages objects within digital images as objects of a real scene that are interactive and can be handled as cohesive units. Further, as discussed, the scene-based image editing system 106 offers improved flexibility with respect to deployment on smaller devices by flexibly and dynamically managing the amount of content that is displayed on a graphical user interface in addition to a digital image.

Additionally, the scene-based image editing system 106 offers improved efficiency when compared to many conventional systems. Indeed, as previously discussed, conventional systems typically require execution of a workflow consisting of a sequence of user interactions to perform a modification. Where a modification is meant to target a particular object, many of these systems require several user interactions just to indicate that the object is the subject of the subsequent modification (e.g., user interactions for identifying the object and separating the object from the rest of the image) as well as user interactions for closing the loop on executed modifications (e.g., filling in the holes remaining after removing objects). The scene-based image editing system 106, however, reduces the user interactions typically required for a modification by pre-processing a digital image before receiving user input for such a modification. Indeed, by generating object masks and content fills automatically, the scene-based image editing system 106 eliminates the need for user interactions to perform these steps.

In one or more embodiments, the scene-based image editing system 106 performs further processing of a digital image in anticipation of modifying the digital image. For instance, as previously mentioned, the scene-based image editing system 106 generates a semantic scene graph from a digital image in some implementations. Thus, in some cases, upon receiving one or more user interactions for modifying the digital image, the scene-based image editing system 106 utilizes the semantic scene graph to execute the modifications. Indeed, in many instances, the scene-based image editing system 106 generates a semantic scene graph for use in modifying a digital image before receiving user input for such modifications. FIGS. 10-15 illustrate diagrams for generating a semantic scene graph for a digital image in accordance with one or more embodiments.

Indeed, many conventional systems are inflexible in that they typically wait upon user interactions before determining characteristics of a digital image. For instance, such conventional systems often wait upon a user interaction that indicates a characteristic to be determined and then performs the corresponding analysis in response to receiving the user interaction. Accordingly, these systems fail to have useful characteristics readily available for use. For example, upon receiving a user interaction for modifying a digital image, conventional systems typically must perform an analysis of the digital image to determine characteristics to change after the user interaction has been received.

Further, as previously discussed, such operation results in inefficient operation as image edits often require workflows of user interactions, many of which are used in determining characteristics to be used in execution of the modification. Thus, conventional systems often require a significant number of user interactions to determine the characteristics needed for an edit.

The scene-based image editing system 106 provides advantages by generating a semantic scene graph for a digital image in anticipation of modifications to the digital image. Indeed, by generating the semantic scene graph, the scene-based image editing system 106 improves flexibility over conventional systems as it makes characteristics of a digital image readily available for use in the image editing process. Further, the scene-based image editing system 106 provides improved efficiency by reducing the user interactions required in determining these characteristics. In other words, the scene-based image editing system 106 eliminates the user interactions often required under conventional systems for the preparatory steps of editing a digital image. Thus, the scene-based image editing system 106 enables user interactions to focus on the image edits more directly themselves.

Additionally, by generating a semantic scene graph for a digital image, the scene-based image editing system 106 intelligently generates/obtains information the allows an image to be edited like a real-world scene. For example, the scene-based image editing system 106 generates a scene graph that indicates objects, object attributes, object relationships, etc. that allows the scene-based image editing system 106 to enable object/scene-based image editing.

In one or more embodiments, a semantic scene graph includes a graph representation of a digital image. In particular, in some embodiments, a semantic scene graph includes a graph that maps out characteristics of a digital image and their associated characteristic attributes. For instance, in some implementations, a semantic scene graph includes a node graph having nodes that represent characteristics of the digital image and values associated with the node representing characteristic attributes of those characteristics. Further, in some cases, the edges between the nodes represent the relationships between the characteristics.

Figure 10:
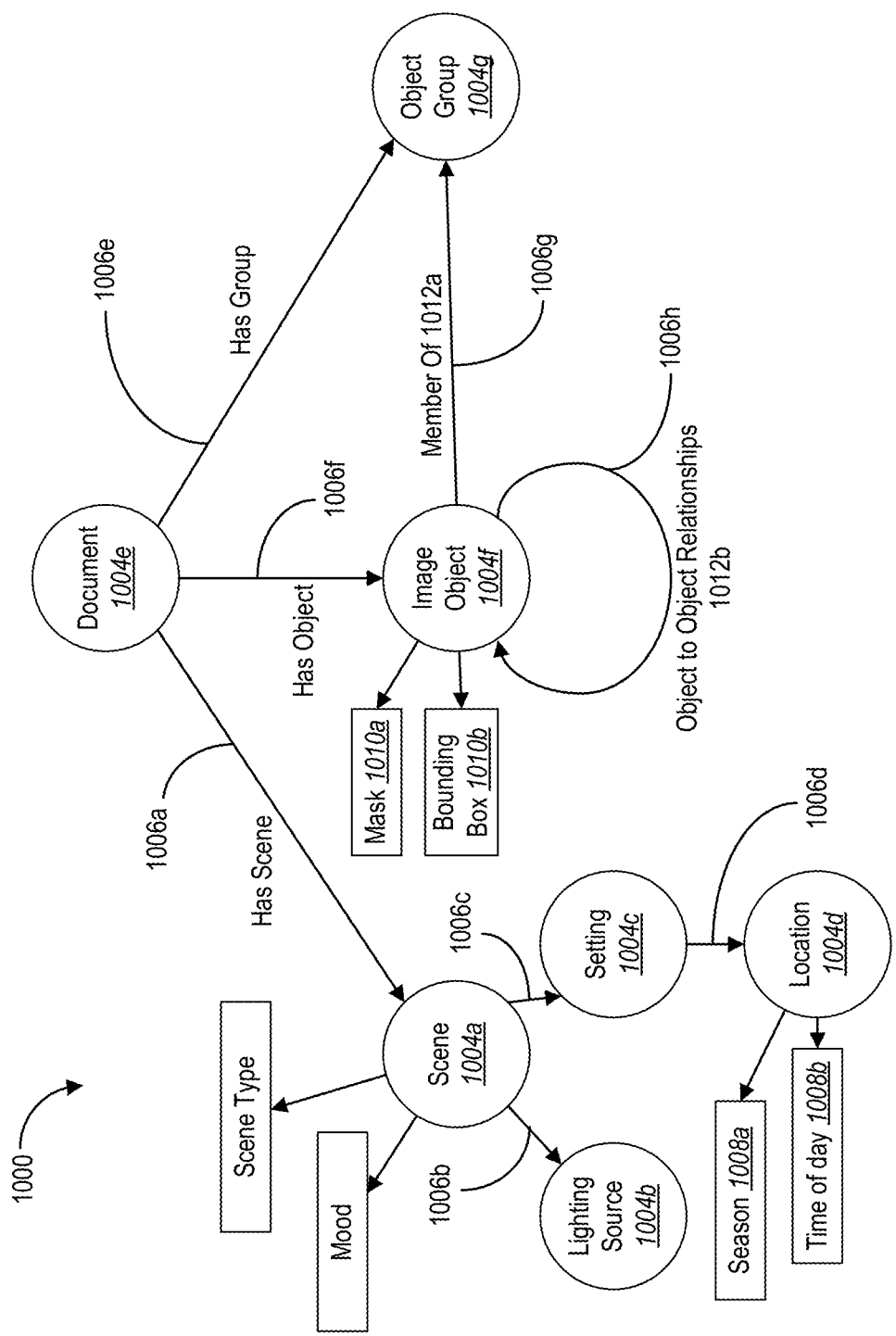
FIG. 10 illustrates an image analysis graph utilized by the scene-based image editing system in generating a semantic scene graph in accordance with one or more embodiments.

As mentioned, in one or more implementations, the scene-based image editing system 106 utilizes one or more predetermined or pre-generated template graphs in generating a semantic scene graph for a digital image. For instance, in some cases, the scene-based image editing system 106 utilizes an image analysis graph in generating a semantic scene graph. FIG. 10 illustrates an image analysis graph 1000 utilized by the scene-based image editing system 106 in generating a semantic scene graph in accordance with one or more embodiments.

In one or more embodiments, an image analysis graph includes a template graph for structing a semantic scene graph. In particular, in some embodiments, an image analysis graph includes a template graph used by the scene-based image editing system 106 to organize the information included in a semantic scene graph. For instance, in some implementations, an image analysis graph includes a template graph that indicates how to organize the nodes of the semantic scene graph representing characteristics of a digital image. In some instances, an image analysis graph additionally or alternatively indicates the information to be represented within a semantic scene graph. For instance, in some cases, an image analysis graph indicates the characteristics, relationships, and characteristic attributes of a digital image to be represented within a semantic scene graph.

Indeed, as shown in FIG. 10, the image analysis graph 1000 includes a plurality of nodes 1004a-1004g. In particular, the plurality of nodes 1004a-1004g correspond to characteristics of a digital image. For instance, in some cases, the plurality of nodes 1004a-1004g represent characteristic categories that are to be determined when analyzing a digital image. Indeed, as illustrated, the image analysis graph 1000 indicates that a semantic scene graph is to represent the objects and object groups within a digital image as well as the scene of a digital image, including the lighting source, the setting, and the particular location.

As further shown in FIG. 10, the image analysis graph 1000 includes an organization of the plurality of nodes 1004a-1004g. In particular, the image analysis graph 1000 includes edges 1006a-1006h arranged in a manner that organizes the plurality of nodes 1004a-1004g. In other words, the image analysis graph 1000 illustrates the relationships among the characteristic categories included therein. For instance, the image analysis graph 1000 indicates that the object category represented by the node 1004f and the object group category represented by the node 1004g are closely related, both describing objects that portrayed in a digital image.

Additionally, as shown in FIG. 10, the image analysis graph 1000 associates characteristic attributes with one or more of the nodes 1004a-1004g to represent characteristic attributes of the corresponding characteristic categories. For instance, as shown, the image analysis graph 1000 associates a season attribute 1008a and a time-of-day attribute 1008b with the setting category represented by the node 1004c. In other words, the image analysis graph 1000 indicates that the season and time of day should be determined when determining a setting of a digital image. Further, as shown, the image analysis graph 1000 associates an object mask 1010a and a bounding box 1010b with the object category represented by the node 1004f. Indeed, in some implementations, the scene-based image editing system 106 generates content for objects portrayed in a digital image, such as an object mask and a bounding box. Accordingly, the image analysis graph 1000 indicates that this pre-generated content is to be associated with the node representing the corresponding object within a semantic scene graph generated for the digital image.

As further shown in FIG. 10, the image analysis graph 1000 associates characteristic attributes with one or more of the edges 1006a-1006h to represent characteristic attributes of the corresponding characteristic relationships represented by these edges 1006a-1006h. For instance, as shown, the image analysis graph 1000 associates a characteristic attribute 1012a with the edge 1006g indicating that an object portrayed in a digital image will be a member of a particular object group. Further, the image analysis graph 1000 associates a characteristic attribute 1012b with the edge 1006h indicating that at least some objects portrayed in a digital image have relationships with one another. FIG. 10 illustrates a sample of relationships that are identified between objects in various embodiments, and additional detail regarding these relationships will be discussed in further detail below.

It should be noted that the characteristic categories and characteristic attributes represented in FIG. 10 are exemplary and the image analysis graph 1000 includes a variety of characteristic categories and/or characteristic attributes not shown in various embodiments. Further, FIG. 10 illustrates a particular organization of the image analysis graph 1000, though alternative arrangements are used in different embodiments. Indeed, in various embodiments, the scene-based image editing system 106 accommodates a variety of characteristic categories and characteristic attributes to facilitate subsequent generation of a semantic scene graph that supports a variety of image edits. In other words, the scene-based image editing system 106 includes those characteristic categories and characteristic attributes that it determines are useful in editing a digital image.

Figure 11:
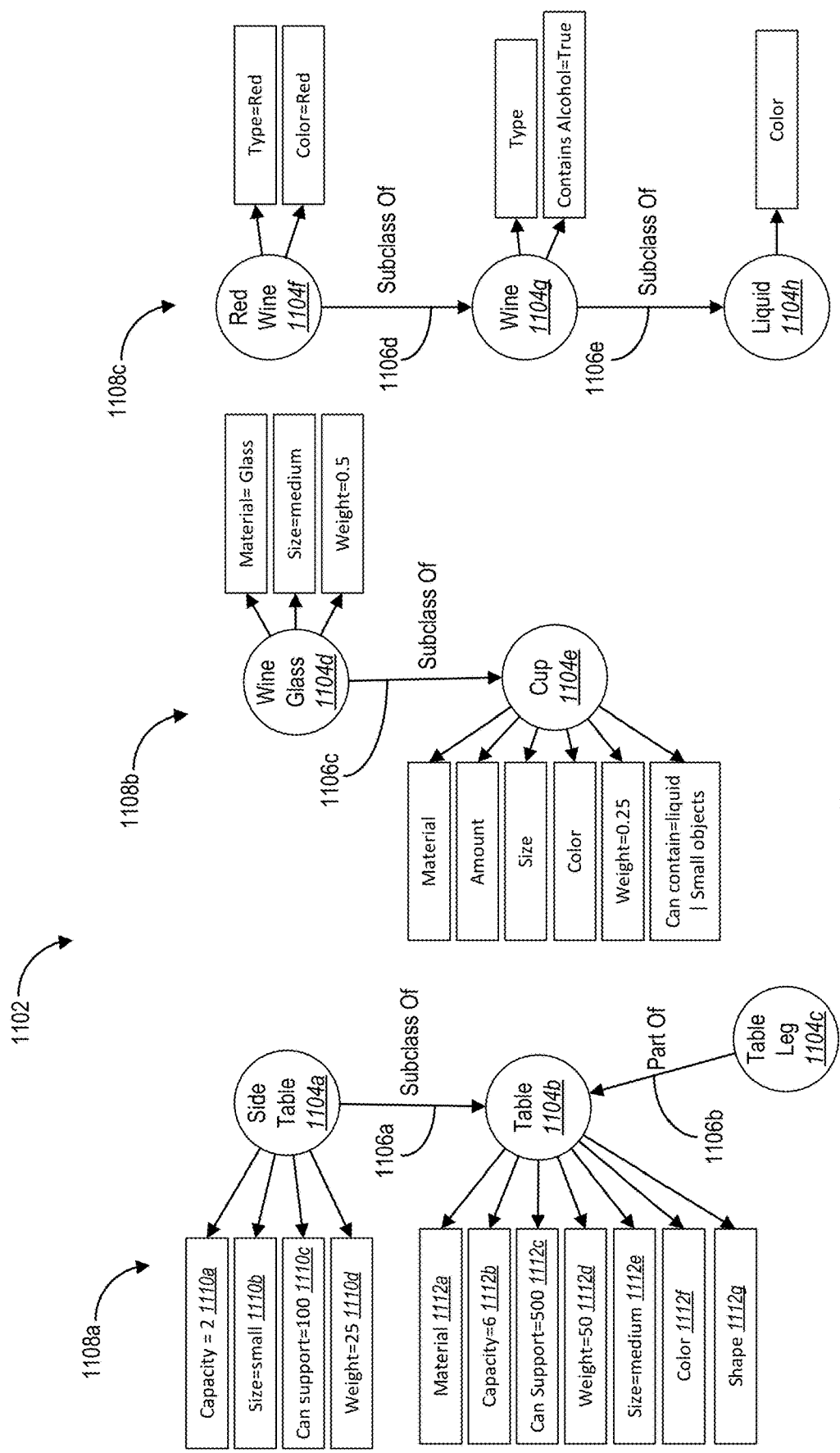
FIG. 11 illustrates a real-world class description graph utilized by the scene-based image editing system in generating a semantic scene graph in accordance with one or more embodiments.

In some embodiments, the scene-based image editing system 106 utilizes a real-world class description graph in generating a semantic scene graph for a digital image. FIG. 11 illustrates a real-world class description graph 1102 utilized by the scene-based image editing system 106 in generating a semantic scene graph in accordance with one or more embodiments.

In one or more embodiments, a real-world class description graph includes a template graph that describes scene components (e.g., semantic areas) that may be portrayed in a digital image. In particular, in some embodiments, a real-world class description graph includes a template graph used by the scene-based image editing system 106 to provide contextual information to a semantic scene graph regarding scene components-such as objects-potentially portrayed in a digital image. For instance, in some implementations, a real-world class description graph provides a hierarchy of object classifications and/or an anatomy (e.g., object components) of certain objects that may be portrayed in a digital image. In some instances, a real-world class description graph further includes object attributes associated with the objects represented therein. For instance, in some cases, a real-world class description graph provides object attributes assigned to a given object, such as shape, color, material from which the object is made, weight of the object, weight the object can support, and/or various other attributes determined to be useful in subsequently modifying a digital image. Indeed, as will be discussed, in some cases, the scene-based image editing system 106 utilizes a semantic scene graph for a digital image to suggest certain edits or suggest avoiding certain edits to maintain consistency of the digital image with respect to the contextual information contained in the real-world class description graph from which the semantic scene graph was built.

As shown in FIG. 11, the real-world class description graph 1102 includes a plurality of nodes 1104a-1104h and a plurality of edges 1106a-1106e that connect some of the nodes 1104a-1104h. In particular, in contrast to the image analysis graph 1000 of FIG. 10, the real-world class description graph 1102 does not provide a single network of interconnected nodes. Rather, in some implementations, the real-world class description graph 1102 includes a plurality of node clusters 1108a-1108c that are separate and distinct from one another.

In one or more embodiments, each node cluster corresponds to a separate scene component (e.g., semantic area) class that may be portrayed in a digital image. Indeed, as shown in FIG. 11, each of the node clusters 1108a-1108c corresponds to a separate object class that may be portrayed in a digital image. As indicated above, the real-world class description graph 1102 is not limited to representing object classes and can represent other scene component classes in various embodiments.

As shown in FIG. 11, each of the node clusters 1108a-1108c portrays a hierarchy of class descriptions (otherwise referred to as a hierarchy of object classifications) corresponding to a represented object class. In other words, each of the node clusters 1108a-1108c portrays degrees of specificity/generality with which an object is described or labeled. Indeed, in some embodiments, the scene-based image editing system 106 applies all class descriptions/labels represented in a node cluster to describe a corresponding object portrayed in a digital image. In some implementations, however, the scene-based image editing system 106 utilizes a subset of the class descriptions/labels to describe an object.

As an example, the node cluster 1108a includes a node 1104a representing a side table class and a node 1104b representing a table class. Further, as shown in FIG. 11, the node cluster 1108a includes an edge 1106a between the node 1104a and the node 1104b to indicate that the side table class is a subclass of the table class, thus indicating a hierarchy between these two classifications that are applicable to a side table. In other words, the node cluster 1108a indicates that a side table is classifiable either as a side table and/or more generally as a table. In other words, in one or more embodiments, upon detecting a side table portrayed in a digital image, the scene-based image editing system 106 labels the side table as a side table and/or as a table based on the hierarchy represented in the real-world class description graph 1102.

The degree to which a node cluster represents a hierarchy of class descriptions varies in various embodiments. In other words, the length/height of the represented hierarchy varies in various embodiments. For instance, in some implementations, the node cluster 1108a further includes a node representing a furniture class, indicating that a side table is classifiable as a piece of furniture. In some cases, the node cluster 1108a also includes a node representing an inanimate object lass, indicating that a side table is classifiable as such. Further, in some implementations, the node cluster 1108a includes a node representing an entity class, indicating that a side table is classifiable as an entity. Indeed, in some implementations, the hierarchies of class descriptions represented within the real-world class description graph 1102 include a class description/label-such as an entity class—at such a high level of generality that it is commonly applicable to all objects represented within the real-world class description graph 1102.

As further shown in FIG. 11, the node cluster 1108a includes an anatomy (e.g., object components) of the represented object class. In particular, the node cluster 1108a includes a representation of component parts for the table class of objects. For instance, as shown, the node cluster 1108a includes a node 1104c representing a table leg class. Further, the node cluster 1108a includes an edge 1106b indicating that a table leg from the table leg class is part of a table from the table class. In other words, the edge 1106b indicates that a table leg is a component of a table. In some cases, the node cluster 1108a includes additional nodes for representing other components that are part of a table, such as a tabletop, a leaf, or an apron.

As shown in FIG. 11, the node 1104c representing the table leg class of objects is connected to the node 1104b representing the table class of objects rather than the node 1104a representing the side table class of objects. Indeed, in some implementations, the scene-based image editing system 106 utilizes such a configuration based on determining that all tables include one or more table legs. Thus, as side tables are a subclass of tables, the configuration of the node cluster 1108a indicates that all side tables also include one or more table legs. In some implementations, however, the scene-based image editing system 106 additionally or alternatively connects the node 1104c representing the table leg class of objects to the node 1104a representing the side table class of objects to specify that all side tables include one or more table legs.

Similarly, the node cluster 1108a includes object attributes 1110a-1110d associated with the node 1104a for the side table class and an additional object attributes 1112a-1112g associated with the node 1104b for the table class. Thus, the node cluster 1108a indicates that the object attributes 1110a-1110d are specific to the side table class while the additional object attributes 1112a-1112g are more generally associated with the table class (e.g., associated with all object classes that fall within the table class). In one or more embodiments, the object attributes 1110a-1110d and/or the additional object attributes 1112a-1112g are attributes that have been arbitrarily assigned to their respective object class (e.g., via user input or system defaults). For instance, in some cases, the scene-based image editing system 106 determines that all side tables can support one hundred pounds as suggested by FIG. 11 regardless of the materials used or the quality of the build. In some instances, however, the object attributes 1110a-1110d and/or the additional object attributes 1112a-1112g represent object attributes that are common among all objects that fall within a particular class, such as the relatively small size of side tables. In some implementations, however, the object attributes 1110a-1110d and/or the additional object attributes 1112a-1112g are indicators of object attributes that should be determined for an object of the corresponding object class. For instance, in one or more embodiments, upon identifying a side table, the scene-based image editing system 106 determines at least one of the capacity, size, weight, or supporting weight of the side table.

It should be noted that there is some overlap between object attributes included in a real-world class description graph and characteristic attributes included in an image analysis graph in some embodiments. Indeed, in many implementations, object attributes are characteristic attributes that are specific towards objects (rather than attributes for the setting or scene of a digital image). Further, it should be noted that the object attributes are merely exemplary and do not necessarily reflect the object attributes that are to be associated with an object class. Indeed, in some embodiments, the object attributes that are shown and their association with particular object classes are configurable to accommodate different needs in editing a digital image.

In some cases, a node cluster corresponds to one particular class of objects and presents a hierarchy of class descriptions and/or object components for that one particular class. For instance, in some implementations, the node cluster 1108a only corresponds to the side table class and presents a hierarchy of class descriptions and/or object components that are relevant to side tables. Thus, in some cases, upon identifying a side table within a digital image, the scene-based image editing system 106 refers to the node cluster 1108a for the side table class when generating a semantic scene graph but refers to a separate node cluster upon identifying another subclass of table within the digital image. In some cases, this separate node cluster includes several similarities (e.g., similar nodes and edges) with the node cluster 1108a as the other type of table would be included in a subclass of the table class and include one or more table legs.

In some implementations, however, a node cluster corresponds to a plurality of different but related object classes and presents a common hierarchy of class descriptions and/or object components for those object classes. For instance, in some embodiments, the node cluster 1108a includes an additional node representing a dining table class that is connected to the node 1104b representing the table class via an edge indicating that dining tables are also a subclass of tables. Indeed, in some cases, the node cluster 1108a includes nodes representing various subclasses of a table class. Thus, in some instances, upon identifying a table from a digital image, the scene-based image editing system 106 refers to the node cluster 1108a when generating a semantic scene graph for the digital image regardless of the subclass to which the table belongs.

As will be described, in some implementations, utilizing a common node cluster for multiple related subclasses facilitates object interactivity within a digital image. For instance, as noted, FIG. 11 illustrates multiple separate node clusters. As further mentioned however, the scene-based image editing system 106 includes a classification (e.g., an entity classification) that is common among all represented objects within the real-world class description graph 1102 in some instances. Accordingly, in some implementations, the real-world class description graph 1102 does include a single network of interconnected nodes where all node clusters corresponding to separate object classes connect at a common node, such as a node representing an entity class. Thus, in some embodiments, the real-world class description graph 1102 illustrates the relationships among all represented objects.

Figure 12:
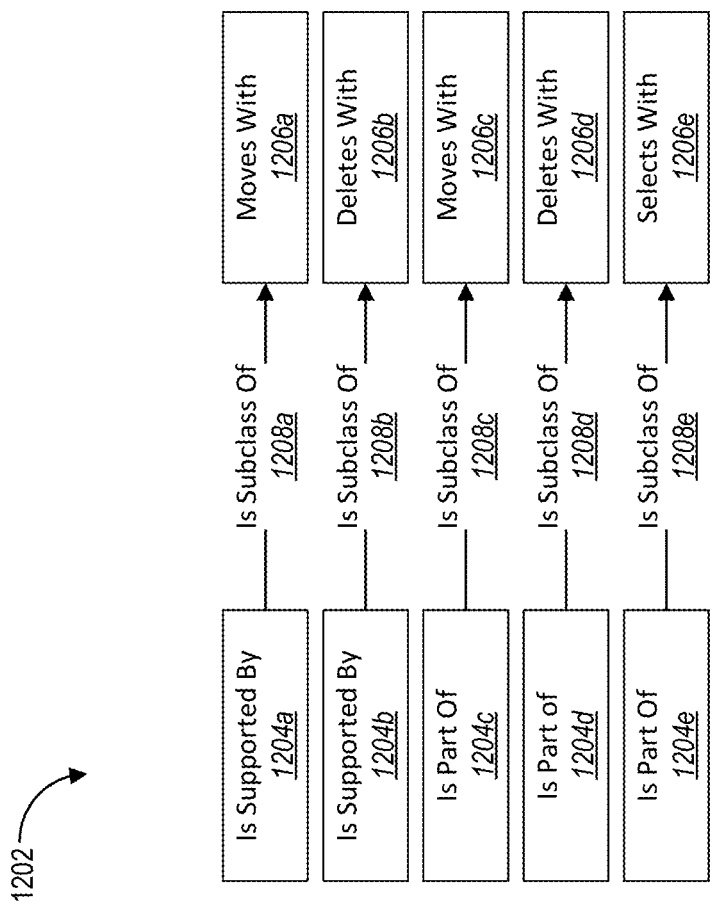
FIG. 12 illustrates a behavioral policy graph utilized by the scene-based image editing system in generating a semantic scene graph in accordance with one or more embodiments.

In one or more embodiments, the scene-based image editing system 106 utilizes a behavioral policy graph in generating a semantic scene graph for a digital image. FIG. 12 illustrates a behavioral policy graph 1202 utilized by the scene-based image editing system 106 in generating a semantic scene graph in accordance with one or more embodiments.

In one or more embodiments, a behavioral policy graph includes a template graph that describes the behavior of an object portrayed in a digital image based on the context in which the object is portrayed. In particular, in some embodiments, a behavioral policy graph includes a template graph that assigns behaviors to objects portrayed in a digital image based on a semantic understanding of the objects and/or their relationships to other objects portrayed in the digital image. Indeed, in one or more embodiments, a behavioral policy includes various relationships among various types of objects and designates behaviors for those relationships. In some cases, the scene-based image editing system 106 includes a behavioral policy graph as part of a semantic scene graph. In some implementations, as will be discussed further below, a behavioral policy is separate from the semantic scene graph but provides plug-in behaviors based on the semantic understanding and relationships of objects represented in the semantic scene graph.

As shown in FIG. 12, the behavioral policy graph 1202 includes a plurality of relationship indicators 1204a-1204e and a plurality of behavior indicators 1206a-1206e that are associated with the relationship indicators 1204a-1204e. In one or more embodiments, the relationship indicators 1204a-1204e reference a relationship subject (e.g., an object in the digital image that is the subject of the relationship) and a relationship object (e.g., an object in the digital image that is the object of the relationship). For example, the relationship indicators 1204a-1204e of FIG. 12 indicate that the relationship subject "is supported by" or "is part of" the relationship object. Further, in one or more embodiments the behavior indicators 1206a-1206e assign a behavior to the relationship subject (e.g., indicating that the relationship subject "moves with" or "deletes with" the relationship object). In other words, the behavior indicators 1206a-1206e provide modification instructions for the relationship subject when the relationship object is modified.

FIG. 12 provides a small subset of the relationships recognized by the scene-based image editing system 106 in various embodiments. For instance, in some implementations, the relationships recognized by the scene-based image editing system 106 and incorporated into generated semantic scene graphs include, but are not limited to, relationships described as "above," "below," "behind," "in front of," "touching," "held by," "is holding," "supporting," "standing on," "worn by," "wearing," "leaning on," "looked at by," or "looking at." Indeed, as suggested by the foregoing, the scene-based image editing system 106 utilizes relationship pairs to describe the relationship between objects in both directions in some implementations. For instance, in some cases, where describing that a first object "is supported by" a second object, the scene-based image editing system 106 further describes that the second object "is supporting" the first object. Thus, in some cases, the behavioral policy graph 1202 includes these relationship pairs, and the scene-based image editing system 106 includes the information in the semantic scene graphs accordingly.

As further shown, the behavioral policy graph 1202 further includes a plurality of classification indicators 1208a-1208e associated with the relationship indicators 1204a-1204e. In one or more embodiments, the classification indicators 1208a-1208e indicate an object class to which the assigned behavior applies. Indeed, in one or more embodiments, the classification indicators 1208a-1208e reference the object class of the corresponding relationship object. As shown by FIG. 12, the classification indicators 1208a-1208e indicate that a behavior is assigned to object classes that are a subclass of the designated object class. In other words, FIG. 12 shows that the classification indicators 1208a-1208e reference a particular object class and indicate that the assigned behavior applies to all objects that fall within that object class (e.g., object classes that are part of a subclass that falls under that object class).

The level of generality or specificity of a designated object class referenced by a classification indicator within its corresponding hierarchy of object classification varies in various embodiments. For instance, in some embodiments, a classification indicator references a lowest classification level (e.g., the most specific classification applicable) so that there are no subclasses, and the corresponding behavior applies only to those objects having that particular object lowest classification level. On the other hand, in some implementations, a classification indicator references a highest classification level (e.g., the most generic classification applicable) or some other level above the lowest classification level so that the corresponding behavior applies to objects associated with one or more of the multiple classification levels that exist within that designated classification level.

To provide an illustration of how the behavioral policy graph 1202 indicates assigned behavior, the relationship indicator 1204a indicates a "is supported by" relationship between an object (e.g., the relationship subject) and another object (e.g., the relationship object). The behavior indicator 1206a indicates a "moves with" behavior that is associated with the "is supported by" relationship, and the classification indicator 1208a indicates that this particular behavior applies to objects within some designated object class. Accordingly, in one or more embodiments, the behavioral policy graph 1202 shows that an object that falls within the designated object class and has a "is supported by" relationship with another object will exhibit the "moves with" behavior. In other words, if a first object of the designated object class is portrayed in a digital image being supported by a second object, and the digital image is modified to move that second object, then the scene-based image editing system 106 will automatically move the first object with the second object as part of the modification in accordance with the behavioral policy graph 1202. In some cases, rather than moving the first object automatically, the scene-based image editing system 106 provides a suggestion to move the first object for display within the graphical user interface in use to modify the digital image.

As shown by FIG. 12, some of the relationship indicators (e.g., the relationship indicators 1204a-1204b or the relationship indicators 1204c-1204e) refer to the same relationship but are associated with different behaviors. Indeed, in some implementations, the behavioral policy graph 1202 assigns multiple behaviors to the same relationship. In some instances, the difference is due to the difference in the designated subclass. In particular, in some embodiments, the scene-based image editing system 106 assigns an object of one object class a particular behavior for a particular relationship but assigns an object of another object class a different behavior for the same relationship. Thus, in configuring the behavioral policy graph 1202, the scene-based image editing system 106 manages different object classes differently in various embodiments.

Figure 13:
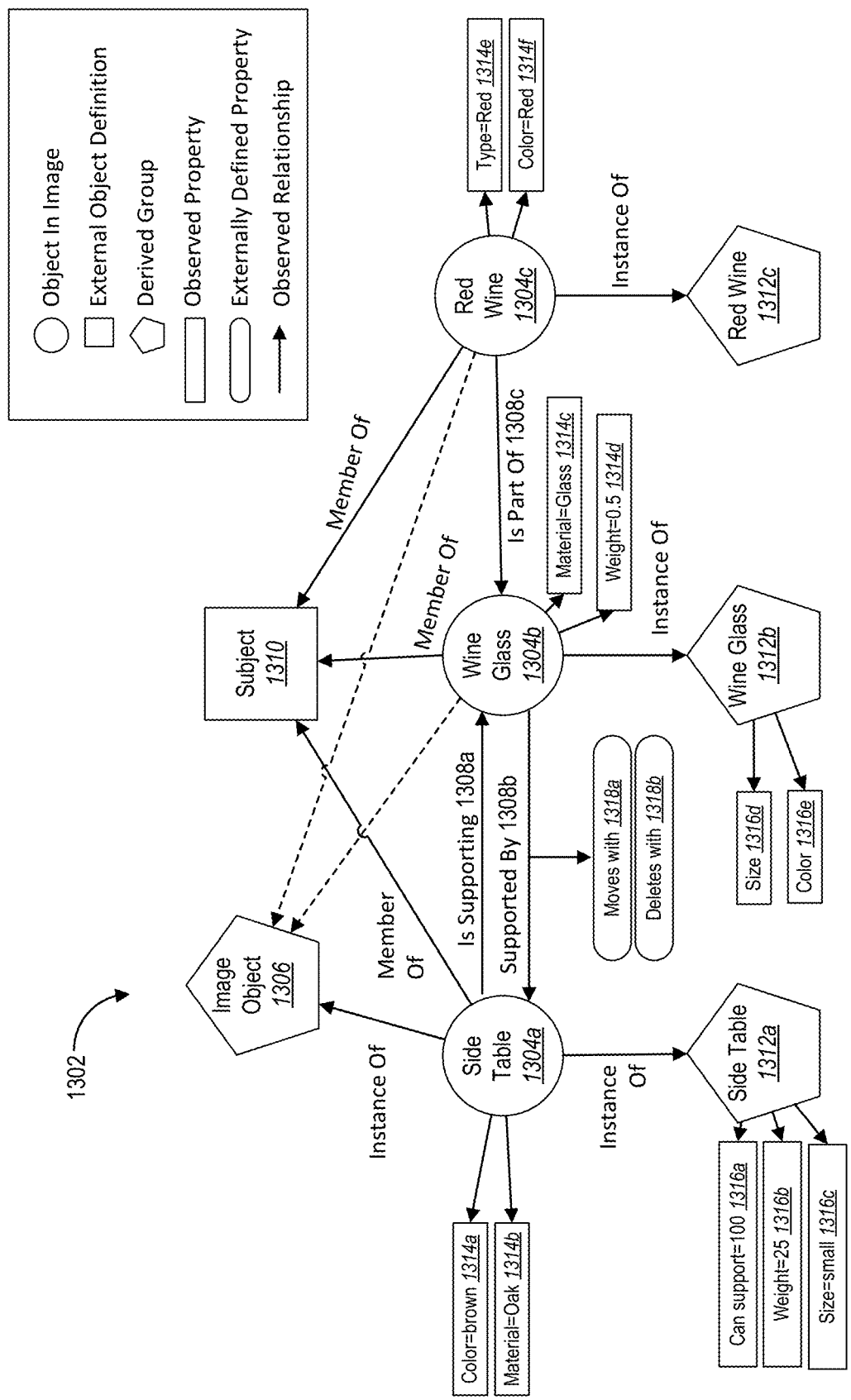
FIG. 13 illustrates a semantic scene graph generated by the scene-based image editing system for a digital image in accordance with one or more embodiments.

FIG. 13 illustrates a semantic scene graph 1302 generated by the scene-based image editing system 106 for a digital image in accordance with one or more embodiments. In particular, the semantic scene graph 1302 shown in FIG. 13 is a simplified example of a semantic scene graph and does not portray all the information included in a semantic scene graph generated by the scene-based image editing system 106 in various embodiments.

As shown in FIG. 13, the semantic scene graph 1302 is organized in accordance with the image analysis graph 1000 described above with reference to FIG. 10. In particular, the semantic scene graph 1302 includes a single network of interconnected nodes that reference characteristics of a digital image. For instance, the semantic scene graph 1302 includes nodes 1304a-1304c representing portrayed objects as indicated by their connection to the node 1306. Further, the semantic scene graph 1302 includes relationship indicators 1308a-1308c representing the relationships between the objects corresponding to the nodes 1304a-1304c. As further shown, the semantic scene graph 1302 includes a node 1310 representing a commonality among the objects (e.g., in that the objects are all included in the digital image, or the objects indicate a subject or topic of the digital image). Additionally, as shown, the semantic scene graph 1302 includes the characteristic attributes 1314a-1314f of the objects corresponding to the nodes 1304a-1304c.

As further shown in FIG. 13, the semantic scene graph 1302 includes contextual information from the real-world class description graph 1102 described above with reference to FIG. 11. In particular, the semantic scene graph 1302 includes nodes 1312a-1312c that indicate the object class to which the objects corresponding to the nodes 1304a-1304c belong. Though not shown in FIG. 11, the semantic scene graph 1302 further includes the full hierarchy of object classifications for each of the object classes represented by the nodes 1312a-1312c. In some cases, however, the nodes 1312a-1312c each include a pointer that points to their respective hierarchy of object classifications within the real-world class description graph 1102. Additionally, as shown in FIG. 13, the semantic scene graph 1302 includes object attributes 1316a-1316e of the object classes represented therein.

Additionally, as shown in FIG. 13, the semantic scene graph 1302 includes behaviors from the behavioral policy graph 1202 described above with reference to FIG. 12. In particular, the semantic scene graph 1302 includes behavior indicators 1318a-1318b indicating behaviors of the objects represented therein based on their associated relationships.

Figure 14:
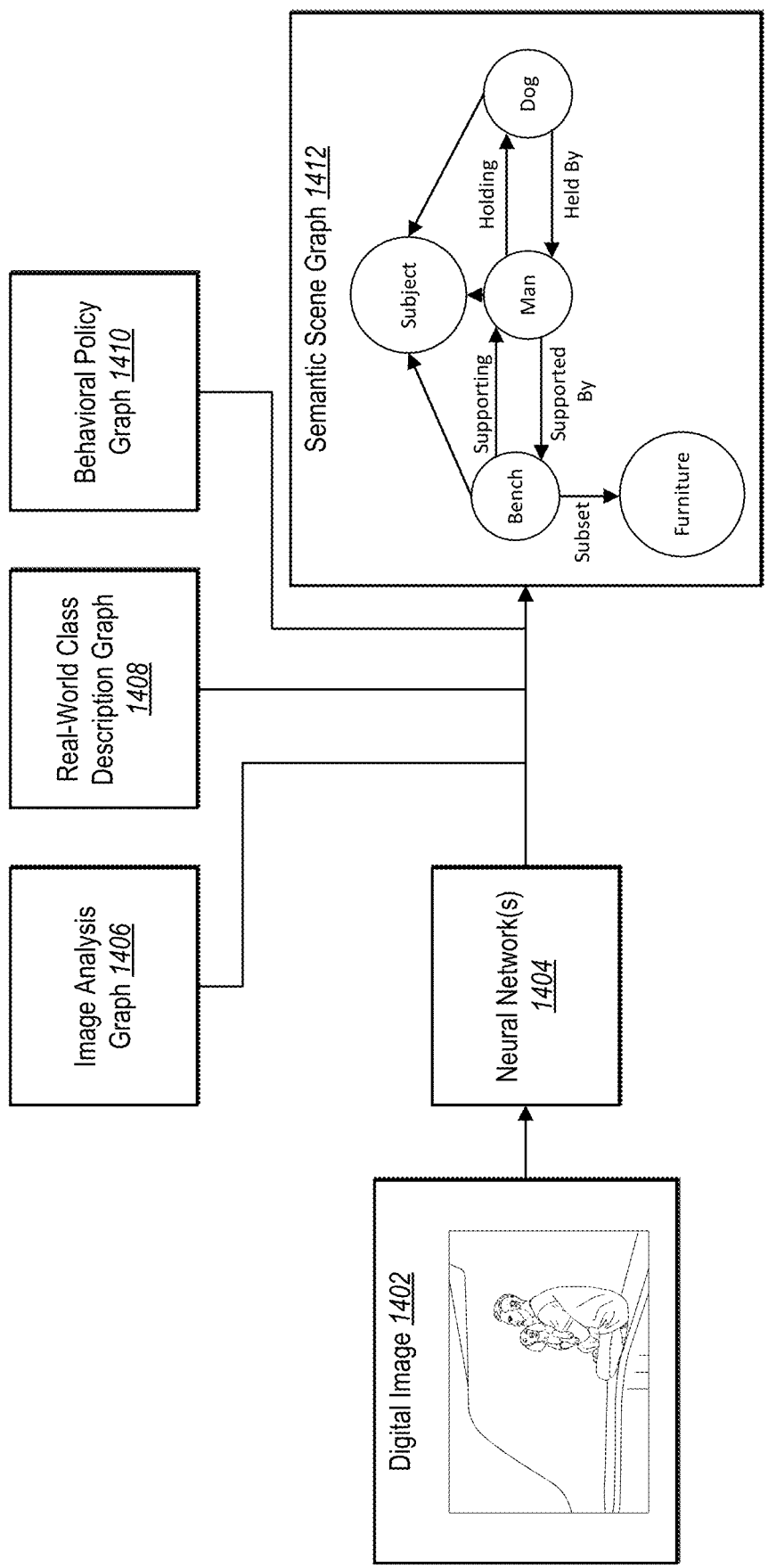
FIG. 14 illustrates a diagram for generating a semantic scene graph for a digital image utilizing template graphs in accordance with one or more embodiments.

FIG. 14 illustrates a diagram for generating a semantic scene graph for a digital image utilizing template graphs in accordance with one or more embodiments. Indeed, as shown in FIG. 14, the scene-based image editing system 106 analyzes a digital image 1402 utilizing one or more neural networks 1404. In particular, in one or more embodiments, the scene-based image editing system 106 utilizes the one or more neural networks 1404 to determine various characteristics of the digital image 1402 and/or their corresponding characteristic attributes. For instance, in some cases, the scene-based image editing system 106 utilizes a segmentation neural network to identify and classify objects portrayed in a digital image (as discussed above with reference to FIG. 3). Further, in some embodiments, the scene-based image editing system 106 utilizes neural networks to determine the relationships between objects and/or their object attributes as will be discussed in more detail below.

In one or more implementations, the scene-based image editing system 106 utilizes a depth estimation neural network to estimate a depth of an object in a digital image and stores the determined depth in the semantic scene graph 1412. For example, the scene-based image editing system 106 utilizes a depth estimation neural network as described in U.S. application Ser. No. 17/186,436, filed Feb. 26, 2021, titled "GENERATING DEPTH IMAGES UTILIZING A MACHINE-LEARNING MODEL BUILT FROM MIXED DIGITAL IMAGE SOURCES AND MULTIPLE LOSS FUNCTION SETS," which is herein incorporated by reference in its entirety. Alternatively, the scene-based image editing system 106 utilizes a depth refinement neural network as described in U.S. application Ser. No. 17/658,873, filed Apr. 12, 2022, titled "UTILIZING MACHINE LEARNING MODELS TO GENERATE REFINED DEPTH MAPS WITH SEGMENTATION MASK GUIDANCE," which is herein incorporated by reference in its entirety. The scene-based image editing system 106 then accesses the depth information (e.g., average depth for an object) for an object from the semantic scene graph 1412 when editing an object to perform a realistic scene edit. For example, when moving an object within an image, the scene-based image editing system 106 then accesses the depth information for objects in the digital image from the semantic scene graph 1412 to ensure that the object being moved is not placed in front an object with less depth.

In one or more implementations, the scene-based image editing system 106 utilizes a depth estimation neural network to estimate lighting parameters for an object or scene in a digital image and stores the determined lighting parameters in the semantic scene graph 1412. For example, the scene-based image editing system 106 utilizes a source-specific-lighting-estimation-neural network as described in U.S. application Ser. No. 16/558,975, filed Sep. 3, 2019, titled "DYNAMICALLY ESTIMATING LIGHT-SOURCE-SPECIFIC PARAMETERS FOR DIGITAL IMAGES USING A NEURAL NETWORK," which is herein incorporated by reference in its entirety. The scene-based image editing system 106 then accesses the lighting parameters for an object or scene from the semantic scene graph 1412 when editing an object to perform a realistic scene edit. For example, when moving an object within an image or inserting a new object in a digital image, the scene-based image editing system 106 accesses the lighting parameters for from the semantic scene graph 1412 to ensure that the object being moved/placed within the digital image has realistic lighting.

In one or more implementations, the scene-based image editing system 106 utilizes a depth estimation neural network to estimate lighting parameters for an object or scene in a digital image and stores the determined lighting parameters in the semantic scene graph 1412. For example, the scene-based image editing system 106 utilizes a source-specific-lighting-estimation-neural network as described in U.S. application Ser. No. 16/558,975, filed Sep. 3, 2019, titled "DYNAMICALLY ESTIMATING LIGHT-SOURCE-SPECIFIC PARAMETERS FOR DIGITAL IMAGES USING A NEURAL NETWORK," which is herein incorporated by reference in its entirety. The scene-based image editing system 106 then accesses the lighting parameters for an object or scene from the semantic scene graph 1412 when editing an object to perform a realistic scene edit. For example, when moving an object within an image or inserting a new object in a digital image, the scene-based image editing system 106 accesses the lighting parameters for from the semantic scene graph 1412 to ensure that the object being moved/placed within the digital image has realistic lighting.

As further shown in FIG. 14, the scene-based image editing system 106 utilizes the output of the one or more neural networks 1404 along with an image analysis graph 1406, a real-world class description graph 1408, and a behavioral policy graph 1410 to generate a semantic scene graph 1412. In particular, the scene-based image editing system 106 generates the semantic scene graph 1412 to include a description of the digital image 1402 in accordance with the structure, characteristic attributes, hierarchies of object classifications, and behaviors provided by the image analysis graph 1406, the real-world class description graph 1408, and the behavioral policy graph 1410.

As previously indicated, in one or more embodiments, the image analysis graph 1406, the real-world class description graph 1408, and/or the behavioral policy graph 1410 are predetermined or pre-generated. In other words, the scene-based image editing system 106 pre-generates, structures, or otherwise determines the content and organization of each graph before implementation. For instance, in some cases, the scene-based image editing system 106 generates the image analysis graph 1406, the real-world class description graph 1408, and/or the behavioral policy graph 1410 based on user input.

Further, in one or more embodiments, the image analysis graph 1406, the real-world class description graph 1408, and/or the behavioral policy graph 1410 are configurable. Indeed, the graphs can be re-configured, re-organized, and/or have data represented therein added or removed based on preferences or the needs of editing a digital image. For instance, in some cases, the behaviors assigned by the behavioral policy graph 1410 work in some image editing contexts but not others. Thus, when editing an image in another image editing context, the scene-based image editing system 106 implements the one or more neural networks 1404 and the image analysis graph 1406 but implements a different behavioral policy graph (e.g., one that was configured to satisfy preferences for that image editing context). Accordingly, in some embodiments, the scene-based image editing system 106 modifies the image analysis graph 1406, the real-world class description graph 1408, and/or the behavioral policy graph 1410 to accommodate different image editing contexts.

For example, in one or more implementations, the scene-based image editing system 106 determines a context for selecting a behavioral policy graph by identifying a type of user. In particular, the scene-based image editing system 106 generates a plurality of behavioral policy graphs for various types of users. For instance, the scene-based image editing system 106 generates a first behavioral policy graph for novice or new users. The first behavioral policy graph, in one or more implementations, includes a greater number of behavior policies than a second behavioral policy graph. In particular, for newer users, the scene-based image editing system 106 utilizes a first behavioral policy graph that provides greater automation of actions and provides less control to the user. On the other hand, the scene-based image editing system 106 utilizes a second behavioral policy graph for advanced users with less behavior policies than the first behavioral policy graph. In this manner, the scene-based image editing system 106 provides the advanced user with greater control over the relationship-based actions (automatic moving/deleting/editing) of objects based on relationships. In other words, by utilizing the second behavioral policy graph for advanced users, the scene-based image editing system 106 performs less automatic editing of related objects.

In one or more implementations the scene-based image editing system 106 determines a context for selecting a behavioral policy graph based on visual content of a digital image (e.g., types of objects portrayed in the digital image), the editing application being utilized, etc. Thus, the scene-based image editing system 106, in one or more implementations, selects/utilizes a behavioral policy graph based on image content, a type of user, an editing application being utilizes, or another context.

Moreover, in some embodiments, the scene-based image editing system 106 utilizes the graphs in analyzing a plurality of digital images. Indeed, in some cases, the image analysis graph 1406, the real-world class description graph 1408, and/or the behavioral policy graph 1410 do not specifically target a particular digital image. Thus, in many cases, these graphs are universal and re-used by the scene-based image editing system 106 for multiple instances of digital image analysis.

In some cases, the scene-based image editing system 106 further implements one or more mappings to map between the outputs of the one or more neural networks 1404 and the data scheme of the image analysis graph 1406, the real-world class description graph 1408, and/or the behavioral policy graph 1410. As one example, the scene-based image editing system 106 utilizes various segmentation neural networks to identify and classify objects in various embodiments. Thus, depending on the segmentation neural network used, the resulting classification of a given object can be different (e.g., different wording or a different level of abstraction). Thus, in some cases, the scene-based image editing system 106 utilizes a mapping that maps the particular outputs of the segmentation neural network to the object classes represented in the real-world class description graph 1408, allowing the real-world class description graph 1408 to be used in conjunction with multiple neural networks.

Figure 15:
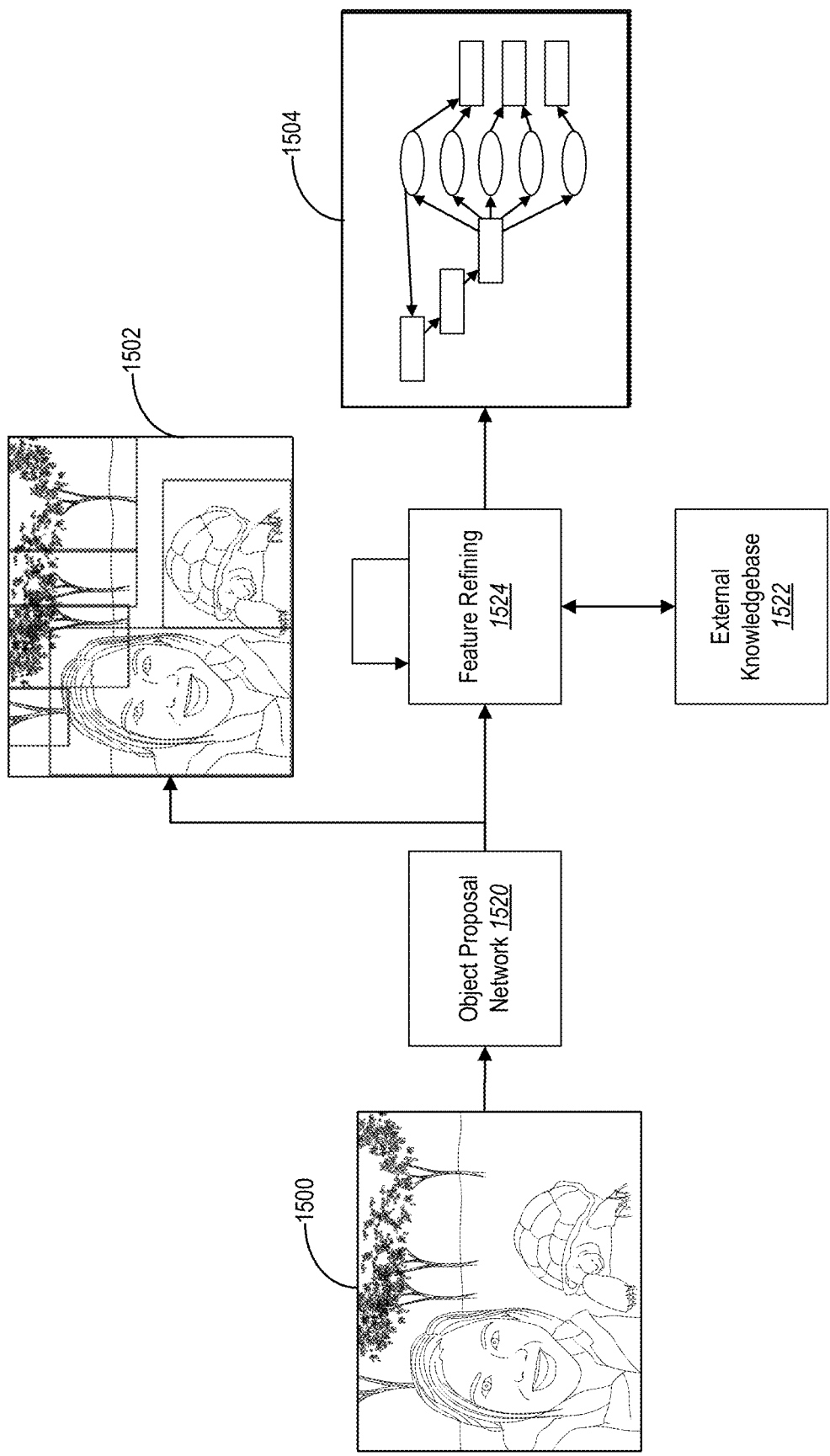
FIG. 15 illustrates another diagram for generating a semantic scene graph for a digital image in accordance with one or more embodiments.

FIG. 15 illustrates another diagram for generating a semantic scene graph for a digital image in accordance with one or more embodiments. In particular, FIG. 15 illustrates an example framework of the scene-based image editing system 106 generating a semantic scene graph in accordance with one or more embodiments.

As shown in FIG. 15, the scene-based image editing system 106 identifies an input image 1500. In some cases, the scene-based image editing system 106 identifies the input image 1500 based on a request. For instances, in some cases, the request includes a request to generate a semantic scene graph for the input image 1500. In one or more implementations the request comprises to analyze the input image comprises the scene-based image editing system 106 accessing, opening, or displaying by the input image 1500.

In one or more embodiments, the scene-based image editing system 106 generates object proposals and subgraph proposals for the input image 1500 in response to the request. For instance, in some embodiments, the scene-based image editing system 106 utilizes an object proposal network 1520 to extract a set of object proposals for the input image 1500. To illustrate, in some cases, the scene-based image editing system 106 extracts a set of object proposals for humans detected within the input image 1500, objects that the human(s) are wearing, objects near the human(s), buildings, plants, animals, background objects or scenery (including the sky or objects in the sky), etc.

In one or more embodiments, the object proposal network 1520 comprises the detection-masking neural network 300 (specifically, the object detection machine learning model 308) discussed above with reference to FIG. 3. In some cases, the object proposal network 1520 includes a neural network such as a region proposal network ("RPN"), which is part of a region-based convolutional neural network, to extract the set of object proposals represented by a plurality of bounding boxes. One example RPN is disclosed in S. Ren, K. He, R. Girshick, and J. Sun, *Faster r-cnn: Towards real-time object detection with region proposal networks*, NIPS, 2015, the entire contents of which are hereby incorporated by reference. As an example, in some cases, the scene-based image editing system 106 uses the RPN to extract object proposals for significant objects (e.g., detectable objects or objects that have a threshold size/visibility) within the input image. The algorithm below represents one embodiment of a set of object proposals:

$$[o_0, \ldots, o_{N-1}] = f_{RPN} \quad (I)$$

where I is the input image, $f_{RPN}(\cdot)$ represents the RPN network, and $o_i$ is the i-th object proposal.

In some implementations, in connection with determining the object proposals, the scene-based image editing system 106 also determines coordinates of each object proposal relative to the dimensions of the input image 1500. Specifically, in some instances, the locations of the object proposals are based on bounding boxes that contain the visible portion(s) of objects within a digital image. To illustrate, for $o_i$, the coordinates of the corresponding bounding box are represented by $r_i=[x_i, y_i, w_i, h_i]$, with $(x_i, y_i)$ being the coordinates of the top left corner and $w_i$ and $h_i$ being the width and the height of the bounding box, respectively. Thus, the scene-based image editing system 106 determines the relative location of each significant object or entity in the input image 1500 and stores the location data with the set of object proposals.

As mentioned, in some implementations, the scene-based image editing system 106 also determines subgraph proposals for the object proposals. In one or more embodiments, the subgraph proposals indicate relations involving specific object proposals in the input image 1500. As can be appreciated, any two different objects $(o_i, o_j)$ in a digital image can correspond to two possible relationships in opposite directions. As an example, a first object can be "on top of" a second object, and the second object can be "underneath" the first object. Because each pair of objects has two possible relations, the total number of possible relations for N object proposals is N(N-1). Accordingly, more object proposals result in a larger scene graph than fewer object proposals, while increasing computational cost and deteriorating inference speed of object detection in systems that attempt to determine all the possible relations in both directions for every object proposal for an input image.

Subgraph proposals reduce the number of potential relations that the scene-based image editing system 106 analyze. Specifically, as mentioned previously, a subgraph proposal represents a relationship involving two or more specific object proposals. Accordingly, in some instances, the scene-based image editing system 106 determines the subgraph proposals for the input image 1500 to reduce the number of potential relations by clustering, rather than maintaining the N (N-1) number of possible relations. In one or more embodiments, the scene-based image editing system 106 uses the clustering and subgraph proposal generation process described in Y. Li, W. Ouyang, B. Zhou, Y. Cui, J. Shi, and X. Wang, *Factorizable net: An efficient subgraph based framework for scene graph generation*, ECCV, Jun. 29, 2018, the entire contents of which are hereby incorporated by reference.

As an example, for a pair of object proposals, the scene-based image editing system 106 determines a subgraph based on confidence scores associated with the object proposals. To illustrate, the scene-based image editing system 106 generates each object proposal with a confidence score indicating the confidence that the object proposal is the right match for the corresponding region of the input image. The scene-based image editing system 106 further determines the subgraph proposal for a pair of object proposals based on a combined confidence score that is the product of the confidence scores of the two object proposals. The scene-based image editing system 106 further constructs the subgraph proposal as the union box of the object proposals with the combined confidence score.

In some cases, the scene-based image editing system 106 also suppresses the subgraph proposals to represent a candidate relation as two objects and one subgraph. Specifically, in some embodiments, the scene-based image editing system 106 utilizes non-maximum-suppression to represent the candidate relations as $\langle o_i, o_j, s_k^i \rangle$, where $i \neq j$ and $s_k^i$ is the k-th subgraph of all the subgraphs associated with $o_i$, the subgraphs for $o_i$ including $o_j$ and potentially other object proposals. After suppressing the subgraph proposals, the scene-based image editing system 106 represents each object and subgraph as a feature vector, $o_i \in \mathbb{R}^D$ and a feature map $s_k^i \in \mathbb{R}^{D \times K_a \times K_a}$, respectively, where D and $K_a$ are dimensions.

After determining object proposals and subgraph proposals for objects in the input image, the scene-based image editing system 106 retrieves and embeds relationships from an external knowledgebase 1522. In one or more embodiments, an external knowledgebase includes a dataset of semantic relationships involving objects. In particular, in some embodiments, an external knowledgebase includes a semantic network including descriptions of relationships between objects based on background knowledge and contextual knowledge (also referred to herein as "commonsense relationships"). In some implementations, an external knowledgebase includes a database on one or more servers that includes relationship knowledge from one or more sources including expert-created resources, crowdsourced resources, web-based sources, dictionaries, or other sources that include information about object relationships.

Additionally, in one or more embodiments an embedding includes a representation of relationships involving objects as a vector. For instance, in some cases, a relationship embedding includes a vector representation of a triplet (i.e., an object label, one or more relationships, and an object entity) using extracted relationships from an external knowledgebase.

Indeed, in one or more embodiments, the scene-based image editing system 106 communicates with the external knowledgebase 1522 to obtain useful object-relationship information for improving the object and subgraph proposals. Further, in one or more embodiments, the scene-based image editing system 106 refines the object proposals and subgraph proposals (represented by the box 1524) using embedded relationships, as described in more detail below.

In some embodiments, in preparation for retrieving the relationships from the external knowledgebase 1522, the scene-based image editing system 106 performs a process of inter-refinement on the object and subgraph proposals (e.g., in preparation for refining features of the object and subgraph proposals). Specifically, the scene-based image editing system 106 uses the knowledge that each object $o_i$ is connected to a set of subgraphs $S^i$, and each subgraph $s_k$ is associated with a set of objects $O^k$ to refine the object vector (resp. the subgraphs) by attending the associated subgraph feature maps (resp. the associated object vectors). For instance, in some cases, the inter-refinement process is represented as:

$$\bar{o}_i = o_i + f_{s \to o}\left(\sum_{s_k^i \in S^i} \alpha_k^{s \to o} \cdot s_k^i\right)$$

$$\bar{s}_i = s_i + f_{o \to s}\left(\sum_{o_i^k \in O^k} \alpha_i^{o \to s} \cdot o_i^k\right)$$

where $\alpha_k^{s \to o}$ (resp. $\alpha_i^{o \to s}$) is the output of a softmax layer indicating the weight for passing $s_k^i$ (resp. $o_i^k$) to $o_i$ (resp. to $S_k$), and $f_{s \to o}$ and $f_{o \to s}$ are non-linear mapping functions. In one or more embodiments, due to different dimensions of $o_i$ and $s_k$, the scene-based image editing system 106 applies pooling or spatial location-based attention for s→o or o→s refinement.

In some embodiments, once the inter-refinement is complete, the scene-based image editing system 106 predicts an object label from the initially refined object feature vector $\bar{o}_i$ and matches the object label with the corresponding semantic entities in the external knowledgebase 1522. In particular, the scene-based image editing system 106 accesses the external knowledgebase 1522 to obtain the most common relationships corresponding to the object label. The scene-based image editing system 106 further selects a predetermined number of the most common relationships from the external knowledgebase 1522 and uses the retrieved relationships to refine the features of the corresponding object proposal/feature vector.

In one or more embodiments, after refining the object proposals and subgraph proposals using the embedded relationships, the scene-based image editing system 106 predicts object labels 1502 and predicate labels from the refined proposals. Specifically, the scene-based image editing system 106 predicts the labels based on the refined object/subgraph features. For instance, in some cases, the scene-based image editing system 106 predicts each object label directly with the refined features of a corresponding feature vector. Additionally, the scene-based image editing system 106 predicts a predicate label (e.g., a relationship label) based on subject and object feature vectors in connection with their corresponding subgraph feature map due to subgraph features being associated with several object proposal pairs. In one or more embodiments, the inference process for predicting the labels is shown as:

$$P_{i,j} \sim \text{softmax}(f_{rel}([\tilde{o}_i \otimes \bar{s}_k; \tilde{o}_j \otimes \bar{s}_k; \bar{s}_k]))$$

$$V_i \sim \text{softmax}(f_{node}(\tilde{o}_i))$$

where $f_{rel}(\cdot)$ and $f_{node}(\cdot)$ denote the mapping layers for predicate and object recognition, respectively, and ⊗ represents a convolution operation. Furthermore, $\tilde{o}_i$ represents a refined feature vector based on the extracted relationships from the external knowledgebase.

In one or more embodiments, the scene-based image editing system 106 further generates a semantic scene graph 1504 using the predicted labels. In particular, the scene-based image editing system 106 uses the object labels 1502 and predicate labels from the refined features to create a graph representation of the semantic information of the input image 1500. In one or more embodiments, the scene-based image editing system 106 generates the scene graph as $\mathcal{G} = \langle V_i, P_{i,j}, V_j \rangle$, i±j, where $\mathcal{G}$ is the scene graph.

Thus, the scene-based image editing system 106 utilizes relative location of the objects and their labels in connection with an external knowledgebase 1522 to determine relationships between objects. The scene-based image editing system 106 utilizes the determined relationships when generating a behavioral policy graph 1410. As an example, the scene-based image editing system 106 determines that a hand and a cell phone have an overlapping location within the digital image. Based on the relative locations and depth information, the scene-based image editing system 106 determines that a person (associated with the hand) has a relationship of "holding" the cell phone. As another example, the scene-based image editing system 106 determines that a person and a shirt have an overlapping location and overlapping depth within a digital image. Based on the relative locations and relative depth information, the scene-based image editing system 106 determines that the person has a relationship of "wearing" the shirt. On other hand, the scene-based image editing system 106 determines that a person and a shirt have an overlapping location and but the shirt has a greater average depth than an average depth of the person within a digital image. Based on the relative locations and relative depth information, the scene-based image editing system 106 determines that the person has a relationship of "in front of" with the shirt.

By generating a semantic scene graph for a digital image, the scene-based image editing system 106 provides improved flexibility and efficiency. Indeed, as mentioned above, the scene-based image editing system 106 generates a semantic scene graph to provide improved flexibility as characteristics used in modifying a digital image are readily available at the time user interactions are received to execute a modification. Accordingly, the scene-based image editing system 106 reduces the user interactions typically needed under conventional systems to determine those characteristics (or generate needed content, such as bounding boxes or object masks) in preparation for executing a modification. Thus, the scene-based image editing system 106 provides a more efficient graphical user interface that requires less user interactions to modify a digital image.

Additionally, by generating a semantic scene graph for a digital image, the scene-based image editing system 106 provides an ability to edit a two-dimensional image like a real-world scene. For example, based on a generated semantic scene graph for an image generated utilizing various neural networks, the scene-based image editing system 106 determines objects, their attributes (position, depth, material, color, weight, size, label, etc.). The scene-based image editing system 106 utilizes the information of the semantic scene graph to edit an image intelligently as if the image were a real-world scene.

Indeed, in one or more embodiments, the scene-based image editing system 106 utilizes a semantic scene graph generated for a digital image to facilitate modification to the digital image. For instance, in one or more embodiments, the scene-based image editing system 106 facilitates modification of one or more object attributes of an object portrayed in a digital image utilizing the corresponding semantic scene graph. FIGS. 16-21C illustrate modifying one or more object attributes of an object portrayed in a digital image in accordance with one or more embodiments.

Many conventional systems are inflexible in that they often require difficult, tedious workflows to target modifications to a particular object attribute of an object portrayed in a digital image. Indeed, modifying an object attribute often requires manual manipulation of the object attribute under such systems. For example, modifying a shape of an object portrayed in a digital image often requires several user interactions to manually restructure the boundaries of an object (often at the pixel level), and modifying a size often requires tedious interactions with resizing tools to adjust the size and ensure proportionality. Thus, in addition to inflexibility, many conventional systems suffer from inefficiency in that the processes required by these systems to execute such a targeted modification typically involve a significant number of user interactions.

The scene-based image editing system 106 provides advantages over conventional systems by operating with improved flexibility and efficiency. Indeed, by presenting a graphical user interface element through which user interactions are able to target object attributes of an object, the scene-based image editing system 106 offers more flexibility in the interactivity of objects portrayed in digital images. In particular, via the graphical user interface element, the scene-based image editing system 106 provides flexible selection and modification of object attributes. Accordingly, the scene-based image editing system 106 further provides improved efficiency by reducing the user interactions required to modify an object attribute. Indeed, as will be discussed below, the scene-based image editing system 106 enables user interactions to interact with a description of an object attribute in order to modify that object attribute, avoiding the difficult, tedious workflows of user interactions required under many conventional systems.

Figure 16:
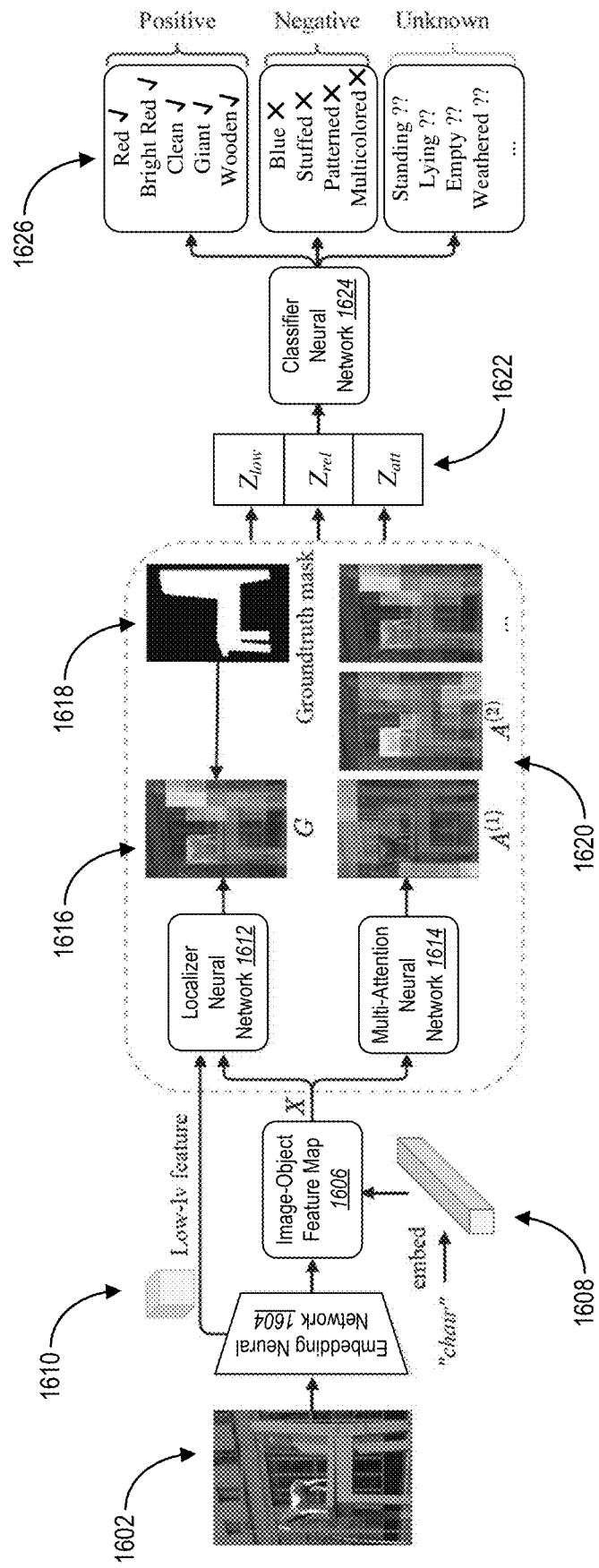
FIG. 16 illustrates an overview of a multi-attribute contrastive classification neural network in accordance with one or more embodiments.
Figure 17:
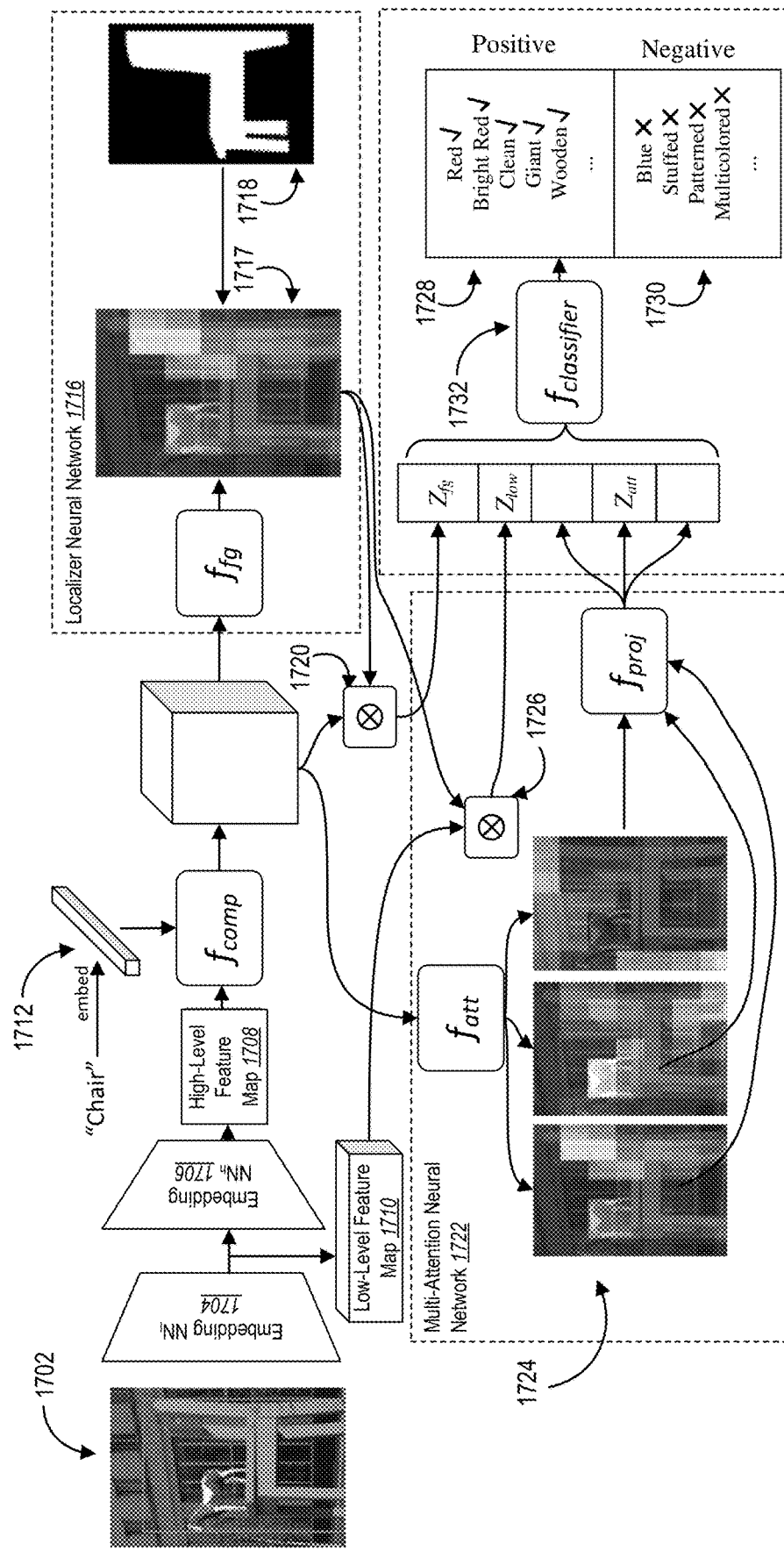
FIG. 17 illustrates an architecture of a multi-attribute contrastive classification neural network in accordance with one or more embodiments.

As suggested, in one or more embodiments, the scene-based image editing system 106 facilitates modifying object attributes of objects portrayed in a digital image by determining the object attributes of those objects. In particular, in some cases, the scene-based image editing system 106 utilizes a machine learning model, such as an attribute classification neural network, to determine the object attributes. FIGS. 16-17 illustrates an attribute classification neural network utilized by the scene-based image editing system 106 to determine object attributes for objects in accordance with one or more embodiments. In particular, FIGS. 16-17 illustrate a multi-attribute contrastive classification neural network utilized by the scene-based image editing system 106 in one or more embodiments.

In one or more embodiments, an attribute classification neural network includes a computer-implemented neural network that identifies object attributes of objects portrayed in a digital image. In particular, in some embodiments, an attribute classification neural network includes a computer-implemented neural network that analyzes objects portrayed in a digital image, identifies the object attributes of the objects, and provides labels for the corresponding object attributes in response. It should be understood that, in many cases, an attribute classification neural network more broadly identifies and classifies attributes for semantic areas portrayed in a digital image. Indeed, in some implementations, an attribute classification neural network determines attributes for semantic areas portrayed in a digital image aside from objects (e.g., the foreground or background).

FIG. 16 illustrates an overview of a multi-attribute contrastive classification neural network in accordance with one or more embodiments. In particular, FIG. 16 illustrates the scene-based image editing system 106 utilizing a multi-attribute contrastive classification neural network to extract a wide variety of attribute labels (e.g., negative, positive, and unknown labels) for an object portrayed within a digital image.

As shown in FIG. 16, the scene-based image editing system 106 utilizes an embedding neural network 1604 with a digital image 1602 to generate an image-object feature map 1606 and a low-level attribute feature map 1610. In particular, the scene-based image editing system 106 generates the image-object feature map 1606 (e.g., the image-object feature map X) by combining an object-label embedding vector 1608 with a high-level attribute feature map from the embedding neural network 1604. For instance, the object-label embedding vector 1608 represents an embedding of an object label (e.g., "chair").

Furthermore, as shown in FIG. 16, the scene-based image editing system 106 generates a localized image-object feature vector $Z_{rel}$. In particular, the scene-based image editing system 106 utilizes the image-object feature map 1606 with the localizer neural network 1612 to generate the localized image-object feature vector $Z_{rel}$. Specifically, the scene-based image editing system 106 combines the image-object feature map 1606 with a localized object attention feature vector 1616 (denoted G) to generate the localized image-object feature vector $Z_{rel}$ to reflect a segmentation prediction of the relevant object (e.g., "chair") portrayed in the digital image 1602. As further shown in FIG. 16, the localizer neural network 1612, in some embodiments, is trained using ground truth object segmentation masks 1618.

Additionally, as illustrated in FIG. 16, the scene-based image editing system 106 also generates a localized low-level attribute feature vector $Z_{low}$. In particular, in reference to FIG. 16, the scene-based image editing system 106 utilizes the localized object attention feature vector G from the localizer neural network 1612 with the low-level attribute feature map 1610 to generate the localized low-level attribute feature vector $Z_{low}$.

Moreover, as shown FIG. 16, the scene-based image editing system 106 generates a multi-attention feature vector $Z_{att}$. As illustrated in FIG. 16, the scene-based image editing system 106 generates the multi-attention feature vector $Z_{att}$ from the image-object feature map 1606 by utilizing attention maps 1620 of the multi-attention neural network 1614. Indeed, in one or more embodiments, the scene-based image editing system 106 utilizes the multi-attention feature vector $Z_{att}$ to attend to features at different spatial locations in relation to the object portrayed within the digital image 1602 while predicting attribute labels for the portrayed object.

As further shown in FIG. 16, the scene-based image editing system 106 utilizes a classifier neural network 1624 to predict the attribute labels 1626 upon generating the localized image-object feature vector $Z_{rel}$, the localized low-level attribute feature vector $Z_{low}$, and the multi-attention feature vector $Z_{att}$ (collectively shown as vectors 1622 in FIG. 16). In particular, in one or more embodiments, the scene-based image editing system 106 utilizes the classifier neural network 1624 with a concatenation of the localized image-object feature vector $Z_{rel}$, the localized low-level attribute feature vector $Z_{low}$, and the multi-attention feature vector $Z_{att}$ to determine the attribute labels 1626 for the object (e.g., chair) portrayed within the digital image 1602. As shown in FIG. 16, the scene-based image editing system 106 determines positive attribute labels for the chair portrayed in the digital image 1602, negative attribute labels that are not attributes of the chair portrayed in the digital image 1602, and unknown attribute labels that correspond to attribute labels that the scene-based image editing system 106 could not confidently classify utilizing the classifier neural network 1624 as belonging to the chair portrayed in the digital image 1602.

In some instances, the scene-based image editing system 106 utilizes probabilities (e.g., a probability score, floating point probability) output by the classifier neural network 1624 for the particular attributes to determine whether the attributes are classified as positive, negative, and/or unknown attribute labels for the object portrayed in the digital image 1602 (e.g., the chair). For example, the scene-based image editing system 106 identifies an attribute as a positive attribute when a probability output for the particular attribute satisfies a positive attribute threshold (e.g., a positive probability, a probability that is over 0.5). Moreover, the scene-based image editing system 106 identifies an attribute as a negative attribute when a probability output for the particular attribute satisfies a negative attribute threshold (e.g., a negative probability, a probability that is below −0.5). Furthermore, in some cases, the scene-based image editing system 106 identifies an attribute as an unknown attribute when the probability output for the particular attribute does not satisfy either the positive attribute threshold or the negative attribute threshold.

In some cases, a feature map includes a height, width, and dimension locations (H×W×D) which have D-dimensional feature vectors at each of the H×W image locations. Furthermore, in some embodiments, a feature vector includes a set of values representing characteristics and/or features of content (or an object) within a digital image. Indeed, in some embodiments, a feature vector includes a set of values corresponding to latent and/or patent attributes related to a digital image. For example, in some instances, a feature vector is a multi-dimensional dataset that represents features depicted within a digital image. In one or more embodiments, a feature vector includes a set of numeric metrics learned by a machine learning algorithm.

FIG. 17 illustrates an architecture of the multi-attribute contrastive classification neural network in accordance with one or more embodiments. Indeed, in one or more embodiments, the scene-based image editing system 106 utilizes the multi-attribute contrastive classification neural network, as illustrated in FIG. 17, with the embedding neural network, the localizer neural network, the multi-attention neural network, and the classifier neural network components to determine positive and negative attribute labels (e.g., from output attribute presence probabilities) for an object portrayed in a digital image.

As shown in FIG. 17, the scene-based image editing system 106 utilizes an embedding neural network within the multi-attribute contrastive classification neural network. In particular, as illustrated in FIG. 17, the scene-based image editing system 106 utilizes a low-level embedding layer 1704 (e.g., embedding $NN_h$) (e.g., of the embedding neural network 1604 of FIG. 16) to generate a low-level attribute feature map 1710 from a digital image 1702. Furthermore, as shown in FIG. 17, the scene-based image editing system 106 utilizes a high-level embedding layer 1706 (e.g., embedding $NN_h$) (e.g., of the embedding neural network 1604 of FIG. 16) to generate a high-level attribute feature map 1708 from the digital image 1702.

In particular, in one or more embodiments, the scene-based image editing system 106 utilizes a convolutional neural network as an embedding neural network. For example, the scene-based image editing system 106 generates a D-dimensional image feature map $f_{img}(I) \in \mathbb{R}^{H \times W \times D}$ with a spatial size H×W extracted from a convolutional neural network-based embedding neural network. In some instance, the scene-based image editing system 106 utilizes an output of the penultimate layer of ResNet-50 as the image feature map $f_{img}(I)$.

As shown in FIG. 17, the scene-based image editing system 106 extracts both a high-level attribute feature map 1708 and a low-level attribute feature map 1710 utilizing a high-level embedding layer and a low-level embedding layer of an embedding neural network. By extracting both the high-level attribute feature map 1708 and the low-level attribute feature map 1710 for the digital image 1702, the scene-based image editing system 106 addresses the heterogeneity in features between different classes of attributes. Indeed, attributes span across a wide range of semantic levels.

By utilizing both low-level feature maps and high-level feature maps, the scene-based image editing system 106 accurately predicts attributes across the wide range of semantic levels. For instance, the scene-based image editing system 106 utilizes low-level feature maps to accurately predict attributes such as, but not limited to, colors (e.g., red, blue, multicolored), patterns (e.g., striped, dotted, striped), geometry (e.g., shape, size, posture), texture (e.g., rough, smooth, jagged), or material (e.g., wooden, metallic, glossy, matte) of a portrayed object. Meanwhile, in one or more embodiments, the scene-based image editing system 106 utilizes high-level feature maps to accurately predict attributes such as, but not limited to, object states (e.g., broken, dry, messy, full, old) or actions (e.g., running, sitting, flying) of a portrayed object.

Furthermore, as illustrated in FIG. 17, the scene-based image editing system 106 generates an image-object feature map 1714. In particular, as shown in FIG. 17, the scene-based image editing system 106 combines an object-label embedding vector 1712 (e.g., such as the object-label embedding vector 1608 of FIG. 16) from a label corresponding to the object (e.g., "chair") with the high-level attribute feature map 1708 to generate the image-object feature map 1714 (e.g., such as the image-object feature map 1606 of FIG. 16). As further shown in FIG. 17, the scene-based image editing system 106 utilizes a feature composition module (e.g., $f_{comp}$) that utilizes the object-label embedding vector 1712 and the high-level attribute feature map 1708 to output the image-object feature map 1714.

In one or more embodiments, the scene-based image editing system 106 generates the image-object feature map 1714 to provide an extra signal to the multi-attribute contrastive classification neural network to learn the relevant object for which it is predicting attributes (e.g., while also encoding the features for the object). In particular, in some embodiments, the scene-based image editing system 106 incorporates the object-label embedding vector 1712 (as an input in a feature composition module $f_{comp}$ to generate the image-object feature map 1714) to improve the classification results of the multi-attribute contrastive classification neural network by having the multi-attribute contrastive classification neural network learn to avoid unfeasible object-attribute combinations (e.g., a parked dog, a talking table, a barking couch). Indeed, in some embodiments, the scene-based image editing system 106 also utilizes the object-label embedding vector 1712 (as an input in the feature composition module $f_{comp}$) to have the multi-attribute contrastive classification neural network learn to associate certain object-attribute pairs together (e.g., a ball is always round). In many instances, by guiding the multi-attribute contrastive classification neural network on what object it is predicting attributes for enables the multi-attribute contrastive classification neural network to focus on particular visual aspects of the object. This, in turn, improves the quality of extracted attributes for the portrayed object.

In one or more embodiments, the scene-based image editing system 106 utilizes a feature composition module (e.g., $f_{comp}$) to generate the image-object feature map 1714. In particular, the scene-based image editing system 106 implements the feature composition module (e.g., $f_{comp}$) with a gating mechanism in accordance with the following:

$$f_{comp}(f_{img}(I),\phi_o) = f_{img}(I) \odot f_{gate}(\phi_o)$$

and $$f_{comp}(\phi_o) = \sigma(W_{g2} \cdot \text{ReLU}(W_{g1}\phi_o + b_{g1}) + b_{g2})$$

In the first function above, the scene-based image editing system 106 utilizes a channel-wise product (⊙) of the high-level attribute feature map $f_{img}(I)$ and a filter $f_{gate}$ of the object-label embedding vector $\phi_o \in \mathbb{R}^d$ to generate an image-object feature map $f_{comp}$ $(f_{img}(I), \phi_o) \in \mathbb{R}^D$.

In addition, in the second function above, the scene-based image editing system 106 utilizes a sigmoid function σ in the $f_{gate}(\phi_o) \in \mathbb{R}^D$ that is broadcasted to match the feature map spatial dimension as a 2-layer multilayer perceptron (MLP). Indeed, in one or more embodiments, the scene-based image editing system 106 utilizes $f_{gate}$ as a filter that selects attribute features that are relevant to the object of interest (e.g., as indicated by the object-label embedding vector $\phi_0$). In many instances, the scene-based image editing system 106 also utilizes $f_{gate}$ to suppress incompatible object-attribute pairs (e.g., talking table). In some embodiments, the scene-based image editing system 106 can identify object-image labels for each object portrayed within a digital image and output attributes for each portrayed object by utilizing the identified object-image labels with the multi-attribute contrastive classification neural network.

Furthermore, as shown in FIG. 17, the scene-based image editing system 106 utilizes the image-object feature map 1714 with a localizer neural network 1716 to generate a localized image-object feature vector $Z_{rel}$ (e.g., as also shown in FIG. 16 as localizer neural network 1612 and $Z_{rel}$). In particular, as shown in FIG. 17, the scene-based image editing system 106 generates a localized object attention feature vector 1717 (e.g., G in FIG. 16) that reflects a segmentation prediction of the portrayed object by utilizing the image-object feature map 1714 with a convolutional layer $f_{rel}$ of the localizer neural network 1716. Then, as illustrated in FIG. 17, the scene-based image editing system 106 combines the localized object attention feature vector 1717 with the image-object feature map 1714 to generate the localized image-object feature vector $Z_{rel}$. As shown in FIG. 17, the scene-based image editing system 106 utilizes matrix multiplication 1720 between the localized object attention feature vector 1717 and the image-object feature map 1714 to generate the localized image-object feature vector $Z_{rel}$.

In some instances, digital images may include multiple objects (and/or a background). Accordingly, in one or more embodiments, the scene-based image editing system 106 utilizes a localizer neural network to learn an improved feature aggregation that suppresses non-relevant-object regions (e.g., regions not reflected in a segmentation prediction of the target object to isolate the target object). For example, in reference to the digital image 1702, the scene-based image editing system 106 utilizes the localizer neural network 1716 to localize an object region such that the multi-attribute contrastive classification neural network predicts attributes for the correct object (e.g., the portrayed chair) rather than other irrelevant objects (e.g., the portrayed horse). To do this, in some embodiments, the scene-based image editing system 106 utilizes a localizer neural network that utilizes supervised learning with object segmentation masks (e.g., ground truth relevant-object masks) from a dataset of labeled images (e.g., ground truth images as described below).

To illustrate, in some instances, the scene-based image editing system 106 utilizes 2-stacked convolutional layers $f_{rel}$ (e.g., with a kernel size of 1) followed by a spatial softmax to generate a localized object attention feature vector G (e.g., a localized object region) from an image-object feature map $X \in \mathbb{R}^{H \times W \times D}$ in accordance with the following:

$$g = f_{rel}(X), g \in \mathbb{R}^{H \times W},$$

$$G_{h,w} = \frac{\exp(g_h, w)}{\sum_{h,w} \exp(g_h, w)}, G \in \mathbb{R}^{H \times W}$$

For example, the localized object attention feature vector G includes a single plane of data that is H×W (e.g., a feature map having a single dimension). In some instances, the localized object attention feature vector G includes a feature map (e.g., a localized object attention feature map) that includes one or more feature vector dimensions.

Then, in one or more embodiments, the scene-based image editing system 106 utilizes the localized object attention feature vector $G_{h,w}$ and the image-object feature map $X_{h,w}$ to generate the localized image-object feature vector $Z_{rel}$ in accordance with the following:

$$Z_{rel} = \sum_{h,w} G_{h,w} X_{h,w}$$

In some instances, in the above function, the scene-based image editing system 106 pools H×W D-dimensional feature vectors $X_{h,w}$ (from the image-object feature map) in $\mathbb{R}$ D using weights from the localized object attention feature vector $G_{h,w}$ into a single D-dimensional feature vector $Z_{rel}$.

In one or more embodiments, in reference to FIG. 17, the scene-based image editing system 106 trains the localizer neural network 1716 to learn the localized object attention feature vector 1717 (e.g., G) utilizing direct supervision with object segmentation masks 1718 (e.g., ground truth object segmentation masks 1618 from FIG. 16).

Furthermore, as shown in FIG. 17, the scene-based image editing system 106 utilizes the image-object feature map 1714 with a multi-attention neural network 1722 to generate a multi-attention feature vector $Z_{att}$ (e.g., the multi-attention neural network 1614 and $Z_{att}$ of FIG. 16). In particular, as shown in FIG. 17, the scene-based image editing system 106 utilizes a convolutional layer $f_{att}$ (e.g., attention layers) with the image-object feature map 1714 to extract attention maps 1724 (e.g., Attention 1 through Attention k) (e.g., attention maps 1620 of FIG. 16). Then, as further shown in FIG. 17, the scene-based image editing system 106 passes (e.g., via linear projection) the extracted attention maps 424 (attention 1 through attention k) through a projection layer $f_{proj}$ to extract one or more attention features that are utilized to generate the multi-attention feature vector $Z_{att}$.

In one or more embodiments, the scene-based image editing system 106 utilizes the multi-attention feature vector $Z_{att}$ to accurately predict attributes of a portrayed object within a digital image by providing focus to different parts of the portrayed object and/or regions surrounding the portrayed object (e.g., attending to features at different spatial locations). To illustrate, in some instances, the scene-based image editing system 106 utilizes the multi-attention feature vector $Z_{att}$ to extract attributes such as "barefooted" or "bald-headed" by focusing on different parts of a person (i.e., an object) that is portrayed in a digital image. Likewise, in some embodiments, the scene-based image editing system 106 utilizes the multi-attention feature vector $Z_{att}$ to distinguish between different activity attributes (e.g., jumping vs crouching) that may rely on information from surrounding context of the portrayed object.

In certain instances, the scene-based image editing system 106 generates an attention map per attribute portrayed for an object within a digital image. For example, the scene-based image editing system 106 utilizes an image-object feature map with one or more attention layers to generate an attention map from the image-object feature map for each known attribute. Then, the scene-based image editing system 106 utilizes the attention maps with a projection layer to generate the multi-attention feature vector $Z_{att}$. In one or more embodiments, the scene-based image editing system 106 generates various numbers of attention maps for various attributes portrayed for an object within a digital image (e.g., the system can generate an attention map for each attribute or a different number of attention maps than the number of attributes).

Furthermore, in one or more embodiments, the scene-based image editing system 106 utilizes a hybrid shared multi-attention approach that allows for attention hops while generating the attention maps from the image-object feature map. For example, the scene-based image editing system 106 extracts M attention maps $\{A^{(m)}\}_{m=1}^{M}$ from an image-object feature map X utilizing a convolutional layer $f_{att}^{(m)}$ (e.g., attention layers) in accordance with the following function:

$$E^{(m)} = f_{att}^{(m)}(X), E^{(m)} \in \mathbb{R}^{H \times W}, m=1, \ldots, M$$

and $$A_{h,w}^{(m)} = \frac{\exp(E_{h,w}^{(m)})}{\sum_{h,w} \exp(E_{h,w}^{(m)})}, A_{h,w}^{(m)} \in \mathbb{R}^{H \times W}$$

In some cases, the scene-based image editing system 106 utilizes a convolutional layer $f_{att}^{(m)}$ that has a similar architecture to the 2-stacked convolutional layers $f_{rel}$ from function (3) above. By utilizing the approach outlined in second function above, the scene-based image editing system 106 utilizes a diverse set of attention maps that correspond to a diverse range of attributes.

Subsequently, in one or more embodiments, the scene-based image editing system 106 utilizes the M attention maps (e.g., $A_{h,w}^{(m)}$) to aggregate M attention feature vectors $(\{r^{(m)}\}_{m=1}^{M})$ from the image-object feature map X in accordance with the following function:

$$r^{(m)} = \sum_{h,w} A_{h,w}^{(m)} X_{h,w}, r^{(m)} \in \mathbb{R}^{D}$$

Moreover, in reference to FIG. 17, the scene-based image editing system 106 passes the M attention feature vectors $(\{r^{(m)}\}_{i=1}^{M})$ through a projection layer $f_{proj}^{(m)}$ to extract one or more attention feature vectors $z^{(m)}$ in accordance with the following function:

$$z_{att}^{(m)} = f_{proj}^{(m)}(r^{(m)}, z_{att}^{(m)}) \in \mathbb{R}^{D_{proj}}$$

Then, in one or more embodiments, the scene-based image editing system 106 generates the multi-attention feature vector $Z_{att}$ by concatenating the individual attention feature vectors $z_{att}^{(m)}$ in att accordance with the following function:

$$Z_{att} = \text{concat}([Z_{att}^{(1)}, \ldots, Z_{att}^{(M)}])$$

In some embodiments, the scene-based image editing system 106 utilizes a divergence loss with the multi-attention neural network in the M attention hops approach. In particular, the scene-based image editing system 106 utilizes a divergence loss that encourages attention maps to focus on different (or unique) regions of a digital image (from the image-object feature map). In some cases, the scene-based image editing system 106 utilizes a divergence loss that promotes diversity between attention features by minimizing a cosine similarity (e.g., $\ell_2$-norm) between attention weight vectors (e.g., E) of attention features. For instance, the scene-based image editing system 106 determines a divergence loss $\mathcal{L}_{div}$ in accordance with the following function:

$$\mathcal{L}_{div} = \sum_{m \neq n} \frac{\langle E^{(m)}, E^{(n)} \rangle}{\|E^{(m)}\|_2 \|E^{(n)}\|_2}$$

In one or more embodiments, the scene-based image editing system 106 utilizes the divergence loss $\mathcal{L}_{div}$ to learn parameters of the multi-attention neural network 1722 and/or the multi-attribute contrastive classification neural network (as a whole).

Furthermore, as shown in FIG. 17, the scene-based image editing system 106 also generates a localized low-level attribute feature vector $Z_{low}$ (e.g., $Z_{low}$ of FIG. 16). Indeed, as illustrated in FIG. 17, the scene-based image editing system 106 generates the localized low-level attribute feature vector $Z_{low}$ by combining the low-level attribute feature map 1710 and the localized object attention feature vector 1717. For example, as shown in FIG. 17, the scene-based image editing system 106 combines the low-level attribute feature map 1710 and the localized object attention feature vector 1717 utilizing matrix multiplication 1726 to generate the localized low-level attribute feature vector $Z_{low}$.

By generating and utilizing the localized low-level attribute feature vector $Z_{low}$, in one or more embodiments, the scene-based image editing system 106 improves the accuracy of low-level features (e.g., colors, materials) that are extracted for an object portrayed in a digital image. In particular, in one or more embodiments, the scene-based image editing system 106 pools low-level features (as represented by a low-level attribute feature map from a low-level embedding layer) from a localized object attention feature vector (e.g., from a localizer neural network). Indeed, in one or more embodiments, by pooling low-level features from the localized object attention feature vector utilizing a low-level feature map, the scene-based image editing system 106 constructs a localized low-level attribute feature vector $Z_{low}$.

As further shown in FIG. 17, the scene-based image editing system 106 utilizes a classifier neural network 1732 ($f_{classifier}$) (e.g., the classifier neural network 1624 of FIG. 16) with the localized image-object feature vector $Z_{rel}$, the multi-attention feature vector $Z_{att}$, and the localized low-level attribute feature vector $Z_{low}$ to determine positive attribute labels 1728 and negative attribute labels 1730 for the object (e.g., "chair") portrayed within the digital image 1702. In some embodiments, the scene-based image editing system 106 utilizes a concatenation of the localized image-object feature vector $Z_{rel}$, the multi-attention feature vector $Z_{att}$, and the localized low-level attribute feature vector $Z_{low}$ as input in a classification layer of the classifier neural network 1732 ($f_{classifier}$). Then, as shown in FIG. 17, the classifier neural network 1732 ($f_{classifier}$) generates positive attribute labels 1728 (e.g., red, bright red, clean, giant, wooden) and also generates negative attribute labels 1730 (e.g., blue, stuffed, patterned, multicolored) for the portrayed object in the digital image 1702.

In one or more embodiments, the scene-based image editing system 106 utilizes a classifier neural network that is a 2-layer MLP. In some cases, the scene-based image editing system 106 utilizes a classifier neural network that includes various amounts of hidden units and output logic values followed by sigmoid. In some embodiments, the classifier neural network is trained by the scene-based image editing system 106 to generate both positive and negative attribute labels. Although one or more embodiments described herein utilize a 2-layer MLP, in some instances, the scene-based image editing system 106 utilizes a linear layer (e.g., within the classifier neural network, for the $f_{gate}$, and for the image-object feature map).

Furthermore, in one or more embodiments, the scene-based image editing system 106 utilizes various combinations of the localized image-object feature vector $Z_{rel}$, the multi-attention feature vector $Z_{att}$, and the localized low-level attribute feature vector $Z_{low}$ with the classifier neural network to extract attributes for an object portrayed in a digital image. For example, in certain instances, the scene-based image editing system 106 provides the localized image-object feature vector $Z_{rel}$ and the multi-attention feature vector $Z_{att}$ to extract attributes for the portrayed object. In some instances, as shown in FIG. 17, the scene-based image editing system 106 utilizes a concatenation of each the localized image-object feature vector $Z_{rel}$, the multi-attention feature vector $Z_{att}$, and the localized low-level attribute feature vector $Z_{low}$ with the classifier neural network.

In one or more embodiments, the scene-based image editing system 106 utilizes the classifier neural network 1732 to generate prediction scores corresponding to attribute labels as outputs. For, example, the classifier neural network 1732 can generate a prediction score for one or more attribute labels (e.g., a score of 0.04 for blue, a score of 0.9 for red, a score of 0.4 for orange). Then, in some instances, the scene-based image editing system 106 utilizes attribute labels that correspond to prediction scores that satisfy a threshold prediction score. Indeed, in one or more embodiments, the scene-based image editing system 106 selects various attribute labels (both positive and negative) by utilizing output prediction scores for attributes from a classifier neural network.

Although one or more embodiments herein illustrate the scene-based image editing system 106 utilizing a particular embedding neural network, localizer neural network, multi-attention neural network, and classifier neural network, the scene-based image editing system 106 can utilize various types of neural networks for these components (e.g., CNN, FCN). In addition, although one or more embodiments herein describe the scene-based image editing system 106 combining various feature maps (and/or feature vectors) utilizing matrix multiplication, the scene-based image editing system 106, in some embodiments, utilizes various approaches to combine feature maps (and/or feature vectors) such as, but not limited to, concatenation, multiplication, addition, and/or aggregation. For example, in some implementations, the scene-based image editing system 106 combines a localized object attention feature vector and an image-object feature map to generate the localized image-object feature vector by concatenating the localized object attention feature vector and the image-object feature map.

Thus, in some cases, the scene-based image editing system 106 utilizes an attribute classification neural network (e.g., a multi-attribute contrastive classification neural network) to determine objects attributes of objects portrayed in a digital image or otherwise determined attributes of portrayed semantic areas. In some cases, the scene-based image editing system 106 adds object attributes or other attributes determined for a digital image to a semantic scene graph for the digital image. In other words, the scene-based image editing system 106 utilizes the attribute classification neural network in generating semantic scene graphs for digital images. In some implementations, however, the scene-based image editing system 106 stores the determined object attributes or other attributes in a separate storage location.

Figure 18:
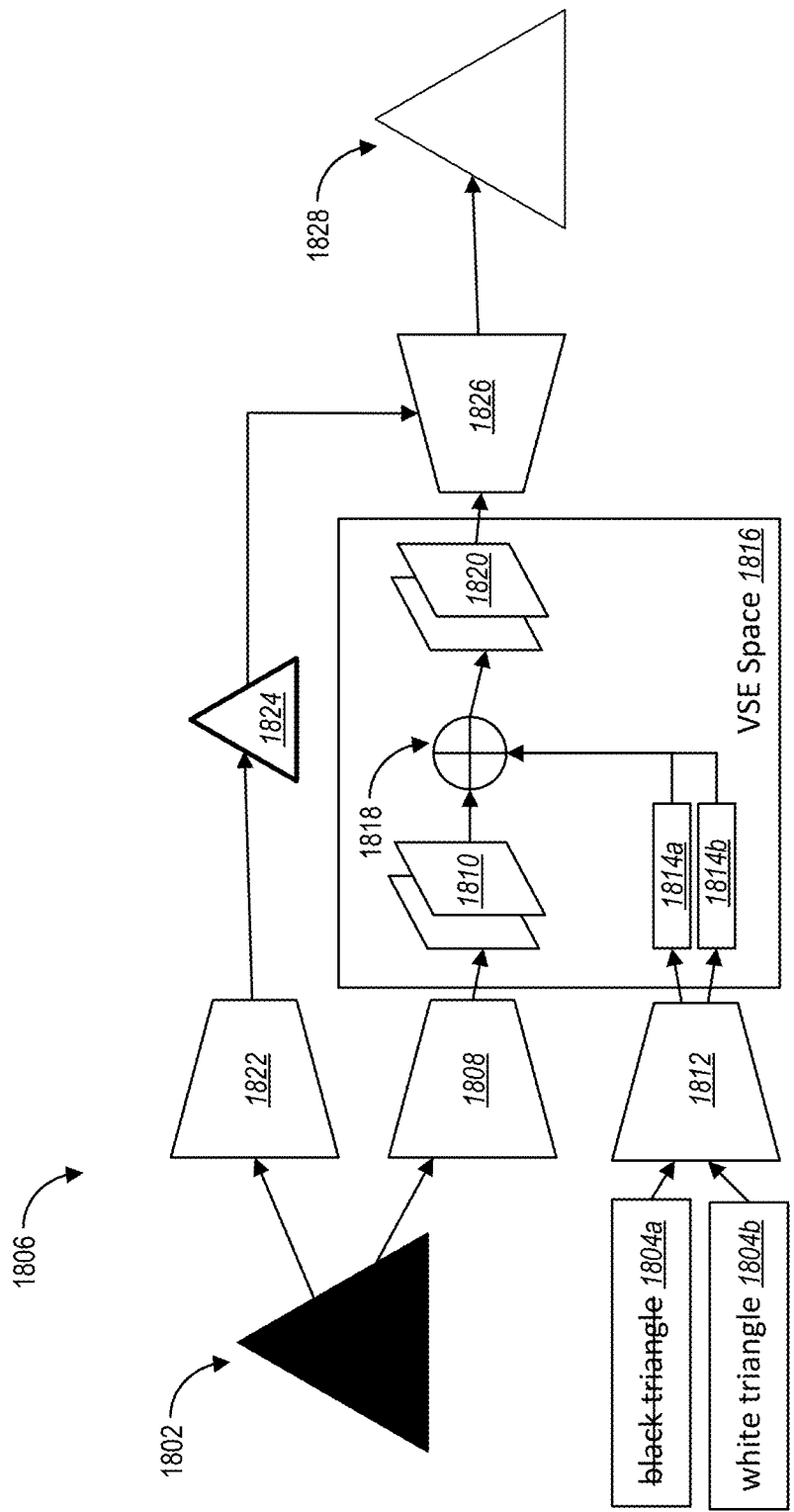
FIG. 18 illustrates an attribute modification neural network utilized by the scene-based image editing system to modify object attributes in accordance with one or more embodiments.

Further, in one or more embodiments, the scene-based image editing system 106 facilitates modifying object attributes of objects portrayed in a digital image by modifying one or more object attributes in response to user input. In particular, in some cases, the scene-based image editing system 106 utilizes a machine learning model, such as an attribute modification neural network to modify object attributes. FIG. 18 illustrates an attribute modification neural network utilized by the scene-based image editing system 106 to modify object attributes in accordance with one or more embodiments.

In one or more embodiments, an attribute modification neural network includes a computer-implemented neural network that modifies specified object attributes of an object (or specified attributes of other specified semantic areas). In particular, in some embodiments, an attribute modification neural network includes a computer-implemented neural network that receives user input targeting an object attribute and indicating a change to the object attribute and modifies the object attribute in accordance with the indicated change. In some cases, an attribute modification neural network includes a generative network.

As shown in FIG. 18, the scene-based image editing system 106 provides an object 1802 (e.g., a digital image that portrays the object 1802) and modification input 1804a-1804b to an object modification neural network 1806. In particular, FIG. 18 shows the modification input 1804a-1804b including input for the object attribute to be changed (e.g., the black color of the object 1802) and input for the change to occur (e.g., changing the color of the object 1802 to white).

As illustrated by FIG. 18, the object modification neural network 1806 utilizes an image encoder 1808 to generate visual feature maps 1810 from the object 1802. Further, the object modification neural network 1806 utilizes a text encoder 1812 to generate textual features 1814a-1814b from the modification input 1804a-1804b. In particular, as shown in FIG. 18, the object modification neural network 1806 generates the visual feature maps 1810 and the textual features 1814a-1814b within a joint embedding space 1816 (labeled "visual-semantic embedding space" or "VSE space").

In one or more embodiments, the object modification neural network 1806 performs text-guided visual feature manipulation to ground the modification input 1804a-1804b on the visual feature maps 1810 and manipulate the corresponding regions of the visual feature maps 1810 with the provided textual features. For instance, as shown in FIG. 18, the object modification neural network 1806 utilizes an operation 1818 (e.g., a vector arithmetic operation) to generate manipulated visual feature maps 1820 from the visual feature maps 1810 and the textual features 1814a-1814b.

As further shown in FIG. 18, the object modification neural network 1806 also utilizes a fixed edge extractor 1822 to extract an edge 1824 (a boundary) of the object 1802. In other words, the object modification neural network 1806 utilizes the fixed edge extractor 1822 to extract the edge 1824 of the area to be modified.

Further, as shown, the object modification neural network 1806 utilizes a decoder 1826 to generate the modified object 1828. In particular, the decoder 1826 generates the modified object 1828 from the edge 1824 extracted from the object 1802 and the manipulated visual feature maps 1820 generated from the object 1802 and the modification input 1804a-1804b.

In one or more embodiments, the scene-based image editing system 106 trains the object modification neural network 1806 to handle open-vocabulary instructions and open-domain digital images. For instance, in some cases, the scene-based image editing system 106 trains the object modification neural network 1806 utilizing a large-scale image-caption dataset to learn a universal visual-semantic embedding space. In some cases, the scene-based image editing system 106 utilizes convolutional neural networks and/or long short-term memory networks as the encoders of the object modification neural network 1806 to transform digital images and text input into the visual and textual features.

The following provides a more detailed description of the text-guided visual feature manipulation. As previously mentioned, in one or more embodiments, the scene-based image editing system 106 utilizes the joint embedding space 1816 to manipulate the visual feature maps 1810 with the text instructions of the modification input 1804a-1804b via vector arithmetic operations. When manipulating certain objects or object attributes, the object modification neural network 1806 aims to modify only specific regions while keeping other regions unchanged. Accordingly, the object modification neural network 1806 conducts vector arithmetic operations between the visual feature maps 1810 represented as $V \in \mathbb{R}^{1024 \times 7 \times 7}$ and the textual features 1814a-1814b (e.g., represented as textual feature vectors).

For instance, in some cases, the object modification neural network 1806 identifies the regions in the visual feature maps 1810 to manipulate (i.e., grounds the modification input 1804a-1804b) on the spatial feature map. In some cases, the object modification neural network 1806 provides a soft grounding for textual queries via a weighted summation of the visual feature maps 1810. In some cases, the object modification neural network 1806 uses the textual features 1814a-1814b (represented as $t \in \mathbb{R}^{1024 \times 1}$) as weights to compute the weighted summation of the visual feature maps 1810 $g = t^T V$. Using this approach, the object modification neural network 1806 provides a soft grounding map $g \in \mathbb{R}^{7 \times 7}$, which roughly localizes corresponding regions in the visual feature maps 1810 related to the text instructions.

In one or more embodiments, the object modification neural network 1806 utilizes the grounding map as location-adaptive coefficients to control the manipulation strength at different locations. In some cases, the object modification neural network 1806 utilizes a coefficient α to control the global manipulation strength, which enables continuous transitions between source images and the manipulated ones. In one or more embodiments, the scene-based image editing system 106 denotes the visual feature vector at spatial location (i,j) (where i, j∈{0, 1, ... 6}) in the visual feature map $V \in \mathbb{R}^{1024 \times 7 \times 7}$ as $v^{i,j} \in \mathbb{R}^{1024}$.

The scene-based image editing system 106 utilizes the object modification neural network 1806 to perform various types of manipulations via the vector arithmetic operations weighted by the soft grounding map and the coefficient α. For instance, in some cases, the scene-based image editing system 106 utilizes the object modification neural network 1806 to change an object attribute or a global attribute. The object modification neural network 1806 denotes the textual feature embeddings of the source concept (e.g., "black triangle") and the target concept (e.g., "white triangle") as $t_1$ and $t_2$, respectively. The object modification neural network 1806 performs the manipulation of image feature vector $v^{i,j}$ at location (i,j) as follows:

$$v_m^{i,j} = v^{i,j} - \alpha \langle v^{i,j}, t_1 \rangle t_1 + \alpha \langle v^{i,j}, t_1 \rangle t_2,$$

where i, j∈{0, 1, ... 6} and $v_m^{i,j}$ is the manipulated visual feature vector at location (i,j) of the 7×7 feature map.

In one or more embodiments, the object modification neural network 1806 removes the source features $t_1$ and adds the target features $t_2$ to each visual feature vector $v^{i,j}$. Additionally, $\langle v^{i,j}, t_1 \rangle$ represents the value of the soft grounding map at location (i,j), calculated as the dot product of the image feature vector and the source textual features. In other words, the value represents the projection of the visual embedding $v^{i,j}$ onto the direction of the textual embedding $t_1$. In some cases, object modification neural network 1806 utilizes the value as a location-adaptive manipulation strength to control which regions in the image should be edited. Further, the object modification neural network 1806 utilizes the coefficient α as a hyper-parameter that controls the image-level manipulation strength. By smoothly increasing α, the object modification neural network 1806 achieves smooth transitions from source to target attributes.

In some implementations, the scene-based image editing system 106 utilizes the object modification neural network 1806 to remove a concept (e.g., an object attribute, an object, or other visual elements) from a digital image (e.g., removing an accessory from a person). In some instances, the object modification neural network 1806 denotes the semantic embedding of the concept to be removed as t. Accordingly, the object modification neural network 1806 performs the removing operation as follows:

$$v_m^{i,j} = v^{i,j} - \alpha \langle v^{i,j}, t \rangle t$$

Further, in some embodiments, the scene-based image editing system 106 utilizes the object modification neural network 1806 to modify the degree to which an object attribute (or other attribute of a semantic area) appears (e.g., making a red apple less red or increasing the brightness of a digital image). In some cases, the object modification neural network 1806 controls the strength of an attribute via the hyper-parameter a. By smoothly adjusting a, the object modification neural network 1806 gradually strengthens or weakens the degree to which an attribute appears as follows:

$$v_m^{i,j} = v^{i,j} \pm \alpha \langle v^{i,j}, t \rangle t$$

After deriving the manipulated feature map $V_m \in \mathbb{R}^{1024 \times 7 \times 7}$, the object modification neural network

1806 utilizes the decoder 1826 (an image decoder) to generate a manipulated image (e.g., the modified object 1828). In one or more embodiments, the scene-based image editing system 106 trains the object modification neural network 1806 as described by F. Faghri et al., Vse++: Improving visual-semantic Embeddings with Hard Negatives, arXiv: 1707.05612, 2017, which is incorporated herein by reference in its entirety. In some cases, the decoder 1826 takes 1024×7×7 features maps as input and is composed of seven ResNet blocks with upsampling layers in between, which generates 256×256 images. Also, in some instances, the scene-based image editing system 106 utilizes a discriminator that includes a multi-scale patch-based discriminator. In some implementations, the scene-based image editing system 106 trains the decoder 1826 with GAN loss, perceptual loss, and discriminator feature matching loss. Further, in some embodiments, the fixed edge extractor 1822 includes a bi-directional cascade network.

Figure 19C:
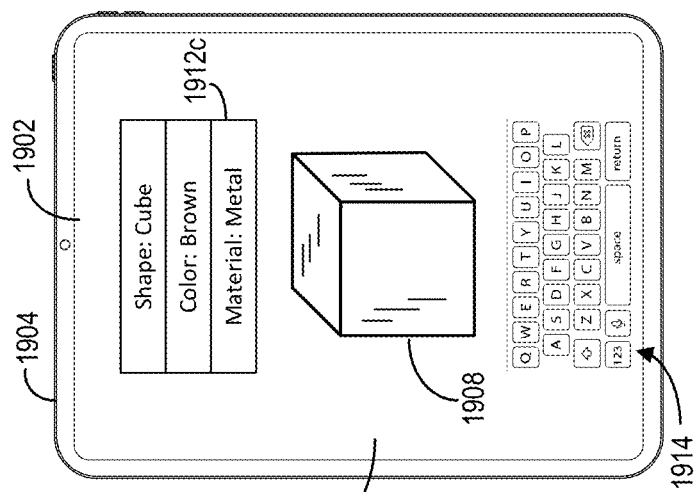
FIGS. 19A-19C illustrate a graphical user interface implemented by the scene-based image editing system to facilitate modifying object attributes of objects portrayed in a digital image in accordance with one or more embodiments.
Figure 19B:
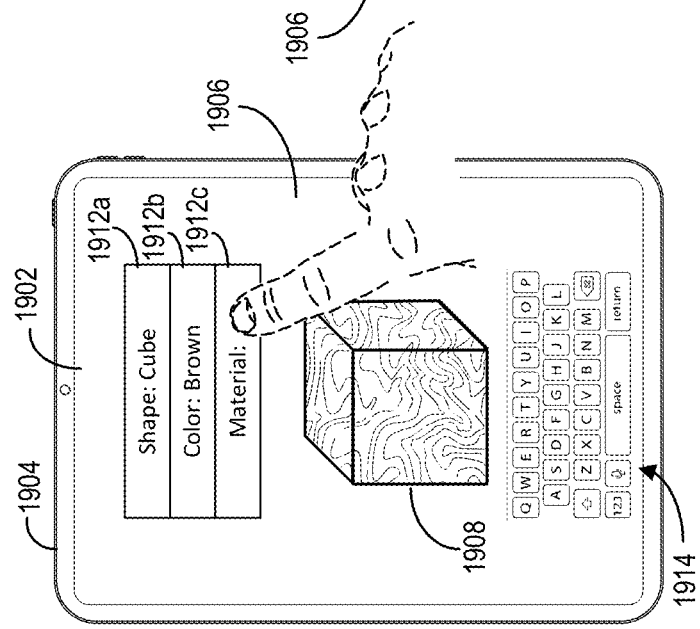
Figure 19A:
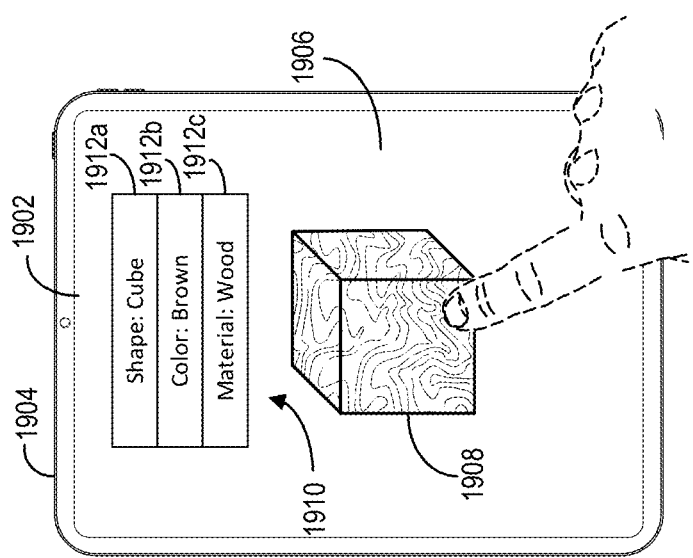

FIGS. 19A-19C illustrate a graphical user interface implemented by the scene-based image editing system 106 to facilitate modifying object attributes of objects portrayed in a digital image in accordance with one or more embodiments. Indeed, though FIGS. 19A-19C particularly show modifying object attributes of objects, it should be noted that the scene-based image editing system 106 similarly modifies attributes of other semantic areas (e.g., background, foreground, ground, sky, etc.) of a digital image in various embodiments.

Indeed, as shown in FIG. 19A, the scene-based image editing system 106 provides a graphical user interface 1902 for display on a client device 1904 and provides a digital image 1906 for display within the graphical user interface 1902. As further shown, the digital image 1906 portrays an object 1908.

As further shown in FIG. 19A, in response to detecting a user interaction with the object 1908, the scene-based image editing system 106 provides an attribute menu 1910 for display within the graphical user interface 1902. In some embodiments, the attribute menu 1910 provides one or more object attributes of the object 1908. Indeed, FIG. 19A shows that the attribute menu 1910 provides object attributes indicators 1912a-1912c, indicating the shape, color, and material of the object 1908, respectively. It should be noted, however, that various alternative or additional object attributes are provided in various embodiments.

In one or more embodiments, the scene-based image editing system 106 retrieves the object attributes for the object attribute indicators 1912a-1912c from a semantic scene graph generated for the digital image 1906. Indeed, in some implementations, the scene-based image editing system 106 generates a semantic scene graph for the digital image 1906 (e.g., before detecting the user interaction with the object 1908). In some cases, the scene-based image editing system 106 determines the object attributes for the object 1908 utilizing an attribute classification neural network and includes the determined object attributes within the semantic scene graph. In some implementations, the scene-based image editing system 106 retrieves the object attributes from a separate storage location.

As shown in FIG. 19B, the scene-based image editing system 106 detects a user interaction with the object attribute indicator 1912c. Indeed, in one or more embodiments, the object attribute indicators 1912a-1912c are interactive. As shown, in response to detecting the user interaction, the scene-based image editing system 106 removes the corresponding object attribute of the object 1908 from display. Further, in response to detecting the user interaction, the scene-based image editing system 106 provides a digital keyboard 1914 for display within the graphical user interface 1902. Thus, the scene-based image editing system 106 provides a prompt for entry of textual user input. In some cases, upon detecting the user interaction with the object attribute indicator 1912c, the scene-based image editing system 106 maintains the corresponding object attribute for display, allowing user interactions to remove the object attribute in confirming that the object attribute has been targeted for modification.

As shown in FIG. 19C, the scene-based image editing system 106 detects one or more user interactions with the digital keyboard 1914 displayed within the graphical user interface 1902. In particular, the scene-based image editing system 106 receives textual user input provided via the digital keyboard 1914. The scene-based image editing system 106 further determines that the textual user input provides a change to the object attribute corresponding to the object attribute indicator 1912c. Additionally, as shown, the scene-based image editing system 106 provides the textual user input for display as part of the object attribute indicator 1912c.

In this case, the user interactions with the graphical user interface 1902 provide instructions to change a material of the object 1908 from a first material (e.g., wood) to a second material (e.g., metal). Thus, upon receiving the textual user input regarding the second material, the scene-based image editing system 106 modifies the digital image 1906 by modifying the object attribute of the object 1908 to reflect the user-provided second material.

In one or more embodiments, the scene-based image editing system 106 utilizes an attribute modification neural network to change the object attribute of the object 1908. In particular, as described above with reference to FIG. 18, the scene-based image editing system 106 provides the digital image 1906 as well as the modification input composed of the first material and the second material provided by the textual user input to the attribute modification neural network. Accordingly, the scene-based image editing system 106 utilizes the attribute modification neural network to provide a modified digital image portraying the object 1908 with the modified object attribute as output.

FIGS. 20A-20C illustrate another graphical user interface implemented by the scene-based image editing system 106 to facilitate modifying object attributes of objects portrayed in a digital image in accordance with one or more embodiments. As shown in FIG. 20A, the scene-based image editing system 106 provides a digital image 2006 portraying an object 2008 for display within a graphical user interface 2002 of a client device 2004. Further, upon detecting a user interaction with the object 2008, the scene-based image editing system 106 provides an attribute menu 2010 having attribute object indicators 2012a-2012c listing object attributes of the object 2008.

As shown in FIG. 20B, the scene-based image editing system 106 detects an additional user interaction with the object attribute indicator 2012a. In response to detecting the additional user interaction, the scene-based image editing system 106 provides an alternative attribute menu 2014 for display within the graphical user interface 2002. In one or more embodiments, the alternative attribute menu 2014 includes one or more options for changing a corresponding object attribute. Indeed, as illustrated in FIG. 20B, the alternative attribute menu 2014 includes alternative attribute indicators 2016a-2016c that provide object attributes that could be used in place of the current object attribute for the object 2008.

As shown in FIG. 20C, the scene-based image editing system 106 detects a user interaction with the alternative attribute indicator 2016b. Accordingly, the scene-based image editing system 106 modifies the digital image 2006 by modifying the object attribute of the object 2008 in accordance with the user input with the alternative attribute indicator 2016b. In particular, the scene-based image editing system 106 modifies the object 2008 to reflect the alternative object attribute associated with the alternative attribute indicator 2016b.

In one or more embodiments, the scene-based image editing system 106 utilizes a textual representation of the alternative object attribute in modifying the object 2008. For instance, as discussed above, the scene-based image editing system 106 provides the textual representation as textual input to an attribute modification neural network and utilizes the attribute modification neural network to output a modified digital image in which the object 2008 reflects the targeted change in its object attribute.

FIGS. 21A-21C illustrate another graphical user interface implemented by the scene-based image editing system 106 to facilitate modifying object attributes of objects portrayed in a digital image in accordance with one or more embodiments. As shown in FIG. 21A, the scene-based image editing system 106 provides a digital image 2106 portraying an object 2108 for display within a graphical user interface 2102 of a client device 2104. Further, upon detecting a user interaction with the object 2108, the scene-based image editing system 106 provides an attribute menu 2110 having attribute object indicators 2112a-2012c listing object attributes of the object 2108.

As shown in FIG. 21B, the scene-based image editing system 106 detects an additional user interaction with the object attribute indicator 2112b. In response to detecting the additional user interaction, the scene-based image editing system 106 provides a slider bar 2114 for display within the graphical user interface 2102. In one or more embodiments, the slider bar 2114 includes a slider element 2116 that indicates a degree to which the corresponding object attribute appears in the digital image 2106 (e.g., the strength or weakness of its presence in the digital image 2106).

As shown in FIG. 21C, the scene-based image editing system 106 detects a user interaction with the slider element 2116 of the slider bar 2114, increasing the degree to which the corresponding object attribute appears in the digital image. Accordingly, the scene-based image editing system 106 modifies the digital image 2106 by modifying the object 2108 to reflect the increased strength in the appearance of the corresponding object attribute.

In particular, in one or more embodiments, the scene-based image editing system 106 utilizes an attribute modification neural network to modify the digital image 2106 in accordance with the user interaction. Indeed, as described above with reference to FIG. 18, the scene-based image editing system 106 is capable of modifying the strength or weakness of the appearance of an object attribute via the coefficient α. Accordingly, in one or more embodiments, the scene-based image editing system 106 adjusts the coefficient α based on the positioning of the slider element 2116 via the user interaction.

By facilitating image modifications that target particular object attributes as described above, the scene-based image editing system 106 provides improved flexibility and efficiency when compared to conventional systems. Indeed, the scene-based image editing system 106 provides a flexible, intuitive approach that visually displays descriptions of an object's attributes and allows user input that interacts with those descriptions to change the attributes. Thus, rather than requiring tedious, manual manipulation of an object attribute as is typical under many conventional systems, the scene-based image editing system 106 allows user interactions to target object attributes at a high level of abstraction (e.g., without having to interact at the pixel level). Further, as scene-based image editing system 106 enables modifications to object attributes via relatively few user interactions with provided visual elements, the scene-based image editing system 106 implements a graphical user interface that provides improved efficiency.

As previously mentioned, in one or more embodiments, the scene-based image editing system 106 further uses a semantic scene graph generated for a digital image to implement relationship-aware object modifications. In particular, the scene-based image editing system 106 utilizes the semantic scene graph to inform the modification behaviors of objects portrayed in a digital image based on their relationships with one or more other objects in the digital image. FIGS. 22A-25D illustrate implementing relationship-aware object modifications in accordance with one or more embodiments.

Indeed, many conventional systems are inflexible in that they require different objects to be interacted with separately for modification. This is often the case even where the different objects are to be modified similarly (e.g., similarly resized or moved). For instance, conventional systems often require separate workflows to be executed via user interactions to modify separate objects or, at least, to perform the preparatory steps for the modification (e.g., outlining the objects and/or separating the objects from the rest of the image). Further, conventional systems typically fail to accommodate relationships between objects in a digital image when executing a modification. Indeed, these systems may modify a first object within a digital image but fail to execute a modification on a second object in accordance with a relationship between the two objects. Accordingly, the resulting modified image can appear unnatural or aesthetically confusing as it does not properly reflect the relationship between the two objects.

Accordingly, conventional systems are also often inefficient in that they require a significant number of user interactions to modify separate objects portrayed in a digital image. Indeed, as mentioned, conventional systems often require separate workflows to be performed via user interactions to execute many of the steps needed in modifying separate objects. Thus, many of the user interactions are redundant in that a user interaction is received, processed, and responded to multiple times for the separate objects. Further, when modifying an object having a relationship with another object, conventional systems require additional user interactions to modify the other object in accordance with that relationship. Thus, these systems unnecessarily duplicate the interactions used (e.g., interactions for moving an object then moving a related object) to perform separate modifications on related objects even where the relationship is suggestive as to the modification to be performed.

The scene-based image editing system 106 provides more flexibility and efficiency over conventional systems by implementing relationship-aware object modifications. Indeed, as will be discussed, the scene-based image editing system 106 provides a flexible, simplified process for selecting related objects for modification. Accordingly, the scene-based image editing system 106 flexibly allows user interactions to select and modify multiple objects portrayed in a digital image via a single workflow. Further, the scene-based image editing system 106 facilitates the intuitive modification of related objects so that the resulting modified image continues to reflect that relationship. As such, digital images modified by the scene-based image editing system 106 provide a more natural appearance when compared to conventional systems.

Further, by implementing a simplified process for selecting and modifying related objects, the scene-based image editing system 106 improves efficiency. In particular, the scene-based image editing system 106 implements a graphical user interface that reduces the user interactions required for selecting and modifying multiple, related objects. Indeed, as will be discussed, the scene-based image editing system 106 processes a relatively small number of user interactions with one object to anticipate, suggest, and/or execute modifications to other objects thus eliminating the need for additional user interactions for those modifications.

Figure 22A:
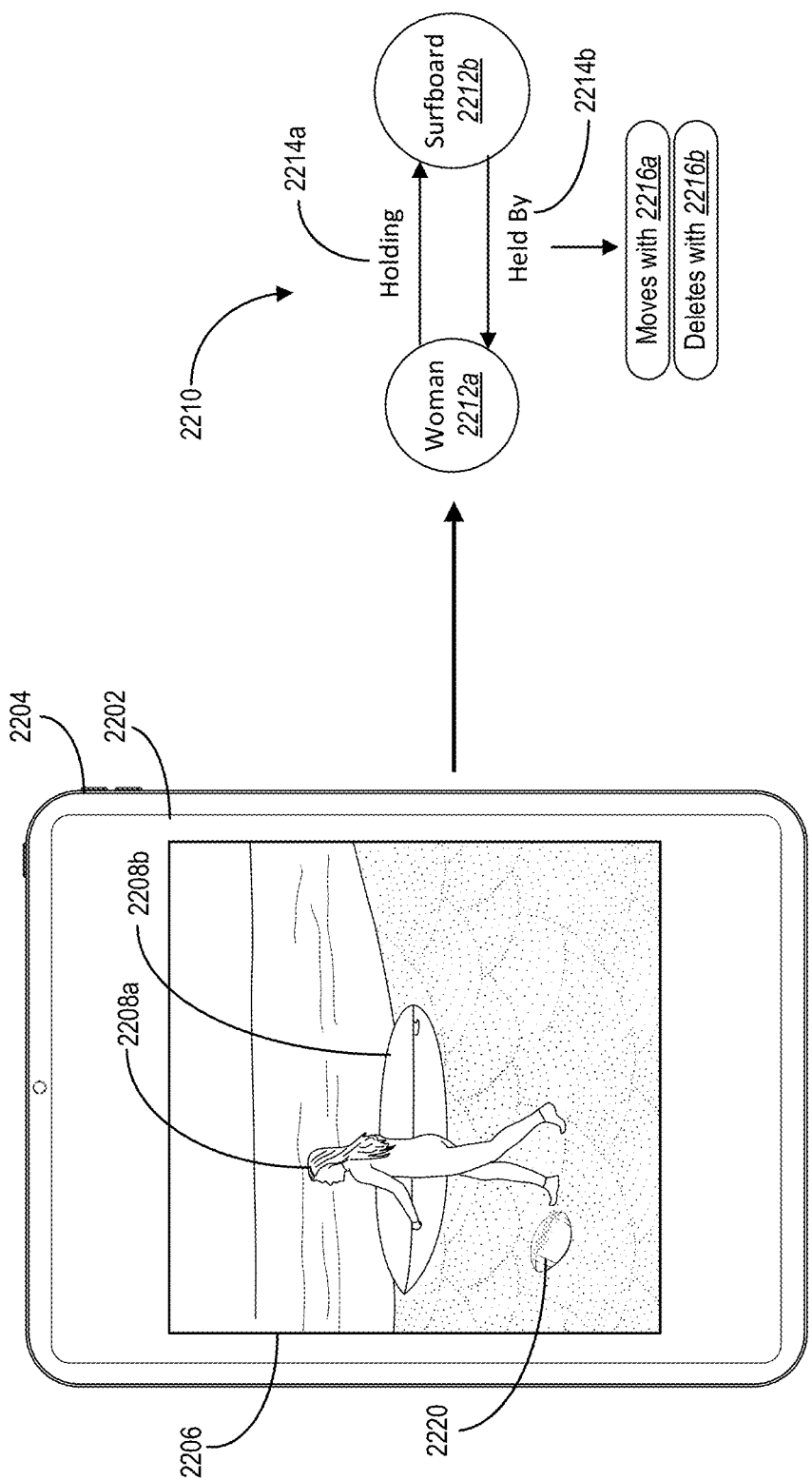

For instance, FIGS. 22A-22D illustrate a graphical user interface implemented by the scene-based image editing system 106 to facilitate a relationship-aware object modification in accordance with one or more embodiments. Indeed, as shown in FIG. 22A, the scene-based image editing system 106 provides, for display within a graphical user interface 2202 of a client device 2204, a digital image 2206 that portrays objects 2208a-2208b and object 2220. In particular, the digital image 2206 portrays a relationship between the objects 2208a-2208b in that the object 2208a is holding the object 2208b.

In one or more embodiments, the scene-based image editing system 106 references the semantic scene graph previously generated for the digital image 2206 to identify the relationship between the objects 2208a-2208b. Indeed, as previously discussed, in some cases, the scene-based image editing system 106 includes relationships among the objects of a digital image in the semantic scene graph generated for the digital image. For instance, in one or more embodiments, the scene-based image editing system 106 utilizes a machine learning model, such as one of the models (e.g., the clustering and subgraph proposal generation model) discussed above with reference to FIG. 15, to determine the relationships between objects. Accordingly, the scene-based image editing system 106 includes the determined relationships within the representation of the digital image in the semantic scene graph. Further, the scene-based image editing system 106 determines the relationship between the objects 2208a-2208b for inclusion in the semantic scene graph before receiving user interactions to modify either one of the objects 2208a-2208b.

Indeed, FIG. 22A illustrates a semantic scene graph component 2210 from a semantic scene graph of the digital image 2206. In particular, the semantic scene graph component 2210 includes a node 2212a representing the object 2208a and a node 2212b representing the object 2208b. Further, the semantic scene graph component 2210 includes relationship indicators 2214a-2214b associated with the nodes 2212a-2212b. The relationship indicators 2214a-2214b indicate the relationship between the objects 2208a-2208b in that the object 2208a is holding the object 2208b, and the object 2208b is conversely being held by the object 2208a.

As further shown, the semantic scene graph component 2210 includes behavior indicators 2216a-2216b associated with the relationship indicator 2214b. The behavior indicators 2216a-2216b assign a behavior to the object 2208b based on its relationship with the object 2208a. For instance, the behavior indicator 2216a indicates that, because the object 2208b is held by the object 2208a, the object 2208b moves with the object 2208a. In other words, the behavior indicator 2216a instructs the scene-based image editing system 106 to move the object 2208b (or at least suggest that the object 2208b be moved) when moving the object 2208a. In one or more embodiments, the scene-based image editing system 106 includes the behavior indicators 2216a-2216b within the semantic scene graph based on the behavioral policy graph used in generating the semantic scene graph. Indeed, in some cases, the behaviors assigned to a "held by" relationship (or other relationships) vary based on the behavioral policy graph used. Thus, in one or more embodiments, the scene-based image editing system 106 refers to a previously generated semantic scene graph to identify relationships between objects and the behaviors assigned based on those relationships.

It should be noted that the semantic scene graph component 2210 indicates that the behaviors of the behavior indicators 2216a-2216b are assigned to the object 2208b but not the object 2208a. Indeed, in one or more, the scene-based image editing system 106 assigns behavior to an object based on its role in the relationship. For instance, while it may be appropriate to move a held object when the holding object is moved, the scene-based image editing system 106 determines that the holding object does not have to move when the held object is moved in some embodiments. Accordingly, in some implementations, the scene-based image editing system 106 assigns different behaviors to different objects in the same relationship.

As shown in FIG. 22B, the scene-based image editing system 106 determines a user interaction selecting the object 2208a. For instance, the scene-based image editing system 106 determines that user interaction targets the object 2208a for modification. As further shown, the scene-based image editing system 106 provides a visual indication 2218 for display to indicate the selection of the object 2208a.

As illustrated by FIG. 22C, in response to detecting the user interaction selecting the object 2208a, the scene-based image editing system 106 automatically selects the object 2208b. For instance, in one or more embodiments, upon detecting the user interaction selecting the object 2208a, the scene-based image editing system 106 refers to the semantic scene graph generated for the digital image 2206 (e.g., the semantic scene graph component 2210 that corresponds to the object 2208a). Based on the information represented in the semantic scene graph, the scene-based image editing system 106 determines that there is another object in the digital image 2206 that has a relationship with the object 2208a. Indeed, the scene-based image editing system 106 determines that the object 2208a is holding the object 2208b. Conversely, the scene-based image editing system 106 determines that the object 2208b is held by the object 2208a.

Because the objects 2208a-2208b have a relationship, the scene-based image editing system 106 adds the object 2208b to the selection. As shown in FIG. 22C, the scene-based image editing system 106 modifies the visual indication 2218 of the selection to indicate that the object 2208b has been added to the selection. Though FIG. 22C illustrates an automatic selection of the object 2208b, in some cases, the scene-based image editing system 106 selects the object 2208b based on a behavior assigned to the object 2208b within the semantic scene graph in accordance with its relationship with the object 2208a. Indeed, in some cases, the scene-based image editing system 106 specifies when a relationship between objects leads to the automatic selection of one object upon the user selection of another object (e.g., via a "selects with" behavior). As shown in FIG. 22C, however, the scene-based image editing system 106 automatically selects the object 2208*b* by default in some instances.

In one or more embodiments, the scene-based image editing system 106 surfaces object masks for the object 2208*a* and the object 2208*b* based on their inclusion within the selection. Indeed, the scene-based image editing system 106 surfaces pre-generated object masks for the objects 2208*a*-2208*b* in anticipation of a modification to the objects 2208*a*-2208*b*. In some cases, the scene-based image editing system 106 retrieves the pre-generated object masks from the semantic scene graph for the digital image 2206 or retrieves a storage location for the pre-generated object masks. In either case, the object masks are readily available at the time the objects 2208*a*-2208*b* are included in the selection and before modification input has been received.

As further shown in FIG. 22C, the scene-based image editing system 106 provides an option menu 2222 for display within the graphical user interface 2202. In one or more embodiments, the scene-based image editing system 106 determines that at least one of the modification options from the option menu 222 would apply to both of the objects 2208*a*-2208*b* if selected. In particular, the scene-based image editing system 106 determines that, based on behavior assigned to the object 2208*b*, a modification selected for the object 2208*a* would also apply to the object 2208*b*.

Indeed, in one or more embodiments, in addition to determining the relationship between the objects 2208*a*-2208*b*, the scene-based image editing system 106 references the semantic scene graph for the digital image 2206 to determine the behaviors that have been assigned based on that relationship. In particular, the scene-based image editing system 106 references the behavior indicators associated with the relationship between the objects 2208*a*-2208*b* (e.g., the behavior indicators 2216*a*-2216*b*) to determine which behaviors are assigned to the objects 2208*a*-2208*b* based on their relationship. Thus, by determining the behaviors assigned to the object 2208*b*, the scene-based image editing system 106 determines how to respond to potential edits.

For instance, as shown in FIG. 22D, the scene-based image editing system 106 deletes the objects 2208*a*-2208*b* together. For instance, in some cases, the scene-based image editing system 106 deletes the objects 2208*a*-2208*b* in response to detecting a selection of the option 2224 presented within the option menu 2222. Accordingly, while the object 2208*a* was targeted for deletion via user interactions, the scene-based image editing system 106 includes the object 2208*b* in the deletion operation based on the behavior assigned to the object 2208*b* via the semantic scene graph (i.e., the "deletes with" behavior). Thus, in some embodiments, the scene-based image editing system 106 implements relationship-aware object modifications by deleting objects based on their relationships to other objects.

As previously suggested, in some implementations, the scene-based image editing system 106 only adds an object to a selection if its assigned behavior specifies that it should be selected with another object. At least, in some cases, the scene-based image editing system 106 only adds the object before receiving any modification input if its assigned behavior specifies that it should be selected with another object. Indeed, in some instances, only a subset of potential edits to a first object are applicable to a second object based on the behaviors assigned to that second object. Thus, including the second object in the selection of the first object before receiving modification input risks violating the rules set forth by the behavioral policy graph via the semantic scene graph if there is not a behavior providing for automatic selection. To avoid this risk, in some implementations, the scene-based image editing system 106 waits until modification input has been received before determining whether to add the second object to the selection. In one or more embodiments, however—as suggested by FIGS. 22A-22D—the scene-based image editing system 106 automatically adds the second object upon detecting a selection of the first object. In such embodiments, the scene-based image editing system 106 deselects the second object upon determining that a modification to the first object does not apply to the second object based on the behaviors assigned to the second object.

As further shown in FIG. 22D, the object 2220 remains in the digital image 2206. Indeed, the scene-based image editing system 106 did not add the object 2220 to the selection in response to the user interaction with the object 2208*a*, nor did it delete the object 2220 along with the objects 2208*a*-2208*b*. For instance, upon referencing the semantic scene graph for the digital image 2206, the scene-based image editing system 106 determines that there is not a relationship between the object 2220 and either of the objects 2208*a*-2208*b* (at least, there is not a relationship that applies in this scenario). Thus, the scene-based image editing system 106 enables user interactions to modify related objects together while preventing unrelated objects from being modified without more targeted user interactions.

Additionally, as shown in FIG. 22D, the scene-based image editing system 106 reveals content fill 2226 within the digital image 2206 upon removing the objects 2208*a*-2208*b*. In particular, upon deleting the objects 2208*a*-2208*b*, the scene-based image editing system 106 exposes a content fill previously generated for the object 2208*a* as well as a content fill previously generated for the object 2208*b*. Thus, the scene-based image editing system 106 facilitates seamless modification of the digital image 2206 as if it were a real scene.

FIGS. 23A-23C illustrate another graphical user interface implemented by the scene-based image editing system 106 to facilitate a relationship-aware object modification in accordance with one or more embodiments. Indeed, as shown in FIG. 23A, the scene-based image editing system 106 provides, for display within a graphical user interface 2302 of a client device 2304, a digital image 2306 that portrays objects 2308*a*-2308*b* and object 2320. In particular, the digital image 2306 portrays a relationship between the objects 2308*a*-2308*b* in that the object 2308*a* is holding the object 2308*b*.

As further shown in FIG. 23A, the scene-based image editing system 106 detects a user interaction selecting the object 2308*a*. In response to detecting the user interaction, the scene-based image editing system 106 provides a suggestion that the object 2308*b* be added to the selection. In particular, the scene-based image editing system 106 provides a text box 2310 asking if the user wants the object 2308*b* to be added to the selection and provides an option 2312 for agreeing to add the object 2308*b* and an option 2314 for declining to add the object 2308*b*.

In one or more embodiments, the scene-based image editing system 106 provides the suggestion for adding the object 2308*b* to the selection based on determining the relationship between the objects 2308*a*-2308*b* via the semantic scene graph generated for the digital image 2306. In some cases, the scene-based image editing system 106 further provides the suggestion for adding the object 2308*b* based on the behaviors assigned to the object 2308*b* based on that relationship.

As suggested by FIG. 23A, the scene-based image editing system 106 does not suggest adding the object 2320 to the selection. Indeed, in one or more embodiments, based on referencing the semantic scene graph, the scene-based image editing system 106 determines that there is no relationship between the object 2320 and either of the objects 2308a-2308b (at least, that there is not a relevant relationship). Accordingly, the scene-based image editing system 106 determines to omit the object 2320 from the suggestion.

As shown in FIG. 23B, the scene-based image editing system 106 adds the object 2308b to the selection. In particular, in response to receiving a user interaction with the option 2312 for agreeing to add the object 2308b, the scene-based image editing system 106 adds the object 2308b to the selection. As shown in FIG. 23B, the scene-based image editing system 106 modifies a visual indication 2316 of the selection to indicate that the object 2308b has been added to the selection along with the object 2308a.

As illustrated in FIG. 23C, the scene-based image editing system 106 modifies the digital image 2306 by moving the object 2308a within the digital image 2306 in response to detecting one or more additional user interactions. Further, the scene-based image editing system 106 moves the object 2308b along with the object 2308a based on the inclusion of the object 2308b in the selection. Accordingly, the scene-based image editing system 106 implements a relationship-aware object modification by moving objects based on their relationship to other objects.

Figures 24A, 24B, 24C:
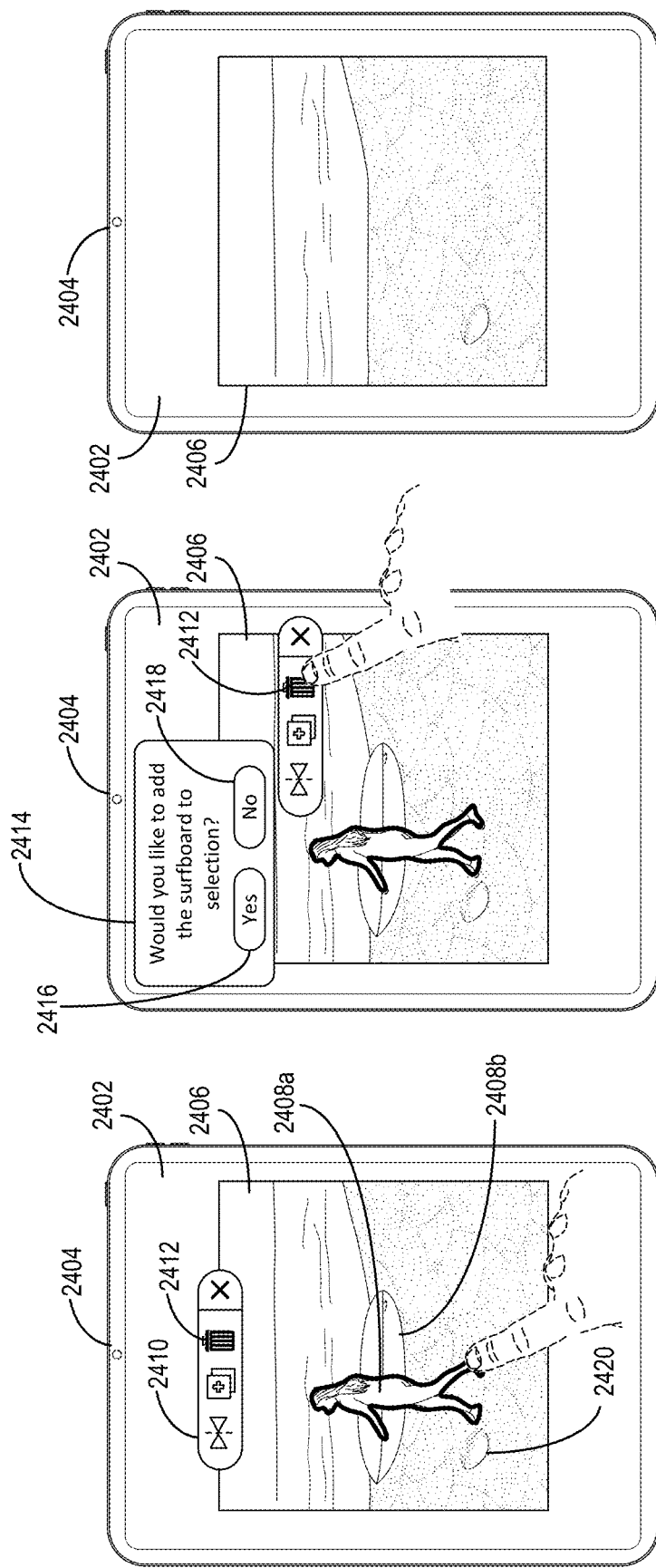
FIGS. 24A-24C illustrate yet another graphical user interface implemented by the scene-based image editing system to facilitate a relationship-aware object modification in accordance with one or more embodiments.

FIGS. 24A-24C illustrate yet another graphical user interface implemented by the scene-based image editing system 106 to facilitate a relationship-aware object modification in accordance with one or more embodiments. Indeed, as shown in FIG. 24A, the scene-based image editing system 106 provides, for display within a graphical user interface 2402 of a client device 2404, a digital image 2406 that portrays objects 2408a-2408b and an object 2420. In particular, the digital image 2406 portrays a relationship between the objects 2408a-2408b in that the object 2408a is holding the object 2408b.

As shown in FIG. 24A, the scene-based image editing system 106 detects a user interaction with the object 2408a. In response to detecting the user interaction, the scene-based image editing system 106 provides an option menu 2410 for display within the graphical user interface 2402. As illustrated, the option menu 2410 includes an option 2412 for deleting the object 2408a.

As shown in FIG. 24B, the scene-based image editing system 106 detects an additional user interaction with the option 2412 for deleting the object 2408a. In response to detecting the additional user interaction, the scene-based image editing system 106 provides, for display, a suggestion for adding the object 2408b to the selection via a text box 2414 asking if the user wants the object 2408b to be added to the selection, an option 2416 for agreeing to add the object 2408b, and an option 2418 for declining to add the object 2308b.

Indeed, as mentioned above, in one or more embodiments, the scene-based image editing system 106 waits upon receiving input to modify a first object before suggesting adding a second object (or automatically adding the second object). Accordingly, the scene-based image editing system 106 determines whether a relationship between the objects and the pending modification indicate that the second object should be added before including the second object in the selection.

To illustrate, in one or more embodiments, upon detecting the additional user interaction with the option 2412, the scene-based image editing system 106 references the semantic scene graph for the digital image 2406. Upon referencing the semantic scene graph, the scene-based image editing system 106 determines that the object 2408a has a relationship with the object 2408b. Further, the scene-based image editing system 106 determines that the behaviors assigned to the object 2408b based on that relationship indicate that the object 2408b should be deleted with the object 2408a. Accordingly, upon receiving the additional user interaction for deleting the object 2408a, the scene-based image editing system 106 determines that the object 2408b should also be deleted and then provides the suggestion to add the object 2408b (or automatically adds the object 2408b) to the selection.

As shown in FIG. 24C, the scene-based image editing system 106 deletes the object 2408a and the object 2408b from the digital image 2406 together. In particular, in response to detecting a user interaction with the option 2416 for adding the object 2408b to the selection, the scene-based image editing system 106 adds the object 2408b and executes the delete operation. In one or more embodiments, upon detecting a user interaction with the option 2418 to decline adding the object 2408b, the scene-based image editing system 106 omits the object 2408b from the selection and only deletes the object 2408a.

Though the above specifically discusses moving objects or deleting objects based on their relationships with other objects, it should be noted that the scene-based image editing system 106 implements various other types of relationship-aware object modifications in various embodiments. For example, in some cases, the scene-based image editing system 106 implements relationship-aware object modifications via resizing modifications, recoloring or retexturing modifications, or compositions. Further, as previously suggested, the behavioral policy graph utilized by the scene-based image editing system 106 is configurable in some embodiments. Thus, in some implementations, the relationship-aware object modifications implemented by the scene-based image editing system 106 change based on user preferences.

In one or more embodiments, in addition to modifying objects based on relationships as described within a behavioral policy graph that is incorporated into a semantic scene graph, the scene-based image editing system 106 modifies objects based on classification relationships. In particular, in some embodiments, the scene-based image editing system 106 modifies objects based on relationships as described by a real-world class description graph that is incorporated into a semantic scene graph. Indeed, as previously discussed, a real-world class description graph provides a hierarchy of object classifications for objects that may be portrayed in a digital image. Accordingly, in some implementations, the scene-based image editing system 106 modifies objects within digital images based on their relationship with other objects via their respective hierarchy of object classifications. For instance, in one or more embodiments, the scene-based image editing system 106 adds objects to a selection for modification based on their relationships with other objects via their respective hierarchy of object classifications. FIGS. 25A-25D illustrate a graphical user interface implemented by the scene-based image editing system 106 to add objects to a selection for modification based on classification relationships in accordance with one or more embodiments.

Figure 25A:
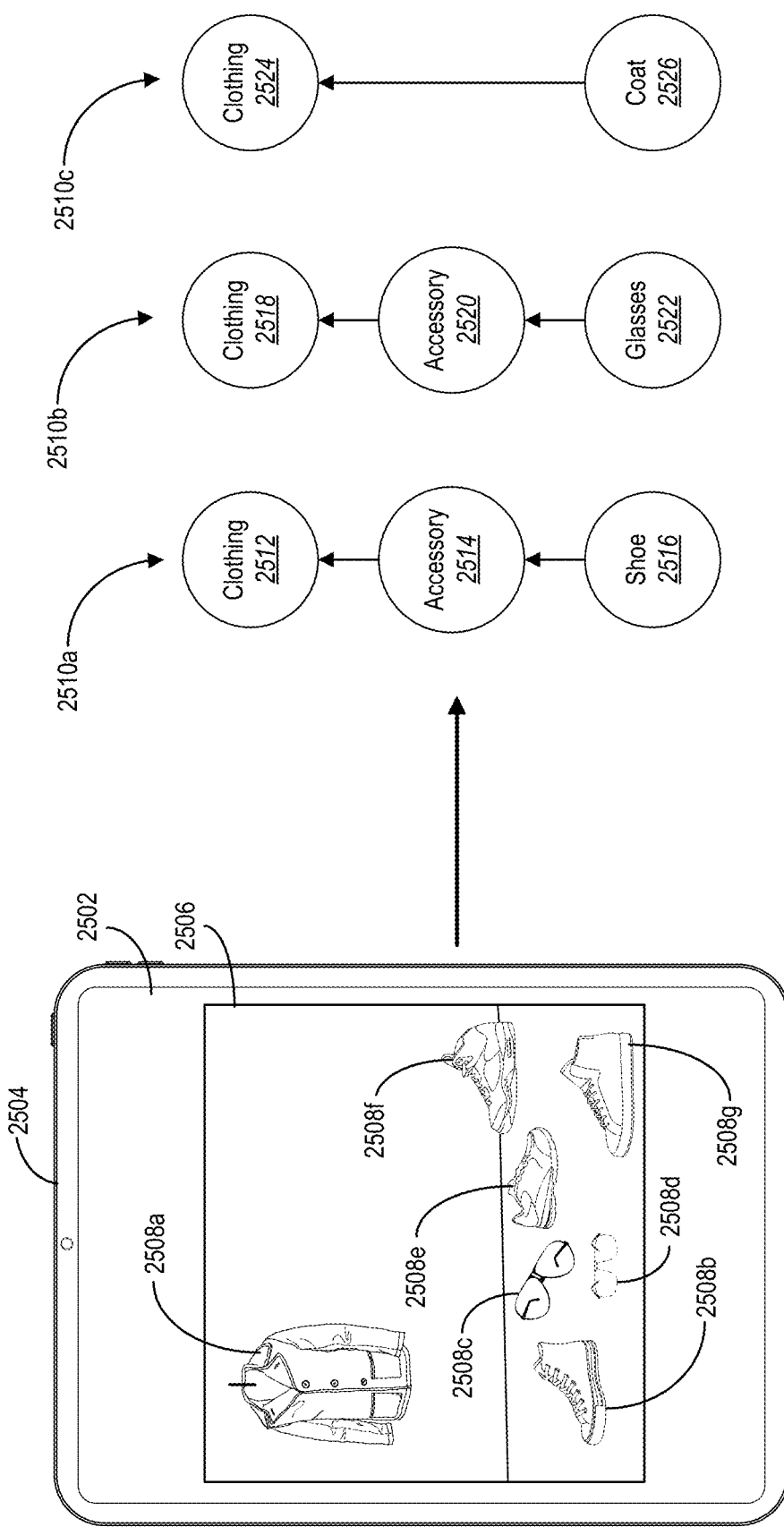
FIGS. 25A-25D illustrate a graphical user interface implemented by the scene-based image editing system to add objects to a selection for modification based on classification relationships in accordance with one or more embodiments.

In particular, FIG. 25A illustrates the scene-based image editing system 106 providing, for display in a graphical user interface 2502 of a client device 2504, a digital image 2506 portraying a plurality of objects 2508a-2508g. In particular, as shown the objects 2508a-2508g include various items, such as shoes, pairs of glasses, and a coat.

FIG. 25A further illustrates semantic scene graph components 2510a-2510c from a semantic scene graph of the digital image 2506. Indeed, the semantic scene graph components 2510a-2510c include portions of a semantic scene graph providing a hierarchy of object classifications for each of the objects 2508a-2508g. Alternatively, in some cases, the semantic scene graph components 2510a-2510c represent portions of the real-world class description graph used in making the semantic scene graph.

As shown in FIG. 25A, the semantic scene graph component 2510a includes a node 2512 representing a clothing class, a node 2514 representing an accessory class, and a node 2516 representing a shoe class. As further shown, the accessory class is a subclass of the clothing class, and the shoe class is a subclass of the accessory class. Similarly, the semantic scene graph component 2510b includes a node 2518 representing the clothing class, a node 2520 representing the accessory class, and a node 2522 representing a glasses class, which is a subclass of the accessory class. Further, the semantic scene graph component 2510c includes a node 2524 representing the clothing class and a node 2526 representing a coat class, which is another subclass of the clothing class. Thus, the semantic scene graph components 2510a-2510c provide various classifications that apply to each of the objects 2508a-2508g. In particular, the semantic scene graph component 2510a provides a hierarchy of object classifications associated with the shoes presented in the digital image 2506, the semantic scene graph component 2510b provides a hierarchy of object classifications associated with the pairs of glasses, and the semantic scene graph component 2510c provides a hierarchy of object classifications associated with the coat.

Figure 25C:
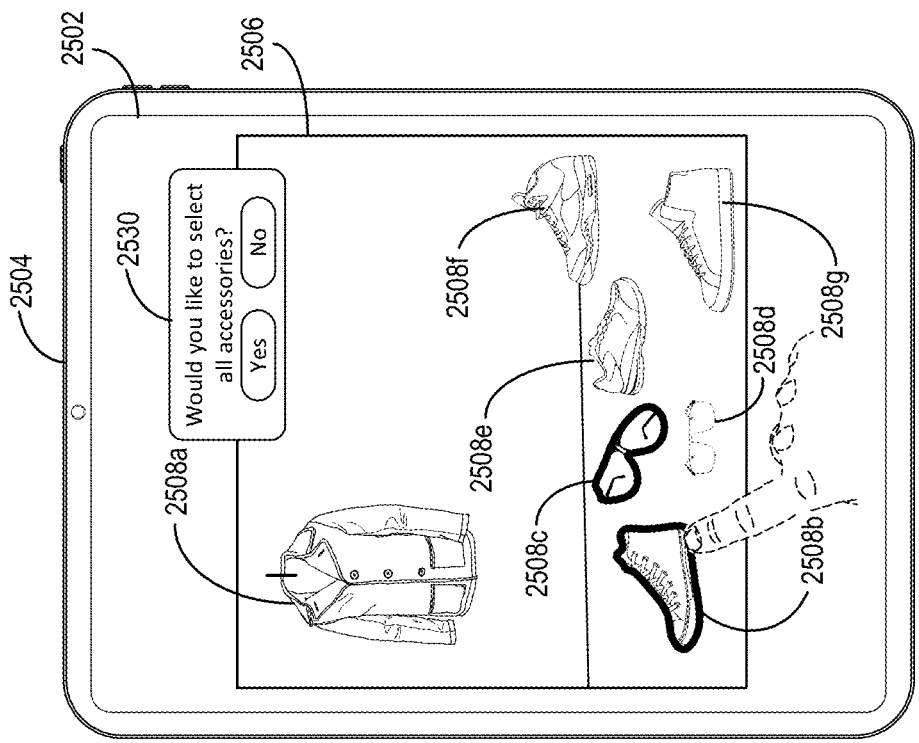
Figure 25B:
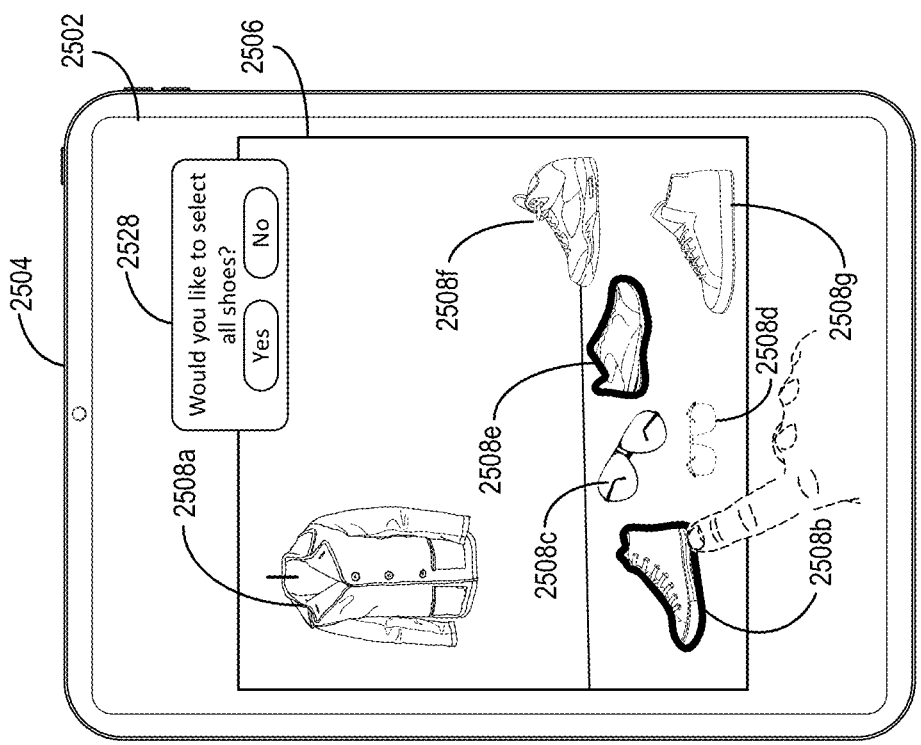

As shown in FIG. 25B, the scene-based image editing system 106 detects a user interaction selecting the object 2508e. Further, the scene-based image editing system 106 detects a user interaction selecting the object 2508b. As further shown, in response to detecting the selection of the object 2508b and the object 2508e, the scene-based image editing system 106 provides a text box 2528 suggesting all shoes in the digital image 2506 be added to the selection.

To illustrate, in some embodiments, in response to detecting the selection of the object 2508b and the object 2508e, the scene-based image editing system 106 references the semantic scene graph generated for the digital image 2506 (e.g., the semantic scene graph components that are associated with the object 2508b and the object 2508e). Based on referencing the semantic scene graph, the scene-based image editing system 106 determines that the object 2508b and the object 2508e are both part of the shoe class. Thus, the scene-based image editing system 106 determines that there is a classification relationship between the object 2508b and the object 2508e via the shoe class. In one or more embodiments, based on determining that the object 2508b and the object 2508e are both part of the shoe class, the scene-based image editing system 106 determines that the user interactions providing the selections are targeting all shoes within the digital image 2506. Thus, the scene-based image editing system 106 provides the text box 2528 suggesting adding the other shoes to the selection. In one or more embodiments, upon receiving a user interaction accepting the suggestion, the scene-based image editing system 106 adds the other shoes to the selection.

Similarly, as shown in FIG. 25C, the scene-based image editing system 106 detects a user interaction selecting the object 2508c and another user interaction selecting the object 2508b. In response to detecting the user interactions, the scene-based image editing system 106 references the semantic scene graph generated for the digital image 2506. Based on referencing the semantic scene graph, the scene-based image editing system 106 determines that the object 2508b is part of the shoe class, which is a subclass of the accessory class. In other words, the scene-based image editing system 106 determines that the object 2508b is part of the accessory class. Likewise, the scene-based image editing system 106 determines that the object 2508c is part of the glasses class, which is a subclass of the accessory class. Thus, the scene-based image editing system 106 determines that there is a classification relationship between the object 2508b and the object 2508c via the accessory class. As shown in FIG. 25C, based on determining that the object 2508b and the object 2508c are both part of the accessory class, the scene-based image editing system 106 provides a text box 2530 suggesting adding all other accessories portrayed in the digital image 2506 (e.g., the other shoes and pairs of glasses) to the selection.

Figure 25D:
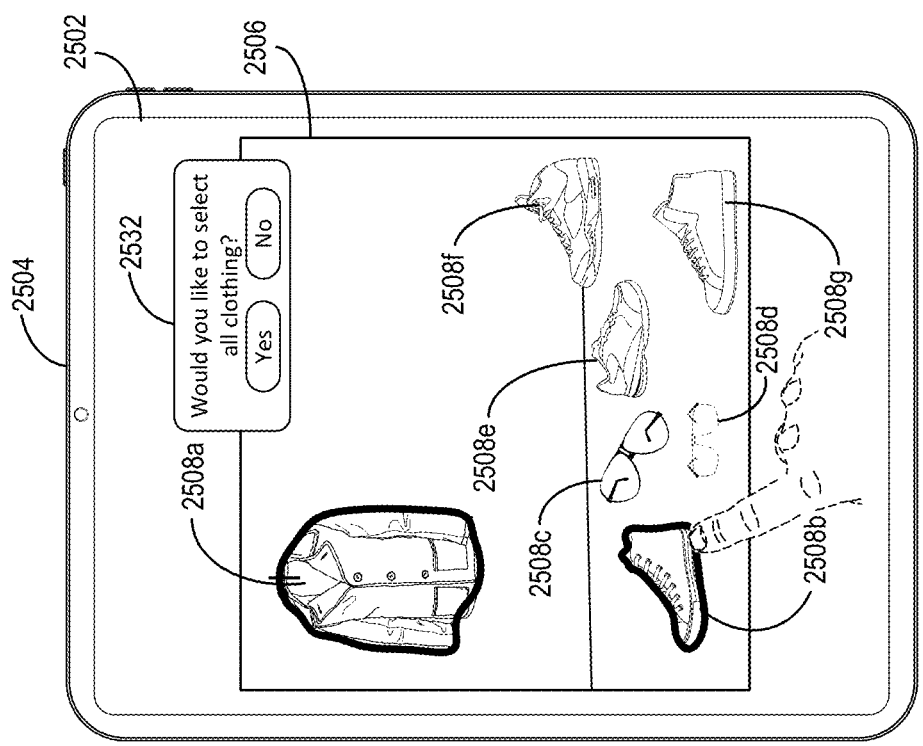

Further, as shown in FIG. 25D, the scene-based image editing system 106 detects a user interaction selecting the object 2508a and another user interaction selecting the object 2508b. In response to detecting the user interactions, the scene-based image editing system 106 references the semantic scene graph generated for the digital image 2506. Based on referencing the semantic scene graph, the scene-based image editing system 106 determines that the object 2508b is part of the shoe class, which is a subclass of the accessory class that is a subclass of the clothing class. Similarly, the scene-based image editing system 106 determines that the object 2508a is part of the coat class, which is also a subclass of the clothing class. Thus, the scene-based image editing system 106 determines that there is a classification relationship between the object 2508b and the object 2508a via the clothing class. As shown in FIG. 25D, based on determining that the object 2508b and the object 2508a are both part of the clothing class, the scene-based image editing system 106 provides a text box 2532 suggesting adding all other clothing items portrayed in the digital image 2506 to the selection.

Thus, in one or more embodiments, the scene-based image editing system 106 anticipates the objects that are targeted user interactions and facilitates quicker selection of those objects based on their classification relationships. In some embodiments, upon selection of multiple objects via provided suggestions, the scene-based image editing system 106 modifies the selected objects in response to additional user interactions. Indeed, the scene-based image editing system 106 modifies the selected objects together. Thus, the scene-based image editing system 106 implements a graphical user interface that provides a more flexible and efficient approach to selecting and modifying multiple related objects using reduced user interactions.

Indeed, as previously mentioned, the scene-based image editing system 106 provides improved flexibility and efficiency when compared to conventional systems. For instance, by selecting (e.g., automatically or via suggestion) objects based on the selection of related objects, the scene-based image editing system 106 provides a flexible method of targeting multiple objects for modification. Indeed, the scene-based image editing system 106 flexibly identifies the related objects and includes them with the selection. Accordingly, the scene-based image editing system 106 implements a graphical user interface that reduces user interactions typically required under conventional system for selecting and modifying multiple objects.

In one or more embodiments, the scene-based image editing system 106 further pre-processes a digital image to aid in the removal of distracting objects. In particular, the scene-based image editing system 106 utilizes machine learning to identify objects in a digital image, classify one or more of the objects as distracting objects, and facilitate the removal of the distracting objects to provide a resulting image that is more visually cohesive and aesthetically pleasing. Further, in some cases, the scene-based image editing system 106 utilizes machine learning to facilitate the removal of shadows associated with distracting objects. FIGS. 26-39C illustrate diagrams of the scene-based image editing system 106 identifying and removing distracting objects and their shadows from digital images in accordance with one or more embodiments.

Many conventional systems are inflexible in the methods they use for removing distracting human in that they strip control away from users. For instance, conventional systems often remove humans they have classified as distracting automatically. Thus, when a digital image is received, such systems fail to provide the opportunity for user interactions to provide input regarding the removal process. For example, these systems fail to allow user interactions to remove human from the set of humans identified for removal.

Additionally, conventional systems typically fail to flexibly remove all types of distracting objects. For instance, many conventional systems fail to flexibly remove shadows cast by distracting objects and non-human objects. Indeed, while some existing systems identify and remove distracting humans from a digital image, these systems often fail to identify shadows cast by humans or other objects within the digital image. Accordingly, the resulting digital image will still include the influence of a distracting human as its shadow remains despite the distracting human itself being removed. This further causes these conventional systems to require additional user interactions to identify and remove these shadows.

The scene-based image editing system 106 addresses these issues by providing more user control in the removal process while reducing the interactions typically required to delete an object from a digital image. Indeed, as will be explained below, the scene-based image editing system 106 presents identified distracting objects for display as a set of objects selected for removal. The scene-based image editing system 106 further enables user interactions to add objects to this set, remove objects from the set, and/or determine when the selected objects are deleted. Thus, the scene-based image editing system 106 employs a flexible workflow for removing distracting objects based on machine learning and user interactions.

Further, the scene-based image editing system 106 flexibly identifies and removes shadows associated with distracting objects within a digital image. By removing shadows associated with distracting objects, the scene-based image editing system 106 provides a better image result in that distracting objects and additional aspects of their influence within a digital image are removed. This allows for reduced user interaction when compared to conventional systems as the scene-based image editing system 106 does not require additional user interactions to identify and remove shadows.

Figure 26:
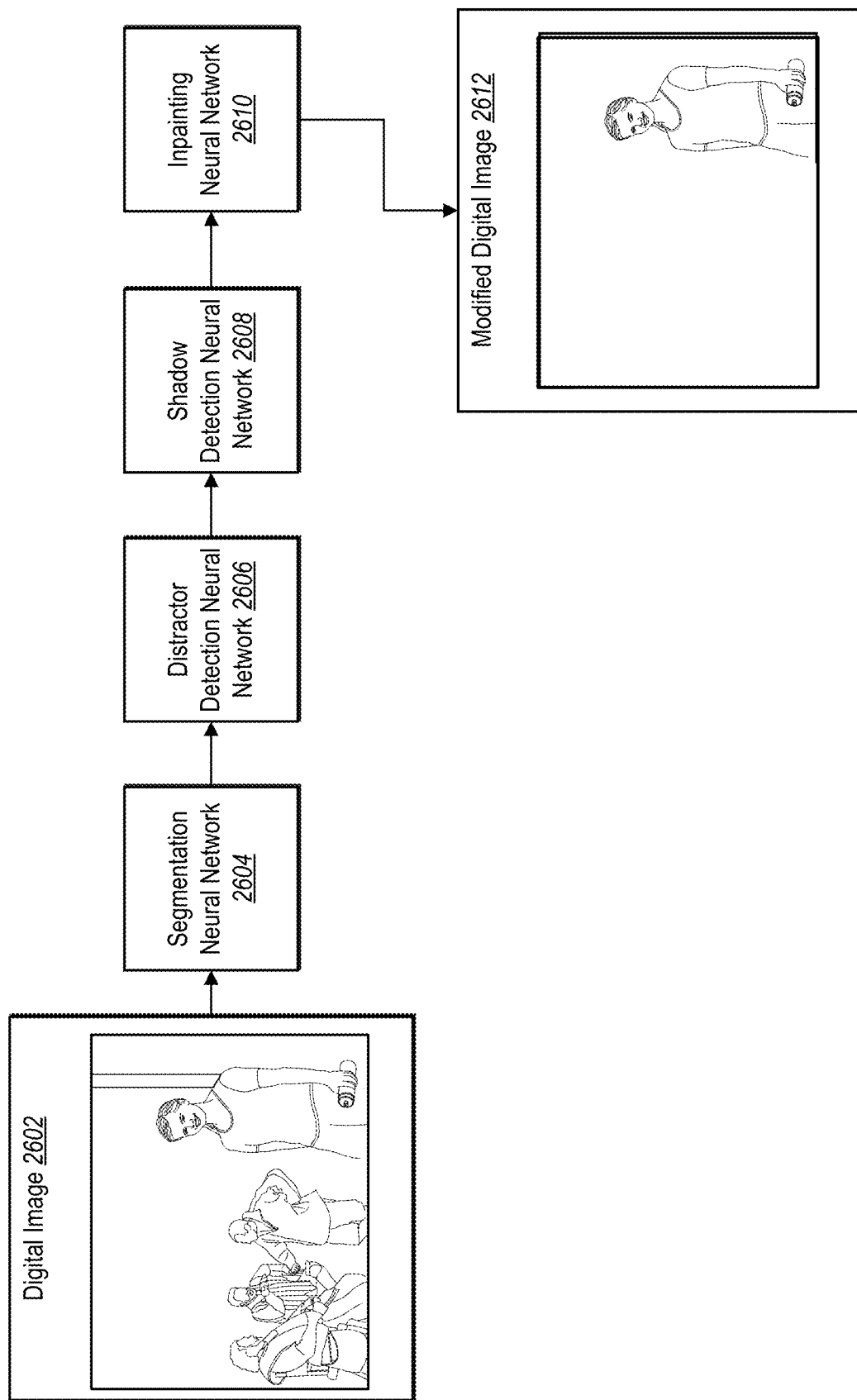
FIG. 26 illustrates a neural network pipeline utilized by the scene-based image editing system to identify and remove distracting objects from a digital image in accordance with one or more embodiments.

FIG. 26 illustrates a neural network pipeline utilized by the scene-based image editing system 106 to identify and remove distracting objects from a digital image in accordance with one or more embodiments. Indeed, as shown in FIG. 26, the scene-based image editing system 106 receives a digital image 2602 that portrays a plurality of objects. As illustrated, the scene-based image editing system 106 provides the digital image 2602 to a pipeline of neural networks comprising a segmentation neural network 2604, a distractor detection neural network 2606, a shadow detection neural network 2608, and an inpainting neural network 2610.

In one or more embodiments, the scene-based image editing system 106 utilizes, as the segmentation neural network 2604, one of the segmentation neural networks discussed above (e.g., the detection-masking neural network 300 discussed with reference to FIG. 3). In some embodiments, the scene-based image editing system 106 utilizes, as the inpainting neural network 2610, one of the content-aware machine learning models discussed above (e.g., the cascaded modulation inpainting neural network 420 discussed with reference to FIG. 4). The distractor detection neural network 2606 and the shadow detection neural network 2608 will be discussed in more detail below.

As shown in FIG. 26, the scene-based image editing system 106 utilizes the pipeline of neural networks to generate a modified digital image 2612 from the digital image 2602. In particular, the scene-based image editing system 106 utilizes the pipeline of neural networks to identify and remove distracting objects from the digital image 2602. In particular, the scene-based image editing system 106 generates an object mask for the objects in the digital image utilizing the segmentation neural network 2604. The scene-based image editing system 106 determines a classification for the objects of the plurality of objects utilizing the distractor detection neural network 2606. More specifically, the scene-based image editing system 106 assigns each object a classification of main subject object or distracting object. The scene-based image editing system 106 removes distracting objects from the digital image utilizing the object masks. Further, the scene-based image editing system 106 utilizes inpainting neural network 2610 to generate content fill for the portions of the digital image 2602 from which the distracting objects were removed to generate the modified digital image 2612. As shown, the scene-based image editing system 106 deletes a plurality of different types of distracting objects (multiple men and a pole). Indeed, the scene-based image editing system 106 is robust enough to identify non-human objects as distracting (e.g., the pole behind the girl).

In one or more embodiments, the scene-based image editing system 106 utilizes a subset of the neural networks shown in FIG. 26 to generate a modified digital image. For instance, in some cases, the scene-based image editing system 106 utilizes the segmentation neural network 2604, the distractor detection neural network 2606, and the content fill 210 to generate a modified digital image from a digital image. Further, in some cases, the scene-based image editing system 106 utilizes a different ordering of the neural networks than what is shown.

Figure 27:
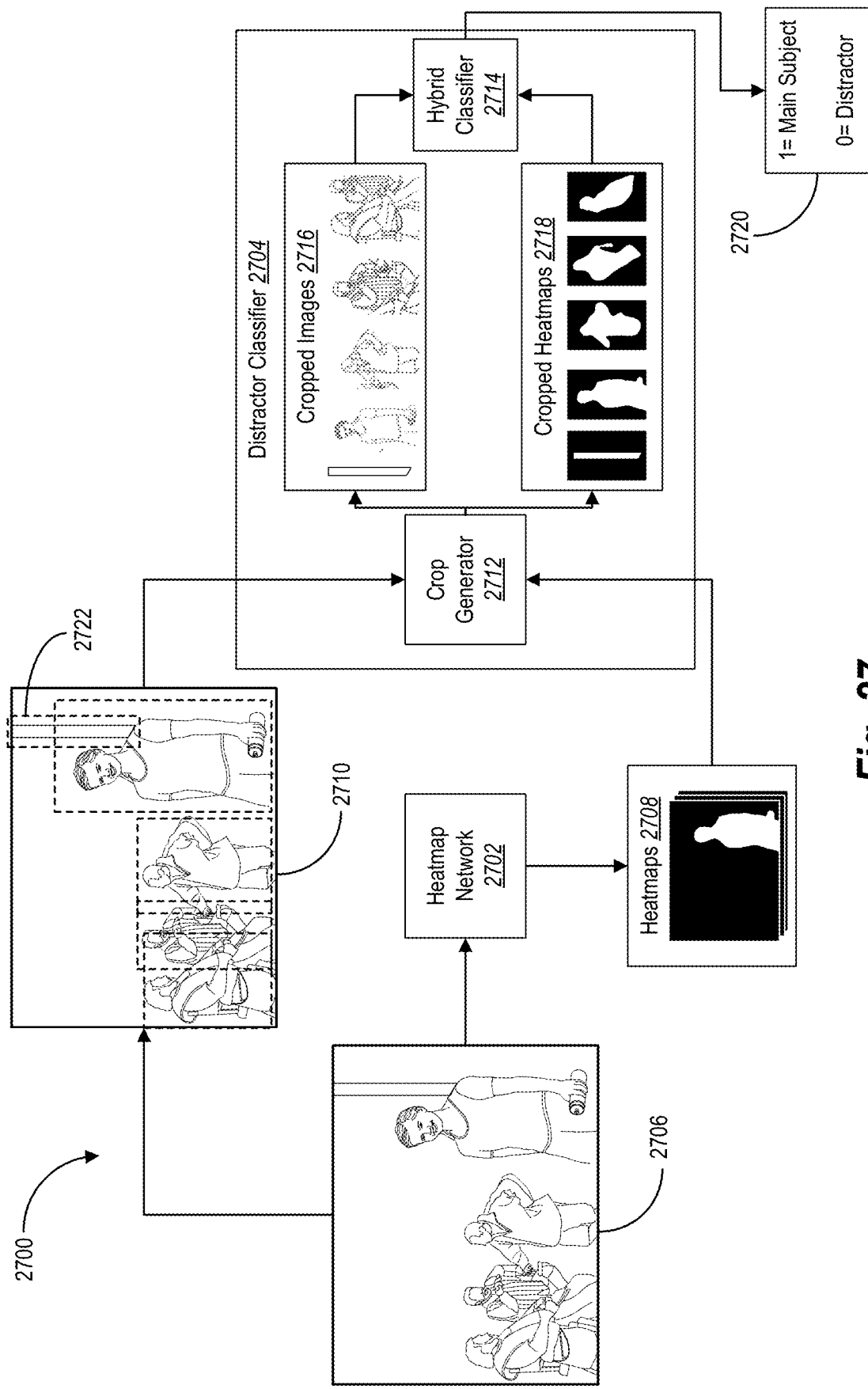
FIG. 27 illustrates an architecture of a distractor detection neural network utilized by the scene-based image editing system to identify and classify distracting objects in of a digital image in accordance with one or more embodiments.

FIG. 27 illustrates an architecture of a distractor detection neural network 2700 utilized by the scene-based image editing system 106 to identify and classify distracting objects in of a digital image in accordance with one or more embodiments. As shown in FIG. 27, the distractor detection neural network 2700 includes a heatmap network 2702 and a distractor classifier 2704.

As illustrated, the heatmap network 2702 operates on an input image 2706 to generate heatmaps 2708. For instance, in some cases, the heatmap network 2702 generates a main subject heatmap representing possible main subject objects and a distractor heatmap representing possible distracting objects. In one or more embodiments, a heatmap (also referred to as a class activation map) includes a prediction made by a convolutional neural network that indicates a probability value, on a scale of zero to one, that a specific pixel of an image belongs to a particular class from a set of classes. As opposed to object detection, the goal of a heatmap network is to classify individual pixels as being part of the same region in some instances. In some cases, a region includes an area of a digital image where all pixels are of the same color or brightness.

In at least one implementation, the scene-based image editing system 106 trains the heatmap network 2702 on whole images, including digital images where there are no distracting objects and digital images that portray main subject objects and distracting objects.

In one or more embodiments, the heatmap network 2702 identifies features in a digital image that contribute to a conclusion that that a given region is more likely to be a distracting object or more likely to be a main subject object, such as body posture and orientation. For instance, in some cases, the heatmap network 2702 determines that objects with slouching postures as opposed to standing at attention postures are likely distracting objects and also that objects facing away from the camera are likely to be distracting objects. In some cases, the heatmap network 2702 considers other features, such as size, intensity, color, etc.

In some embodiments, the heatmap network 2702 classifies regions of the input image 2706 as being a main subject or a distractor and outputs the heatmaps 2708 based on the classifications. For example, in some embodiments, the heatmap network 2702 represents any pixel determined to be part of a main subject object as white within the main subject heatmap and represents any pixel determined to not be part of a main subject object as black (or vice versa). Likewise, in some cases, the heatmap network 2702 represents any pixel determined to be part of a distracting object as white within the distractor heatmap while representing any pixel determined to not be part of a distracting object as black (or vice versa).

In some implementations, the heatmap network 2702 further generates a background heatmap representing a possible background as part of the heatmaps 2708. For instance, in some cases, the heatmap network 2702 determines that the background includes areas that are not part of a main subject object or a distracting object. In some cases, the heatmap network 2702 represents any pixel determined to be part of the background as white within the background heatmap while representing any pixel determined to not be part of the background as black (or vice versa).

In one or more embodiments, the distractor detection neural network 2700 utilizes the heatmaps 2708 output by the heatmap network 2702 as a prior to the distractor classifier 2704 to indicate a probability that a specific region of the input image 2706 contains a distracting object or a main subject object.

In one or more embodiments, the distractor detection neural network 2700 utilizes the distractor classifier 2704 to consider the global information included in the heatmaps 2708 and the local information included in one or more individual objects 2710. To illustrate, in some embodiments, the distractor classifier 2704 generates a score for the classification of an object. If an object in a digital image appears to be a main subject object based on the local information, but the heatmaps 2708 indicate with a high probability that the object is a distracting object, the distractor classifier 2704 concludes that the object is indeed a distracting object in some cases. On the other hand, if the heatmaps 2708 point toward the object being a main subject object, the distractor classifier 2704 determines that the object has been confirmed as a main subject object.

As shown in FIG. 27, the distractor classifier 2704 includes a crop generator 2712 and a hybrid classifier 2714. In one or more embodiments, the distractor classifier 2704 receives one or more individual objects 2710 that have been identified from the input image 2706. In some cases, the one or more individual objects 2710 are identified via user annotation or some object detection network (e.g., the object detection machine learning model 308 discussed above with reference to FIG. 3).

As illustrated by FIG. 27, the distractor classifier 2704 utilizes the crop generator 2712 to generate cropped images 2716 by cropping the input image 2706 based on the locations of the one or more individual objects 2710. For instance, where there are three object detections in the input image 2706, the crop generator 2712 generates three cropped images-one for each detected object. In one or more embodiments, the crop generator 2712 generates a cropped image by removing all pixels of the input image 2706 outside the location of the corresponding inferred bounding region.

As further shown, the distractor classifier 2704 also utilizes the crop generator 2712 to generate cropped heatmaps 2718 by cropping the heatmaps 2708 with respect to each detected object. For instance, in one or more embodiments, the crop generator 2712 generates—from each of the main subject heatmap, the distractor heatmap, and the background heatmap-one cropped heatmap for each of the detected objects based on a region within the heatmaps corresponding to the location of the detected objects.

In one or more embodiments, for each of the one or more individual objects 2710, the distractor classifier 2704 utilizes the hybrid classifier 2714 to operate on a corresponding cropped image (e.g., its features) and corresponding cropped heatmaps (e.g., their features) to determine whether the object is a main subject object or a distracting object. To illustrate, in some embodiments, for a detected object, the hybrid classifier 2714 performs an operation on the cropped image associated with the detected object and the cropped heatmaps associated with the detected object (e.g., the cropped heatmaps derived from the heatmaps 2708 based on a location of the detected object) to determine whether the detected object is a main subject object or a distracting object. In one or more embodiments, the distractor classifier 2704 combines the features of the cropped image for a detected object with the features of the corresponding cropped heatmaps (e.g., via concatenation or appending the features) and provides the combination to the hybrid classifier 2714. As shown in FIG. 27, the hybrid classifier 2714 generates, from its corresponding cropped image and cropped heatmaps, a binary decision 2720 including a label for a detected object as a main subject object or a distracting object.

Figure 28:
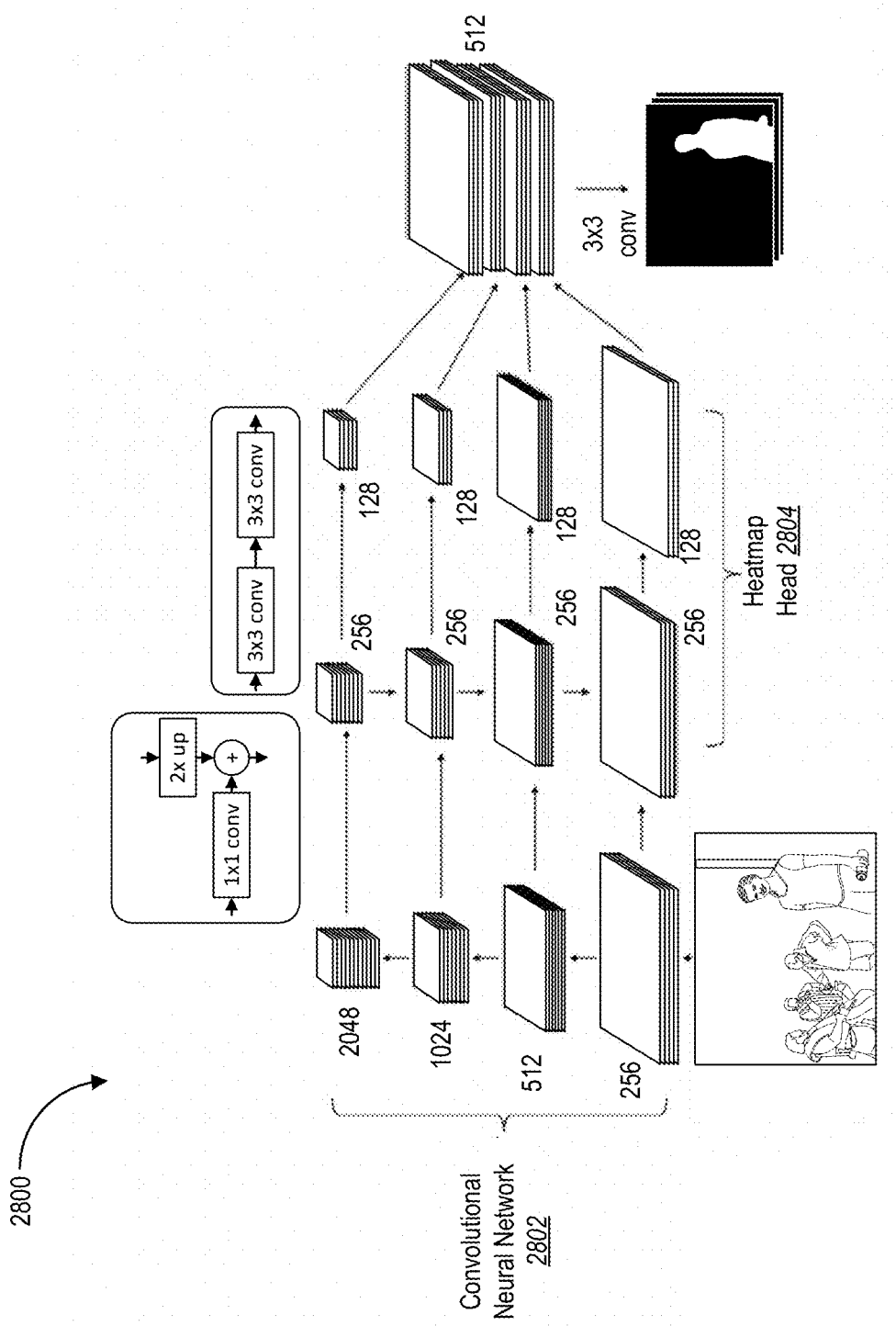
FIG. 28 illustrates an architecture of a heatmap network utilized by the scene-based image editing system as part of a distractor detection neural network in accordance with one or more embodiments.

FIG. 28 illustrates an architecture of a heatmap network 2800 utilized by the scene-based image editing system 106 as part of a distractor detection neural network in accordance with one or more embodiments. As shown in FIG. 28, the heatmap network 2800 includes a convolutional neural network 2802 as its encoder. In one or more embodiments, the convolutional neural network 2802 includes a deep residual network. As further shown in FIG. 28, the heatmap network 2800 includes a heatmap head 2804 as its decoder.

Figure 29:
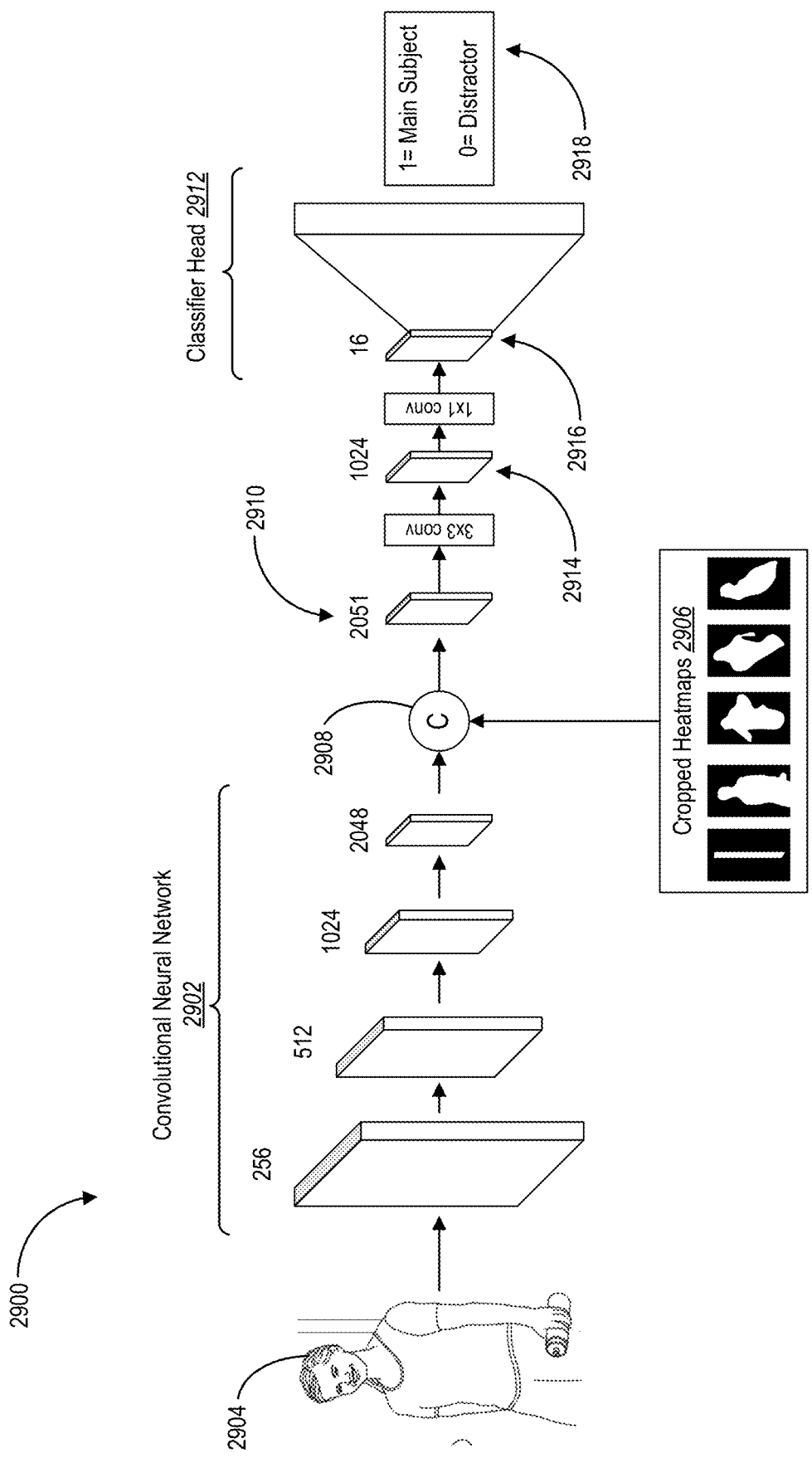
FIG. 29 illustrates an architecture of a hybrid classifier utilized by the scene-based image editing system as part of a distractor detection neural network in accordance with one or more embodiments.

FIG. 29 illustrates an architecture of a hybrid classifier 2900 utilized by the scene-based image editing system 106 as part of a distractor detection neural network in accordance with one or more embodiments. As shown in FIG. 29, the hybrid classifier 2900 includes a convolutional neural network 2902. In one or more embodiments, the hybrid classifier 2900 utilizes the convolutional neural network 2902 as an encoder.

To illustrate, in one or more embodiments, the scene-based image editing system 106 provides the features of a cropped image 2904 to the convolutional neural network 2902. Further, the scene-based image editing system 106 provides features of the cropped heatmaps 2906 corresponding to the object of the cropped image 2904 to an internal layer 2910 of the hybrid classifier 2900. In particular, as shown, in some cases, the scene-based image editing system 106 concatenates the features of the cropped heatmaps 2906 with the output of a prior internal layer (via the concatenation operation 2908) and provides the resulting feature map to the internal layer 2910 of the hybrid classifier 2900. In some embodiments, the feature map includes 2048+N channels, where N corresponds to the channels of the output of the heatmap network and 2048 corresponds to the channels of the output of the prior internal layer (though 2048 is an example).

As shown in FIG. 29, the hybrid classifier 2900 performs a convolution on the output of the internal layer 2910 to reduce the channel depth. Further, the hybrid classifier 2900 performs another convolution on the output of the subsequent internal layer 2914 to further reduce the channel depth. In some cases, the hybrid classifier 2900 applies a pooling to the output of the final internal layer 2916 before the binary classification head 2912. For instance, in some cases, the hybrid classifier 2900 averages the values of the final internal layer output to generate an average value. In some cases, where the average value is above the threshold, the hybrid classifier 2900 classifies the corresponding object as a distracting object and outputs a corresponding binary value; otherwise, the hybrid classifier 2900 classifies the corresponding object as a main subject object and outputs the corresponding binary value (or vice versa). Thus, the hybrid classifier 2900 provides an output 2918 containing a label for the corresponding object.

Figure 30B:
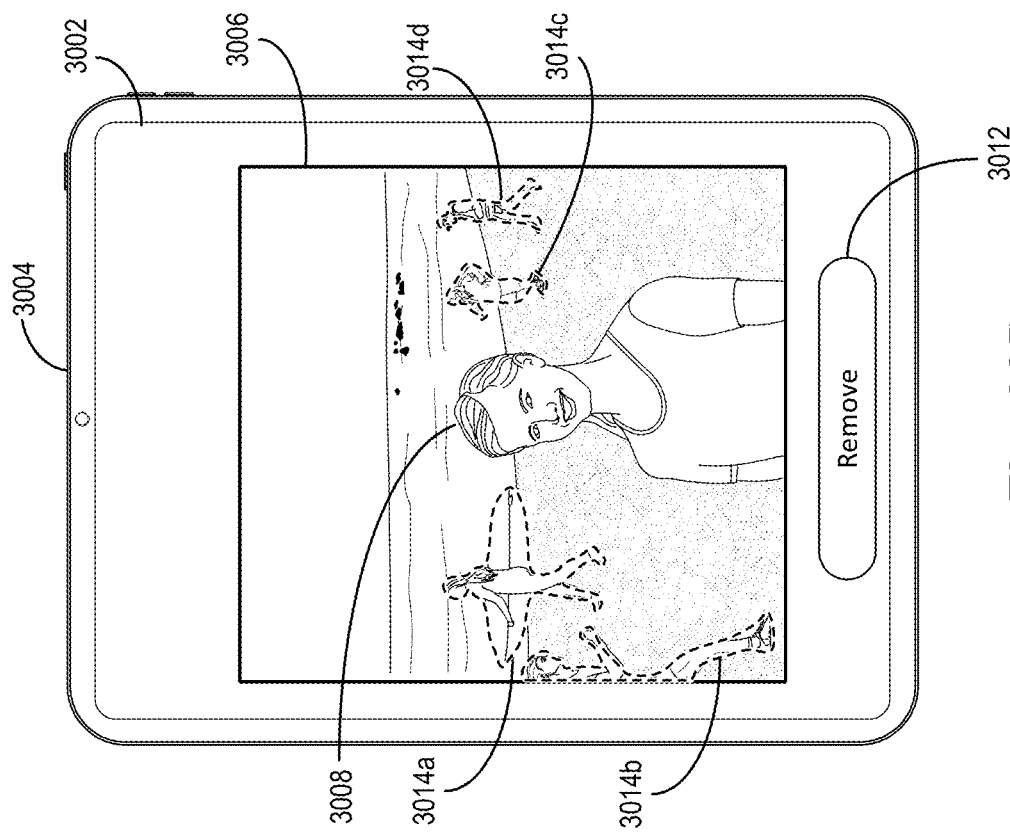
FIGS. 30A-30C illustrate a graphical user interface implemented by the scene-based image editing system to identify and remove distracting objects from a digital image in accordance with one or more embodiments.
Figure 30A:
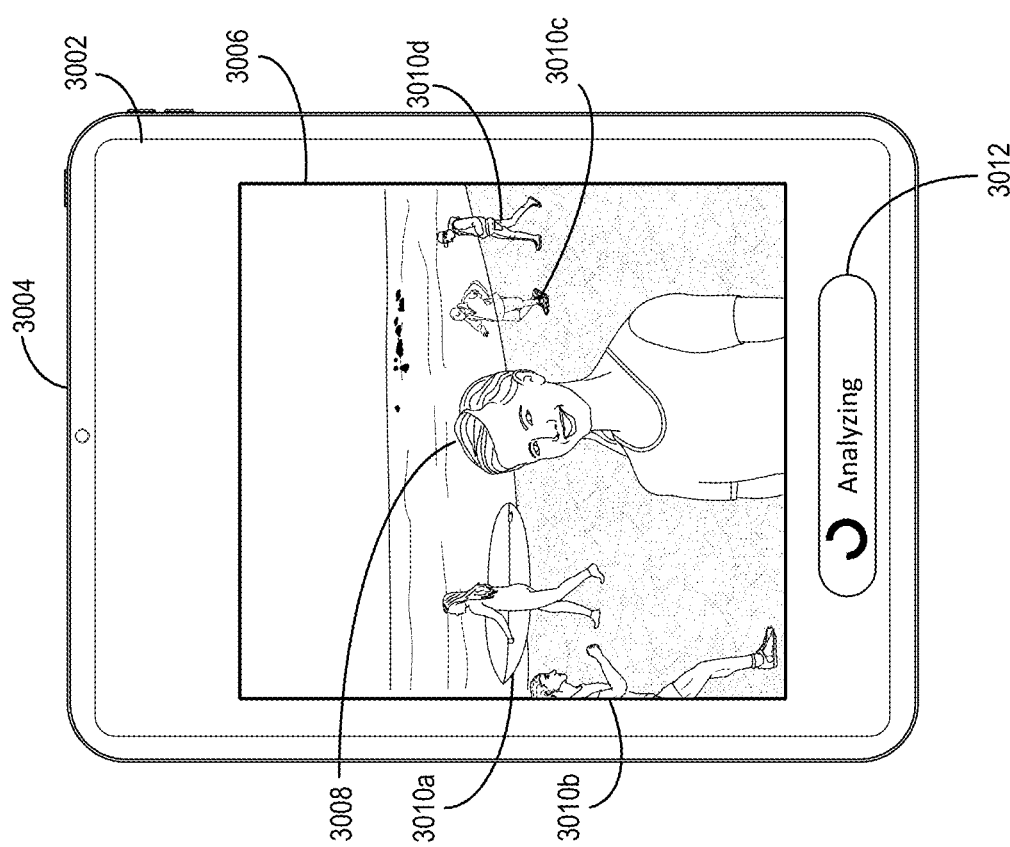
Figure 30C:
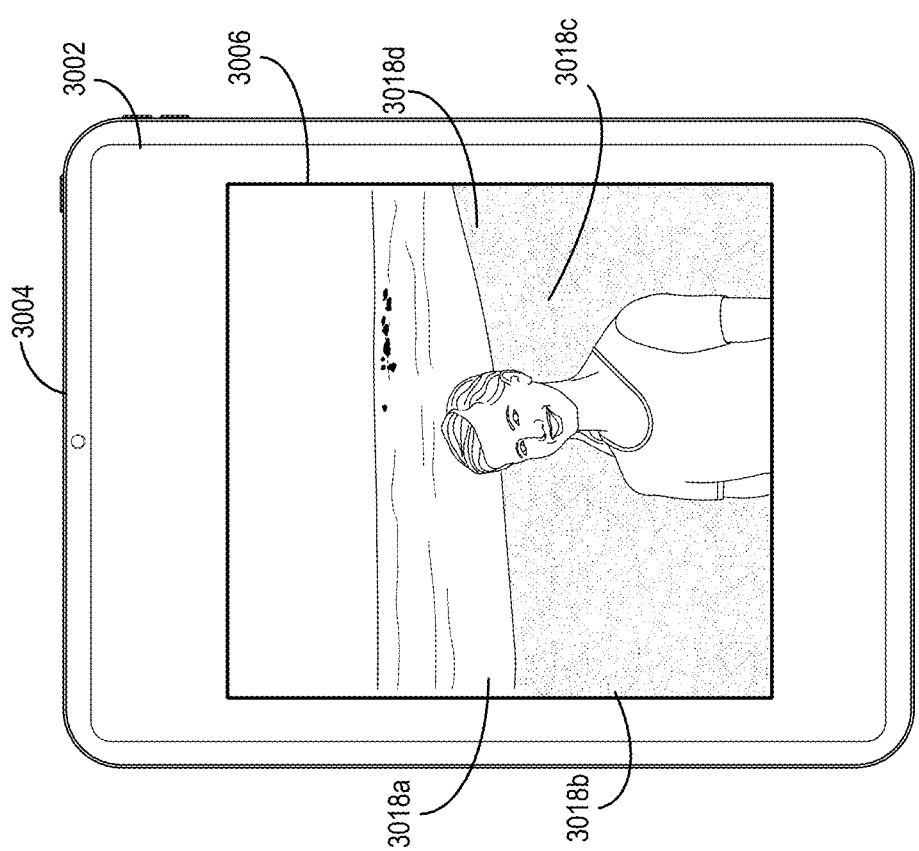

FIGS. 30A-30C illustrate a graphical user interface implemented by the scene-based image editing system 106 to identify and remove distracting objects from a digital image in accordance with one or more embodiments. For instance, as shown in FIG. 30A, the scene-based image editing system 106 provides a digital image 3006 for display within a graphical user interface 3002 of a client device 3004. As further shown, the digital image 3006 portrays an object 3008 and a plurality of additional objects 3010a-3010d.

Additionally, as shown in FIG. 30A, the scene-based image editing system 106 provides a progress indicator 3012 for display within the graphical user interface 3002. In some cases, the scene-based image editing system 106 provides the progress indicator 3012 to indicate that the digital image 3006 is being analyzed for distracting objects. For instance, in some embodiments, the scene-based image editing system 106 provides the progress indicator 3012 while utilizing a distractor detection neural network to identify and classify distracting objects within the digital image 3006. In one or more embodiments, the scene-based image editing system 106 automatically implements the distractor detection neural network upon receiving the digital image 3006 and before receiving user input for modifying one or more of the objects 3010a-3010d. In some implementations, however, the scene-based image editing system 106 waits upon receiving user input before analyzing the digital image 3006 for distracting objects.

As shown in FIG. 30B, the scene-based image editing system 106 provides visual indicators 3014a-3014d for display within the graphical user interface 3002 upon completing the analysis. In particular, the scene-based image editing system 106 provides the visual indicators 3014a-3014d to indicate that the objects 3010a-3010d have been classified as distracting objects.

In one or more embodiments, the scene-based image editing system 106 further provides the visual indicators 3014a-3014d to indicate that the objects 3010a-3010d have been selected for deletion. In some instances, the scene-based image editing system 106 also surfaces the pre-generated object masks for the objects 3010a-3010d in preparation of deleting the objects. Indeed, as has been discussed, the scene-based image editing system 106 pre-generates object masks and content fills for the objects of a digital image (e.g., utilizing the segmentation neural network 2604 and the inpainting neural network 2610 referenced above). Accordingly, the scene-based image editing system 106 has the object masks and content fills readily available for modifying the objects 3010a-3010d.

In one or more embodiments, the scene-based image editing system 106 enables user interactions to add to or remove from the selection of the objects for deletion. For instance, in some embodiments, upon detecting a user interaction with the object 3010a, the scene-based image editing system 106 determines to omit the object 3010a from the deletion operation. Further, the scene-based image editing system 106 removes the visual indication 3014a from the display of the graphical user interface 3002. On the other hand, in some implementations, the scene-based image editing system 106 detects a user interaction with the object 3008 and determines to include the object 3008 in the deletion operation in response. Further, in some cases, the scene-based image editing system 106 provides a visual indication for the object 3008 for display and/or surfaces a pre-generated object mask for the object 3008 in preparation for the deletion.

As further shown in FIG. 30B, the scene-based image editing system 106 provides a removal option 3016 for display within the graphical user interface 3002. In one or more embodiments, in response to detecting a user interaction with the removal option 3016, the scene-based image editing system 106 removes the objects that have been selected for deletion (e.g., the objects 3010a-3010d that had been classified as distracting objects). Indeed, as shown in FIG. 30C, the scene-based image editing system 106 removes the objects 3010a-3010d from the digital image 3006. Further, as shown in 30C, upon removing the objects 3010a-3010d, the scene-based image editing system 106 reveals content fills 3018a-3018d that were previously generated.

By enabling user interactions to control which objects are included in the deletion operation and to further choose when the selected objects are removed, the scene-based image editing system 106 provides more flexibility. Indeed, while conventional systems typically delete distracting objects automatically without user input, the scene-based image editing system 106 allows for the deletion of distracting objects in accordance with user preferences expressed via the user interactions. Thus, the scene-based image editing system 106 flexibly allow for control of the removal process via the user interactions.

Figure 31B:
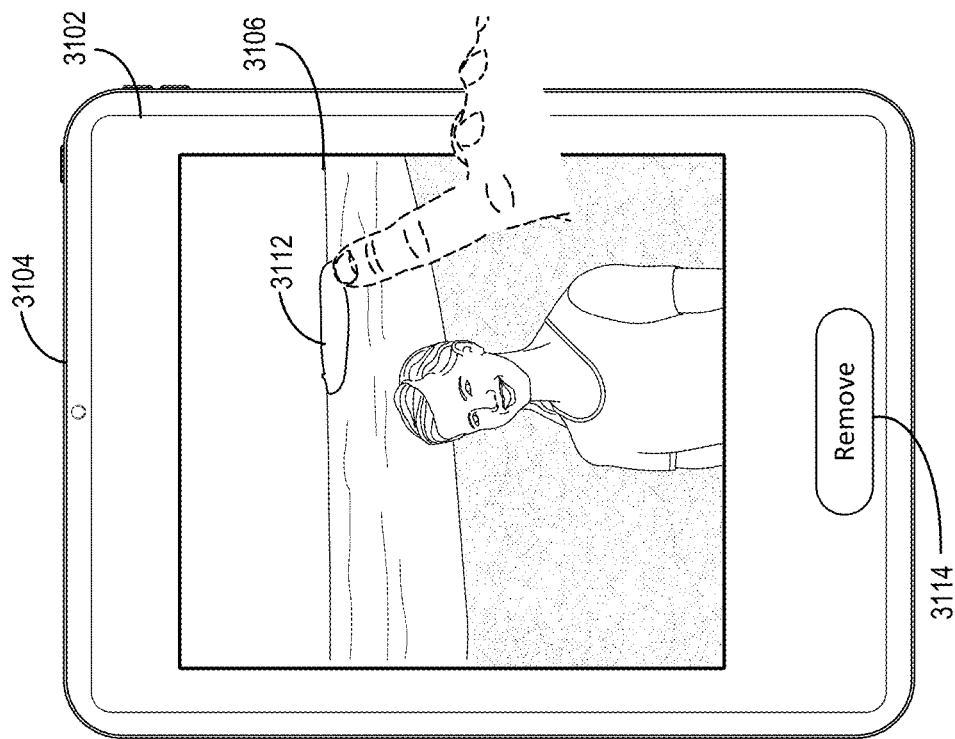
Figure 31A:
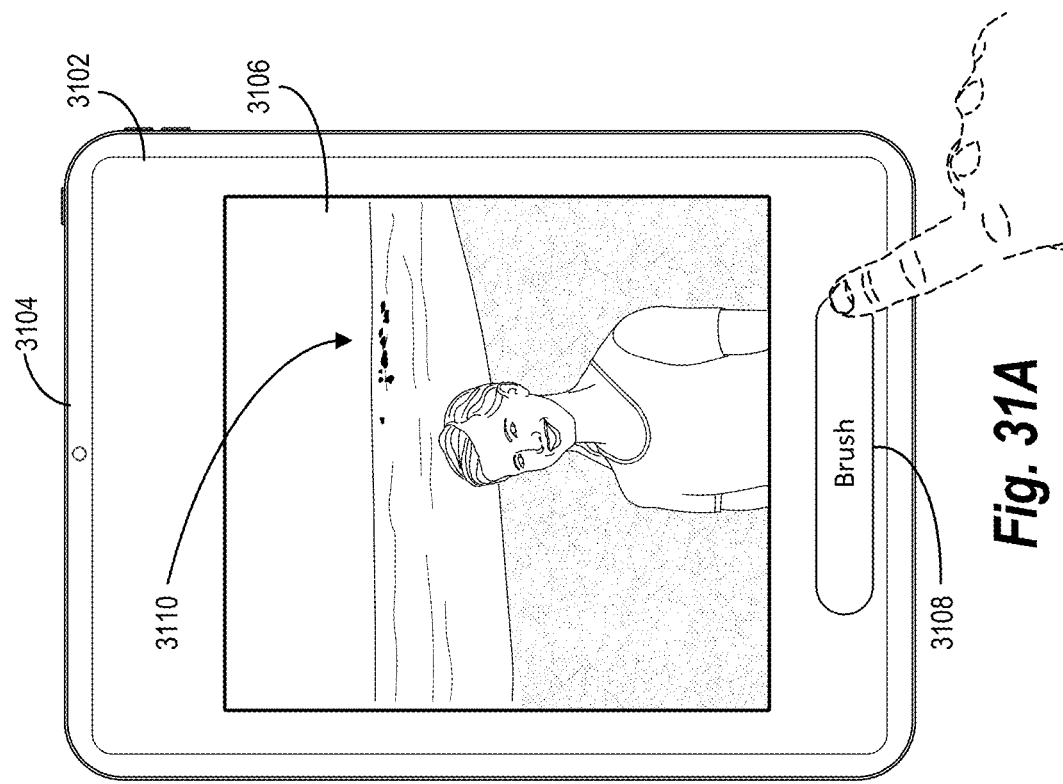

In addition to removing distracting objects identified via a distractor detection neural network, the scene-based image editing system 106 provides other features for removing unwanted portions of a digital image in various embodiments. For instance, in some cases, the scene-based image editing system 106 provides a tool whereby user interactions can target arbitrary portions of a digital image for deletion. FIGS. 31A-31C illustrate a graphical user interface implemented by the scene-based image editing system 106 to identify and remove distracting objects from a digital image in accordance with one or more embodiments.

In particular, FIG. 31A illustrates a digital image 3106 displayed on a graphical user interface 3102 of a client device 3104. The digital image 3106 corresponds to the digital image 3006 of FIG. 30C after distracting objects identified by a distractor detection neural network have been removed. Accordingly, in some cases, the objects remaining in the digital image 3106 represent those objects that were not identified and removed as distracting objects. For instance, in some cases, the collection of objects 3110 near the horizon of the digital image 3106 include objects that were not identified as distracting objects by the distractor detection neural network.

As further shown in FIG. 31A, the scene-based image editing system 106 provides a brush tool option 3108 for display within the graphical user interface 3102. FIG. 31B illustrates that, upon detecting a user interaction with the brush tool option 3108, the scene-based image editing system 106 enables one or more user interactions to use a brush tool to select arbitrary portions of the digital image 3106 (e.g., portions not identified by the distractor detection neural network) for removal. For instance, as illustrated, the scene-based image editing system 106 receives one or more user interactions with the graphical user interface 3102 that target a portion of the digital image 3106 that portrayed the collection of objects 3110.

As indicated by FIG. 31B, via the brush tool, the scene-based image editing system 106 enables free-form user input in some cases. In particular, FIG. 31B shows the scene-based image editing system 106 providing a visual indication 3112 representing the portion of the digital image 3106 selected via the brush tool (e.g., the specific pixels targeted). Indeed, rather than receiving user interactions with previously identified objects or other pre-segmented semantic areas, the scene-based image editing system 106 uses the brush tool to enable arbitrary selection of various portions of the digital image 3106. Accordingly, the scene-based image editing system 106 utilizes the brush tool to provide additional flexibility whereby user interactions is able to designate undesirable areas of a digital image that may not be identified by machine learning.

As further shown in FIG. 31B, the scene-based image editing system 106 provides a remove option 3114 for display within the graphical user interface 3102. As illustrated in FIG. 31C, in response to detecting a user interaction with the remove option 3114, the scene-based image editing system 106 removes the selected portion of the digital image 3106. Further, as shown, the scene-based image editing system 106 fills in the selected portion with a content fill 3116. In one or more embodiments, where the portion removed from the digital image 3106 does not include objects for which content fill was previously selected (or otherwise includes extra pixels not included in previously generated content fill), the scene-based image editing system 106 generates the content fill 3116 after removing the portion of the digital image 3106 selected via the brush tool. In particular, the scene-based image editing system 106 utilizes a content-aware hole-filling machine learning model to generate the content fill 3116 after the selected portion is removed.

Figure 32A:
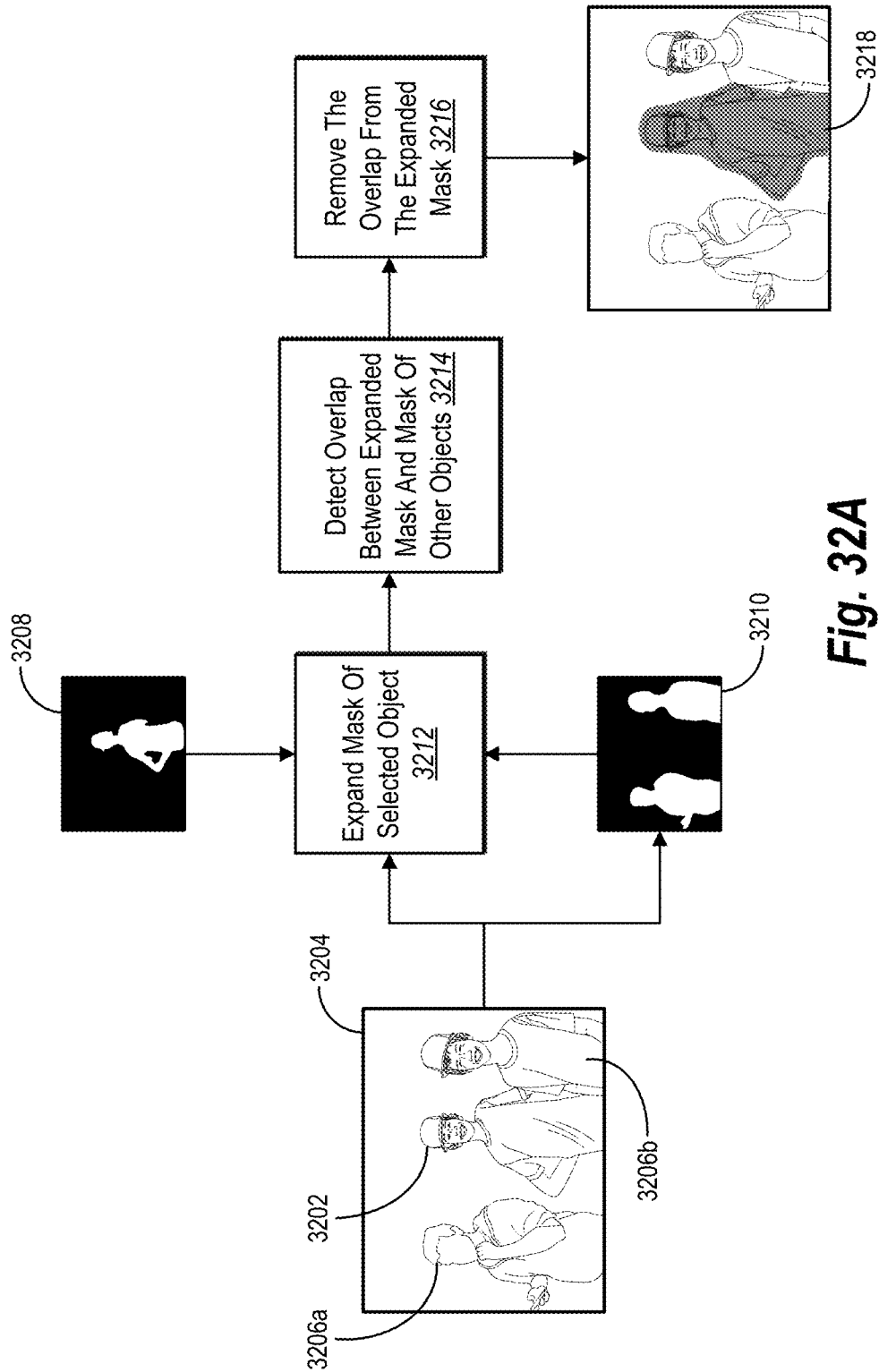
FIGS. 32A-32B illustrate the scene-based image editing system utilizing smart dilation to remove an object from a digital image in accordance with one or more embodiments.

In one or more embodiments, the scene-based image editing system 106 further implements smart dilation when removing objects, such as distracting objects, from digital images. For instance, in some cases, the scene-based image editing system 106 utilizes smart dilation to remove objects that touch, overlap, or are proximate to other objects portrayed in a digital image. FIG. 32A illustrates the scene-based image editing system 106 utilizes smart dilation to remove an object from a digital image in accordance with one or more embodiments.

Often, conventional systems remove objects from digital images utilizing tight masks (e.g., a mask that tightly adheres to the border of the corresponding object). In many cases, however, a digital image includes color bleeding or artifacts around the border of an object. For instance, there exist some image formats (JPEG) that are particularly susceptible to having format-related artifacts around object borders. Using tight masks when these issues are present causes undesirable effects in the resulting image. For example, inpainting models are typically sensitive to these image blemishes, creating large artifacts when operating directly on the segmentation output. Thus, the resulting modified images inaccurately capture the user intent in removing an object by creating additional image noise.

Thus, the scene-based image editing system 106 dilates (e.g., expands) the object mask of an object to avoid associated artifacts when removing the object. Dilating objects masks, however, presents the risk of removing portions of other objects portrayed in the digital image. For instance, where a first object to be removed overlaps, touches, or is proximate to a second object, a dilated mask for the first object will often extend into the space occupied by the second object. Thus, when removing the first object using the dilated object mask, significant portions of the second object are often removed and the resulting hole is filled in (generally improperly), causing undesirable effects in the resulting image. Accordingly, the scene-based image editing system 106 utilizes smart dilation to avoid significantly extending the object mask of an object to be removed into areas of the digital image occupied by other objects.

As shown in FIG. 32A, the scene-based image editing system 106 determines to remove an object 3202 portrayed in a digital image 3204. For instance, in some cases, the scene-based image editing system 106 determines (e.g., via a distractor detection neural network) that the object 3202 is a distracting object. In some implementations, the scene-based image editing system 106 receives a user selection of the object 3202 for removal. The digital image 3204 also portrays the objects 3206a-3206b. As shown, the object 3202 selected for removal overlaps with the object 3206b in the digital image 3204.

As further illustrated in FIG. 32A, the scene-based image editing system 106 generates an object mask 3208 for the object 3202 to be removed and a combined object mask 3210 for the objects 3206a-3206b. For instance, in some embodiments, the scene-based image editing system 106 generates the object mask 3208 and the combined object mask 3210 from the digital image 3204 utilizing a segmentation neural network. In one or more embodiments, the scene-based image editing system 106 generates the combined object mask 3210 by generating an object mask for each of the objects 3206a-3206b and determining the union between the separate object masks.

Additionally, as shown in FIG. 32A, the scene-based image editing system 106 performs an act 3212 of expanding the object mask 3208 for the object 3202 to be removed. In particular, the scene-based image editing system 106 expands the representation of the object 3202 within the object mask 3208. In other words, the scene-based image editing system 106 adds pixels to the border of the representation of the object within the object mask 3208. The amount of expansion varies in various embodiments and, in some implementations, is configurable to accommodate user preferences. For example, in one or more implementations, the scene-based image editing system 106 expands the object mask by extending the object mask outward ten, fifteen, twenty, twenty-five, or thirty pixels.

After expanding the object mask 3208, the scene-based image editing system 106 performs an act 3214 of detecting overlap between the expanded object mask for the object 3202 and the object masks of the other detected objects 3206a-3206b (i.e., the combined object mask 3210). In particular, the scene-based image editing system 106 determines where pixels corresponding to the expanded representation of the object 3202 within the expanded object mask overlap pixels corresponding to the objects 3206a-3206b within the combined object mask 3210. In some cases, the scene-based image editing system 106 determines the union between the expanded object mask and the combined object mask 3210 and determines the overlap using the resulting union. The scene-based image editing system 106 further performs an act 3216 of removing the overlapping portion from the expanded object mask for the object 3202. In other words, the scene-based image editing system 106 removes pixels from the representation of the object 3202 within the expanded object mask that overlaps with the pixels corresponding to the object 3206a and/or the object 3206b within the combined object mask 3210.

Thus, as shown in FIG. 32A, the scene-based image editing system 106 generates a smartly dilated object mask 3218 (e.g., an expanded object mask) for the object 3202 to be removed. In particular, the scene-based image editing system 106 generates the smartly dilated object mask 3218 by expanding the object mask 3208 in areas that don't overlap with either one of the objects 3206a-3206b and avoiding expansion in areas that do overlap with at least one of the objects 3206a-3206b. At least, in some implementations, the scene-based image editing system 106 reduces the expansion in areas that do overlap. For instance, in some cases, the smartly dilated object mask 3218 still includes expansion in overlapping areas but the expansion is significantly less when compared to areas where there is no overlap. In other words, the scene-based image editing system 106 expands using less pixels in areas where there is overlap. For example, in one or more implementations, the scene-based image editing system 106 expands or dilates an object mask five, ten, fifteen, or twenty times as far into areas where there is no overlap compared to areas where there are overlaps.

To describe it differently, in one or more embodiments, the scene-based image editing system 106 generates the smartly dilated object mask 3218 (e.g., an expanded object mask) by expanding the object mask 3208 for the object 3202 into areas not occupied by the object masks for the objects 3206a-3206b (e.g., areas not occupied by the objects 3206a-3206b themselves). For instance, in some cases, the scene-based image editing system 106 expands the object mask 3208 into portions of the digital image 3204 that abut the object mask 3208. In some cases, the scene-based image editing system 106 expands the object mask 3208 into the abutting portions by a set number of pixels. In some implementations, the scene-based image editing system 106 utilizes a different number of pixels for expanding the object mask 3208 into different abutting portions (e.g., based on detecting a region of overlap between the object mask 3208 and other object masks).

To illustrate, in one or more embodiments, the scene-based image editing system 106 expands the object mask 3208 into the foreground and the background of the digital image 3204. In particular, the scene-based image editing system 106 determines foreground by combining the object masks of objects not to be deleted. The scene-based image editing system 106 expands the object mask 3208 into the abutting foreground and background. In some implementations, the scene-based image editing system 106 expands the object mask 3208 into the foreground by a first amount and expands the object mask 3208 into the background by a second amount that differs from the first amount (e.g., the second amount is greater than the first amount). For example, in one or more implementations the scene-based image editing system 106 expands the object mask by twenty pixels into background areas and two pixels into foreground areas (into abutting object masks, such as the combined object mask 3210).

In one or more embodiments, the scene-based image editing system 106 determines the first amount to use for the expanding the object mask 3208 into the foreground by expanding the object mask 3208 into the foreground by the second amount—the same amount used to expand the object mask 3208 into the background. In other words, the scene-based image editing system 106 expands the object mask 3208 as a whole into the foreground and background by the same amount (e.g., using the same number of pixels). The scene-based image editing system 106 further determines a region of overlap between the expanded object mask and the object masks corresponding to the other objects 3206a-3206b (e.g., the combined object mask 3210). In one or more embodiments, the region of overlap exists in the foreground of the digital image 3204 abutting the object mask 3208. Accordingly, the scene-based image editing system 106 reduces the expansion of the object mask 3208 into the foreground so that the expansion corresponds to the second amount. Indeed, in some instances, the scene-based image editing system 106 removes the region of overlap from the expanded object mask for the object 3202 (e.g., removes the overlapping pixels). In some cases, scene-based image editing system 106 removes a portion of the region of overlap rather than the entire region of overlap, causing a reduced overlap between the expanded object mask for the object 3202 and the object masks corresponding to the objects 3206a-3206b.

In one or more embodiments, as removing the object 3202 includes removing foreground and background abutting the smartly dilated object mask 3218 (e.g., the expanded object mask) generated for the object 3202, the scene-based image editing system 106 inpaints a hole remaining after the removal. In particular, the scene-based image editing system 106 inpaints a hole with foreground pixels and background pixels. Indeed, in one or more embodiments, the scene-based image editing system 106 utilizes an inpainting neural network to generate foreground pixels and background pixels for the resulting hole and utilizes the generated pixels to inpaint the hole, resulting in a modified digital image (e.g., an inpainted digital image) where the object 3202 has been removed and the corresponding portion of the digital image 3204 has been filled in.

Figure 32B:
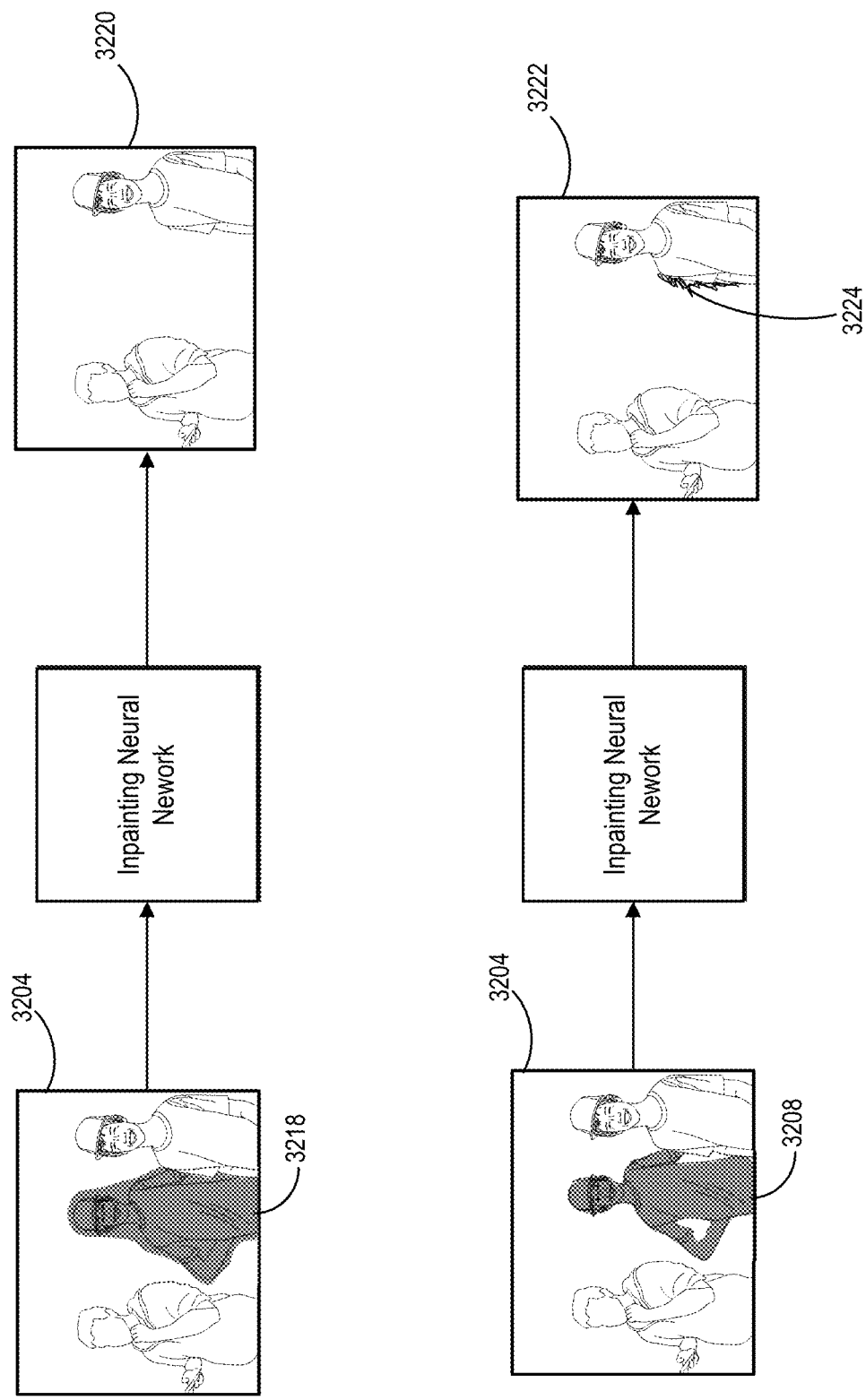

For example, FIG. 32B illustrates the advantages provided by intelligently dilating object masks prior to performing inpainting. In particular, FIG. 32B illustrates that when the smartly dilated object mask 3218 (e.g., the expanded object mask) is provided to an inpainting neural network (e.g., the cascaded modulation inpainting neural network 420) as an area to fill, the inpainting neural network generates a modified digital image 3220 with the area corresponding to the smartly dilated object mask 3218 filled with pixel generated by the inpainting neural network. As shown, the modified digital image 3220 includes no artifacts in the inpainted area corresponding to the smartly dilated object mask 3218. Indeed, the modified digital image 3220 provides a realistic appearing image.

In contrast, FIG. 32B illustrates that when the object mask 3208 (e.g., the non-expanded object mask) is provided to an inpainting neural network (e.g., the cascaded modulation inpainting neural network 420) as an area to fill, the inpainting neural network generates a modified digital image 3222 with the area corresponding to the smartly dilated object mask 3218 filled with pixel generated by the inpainting neural network. As shown, the modified digital image 3222 includes artifacts in the inpainted area corresponding to the object mask 3208. In particular, artifacts are along the back of the girl and event in the generated water.

By generating smartly dilated object masks, the scene-based image editing system 106 provides improved image results when removing objects. Indeed, the scene-based image editing system 106 leverages expansion to remove artifacts, color bleeding, or other undesirable errors in a digital image but avoids removing significant portions of other objects that are remain in the digital image. Thus, the scene-based image editing system 106 is able to fill in holes left by removed objects without enhancing present errors where possible without needlessly replacing portions of other objects that remain.

As previously mentioned, in one or more embodiments, the scene-based image editing system 106 further utilizes a shadow detection neural network to detect shadows associated with distracting objects portrayed within a digital image. FIGS. 33-38 illustrate diagrams of a shadow detection neural network utilized by the scene-based image editing system 106 to detect shadows associated with objects in accordance with one or more embodiments.

Figure 33:
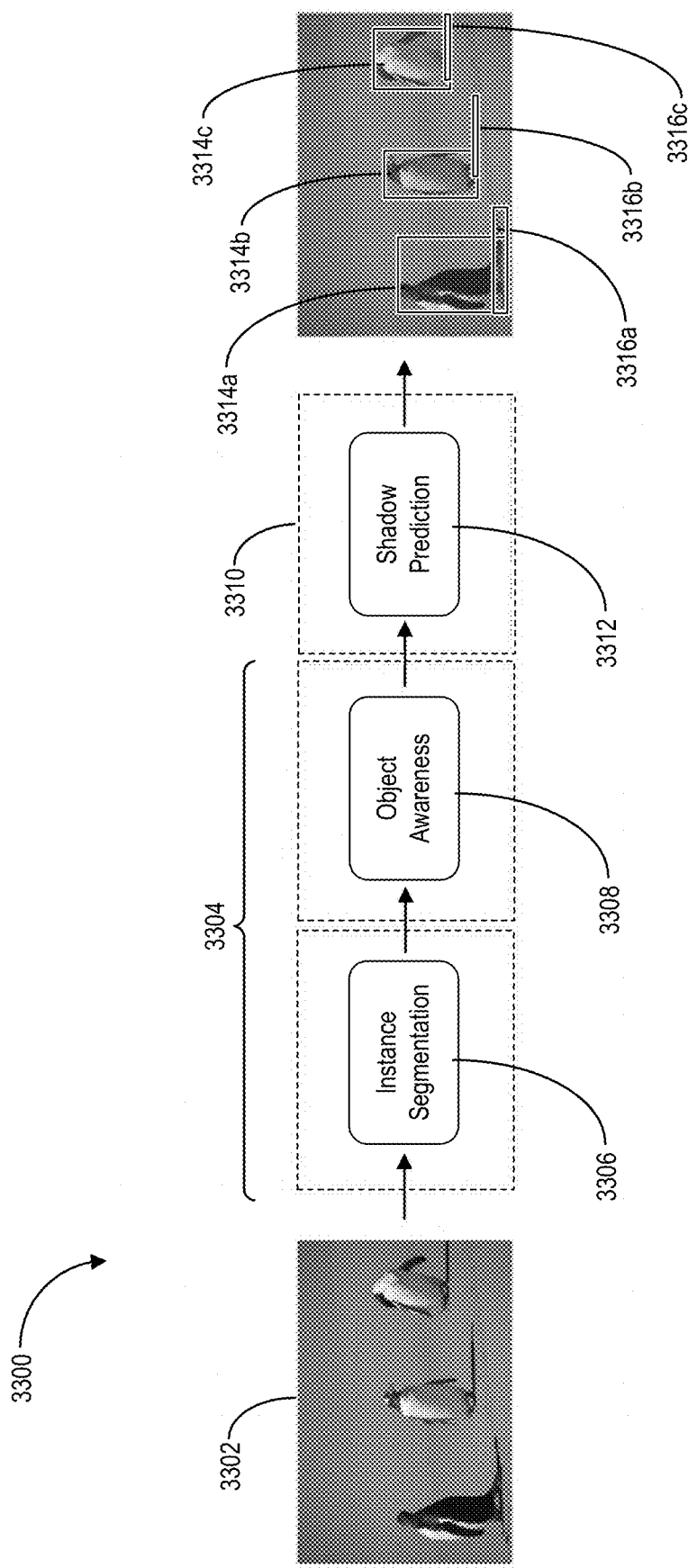
FIG. 33 illustrates an overview of a shadow detection neural network in accordance with one or more embodiments.

In particular, FIG. 33 illustrates an overview of a shadow detection neural network 3300 in accordance with one or more embodiments. Indeed, as shown in FIG. 33, the shadow detection neural network 3300 analyzes an input image 3302 via a first stage 3304 and a second stage 3310. In particular, the first stage 3304 includes an instance segmentation component 3306 and an object awareness component 3308. Further, the second stage 3310 includes a shadow prediction component 3312. In one or more embodiments, the instance segmentation component 3306 includes the segmentation neural network 2604 of the neural network pipeline discussed above with reference to FIG. 26.

As shown in FIG. 33, after analyzing the input image 3302, the shadow detection neural network 3300 identifies objects 3314a-3314c and shadows 3316a-3316c portrayed therein. Further, the shadow detection neural network 3300 associates the objects 3314a-3314c with their respective shadows. For instance, the shadow detection neural network 3300 associates the object 3314a with the shadow 3316a and likewise for the other objects and shadows. Thus, the shadow detection neural network 3300 facilitates inclusion of a shadow when its associated object is selected for deletion, movement, or some other modification.

Figure 34:
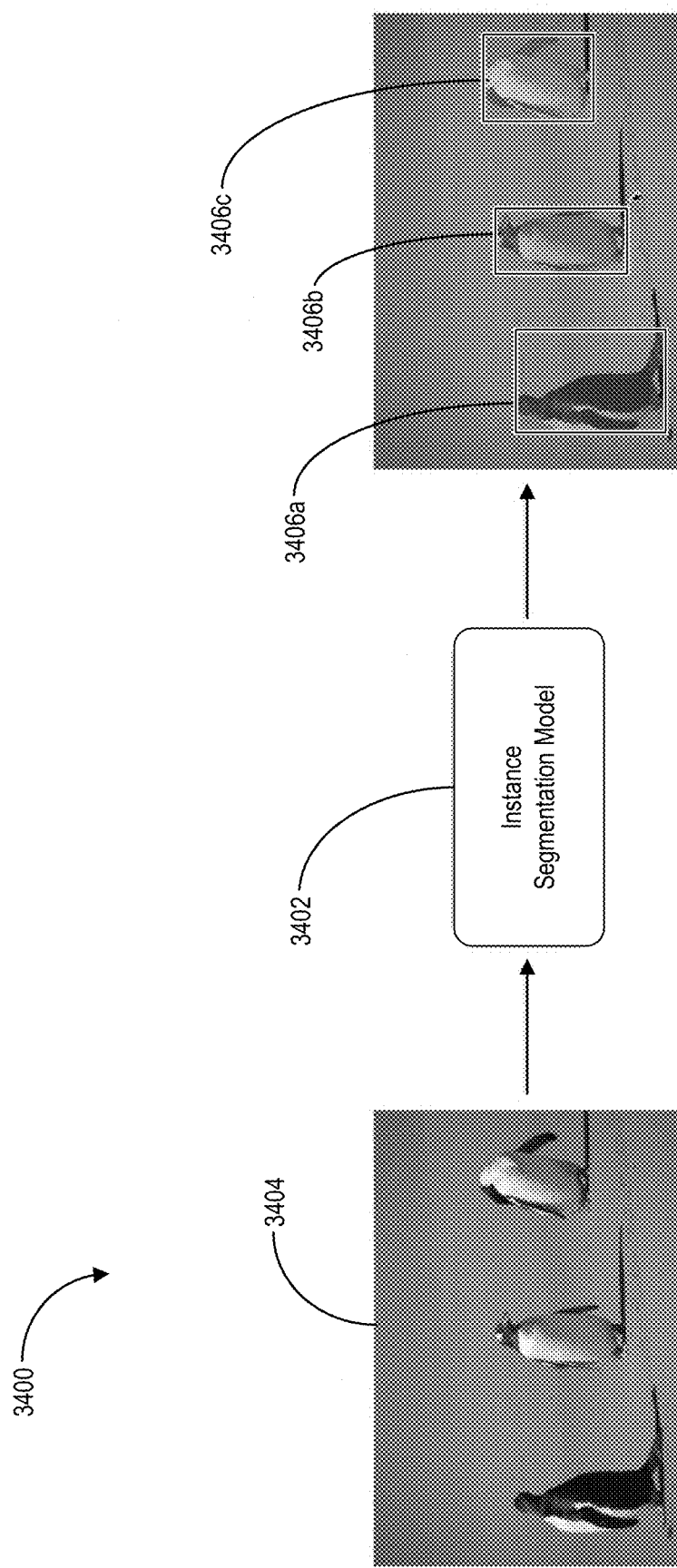
FIG. 34 illustrates an overview of an instance segmentation component of a shadow detection neural network in accordance with one or more embodiments.

FIG. 34 illustrates an overview of an instance segmentation component 3400 of a shadow detection neural network in accordance with one or more embodiments. As shown in FIG. 34, the instance segmentation component 3400 implements an instance segmentation model 3402. In one or more embodiments, the instance segmentation model 3402 includes the detection-masking neural network 300 discussed above with reference to FIG. 3. As shown in FIG. 34, the instance segmentation component 3400 utilizes the instance segmentation model 3402 to analyze an input image 3404 and identify objects 3406a-3406c portrayed therein based on the analysis. For instance, in some cases, the scene-based image editing system 106 outputs object masks and/or bounding boxes for the objects 3406a-3406c.

Figure 35:
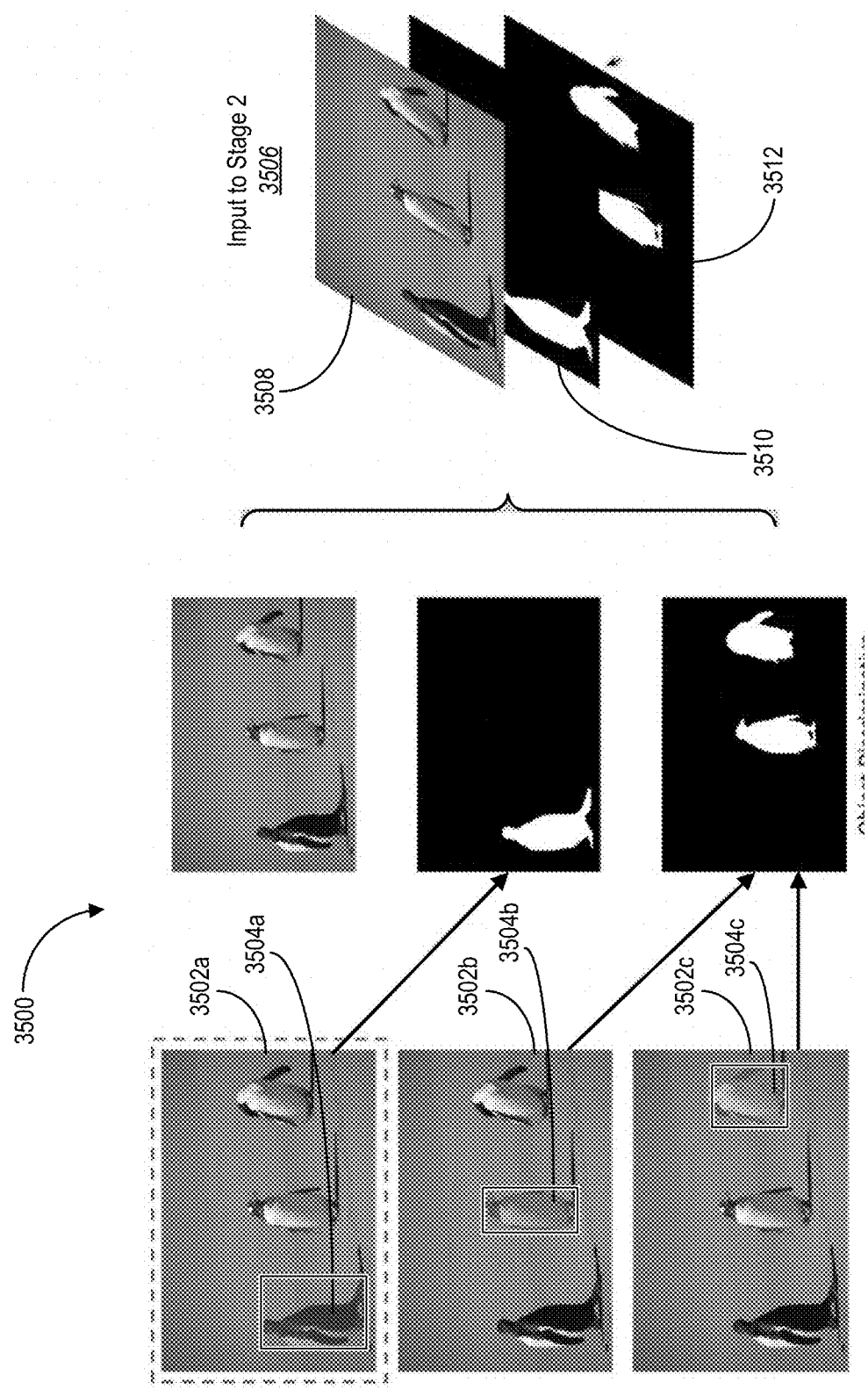
FIG. 35 illustrates an overview of an object awareness component of a shadow detection neural network in accordance with one or more embodiments.

FIG. 35 illustrates an overview of an object awareness component 3500 of a shadow detection neural network in accordance with one or more embodiments. In particular, FIG. 35 illustrates input image instances 3502a-3502c corresponding to each object detected within the digital image via the prior instance segmentation component. In particular, each input image instance corresponds to a different detected object and corresponds to an object mask and/or a bounding box generated for that digital image. For instance, the input image instance 3502a corresponds to the object 3504a, the input image instance 3502b corresponds to the object 3504b, and the input image instance 3502c corresponds to the object 3504c. Thus, the input image instances 3502a-3502c illustrate the separate object detections provided by the instance segmentation component of the shadow detection neural network.

In some embodiments, for each detected object, the scene-based image editing system 106 generates input for the second stage of the shadow detection neural network (i.e., the shadow prediction component). FIG. 35 illustrates the object awareness component 3500 generating input 3506 for the object 3504a. Indeed, as shown in FIG. 35, the object awareness component 3500 generates the input 3506 using the input image 3508, the object mask 3510 corresponding to the object 3504a (referred to as the object-aware channel) and a combined object mask 3512 corresponding to the objects 3504b-3504c (referred to as the object-discriminative channel). For instance, in some implementations, the object awareness component 3500 combines (e.g., concatenates) the input image 3508, the object mask 3510, and the combined object mask 3512. The object awareness component 3500 similarly generates second stage input for the other objects 3504b-3504c as well (e.g., utilizing their respective object mask and combined object mask representing the other objects along with the input image 3508).

In one or more embodiments, the scene-based image editing system 106 (e.g., via the object awareness component 3500 or some other component of the shadow detection neural network) generates the combined object mask 3512 using the union of separate object masks generated for the object 3504b and the object 3504c. In some instances, the object awareness component 3500 does not utilize the object-discriminative channel (e.g., the combined object mask 3512). Rather, the object awareness component 3500 generates the input 3506 using the input image 3508 and the object mask 3510. In some embodiments, however, using the object-discriminative channel provides better shadow prediction in the second stage of the shadow detection neural network.

Figure 36:
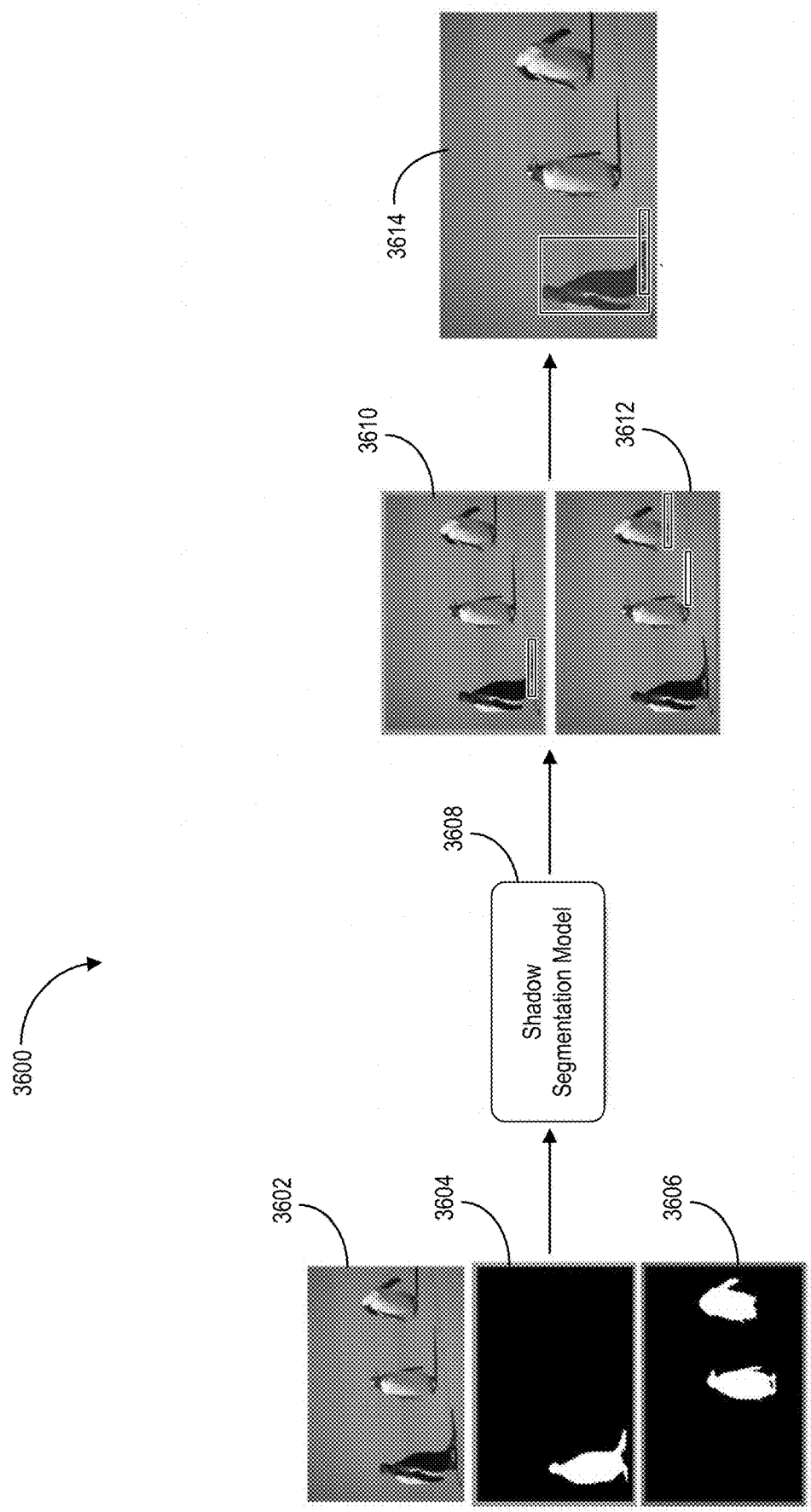
FIG. 36 illustrates an overview of a shadow prediction component of a shadow detection neural network in accordance with one or more embodiments.

FIG. 36 illustrates an overview of a shadow prediction component 3600 of a shadow detection neural network in accordance with one or more embodiments. As shown in FIG. 36, the shadow detection neural network provides, to the shadow prediction component 3600, input compiled by an object awareness component consisting of an input image 3602, an object mask 3604 for an object of interest, and a combined object mask 3606 for the other detected objects. The shadow prediction component 3600 utilizes a shadow segmentation model 3608 to generate a first shadow prediction 3610 for the object of interest and a second shadow prediction 3612 for the other detected objects. In one or more embodiments, the first shadow prediction 3610 and/or the second shadow prediction 3612 include shadow masks (e.g., where a shadow mask includes an object mask for a shadow) for the corresponding shadows. In other words, the shadow prediction component 3600 utilizes the shadow segmentation model 3608 to generate the first shadow prediction 3610 by generating a shadow mask for the shadow predicted for the object of interest. Likewise, the shadow prediction component 3600 utilizes the shadow segmentation model 3608 to generate the second shadow prediction 3612 by generating a combined shadow mask for the shadows predicted for the other detected objects.

Based on the outputs of the shadow segmentation model 3608, the shadow prediction component 3600 provides an object-shadow pair prediction 3614 for the object of interest. In other words, the shadow prediction component 3600 associates the object of interest with its shadow cast within the input image 3602. In one or more embodiments, the shadow prediction component 3600 similarly generates an object-shadow pair prediction for all other objects portrayed in the input image 3602. Thus, the shadow prediction component 3600 identifies shadows portrayed in a digital image and associates each shadow with its corresponding object.

In one or more embodiments, the shadow segmentation model 3608 utilized by the shadow prediction component 3600 includes a segmentation neural network. For instance, in some cases, the shadow segmentation model 3608 includes the detection-masking neural network 300 discussed above with reference to FIG. 3. As another example, in some implementations, the shadow segmentation model 3608 includes the DeepLabv3 semantic segmentation model described by Liang-Chieh Chen et al., *Rethinking Atrous Convolution for Semantic Image Segmentation*, arXiv: 1706.05587, 2017, or the DeepLab semantic segmentation model described by Liang-Chieh Chen et al., *Deeplab: Semantic Image Segmentation with Deep Convolutional Nets, Atrous Convolution, and Fully Connected CRF's*, arXiv: 1606.00915, 2016, both of which are incorporated herein by reference in their entirety.

Figure 37:
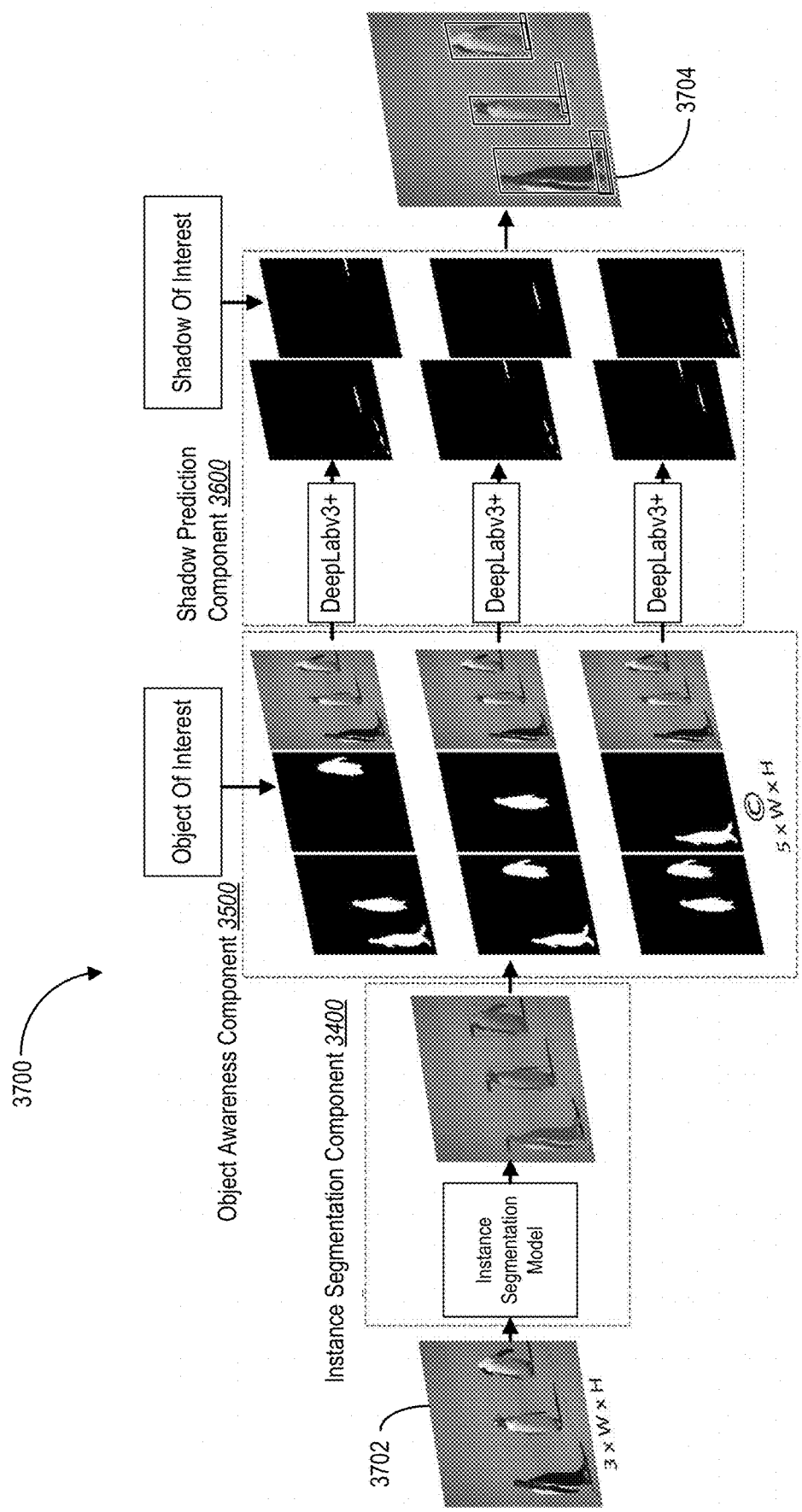
FIG. 37 illustrates an overview of the architecture of a shadow detection neural network in accordance with one or more embodiments.

FIG. 37 illustrates an overview of the architecture of a shadow detection neural network 3700 in accordance with one or more embodiments. In particular, FIG. 37 illustrates the shadow detection neural network 3700 consisting of the instance segmentation component 3400 discussed with reference to FIG. 34, the object awareness component 3500 discussed with reference to FIG. 35, and the shadow prediction component 3600 discussed with reference to FIG. 36. Further, FIG. 37 illustrates the shadow detection neural network 3700 generating object masks, shadow masks, and predictions with respect to each object portrayed in the input image 3702. Thus, the shadow detection neural network 3700 outputs a final prediction 3704 that associates each object portrayed in a digital image with its shadow. Accordingly, as shown in FIG. 37, the shadow detection neural network 3700 provides an end-to-end neural network framework that receives a digital image and outputs an association between objects and shadows depicted therein.

In some implementations, the shadow detection neural network 3700 determines that an object portrayed within a digital image does not have an associated shadow. Indeed, in some cases, upon analyzing the digital image utilizing its various components, the shadow detection neural network 3700 determines that there is not a shadow portrayed within the digital image that is associated with the object. In some cases, the scene-based image editing system 106 provides feedback indicating the lack of a shadow. For example, in some cases, upon determining that there are no shadows portrayed within a digital image (or that there is not a shadow associated with a particular object), the scene-based image editing system 106 provides a message for display or other feedback indicating the lack of shadows. In some instances, the scene-based image editing system 106 does not provide explicit feedback but does not auto-select or provide a suggestion to include a shadow within a selection of an object as discussed below with reference to FIGS. 39A-39C.

In some implementations, the scene-based image editing system 106 utilizes the second stage of the shadow detection neural network to determine shadows associated with objects portrayed in a digital image when the objects masks of the objects have already been generated. Indeed, FIG. 38 illustrates a diagram for using the second stage of the shadow detection neural network for determining shadows associated with objects portrayed in a digital image in accordance with one or more embodiments.

Figure 38:
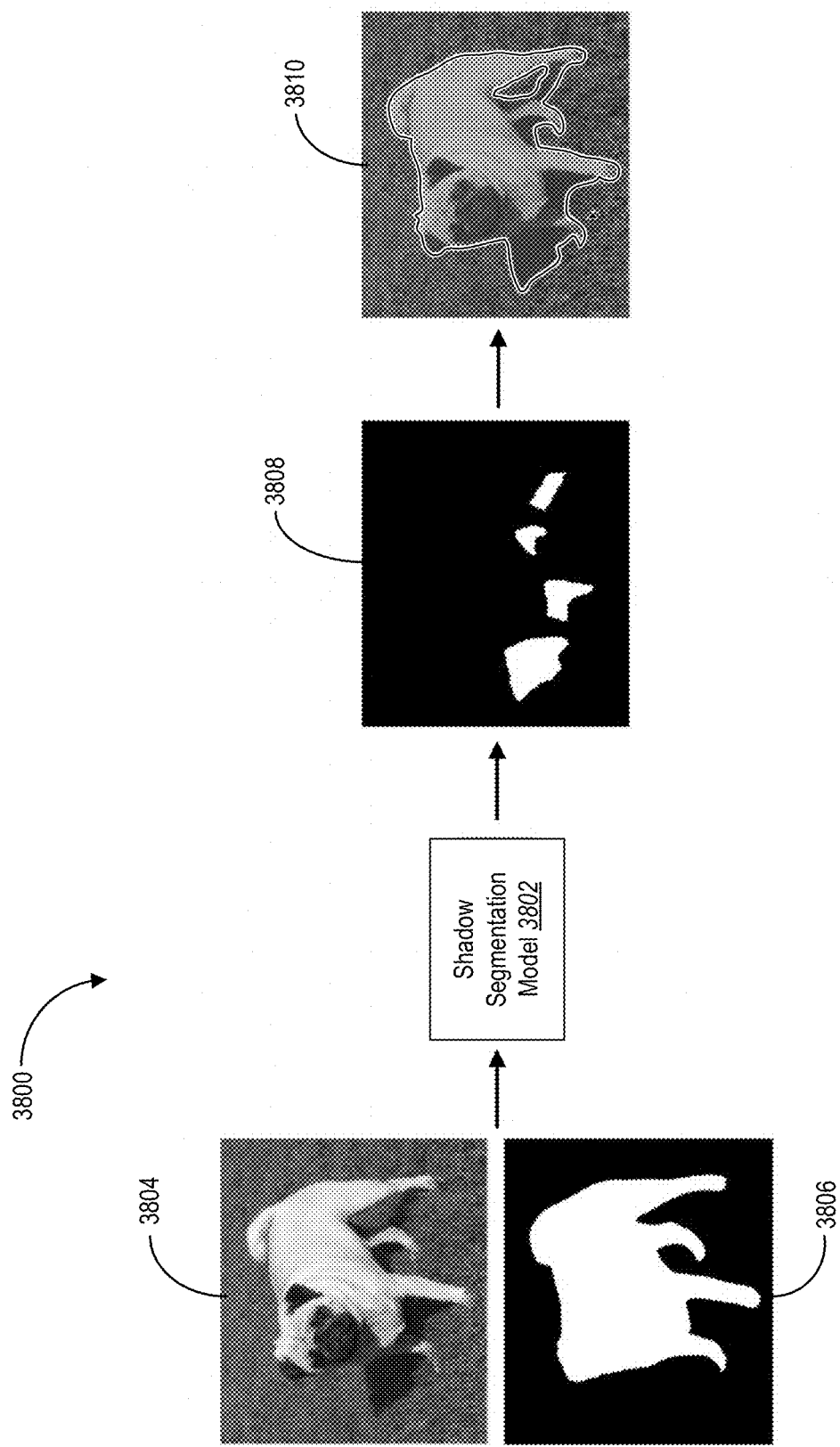
FIG. 38 illustrates a diagram for using the second stage of the shadow detection neural network for determining shadows associated with objects portrayed in a digital image in accordance with one or more embodiments.

As shown in FIG. 38, the scene-based image editing system 106 provides an input image 3804 to the second stage of a shadow detection neural network (i.e., a shadow prediction model 3802). Further, the scene-based image editing system 106 provides an object mask 3806 to the second stage. The scene-based image editing system 106 utilizes the second stage of the shadow detection neural network to generate a shadow mask 3808 for the shadow of the object portrayed in the input image 3804, resulting in the association between the object and the shadow cast by the object within the input image 3804 (e.g., as illustrated in the visualization 3810).

By providing direct access to the second stage of the shadow detection neural network, the scene-based image editing system 106 provides flexibility in the shadow detection process. Indeed, in some cases, an object mask will already have been created for an object portrayed in a digital image. For instance, in some cases, the scene-based image editing system 106 implements a separate segmentation neural network to generate an object mask for a digital image as part of a separate workflow. Accordingly, the object mask for the object already exists, and the scene-based image editing system 106 leverages the previous work in determining the shadow for the object. Thus, the scene-based image editing system 106 further provides efficiency as it avoids duplicating work by accessing the shadow prediction model of the shadow detection neural network directly.

Figure 39B:
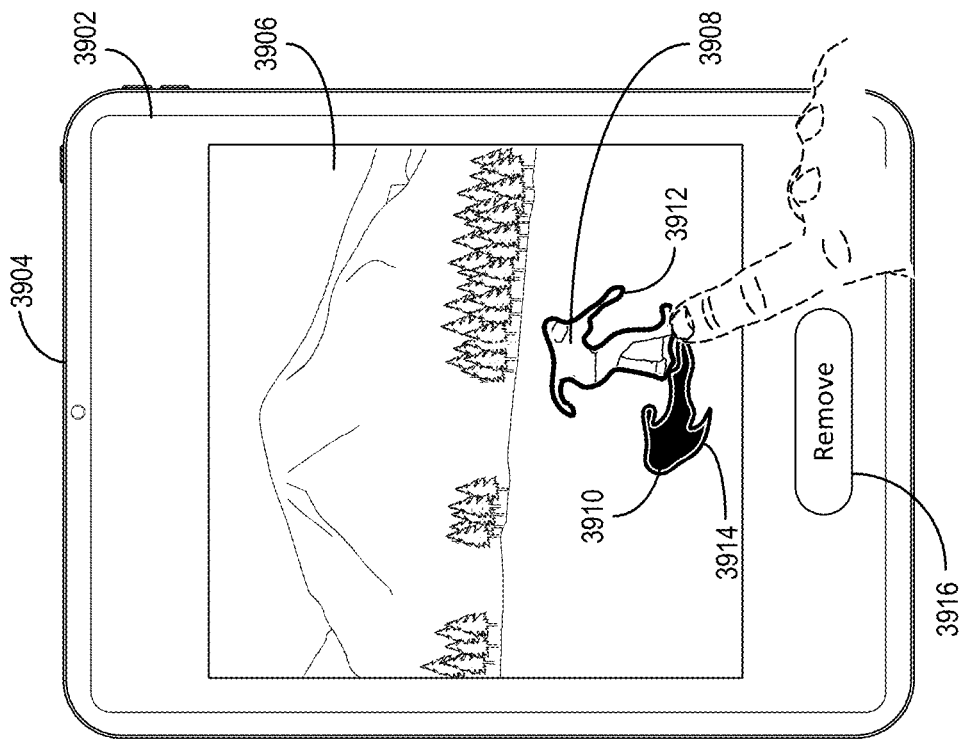
FIGS. 39A-39C illustrate a graphical user interface implemented by the scene-based image editing system to identify and remove shadows of objects portrayed in a digital image in accordance with one or more embodiments.
Figure 39A:
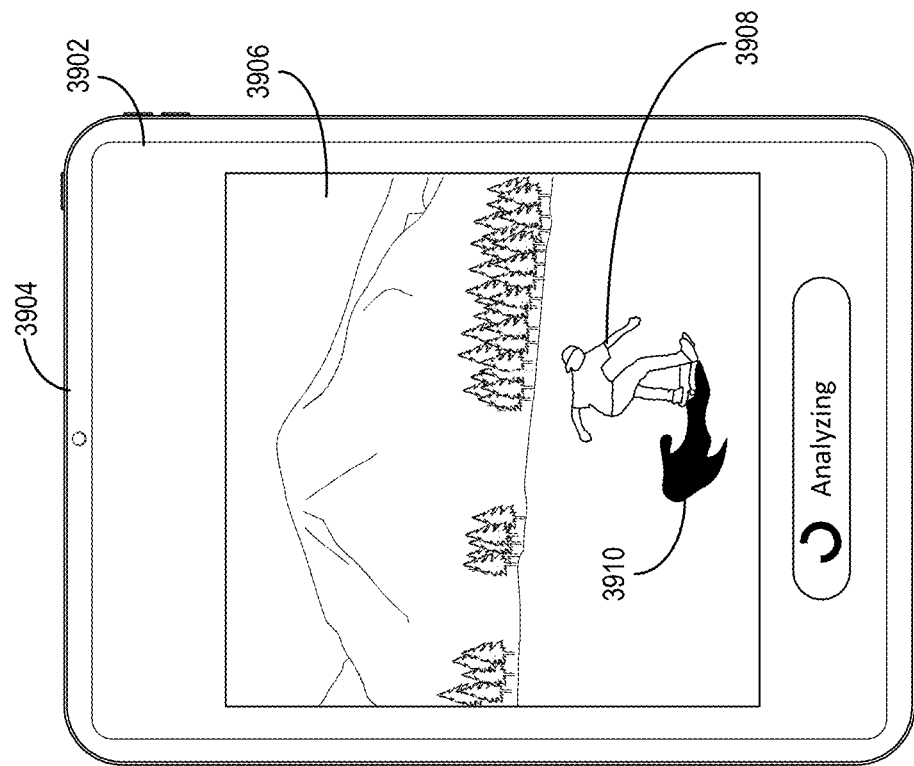
Figure 39C:
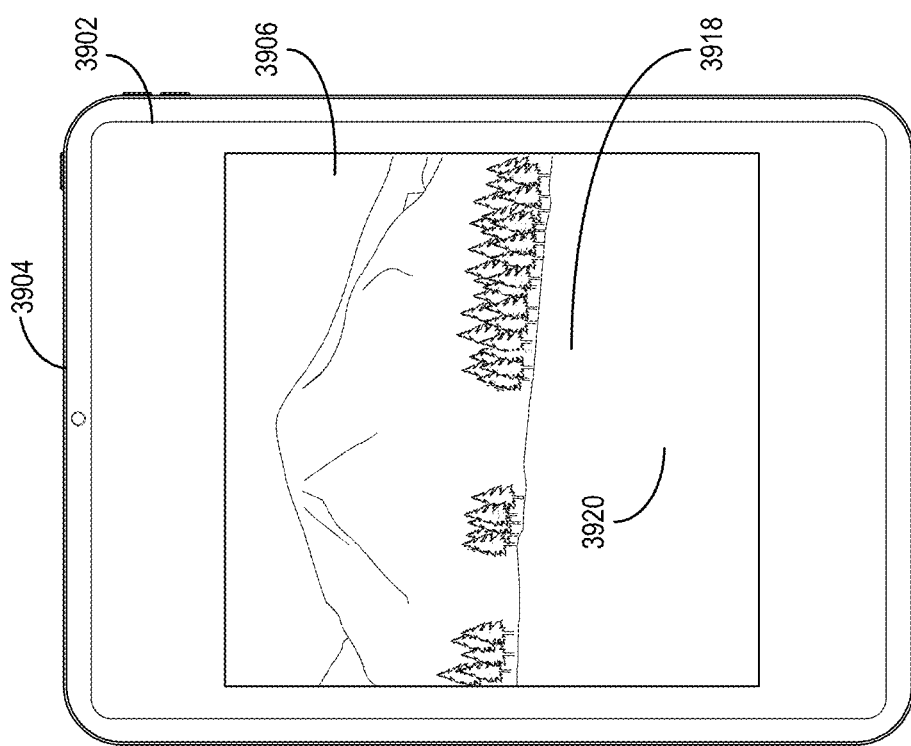

FIGS. 39A-39C illustrate a graphical user interface implemented by the scene-based image editing system 106 to identify and remove shadows of objects portrayed in a digital image in accordance with one or more embodiments. Indeed, as shown in FIG. 39A, the scene-based image editing system 106 provides, for display within a graphical user interface 3902 of a client device, a digital image 3906 portraying an object 3908. As further shown, the object 3908 casts a shadow 3910 within the digital image 3906.

In one or more embodiments, upon receiving the digital image 3906, the scene-based image editing system 106 utilizes a shadow detection neural network to analyze the digital image 3906. In particular, the scene-based image editing system 106 utilizes the shadow detection neural network to identify the object 3908, identify the shadow 3910 cast by the object 3908, and further associate the shadow 3910 with the object 3908. As previously mentioned, in some implementations, the scene-based image editing system 106 further utilizes the shadow detection neural network to generate object masks for the object 3908 and the shadow 3910.

As previously discussed with reference to FIG. 26, in one or more embodiments, the scene-based image editing system 106 identifies shadows cast by objects within a digital image as part of a neural network pipeline for identifying distracting objects within the digital image. For instance, in some cases, the scene-based image editing system 106 utilizes a segmentation neural network to identify objects for a digital image, a distractor detection neural network to classify one or more of the objects as distracting objects, a shadow detection neural network to identify shadows and associate the shadows with their corresponding objects, and an inpainting neural network to generate content fills to replace objects (and their shadows) that are removed. In some cases, the scene-based image editing system 106 implements the neural network pipeline automatically in response to receiving a digital image.

Indeed, as shown in FIG. 39B, the scene-based image editing system 106 provides, for display within the graphical user interface 3902, a visual indication 3912 indicating a selection of the object 3908 for removal. As further shown, the scene-based image editing system 106 provides, for display, a visual indication 3914 indicating a selection of the shadow 3910 for removal. As suggested, in some cases, the scene-based image editing system 106 selects the object 3908 and the shadow 3910 for deletion automatically (e.g., upon determining the object 3908 is a distracting object). In some implementations, however, the scene-based image editing system 106 selects the object 3908 and/or the shadow 3910 in response to receiving one or more user interactions.

For instance, in some cases, the scene-based image editing system 106 receives a user selection of the object 3908 and automatically adds the shadow 3910 to the selection. In some implementations, the scene-based image editing system 106 receives a user selection of the object 3908 and provides a suggestion for display in the graphical user interface 3902, suggesting that the shadow 3910 be added to the selection. In response to receiving an additional user interaction, the scene-based image editing system 106 adds the shadow 3910.

As further shown in FIG. 39B, the scene-based image editing system 106 provides a remove option 3916 for display within the graphical user interface 3902. As indicated by FIG. 39C, upon receiving a selection of the remove option 3916, the scene-based image editing system 106 removes the object 3908 and the shadow 3910 from the digital image. As further shown, the scene-based image editing system 106 replaces the object 3908 with a content fill 3918 and replaces the shadow 3910 with a content fill 3920. In other words, the scene-based image editing system 106 reveals the content fill 3918 and the content fill 3920 upon removing the object 3908 and the shadow 3910, respectively.

Though FIGS. 39A-39C illustrates implementing shadow detection with respect to a delete operation, it should be noted that the scene-based image editing system 106 implements shadow detection for other operations (e.g., a move operation) in various embodiments. Further, thought FIGS. 39A-39C are discussed with respect to removing distracting objects from a digital image, the scene-based image editing system 106 implements shadow detection in the context of other features described herein. For instance, in some cases, the scene-based image editing system 106 implements shadow detection with respect to object-aware modifications where user interactions target objects directly. Thus, the scene-based image editing system 106 provides further advantages to object-aware modifications by segmenting objects and their shadows and generating corresponding content fills before receiving user interactions to modify the objects to allow for seamless interaction with digital images as if they were real scenes.

By identifying shadows cast by objects within digital images, the scene-based image editing system 106 provides improved flexibility when compared to conventional systems. Indeed, the scene-based image editing system 106 flexibly identifies objects within a digital image along with other aspects of those objects portrayed in the digital image (e.g., their shadows). Thus, the scene-based image editing system 106 provides a better image result when removing or moving objects as it accommodates these other aspects. This further leads to reduced user interaction with a graphical user interface as the scene-based image editing system 106 does not require user interactions for targeting the shadows of objects for movement or removal (e.g., user interactions to identify shadow pixels and/or tie the shadow pixels to the object).

In some implementations, the scene-based image editing system 106 implements one or more additional features to facilitate the modification of a digital image. In some embodiments, these features provide additional user-interface-based efficiency in that they reduce the amount of user interactions with a user interface typically required to perform some action in the context of image editing. In some instances, these features further aid in the deployment of the scene-based image editing system 106 on computing devices with limited screen space as they efficiently use the space available to aid in image modification without crowding the display with unnecessary visual elements.

One or more embodiments described herein include the scene-based image editing system 106 that implements scene-based image editing techniques using intelligent image understanding. Indeed, in one or more embodiments, the scene-based image editing system 106 utilizes a shadow synthesis model to generate a natural shadow for objects. For example, in some implementations, the scene-based image editing system 106 leverages a shadow synthesis diffusion model to generate a shadow for scenes and objects. To illustrate, the scene-based image editing system 106 generates a combined representation from the digital image. Further, in some instances, the scene-based image editing system 106 feeds the combined representation as input into the shadow synthesis diffusion model to generate a modified digital image that includes a shadow of the object.

As mentioned above, the scene-based image editing system 106 generates a combined representation, in particular, the scene-based image editing system 106 generates the combined representation from an object mask of the object, the digital image, and a noise representation. For instance, the scene-based image editing system 106 generates the combined representation by concatenating the object mask of the object, the digital image, and the noise representation for input into a pixel space diffusion model. Moreover, in some embodiments, the scene-based image editing system 106 generates a vector representation of the concatenated object mask, digital image, and the noise representation to feed as input to a latent space diffusion model.

As just mentioned, the scene-based image editing system 106 utilizes the shadow synthesis diffusion model that includes diffusion layers and denoising layers. In one or more embodiments, during inference, the scene-based image editing system 106 utilizes the denoising layers (e.g., a denoising neural network) of the shadow synthesis diffusion model to generate the digital image that includes the object and a shadow. Further, in some embodiments, the denoising layers of the shadow synthesis diffusion model includes upsampling and downsampling layers (e.g., a U-Net architecture) that generates a denoised representation (e.g., an at least partially denoised image (pixel space) or tensor (latent space)) at each denoising layer. Moreover, in some embodiments, the scene-based image editing system 106 conditions the denoising layers with the timestep and a text prompt (e.g., the text prompt "shadow").

As mentioned, in some embodiments the scene-based image editing system generates a digital image that includes the object and a shadow of the object. For instance, in some embodiments the scene-based image editing system 106 directly synthesizes a shadow within the digital image. In some embodiments, the scene-based image editing system 106 generates a shadow layer and composites the shadow layer with the digital image to generate the digital image with the shadow.

Moreover, in one or more embodiments, the scene-based image editing system 106 generates a shadow for an object within the digital image and preserves a visible texture in the location at which the shadow is generated. For instance, in some embodiments the synthesized shadow of the object in the digital image covers a specific noticeable texture (e.g., contours in the sand on a beach). In some such embodiments, the scene-based image editing system 106 generates the shadow but maintains a translucent nature of the shadow such that the specific noticeable ground texture is present and visible.

Furthermore, in some embodiments, the scene-based image editing system 106 receives a digital image and synthesizes a shadow for an object transferred from another object to the current digital image. Moreover, in some embodiments, the scene-based image editing system 106 receives the digital image and a plurality of objects transferred over from a plurality of additional digital images. Additionally, in some embodiments, the object originates in the digital image. Accordingly, regardless of the source of the object in the digital image, the scene-based image editing system 106 synthesizes natural and realistic shadows.

As mentioned above, conventional systems suffer from a number of issues in relation to computational inefficiencies, inaccuracies, and operational inflexibility. For example, conventional systems suffer from computational inefficiencies when generating shadows within a digital image. In particular, some systems require extensive information such as explicit three-dimensional information. For instance, some systems analyze a digital image to generate three-dimensional models that include information such as object geometry, scene geometry, and scene lighting. As such, these systems consume a vast number of computational resources in order to generate shadow(s) in digital images.

Furthermore, conventional systems also suffer from computational inaccuracies. For example, conventional systems suffer from computational inaccuracies due to conventional techniques employed when generating shadows. In particular, conventional systems sometimes generate modified pixels within a digital image that do not naturally and realistically portray the intensity, size, or shape of an object. As such, when generating shadows, conventional systems often fail to accurately preserve visible textures within a digital image.

Relatedly, certain conventional systems suffer from operational inflexibility. For example, conventional systems sometimes generate unwanted shadows. For example, some conventional systems generate shadows in a wholesale manner for all objects shown within a digital image. Furthermore, as mentioned above, some conventional systems also fail to generate shadows that preserve a visible texture and naturally/realistically portray shadows cast within a digital image. Accordingly, conventional systems suffer from rigidly generating shadows for all objects in a low-quality and inefficient manner.

As suggested, in one or more embodiments, the scene-based image editing system 106 provides various advantages over conventional systems. For example, in one or more embodiments, the scene-based image editing system 106 improves efficiency over prior systems. For example, as mentioned, in some embodiments the scene-based image editing system 106 utilizes an object mask, a digital image, and a noise representation to generate a modified digital image with the shadow of the object utilizing a diffusion model. Accordingly, the scene-based image editing system 106 generates a shadow within the digital image without computationally heavy operations based on three-dimensional models or scene geometry. Rather, the scene-based image editing system 106 utilizes a shadow synthesis diffusion model to denoise a combined representation and generate the modified digital image portraying the shadow of the object without having to determine or utilize 3D models or other scene geometry.

Furthermore, in one or more embodiments, the scene-based image editing system also improves upon inaccuracies in conventional systems. For example, in some embodiments, the scene-based image editing system 106 generates a shadow utilizing the shadow synthesis diffusion model that is consistent with a scene of the digital image. For instance, in some embodiments, the scene-based image editing system 106 accesses an object mask for an object that corresponds to a location depicting a visible texture (a grassy field or a sandy beach with a specific contour or pattern). In some such embodiments, the scene-based image editing system 106 preserves the visible texture by generating a shadow that maintains the visible texture encompassed by the shadow. Furthermore, in some embodiments, by utilizing the shadow synthesis diffusion model, the scene-based image editing system 106 generates realistic and natural shadows for a digital image based on two-dimensional information (e.g., the object mask, the digital image, and the noise representation).

Moreover, in one or more embodiments, the scene-based image editing system 106 further improves upon operational inflexibilities relative to conventional systems. For example, in some embodiments, the scene-based image editing system 106 generates a shadow for an object indicated by a client device. In other words, the scene-based image editing system 106 generates shadows for objects that are selected or indicated by a user of a client device (e.g., rather than generating shadows in a wholesale manner for all objects within a digital image). Like the efficiency and accuracy improvements, in one or more embodiments, the scene-based image editing system 106 generates shadows that preserve visible textures in a high-quality manner. As such, the scene-based image editing system 106 flexibly provides a wider range of shadow synthesis options.

Figure 40:
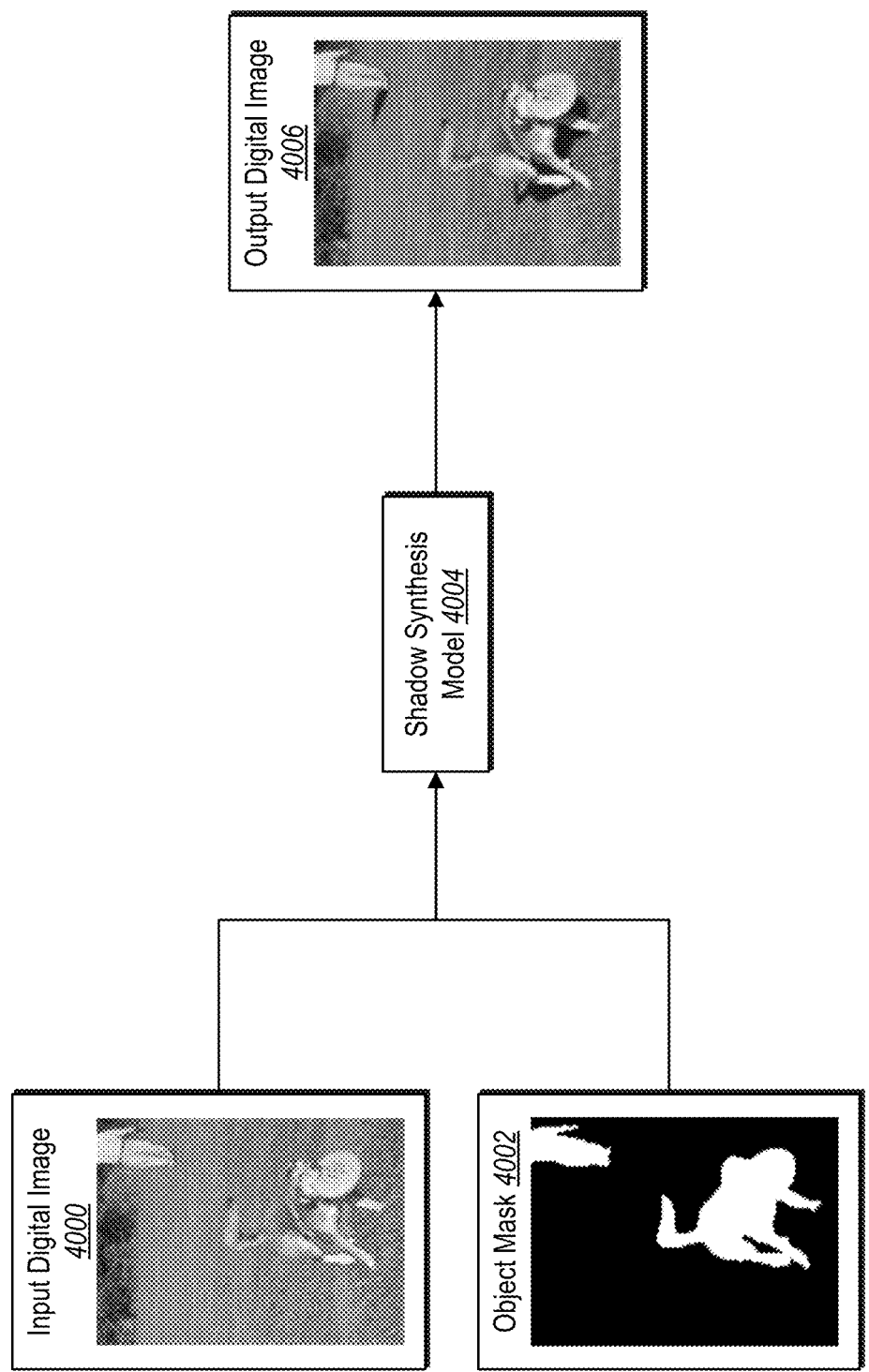
FIG. 40 illustrates an overview diagram for adding a shadow to a digital image utilizing a shadow synthesis model in accordance with one or more embodiments.

FIG. 40 illustrates an overview figure of the scene-based image editing system 106 utilizing a shadow synthesis model to generate a modified digital image that includes a synthesized shadow in accordance with one or more embodiments. For example, FIG. 40 shows a digital image 4000 depicting a scene that includes an object. Specifically, the digital image 4000 depicts a grass field with a person in the distance and a dog in the forefront catching a frisbee.

As mentioned above in FIG. 2, the scene-based image editing system 106 receives digital images. For example, the scene-based image editing system 106 receives the digital image 4000 for performing shadow synthesis. In some embodiments, the digital image 4000 includes a digital frame composed of various pictorial elements. In particular, the pictorial elements include pixel values that define the spatial and visual aspects of the digital image 4000. Furthermore, in some embodiments, the scene-based image editing system 106 receives the digital image 4000 from an image editing platform (e.g., via upload). In other instances, the scene-based image editing system 106 captures the digital image 4000 by utilizing a digital capture application/device. In any event, the digital image 4000 includes one or more object(s) without a shadow.

As mentioned above, the scene-based image editing system 106 receives the digital image 4000 that depicts a scene. For example, the scene includes visual elements within the digital image 4000 that depict a specific environment or scenario. In particular, the scene includes objects, background elements, foreground elements, lighting, colors, and other visual elements that convey a specific narrative. For instance, the scene includes a subject or theme such as a nature landscape, a busy city street, a home, or a sporting event.

Furthermore, FIG. 40 also shows an object mask 4002 of the object(s) within the digital image. Specifically, FIG. 40 shows the object mask 4002 includes the dog with the frisbee and the person in the background. As mentioned previously in FIG. 3, the scene-based image editing system 106 generates an object mask utilizing a segmentation model such as a detection-masking neural network 300. For example, the scene-based image editing system 106 generates the object mask 4002 for an object within the digital image 4000 for use in generating a shadow of the object. In particular, as previously discussed, the object mask 4002 includes an indication of pixels belonging to the object and an indication of pixels not belonging to the object (e.g., does the pixel belong to the dog or not).

Additionally, FIG. 40 shows the scene-based image editing system 106 generating a shadow from the digital image 4000 and the object mask 4002 utilizing a shadow synthesis model 4004. Moreover, in one or more embodiments, the shadow synthesis model 4004 includes a shadow synthesis diffusion model discussed in more detail in FIG. 41A.

As shown in FIG. 40, the scene-based image editing system 106 utilizes the shadow synthesis model 4004 to generate a modified digital image 4006. As shown in FIG. 40, the modified digital image 4006 includes a modified version of the digital image 4000 that shows a shadow for the dog and the person. For example, as used herein, the term "image modification" refers to a change, alteration, or enhancement performed to, or on, a digital image file. In particular, the term image modification includes any change, alteration, or enhancement of pixels within the digital image file. To illustrate, image modification includes the addition of a shadow to the digital image via directly synthesizing pixels within the digital image or generating a shadow layer to composite with the digital image 4000.

As just mentioned, the modified digital image 4006 depicts the dog and the person with shadows. In one or more embodiments, the scene-based image editing system 106 synthesizes a shadow for an object within a digital image. For example, a shadow includes a dark area or shape cast onto a surface from an object when the object blocks a source of light. Furthermore, a shadow varies in size, shape, and intensity depending on an angle of the object positioned in front of a light source. For instance, a shadow from an object within a digital image includes a two-dimensional representation. Moreover, the shadow from the object is typically cast onto a surface and various properties of the surface are still visible due to the shadow's translucent nature.

Figure 41A:
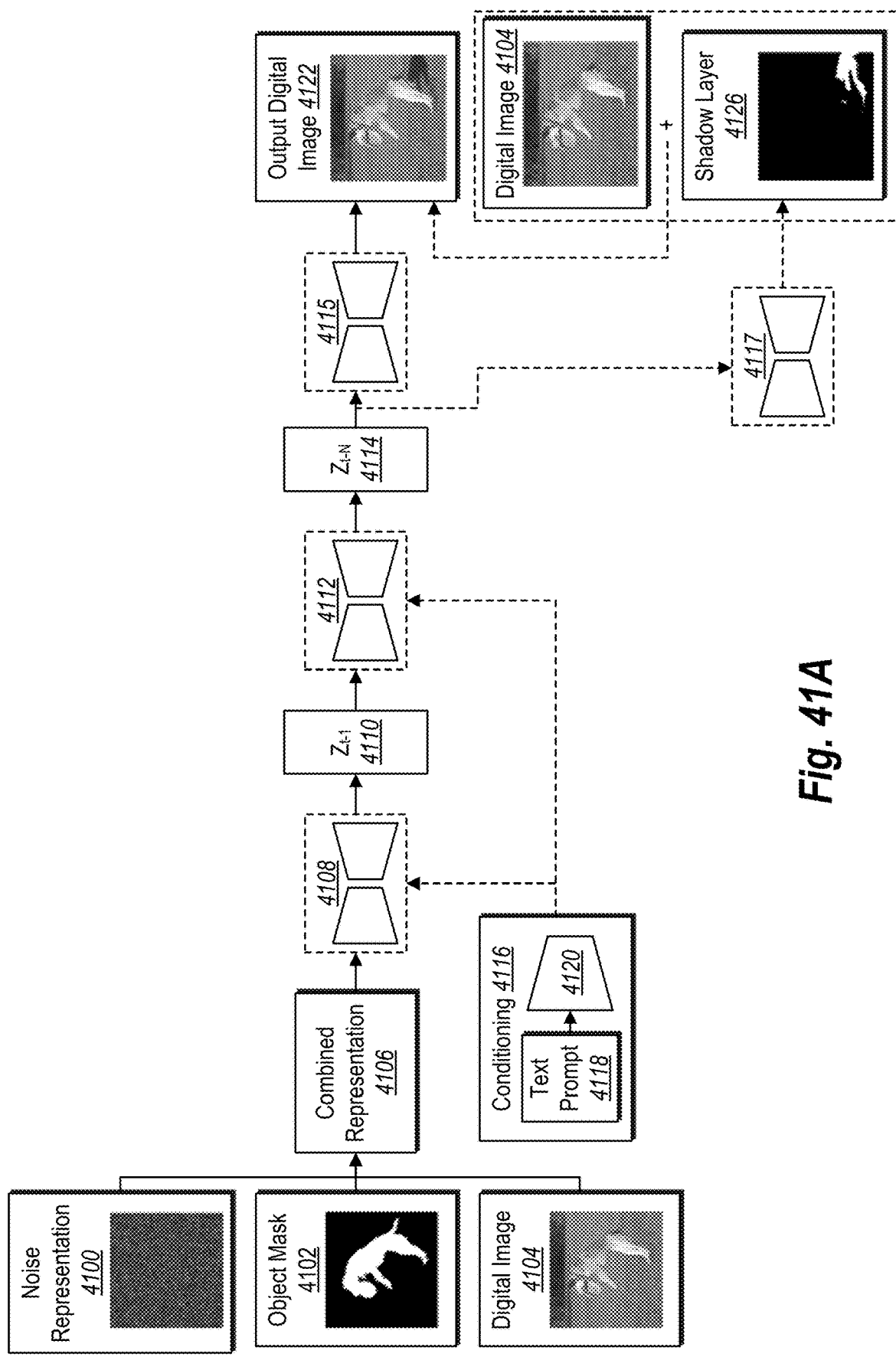
FIGS. 41A-41B illustrates a diagram for generating a digital image with a synthesized shadow utilizing a shadow synthesis diffusion model in accordance with one or more embodiments.

As mentioned above, the shadow synthesis model includes a shadow synthesis diffusion model to generate shadows within a digital image. FIG. 41A illustrates the scene-based image editing system 106 utilizing a shadow synthesis diffusion model to generate a shadow for an object within a digital image in accordance with one or more embodiments. For example, FIG. 41A shows denoising neural networks (e.g., denoising layers) of the shadow synthesis diffusion model. Further, in some embodiments the scene-based image editing system 106 implements a shadow synthesis diffusion model in a pixel color space, while in other embodiments the scene-based image editing system 106 implements the shadow synthesis diffusion model in a latent vector space.

As mentioned, the scene-based image editing system 106 utilizes a diffusion neural network. In particular, during training of the diffusion neural network, a diffusion neural network receives as input a digital image and adds noise to the digital image through a series of steps. For instance, the disclosed system utilizes a fixed Markov chain that adds noise to the data of the digital image until the diffusion representation is diffused. Furthermore, each step of the fixed Markov chain relies upon the previous step. Specifically, at each step, the fixed Markov chain adds Gaussian noise with variance which produces a diffusion representation. The scene-based image editing system 106 adjusts the number of diffusion layers in the diffusion process (and the number of corresponding denoising layers in the denoising process).

During inference (e.g., implementation), the scene-based image editing system 106 utilizes an iterative denoising process to generate digital images with shadows. For example, the scene-based image editing system 106 receives a noise representation 4100, an object mask 4102 of an object in the digital image (e.g., selected for shadow synthesis), and a digital image 4104 depicting a scene. In one or more embodiments, the noise representation 4100 includes the addition of random noise as input data. For instance, the noise representation 4100 includes Gaussian noise sampled from a normal distribution with a mean of zero and a specified standard deviation.

Furthermore, the object mask 4102 and the digital image 4104 were discussed above in relation to FIG. 40 (e.g., object mask 4002 and digital image 4000). As shown in FIG. 41A, the scene-based image editing system 106 combines the noise representation 4100, the object mask 4102, and the digital image 4104 to generate a combined representation 4106. For instance, the scene-based image editing system 106 combines the noise representation 4100, the object mask 4102 and the digital image 4104 by concatenating the noise representation 4100, the object mask 4102, and the digital image 4104.

In some embodiments, the combined representation 4106 includes seven channels (e.g., three (R, G, and B channels) for the noise representation 4100, 1 for the object mask 4102, and three (R, G, and B channels) for the digital image 4104). Moreover, the scene-based image editing system 106 utilizes a diffusion neural network to process to generate a digital image with a synthesized shadow from the combined representation 4106.

As shown in FIG. 41A, the scene-based image editing system 106 via a first denoising neural network 4108 receives the combined representation 4106. Further, as shown, the first denoising neural network 4108 generates a first denoised representation 4110 (i.e., a partially denoised digital image) and iteratively repeats this process (10, 20, 50, or 100 times, etc.). For instance, as shown, the scene-based image editing system 106 utilizes a Nth denoising neural network 4112 to process the first denoised representation 4110 (e.g., or a second, third, or x denoised representation) and generates an Nth denoised representation 4114.

As also shown in FIG. 41A, in some embodiments, the scene-based image editing system 106 performs an optional act 4116 of conditioning the first denoising neural network 4108 and the Nth denoising neural network 4112. For example, the act 4116 includes conditioning each layer of the denoising neural networks 4108 and 4112. To illustrate, conditioning layers of a neural network includes providing context to the networks to guide the generation of a text-conditioned image (e.g., a digital image including a synthesized shadow). For instance, conditioning layers of neural networks include at least one of (1) transforming conditioning inputs (e.g., the text prompt) into vectors to combine with the denoising representations; and/or (2) utilizing attention mechanisms which causes the neural networks to focus on specific portions of the input and condition its predictions (e.g., outputs) based on the attention mechanisms. Specifically, for denoising neural networks, conditioning layers of the denoising neural networks includes providing an alternative input to the denoising neural networks (e.g., the text query). In particular, the scene-based image editing system 106 provides alternative inputs to provide a guide in removing noise from the diffusion representation (e.g., the denoising process). Thus, the scene-based image editing system 106 conditioning layers of the denoising neural networks acts as guardrails to allow the denoising neural networks to learn how to remove noise from an input signal and produce a clean output.

Specifically, conditioning the layers of the network includes modifying input into the layers of the denoising neural networks to combine with the noise representation. For instance, the scene-based image editing system 106 combines (e.g., concatenates) vector values generated from the encoder at different layers of the denoising neural networks. For instance, the scene-based image editing system 106 combines one or more conditioning vectors with the noise representation, or the modified noise representation. Thus, the denoising process considers the noise representation and the text vector representation (e.g., the text prompt) to generate text-conditioned images (e.g., the output digital image 4122 with the synthesized shadow).

As shown in FIG. 41A, to optionally condition the denoising neural networks, in one or more embodiments, the scene-based image editing system 106 utilizes a text prompt 4118. In particular, in some embodiments the scene-based image editing system 106 utilizes the text prompt 4118 during training and during inference. In some embodiments, the scene-based image editing system 106 utilizes the text prompt 4118 that includes the text "shadow." Further as shown, the scene-based image editing system 106 utilizes a text encoder 4120 to process the text prompt and generate a text vector. Moreover, in one or more embodiments, the scene-based image editing system 106 further conditions the denoising neural networks with a corresponding timestep (e.g., the scene-based image editing system 106 conditions a first denoising neural network with a first timestep). Moreover, in some embodiments, the scene-based image editing system 106 does not condition the denoising neural networks with the text prompt 4118 or any other conditioning.

In one or more embodiments, the scene-based image editing system 106 utilizes the text encoder 4120 to process the text prompt 4118. In particular, the text prompt 4118 includes a component of a neural network to transform textual data (e.g., the text query) into a numerical representation. For instance, the scene-based image editing system 106 utilizes the text encoder 4120 to transform the text prompt 4118 into a text vector representation. Further, the scene-based image editing system 106 utilizes the text encoder 4120 in a variety of ways. For instance, the scene-based image editing system 106 utilizes the text encoder 4120 to i) determine the frequency of individual words in the text prompt 4118 (e.g., each word becomes a feature vector), ii) determines a weight for each word within the text prompt 4118 to generate a text vector that captures the importance of words within a text prompt, iii) generates low-dimensional text vectors in a continuous vector space that represents words within the text prompt 4118, and/or iv) generates contextualized text vectors by determining semantic relationships between words within the text prompt 4118.

As mentioned above, the scene-based image editing system 106 utilizes the text encoder 4120 to generate a text vector representation. In one or more embodiments, the text vector representation includes a numeral representation of the text query. In particular, the scene-based image editing system 106 generates the text vector representation via a text encoding process and the text vector representation represents various aspects of the text query. For instance, the text vector representation indicates the presence of specific concepts, the meaning of the specific concepts, the relationship between concepts, and the context of the concepts.

As shown in FIG. 41A, the scene-based image editing system 106 passes the Nth denoised representation 4114 to an Nth denoising neural network 4115 to generate a modified digital image 4122 that includes a denoised digital image depicting the dog with a synthesized shadow for the dog.

Alternatively, as shown, the scene-based image editing system 106 generates via the Nth denoising neural network 4117 a shadow layer 4126 separate from the digital image. Further, in some embodiments the scene-based image editing system 106 combines (e.g., via multiplicative, additive or another other mathematical operation) the shadow layer 4126 with the digital image 4104 to generate a digital image equivalent to the denoised digital image 4122. More particularly, in one or more embodiments, the scene-based image editing system 106 generates a shadow for the object within the digital image that includes the shadow layer 4126 (e.g., a soft shadow layer). For example, the scene-based image editing system 106 utilizes an additional denoising neural network 4117 to process the Nth denoised representation 4114. In particular, from processing the Nth denoised representation with the additional denoising neural network 4117, the scene-based image editing system 106 generates the shadow layer 4126 which includes a blurred and translucent representation of a shadow added to the digital image 4104. Further, in some instances the scene-based image editing system 106 generates the shadow layer 4126 separate from the digital image 4104 and composites the shadow layer on top of the digital image 4104 to generate the output digital image 4122.

Figure 41B:
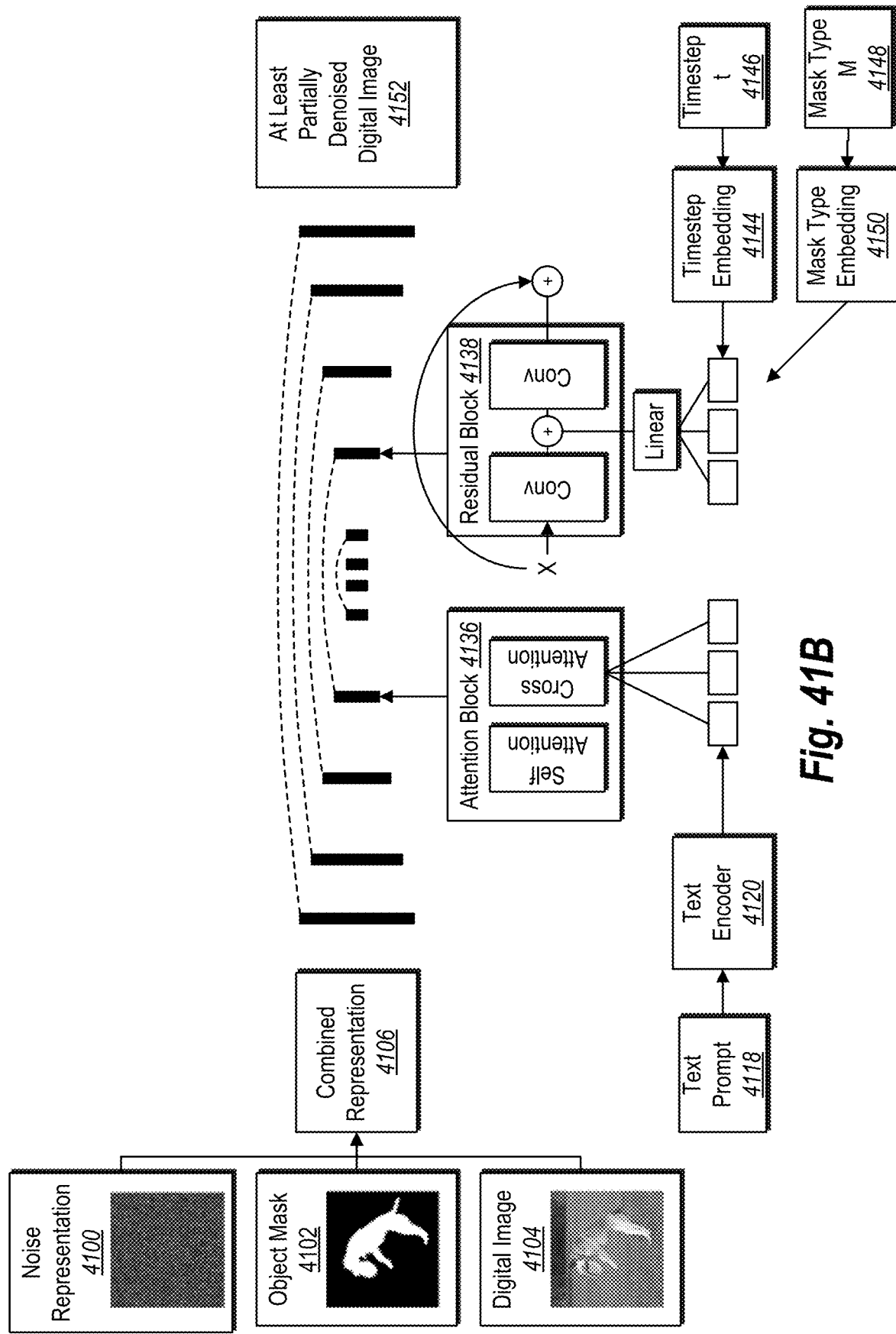

FIG. 41B illustrates an example architecture (e.g., a Multi-diffusion model) of a denoising neural network of the shadow synthesis diffusion model in accordance with one or more embodiments. For example, FIG. 41B, shows the detailed architecture of a denoising neural network (e.g., denoising neural network 4108, 4112, 4115, and/or 4117). FIG. 41B shows the noise representation 4100, the object mask 4102, and the digital image 4104 combined to generate the combined representation 4106. For instance, as shown, in some embodiments, the scene-based image editing system 106 utilizes denoising neural networks with a modified U-Net architecture shown. Specifically, the scene-based image editing system 106 utilizes a U-Net architecture that contains upsampling and downsampling layers connected by skip connections for various resolutions (e.g., 128 to 8) of the digital image 4104.

Moreover, as shown in FIG. 41B, the scene-based image editing system 106 conditions the downsampling denoising layers with the text prompt 4118 via the text encoder 4120. As mentioned above in FIG. 41A, as part of the conditioning process, the scene-based image editing system 106 utilizes an attention mechanism. Specifically, as shown, the scene-based image editing system 106 utilizes an attention block 4136 with self attention and cross attention layers. Additionally, the scene-based image editing system 106 conditions the upsampling denoising layers with a timestep embedding 4144 (e.g., from a timestep 4146) and a mask type embedding 4150 (e.g., from a mask type 4148). For instance, the scene-based image editing system 106 utilizes a residual block 4138 with various convolutional layers that linearizes the timestep embedding and the mask type embedding. As further shown, the scene-based image editing system 106 utilizes the diffusion architecture to generate an at least partially denoised digital image 4152 (e.g., via subsequent denoising steps the scene-based image editing system 106 generates a fully denoised digital image with a synthesized shadow).

Further, in one or more embodiments, the scene-based image editing system 106 trains the Multi-diffusion architecture with a mean-squared error loss (e.g., MSE loss). Specifically, in some embodiments the scene-based image editing system 106 compares a ground truth for only the masked region to determine the MSE loss to modify various parameters of the Multi-diffusion architecture.

FIGS. 41A and 41B illustrate the scene-based image editing system 106 generating shadows utilizing a diffusion process in the pixel space. In other words, the iterative denoising process takes place in the pixel space such that noisy pixels are denoised to generate pixels representing a shadow. In alternative implementations, the scene-based image editing system 106 generates shadows utilizing a diffusion process in a latent space. For example, the scene-based image editing system 106 includes an encoder that encodes the noise representation 4100, the object mask 4102, and the digital image 4104 into an initial noisy representation (e.g., tensor). The scene-based image editing system 106 uses an iterative denoising process in the latent space to generate a denoised representation from the initial noisy representation. The scene-based image editing system 106 utilizes a decoder to generate the modified digital image 4122 with the shadow by decoding the denoised representation from the latent space into the pixel space. Similarly, the scene-based image editing system 106 utilizes a decoder to generate the shadow layer 4126 by decoding the denoised representation from the latent space into the pixel space.

Figure 42A:
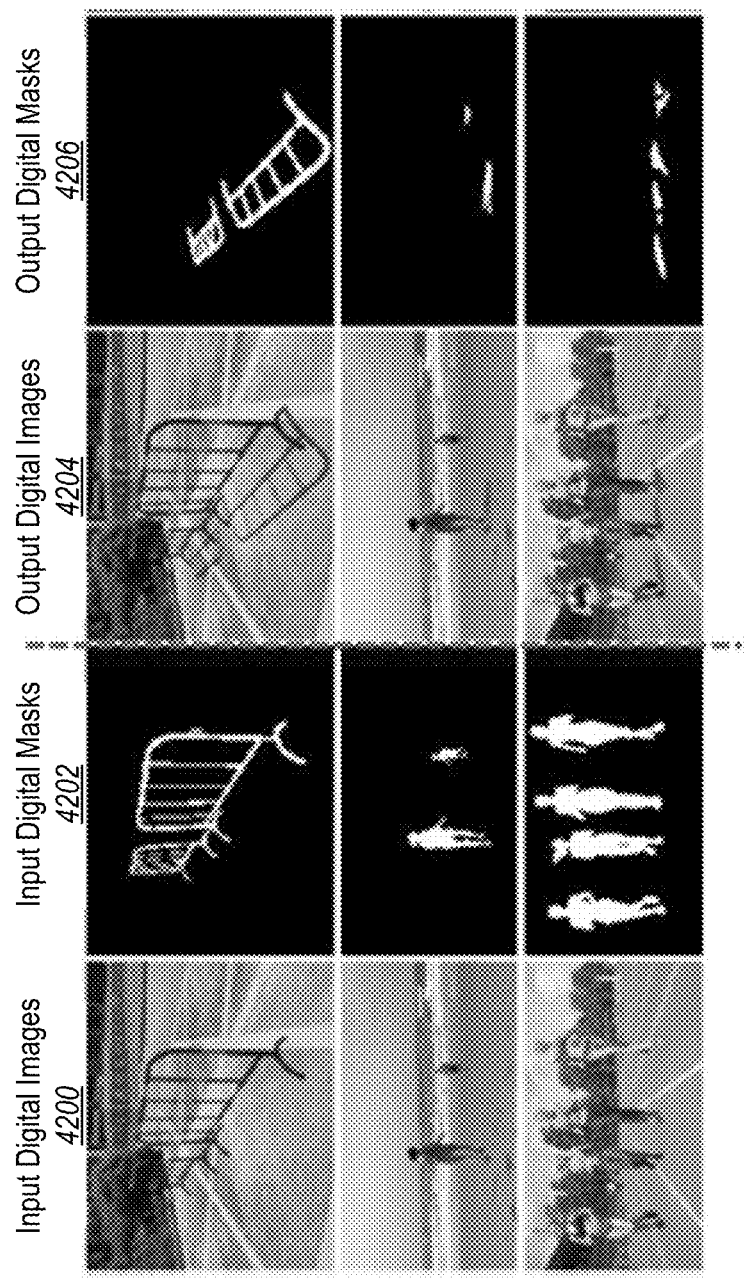
FIGS. 42A-42B illustrates results of the scene-based image editing system generating a shadow directly in the digital image and a shadow layer in accordance with one or more embodiments.

In any event, the scene-based image editing system 106 generates modified images with shadows corresponding to objects for which an object mask was provided as input. FIG. 42A illustrates results of the scene-based image editing system 106 generating digital images with synthesized shadows in accordance with one or more embodiments. For example, FIG. 42A shows results of the scene-based image editing system 106 utilizing a shadow image generation model that synthesizes a shadow image and a binary mask.

As shown in FIG. 42A, the scene-based image editing system 106 receives input digital images 4200 depicting a scene with no shadows for the featured objects within the input digital images 4200. Furthermore, the scene-based image editing system 106 also accesses input digital masks 4202 for the featured objects within the input digital images 4200 that do not contain a shadow (e.g., by accessing a scene graph for the digital image). For instance, the scene-based image editing system 106 generates the input digital masks 4202 with the methods discussed in FIG. 3 via a segmentation neural network.

As additionally shown in FIG. 42A, the scene-based image editing system 106 generates output digital images 4204 from the input digital images 4200 and the input digital masks 4202 utilizing the shadow synthesis model discussed above. In particular, the output digital images 4204 portrays the featured objects with realistic and natural looking shadows. Moreover, FIG. 42A also shows output digital masks 4206 that correspond to shadows of the featured objects in the input digital images 4200. For instance, the scene-based image editing system 106 utilizes the output digital masks 4206 to directly synthesize the shadow inside the output digital images 4204.

Figure 42B:
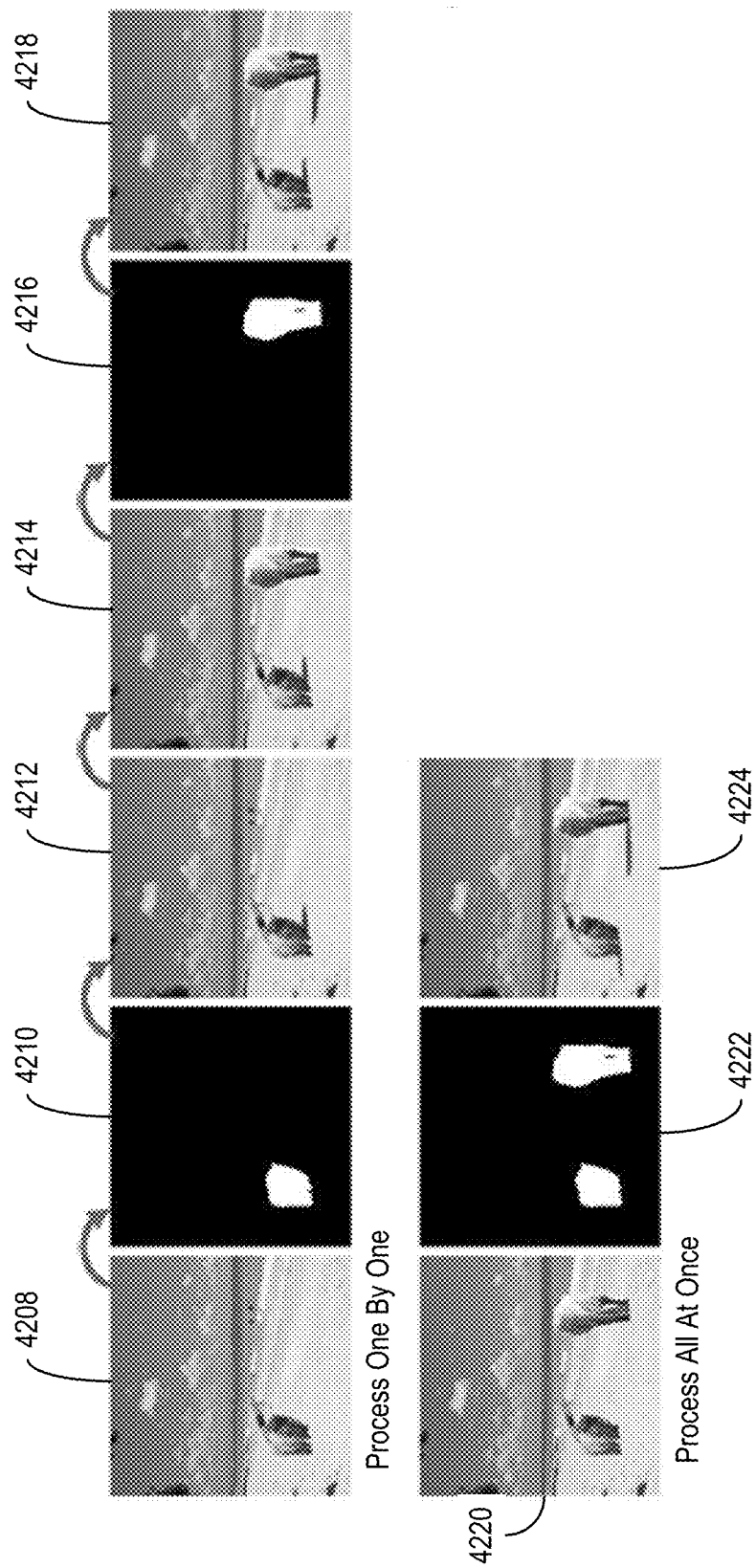

As mentioned above, in some embodiments the scene-based image editing system 106 generates a shadow layer for a specified object rather than directly synthesizing the shadow into the digital image. FIG. 42B, in contrast to FIG. 42A, illustrates the scene-based image editing system 106 utilizing a shadow synthesis model to predict a shadow layer for a set of specified objects either one by one or all at once in accordance with one or more embodiments. For example, FIG. 42B shows a digital image 4208 containing a bison but without a shadow. In particular, the top row of FIG. 42B illustrates synthesizing shadows for objects within a digital image one by one. Further, FIG. 42B shows an object mask 4210 for the bison and a first modified digital image 4212 shows the bison with a synthesized shadow. Moreover, an additional digital image 4214 shows the bison with a shadow and an additional object, an elephant. The scene-based image editing system 106 also accesses an object mask 4216 for the elephant and subsequently generates a second modified digital image 4218 that contains both the bison and the elephant with shadows.

As opposed to the top row, the bottom row in FIG. 42B illustrates synthesizing the shadow for the objects all at once. For example, FIG. 42B shows a digital image 4220 with the bison and the elephant without their shadows. Further, FIG. 42B depicts the scene-based image editing system 106 generating an object mask 4222 for both the bison and the elephant and subsequently generating a modified digital image 4224 that depicts both the bison and the shadow with their shadows. In some embodiments, processing all the objects at once to generate shadows for all the objects results in more consistent shadows across the different objects shown (e.g., the elephant and the bison).

Moreover, FIG. 42B depicts the bison and the elephant transferred from a different image with different lighting, despite this, FIG. 42B shows shadows for the bison and the elephant consistent with the object lighting.

Similar to the discussion above in FIGS. 41A-41B, in one or more embodiments the scene-based image editing system 106 receives an additional object (e.g., the elephant) from an additional digital image. Further, in some such embodiments, the scene-based image editing system 106 combines an additional object mask of the additional object, the digital image, and an additional noise representation to generate an additional combined representation. For instance, in some embodiments, the scene-based image editing system 106 generates an additional shadow for the additional object consistent with the scene by utilizing the additional combined representation.

Figure 43:
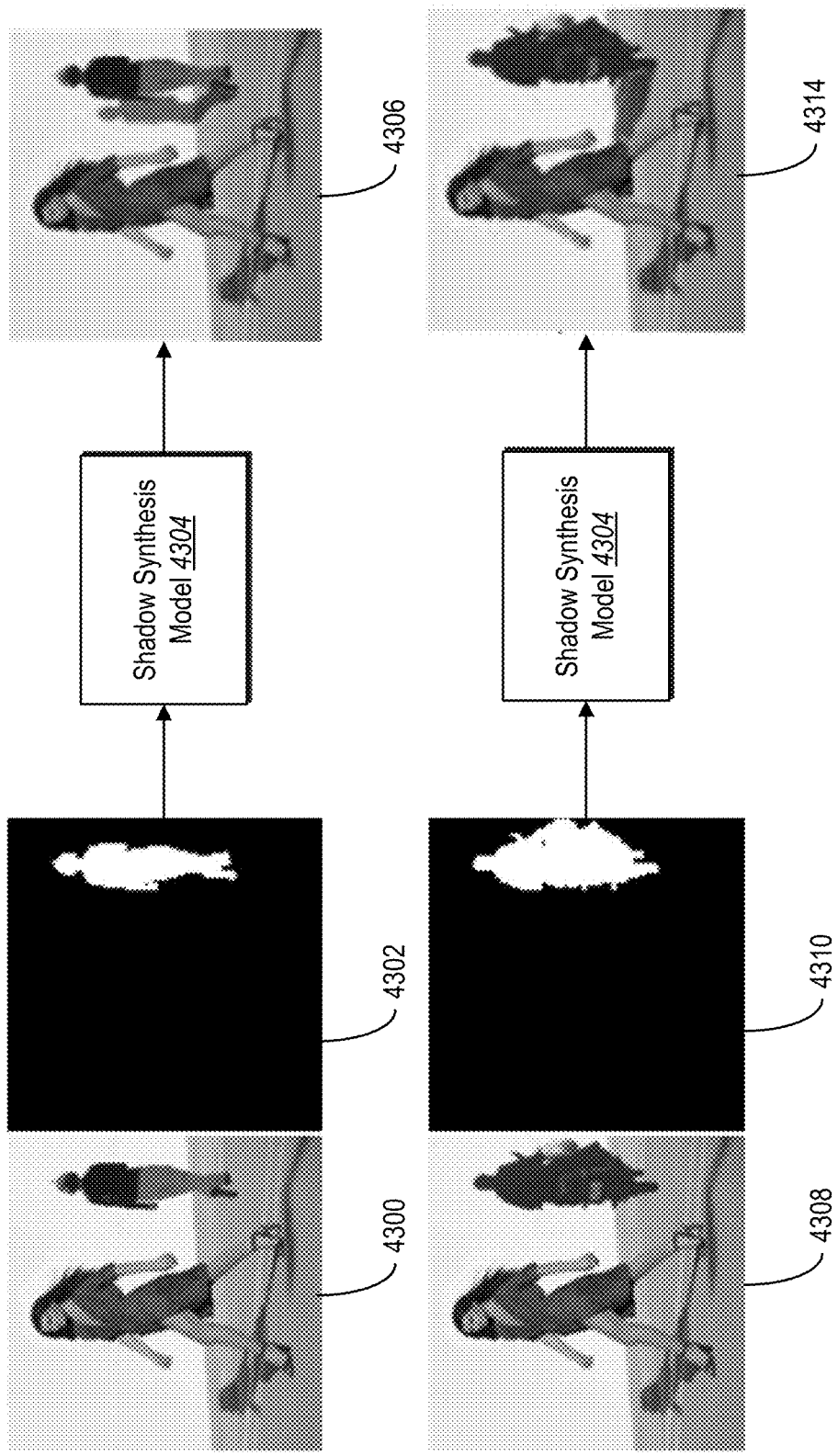
FIG. 43 illustrates the scene-based image editing system utilizing the shadow synthesis diffusion model to generate digital images on a horizontal surface and a vertical surface in accordance with one or more embodiments.

FIG. 43 further illustrates the scene-based image editing system 106 generating shadows for objects consistent with the scene depicted in the digital image. As shown, FIG. 43 shows a digital image 4300 depicting two persons walking past each other. Specifically, the digital image further depicts a shadow for the woman in the foreground and a shadow for a lamppost not depicted in the digital image 4300. Further, to generate a shadow for the person in the background of the digital image 4300, the scene-based image editing system 106 accesses an object mask 4302 for the person in the background. As shown, the scene-based image editing system 106 via a shadow synthesis model 4304 receives the digital image 4300 and the object mask 4302 and generates a modified digital image 4306. As illustrated in the modified digital image 4306, the shadow for the person in the background realistically spans across the ground and the vertical wall near the person.

In one or more embodiments, the digital image 4300 depicts a ground floor as part of depicting the scene. For example, the ground floor includes a surface or background upon which subjects or objects are situated. Further, the ground floor includes the supporting visual elements. For instance, the ground floor includes a grass field, a stone floor, or a sandy beach. In one or more embodiments, the digital image 4300 also depicts a vertical object. For example, the vertical object includes a vertical floor perpendicular to the ground floor. For instance, the vertical object includes a wall, partition, or an upright structure that defines the boundary of the scene. Accordingly, the scene-based image editing system 106 generates shadows for objects in a digital image consistent with the rest of the scene (e.g., conforms with the ground floor or the vertical object).

FIG. 43 further illustrates a digital image 4308 depicting the same women in the forefront with a motorcycle passing the woman. Further, FIG. 43 shows the scene-based image editing system 106 accessing an object mask 4310 of the object (e.g., the motorcycle) and processing the object mask 4310 and the digital image 4308 via the shadow synthesis model 4304. As shown, based on processing the digital image 4308 and the object mask 4310, the scene-based image editing system 106 via the shadow synthesis model 4304 also realistically generates a modified digital image 4314 with a shadow for the motorcycle object that spans the ground floor and slightly spans onto the vertical floor.

In one or more embodiments, the scene-based image editing system 106 further generates a proxy shadow for an object shown in a digital image while moving the object in response to an indication to move the object. For instance, the scene-based image editing system 106 causes a graphical user interface to display the digital image 4300 and provides an option to move one or more objects within the digital image 4300. In some such embodiments, the scene-based image editing system 106 generates a proxy shadow while the object is being moved around the digital image 4300.

Furthermore, in one or more embodiments, the scene-based image editing system 106 generates the shadow proxy by comparing the digital image 4300 with the object and the shadow with a version of the digital image that includes the object without the shadow. In doing so, the scene-based image editing system 106 generates a realistic and natural shadow proxy to accommodate to a new location while the object is being moved around the digital image 4300. Additional details regarding the scene-based image editing system 106 generating the shadow proxy are given below in the description of FIGS. 57-60.

In one or more embodiments, the scene-based image editing system 106 further generates a shadow for an object, where the shadow overlaps an additional object. For instance, for a person in a digital image standing next to a garbage can, the scene-based image editing system 106 generates a shadow for the person cast onto the garbage can. In such embodiments, the scene-based image editing system 106 preserves the visible texture of the additional object even though the additional object is covered by the generated shadow.

One or more embodiments described herein include the scene-based image editing system 106 that implements scene-based image editing techniques using intelligent image understanding. Indeed, in one or more embodiments, the scene-based image editing system 106 utilizes a shadow removal model to generate a digital image with a shadow removed. For example, in some implementations, the scene-based image editing system 106 leverages a shadow removal model to remove unwanted shadows cast into a scene or to remove shadows cast by objects when removing the objects from the digital image. For instance, the scene-based image editing system 106 utilizes a generative inpainting neural network to remove a shadow in a first location within a digital image and generate a fill for the first location that preserves the visible texture of the first location.

As mentioned, the scene-based image editing system 106 utilizes a generative inpainting neural network to perform shadow removal. In one or more embodiments, the scene-based image editing system 106 finetunes a general generative inpainting neural network to enhance the capabilities of the generative inpainting neural network in removing shadows. For instance, in some embodiments, the scene-based image editing system 106 finetunes the general generative inpainting neural network utilizing specialized training datasets.

In one or more embodiments, the scene-based image editing system 106 leverages various dataset generation techniques. For instance, in some embodiments, the scene-based image editing system 106 utilizes data augmentation strategies such as random shadow selection augmentation, random shadow intensity augmentation, and random dilation on shadow masks. In some such embodiments, the scene-based image editing system 106 leverages natural and computer-generated datasets with paired shadow and shadow-free images to enhance the shadow removal capabilities of the generative inpainting neural network (e.g., creating a specialized shadow removal generative inpainting neural network).

In addition to the above, in one or more embodiments, the scene-based image editing system 106 utilizes shadow composites. For instance, in some embodiments the scene-based image editing system 106 utilizes synthetic shadow images generated from randomly compositing shadows to random shadow-free images. Further, in some such embodiments, the scene-based image editing system 106 obtains a diverse data sample for shadow removal and training the generative inpainting neural network for a variety of digital images with different shadows.

In one or more embodiments, the scene-based image editing system 106 utilizes an intelligent selection of models to perform shadow removal. In particular, the scene-based image editing system 106 utilizes a set of models that includes a general generative inpainting neural network and a shadow removal generative inpainting neural network. Further, in some embodiments, the scene-based image editing system 106 utilizes a threshold to determine which model to select to perform the task of shadow removal. For instance, in some embodiments, the general generative inpainting neural network can be more suited for darker and larger shadows, while the shadow removal generative inpainting neural network is more suited for lighter and smaller shadows. As such, in some embodiments, the scene-based image editing system 106 utilizes intelligent detection to provide the highest-quality results for shadow removal.

As mentioned above, conventional systems suffer from a number of issues in relation to computational inaccuracies, and operational inflexibility. For example, conventional systems suffer from computational inaccuracies for removing shadows from a digital image. For instance, conventional systems typically generate digital images with removed shadows that fail to stay consistent with the surrounding scene depicted within the digital image (texture difference make the area where the shadow was removed readily apparent). Accordingly, some conventional systems generate digital images with shadows removed in an inconsistent, unnatural, and unrealistic manner.

Relatedly, conventional systems also suffer from operational inflexibilities. For example, as outlined in relation to accuracy concerns, conventional systems fail to provide higher-quality shadow removal techniques. In particular, conventional systems often fail to account for the region of the digital image associated with the shadow, thus upon removal, conventional systems replace the shadow region with generic pixels. As such, conventional systems fail to tailor the shadow removal with pixel modifications consistent with the rest of the digital image.

As suggested, in one or more embodiments, the scene-based image editing system 106 provides several advantages over conventional systems. For example, in one or more embodiments, the scene-based image editing system 106 improves computational accuracy over conventional systems. For example, as mentioned, the scene-based image editing system 106 receives the digital image depicting a scene with the object and the shadow and removes the shadow from the object. Specifically, in some such embodiments, the scene-based image editing system 106 utilizes a generative inpainting neural network to generate a fill for the location of the shadow which preserves a visible texture of the location.

Furthermore, in one or more embodiments, the scene-based image editing system 106 further improves upon computational accuracies relative to conventional systems due to the various training techniques employed by the scene-based image editing system 106. For example, the scene-based image editing system 106 utilizes paired and simulated shadow data during training in addition to the various dataset augmentation methods discussed above. In doing so, the scene-based image editing system 106 fine-tunes the ability of the shadow removal generative inpainting neural network to remove shadows from a digital image and maintain the underlying texture in a natural and realistic manner. Moreover, in some embodiments, the scene-based image editing system 106 utilizes shadow masks with random dilations during training to further enhance the ability of the shadow removal generative inpainting neural network to remove masks.

In one or more embodiments, the scene-based image editing system 106 also improves upon computational accuracies relative to conventional systems by generating an estimate of the residual pixels (e.g., utilizing residual learning). Specifically, in some embodiments, rather than generically predicting pixels for the masked shadow region, the scene-based image editing system 106 estimates residual pixels for an input image to add to an input image and generate a modified digital image.

Figure 44:
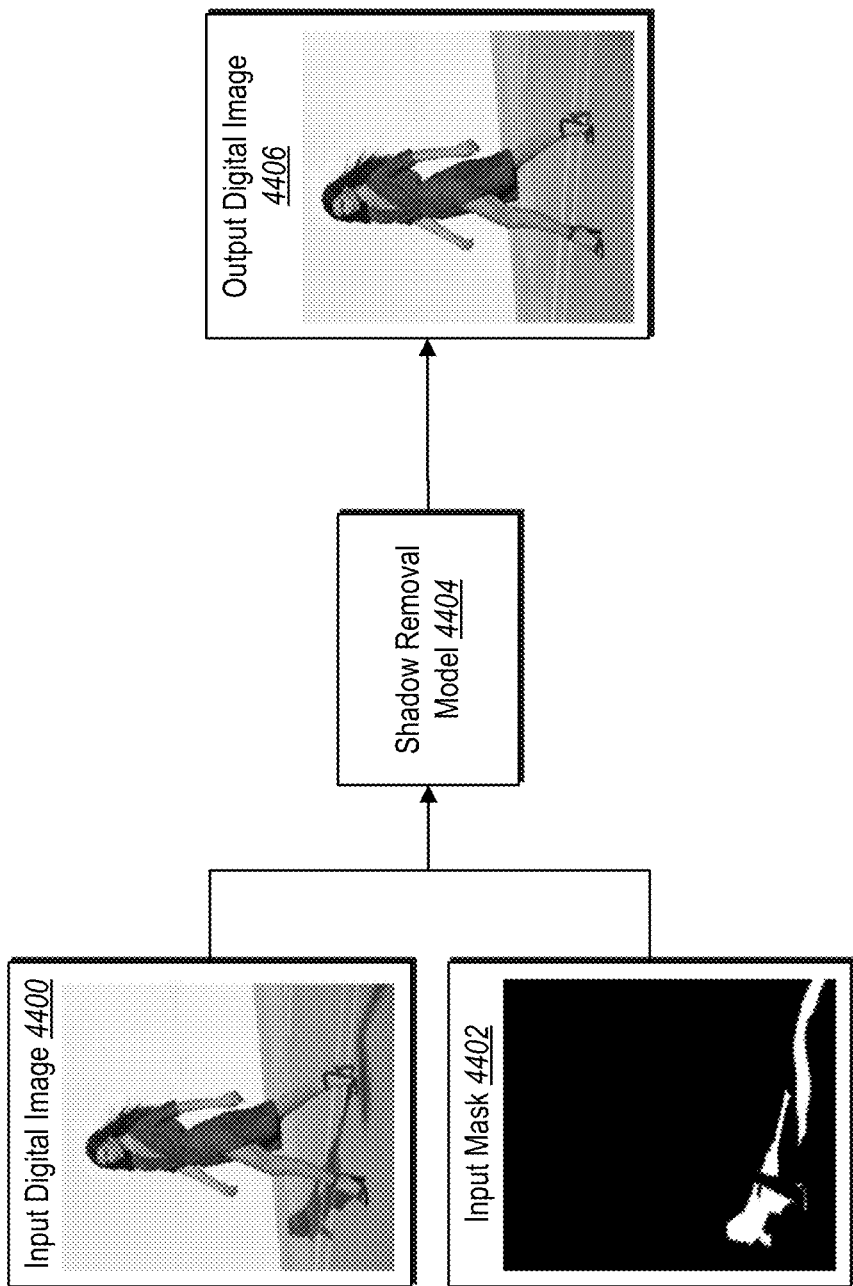
FIG. 44 illustrates an overview diagram of the scene-based image editing system generating a digital image with a shadow removed in accordance with one or more embodiments.

As mentioned above, the scene-based image editing system 106 implements a shadow removal model to remove a shadow of an object within a digital image. FIG. 44 illustrates an overview figure of the scene-based image editing system 106 utilizing an input digital image and an input mask in accordance with one or more embodiments. For example, FIG. 44 shows an input digital image 4400 which was also discussed above in FIGS. 40-43. In FIG. 44 however, the scene-based image editing system 106 receives the input digital image 400 where a featured object contains a shadow (e.g., a shadow cast from the woman) and further shows a shadow cast by a lamp post object not shown in the input digital image 4400.

Furthermore, FIG. 44 shows the scene-based image editing system 106 receiving an input mask 4402. The input mask 4402 includes a mask of the shadows shown in the input digital image 4400. As mentioned above in FIG. 2, the scene-based image editing system 106 generates an object mask. For example, the scene-based image editing system 106 generates a shadow mask for a shadow of an object within a digital image in order to further remove the shadow of the object from the digital image. In particular, as previously discussed, the shadow mask includes an indication of a pixel belonging to the shadow and an indication of a pixel not belonging to the shadow.

As shown in FIG. 44, the scene-based image editing system 106 further utilizes a shadow removal model 4404 to process the input digital image 4400 and the input mask 4402 (e.g., the shadow mask) to generate a fill for a portion of the input digital image 4400 corresponding to the shadows. As mentioned earlier in FIG. 3, the scene-based image editing system 106 generates a content fill for objects. In one or more embodiments, the content fill also includes an object fill or a fill. For example, the scene-based image editing system 106 generates the content fill which includes a set of pixels generated to replace another set of pixels within a digital image. Specifically, the fill acts as a content fill to replace a shadow removed from a digital image (e.g., to replace the shadow with a fill that preserves a background texture or an object texture).

Furthermore, as shown in FIG. 44, the scene-based image editing system 106 generates an output digital image 4406 (e.g., a modified digital image, modified relative to the input digital image 4400). The modified digital image was discussed above in FIG. 40 in context of shadow synthesis. The modified digital image in context of shadow removal includes a digital image with the pixels of the shadow replaced with the fill. For instance, the scene-based image editing system 106 utilizes the shadow removal model 4404 to inpaint the fill in place of the shadows shown in the input digital image 4400.

Figure 45:
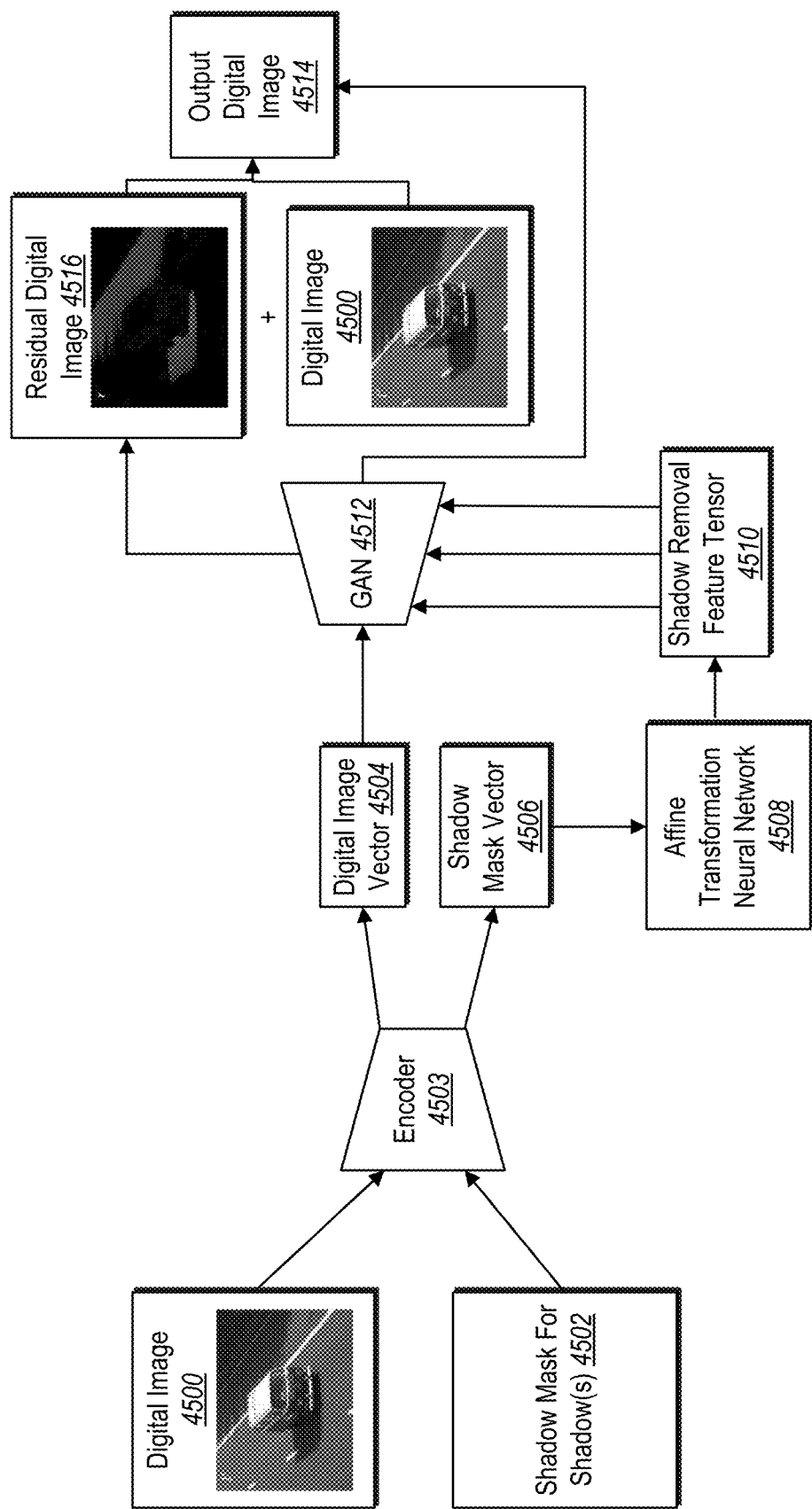
FIG. 45 illustrates a diagram of the scene-based image editing system generating a digital image with a shadow removed by modulating layers of a GAN in accordance with one or more embodiments.

As mentioned above, the scene-based image editing system 106 utilizes a generative inpainting neural network. FIG. 45 illustrates the scene-based image editing system 106 utilizing a generative inpainting neural network to generate a digital image without a shadow in accordance with one or more embodiments. For example, as shown in FIG. 45, the scene-based image editing system 106 receives a digital image 4500. In some embodiments, the digital image 4500 contains an object that casts a shadow over a visible texture depicted in the scene of the digital image 4500.

In one or more embodiments, the digital image 4500 depicting the scene shows multiple visible textures (e.g., patterns or contours within the digital image 4500). For example, a visible texture includes a tactile quality of the surface of objects or the scene within the digital image 4500. Further, the visible texture includes a visual representation of the physical texture of objects or the scene within the digital image 4500 to add depth and realism. For instance, the visible texture includes individual strands of grass on a field, contours of sand on a beach, road pavement, text within the digital image 4500, a vertical object (e.g., a wall), and a ground floor.

As further shown in FIG. 45, the scene-based image editing system 106 receives the digital image 4500 and a shadow mask for shadow(s) 4502 via an encoder 4503. Moreover, as shown, the scene-based image editing system 106 via the encoder 4503 generates a digital image vector 4504 and a shadow mask vector 4506 (e.g., in one or more embodiments a vector includes a numerical representation).

As further shown in FIG. 45, the scene-based image editing system 106 utilizes an affine transformation neural network 4508 to process the shadow mask vector 4506 and generate a shadow removal feature tensor 4510. In particular, the affine transformation neural network 4508 includes generating a scaling and shifting parameter that applies locally (e.g., varies across individual regions or pixel representations, and specifically applies for the shadow mask for shadow(s) 4502). Specifically, the affine transformation neural network 4508 generates the shadow removal feature tensor 4510 (scaling and shifting parameter) for modulating a layer of a generative inpainting neural network 4512 (e.g., GAN).

In other words, the shadow removal feature tensor 4510 for the shadow mask vector 4506 includes a scaling tensor and a shifting tensor that locally modify the digital image 4500 such that the scaling tensor and shifting tensor modifies the digital image 4500 to remove the shadow but preserve the visible texture underneath the shadow. Accordingly, the scene-based image editing system 106 utilizes the affine transformation neural network 4508 to generate a feature tensor (scaling and shifting tensor) from the shadow mask vector 4506 at a specific resolution corresponding to a specific resolution of a particular style block. Moreover, the scene-based image editing system 106 utilizes the affine transformation neural network 4508 to generate different feature tensors (different locally varying scaling and shifting tensors) at different resolutions for the varying layers of the generative inpainting neural network 4512.

For example, a feature tensor includes a multi-dimensional array of numerical values that represent features or characteristics of underlying data (such as a digital image, structural representation, and/or visual appearance representation). The scene-based image editing system 106 utilizes a feature tensor for modulating layers within a GAN.

As mentioned above, the scene-based image editing system 106 generates the shadow removal feature tensor 4510. For example, the shadow removal feature tensor 4510 includes a scaling and/or a shifting tensor. In other words, depending on the pixel value location of the digital image 4500, the scene-based image editing system 106 utilizes a different scaling and shifting tensor to modulate the digital image vector 4504 (e.g., a feature representation) for a particular layer of the generative inpainting neural network 4512. Accordingly, the scene-based image editing system 106 utilizes the shadow removal feature tensor 4510 from the shadow mask vector 4506 that corresponds to a specific resolution of a particular layer to modulate (scale and shift) the digital image vector 4504 of the generative inpainting neural network 4512.

For example, modulation includes scaling and shifting features of the generative inpainting neural network. In particular, modulation includes both spatially varying and spatially invariant scaling and shifting. However, by utilizing the shadow removal feature tensor 4510, the modulation includes spatially variant scaling and spatially variant shifting. For instance, the scene-based image editing system 106 generates an inpainted region for the shadow by modulating layers of the generative inpainting neural network 4512 based on the shadow removal feature tensor 4510 (e.g., the information that is locally applicable to specific locations within the digital image 4500).

Moreover, as shown, the scene-based image editing system 106 via the generative inpainting neural network 4512 generates an output digital image 4514. Further the output digital image 4514 contains the shadow cast by the object in the digital image 4500 removed while preserving the visible texture underneath the shadow.

As also shown in FIG. 45, in one or more embodiments, the scene-based image editing system 106 generates the output digital image 4514 by utilizing residual learning. As mentioned above, the scene-based image editing system 106 improves upon conventional systems by preserving the texture underneath the shadow in the digital image (e.g., when removing a shadow from the digital image). FIG. 45 further illustrates, the scene-based image editing system 106 generating a residual image to preserve the visible texture in accordance with one or more embodiments.

For example, the scene-based image editing system 106 estimates residual pixels for a digital image where shadows are going to be removed. For instance, the scene-based image editing system 106 estimates residual pixels rather than directly predicting pixels corresponding with a hole (e.g., the mask of the shadow). As shown in FIG. 45, the scene-based image editing system 106 receives the digital image 4500 and further generates a residual image 4516 (e.g., utilizing the generative inpainting neural network 4512), which estimates a difference between the digital image 4500 and the digital image 4500 with the shadows removed.

Moreover, as shown, from the residual image 4516 and the digital image 4500, the scene-based image editing system 106 generates the output digital image 4514 without the shadow. Additionally, during training, the scene-based image editing system 106 estimates the residual image 4516 based on a difference between the digital image 4500 with the shadow and a ground truth digital image with the shadow removed (e.g., residual learning). To further illustrate, in one or more embodiments, the scene-based image editing system 106 utilize a cascaded modulation inpainting neural network as described herein above.

Figure 46:
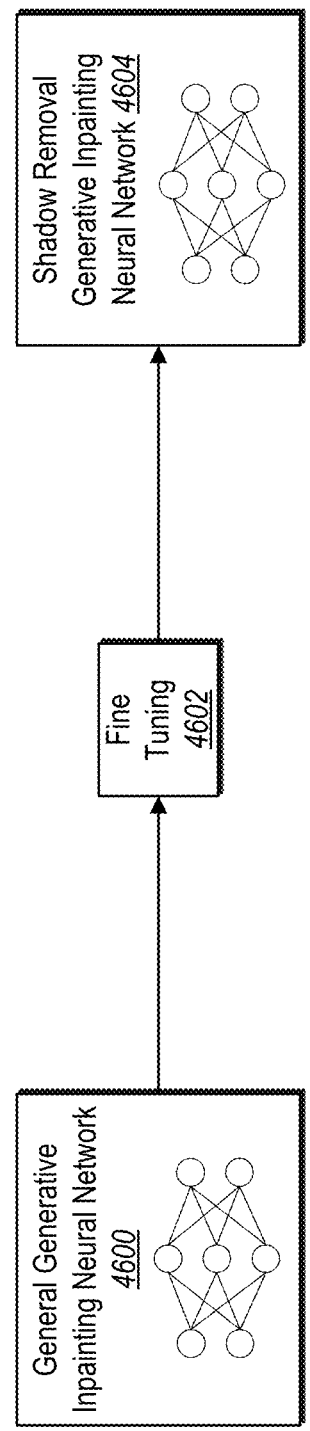
FIG. 46 illustrates a diagram of the scene-based image editing system finetuning a general generative inpainting neural network to create a shadow removal generative inpainting neural network in accordance with one or more embodiments.

As mentioned above, in one or more embodiments, the scene-based image editing system 106 finetunes a general generative inpainting neural network. FIG. 46 illustrates the scene-based image editing system 106 finetuning a general generative inpainting neural network to generate a shadow removal generative inpainting neural network in accordance with one or more embodiments.

As discussed above in FIG. 4, the scene-based image editing system 106 utilizes a generative inpainting neural network. In addition to the above, the generative inpainting neural network includes a general generative inpainting neural network 4600 and a shadow removal generative inpainting neural network 4604. In one or more embodiments, the general generative inpainting neural network 4600 also includes a generative adversarial neural network trained to inpaint or fill pixels of a digital image with a content fill. Furthermore, the scene-based image editing system 106 trains the general generative inpainting neural network 4600 on general datasets for training a generative model to generate infills for a wide variety of different circumstances.

In contrast, the shadow removal generative inpainting neural network 4604 includes a generative adversarial neural network specifically tuned to inpaint regions of a digital image containing shadow(s). For instance, the scene-based image editing system 106 enhances the general generative inpainting neural network by using specialized training datasets to generate the shadow removal generative inpainting neural network. Specifically, the scene-based image editing system 106 modifies parameters of the general generative inpainting neural network based on comparisons between predictions and ground truth images to generate the shadow removal generative inpainting neural network 4604. As shown in FIG. 46, the scene-based image editing system 106 performs an act 4602 of finetuning the general generative inpainting neural network 4600. FIGS. 47-50 illustrate additional details regarding the finetuning process.

In one or more embodiments, the scene-based image editing system 106 selects between the general generative inpainting neural network 4600 and the shadow removal generative inpainting neural network 4604 when performing inpainting to replace a shadow within a digital image. For example, the scene-based image editing system 106 utilizes a threshold to determine whether to select the general generative inpainting neural network 4600 or the shadow removal generative inpainting neural network 4604.

In one or more embodiments, the scene-based image editing system 106 implements model selection criteria for performing shadow removal. As mentioned, the scene-based image editing system 106 utilizes a threshold that includes a predetermined size and intensity of the shadow. Specifically, for digital images with large shadows, the scene-based image editing system 106 typically selects the general generative inpainting neural network 4600. In contrast, for digital images with smaller and lighter shadows, the scene-based image editing system 106 typically selects the shadow removal generative inpainting neural network 4604. To illustrate, the scene-based image editing system 106 establishes a threshold where the shadow intensity is set at 0.4 and the shadow size is set at 4% of the total pixels in the digital image. In one or more embodiments, if the shadow intensity exceeds 0.4 and also exceeds 4% of the total pixels, the scene-based image editing system 106 utilizes the general generative inpainting neural network 4600 and vice-versa. Moreover, in some instances, if the shadow intensity exceeds a threshold amount however the shadow size does not, the scene-based image editing system 106 can select the shadow removal generative inpainting neural network 4604.

Figure 47:
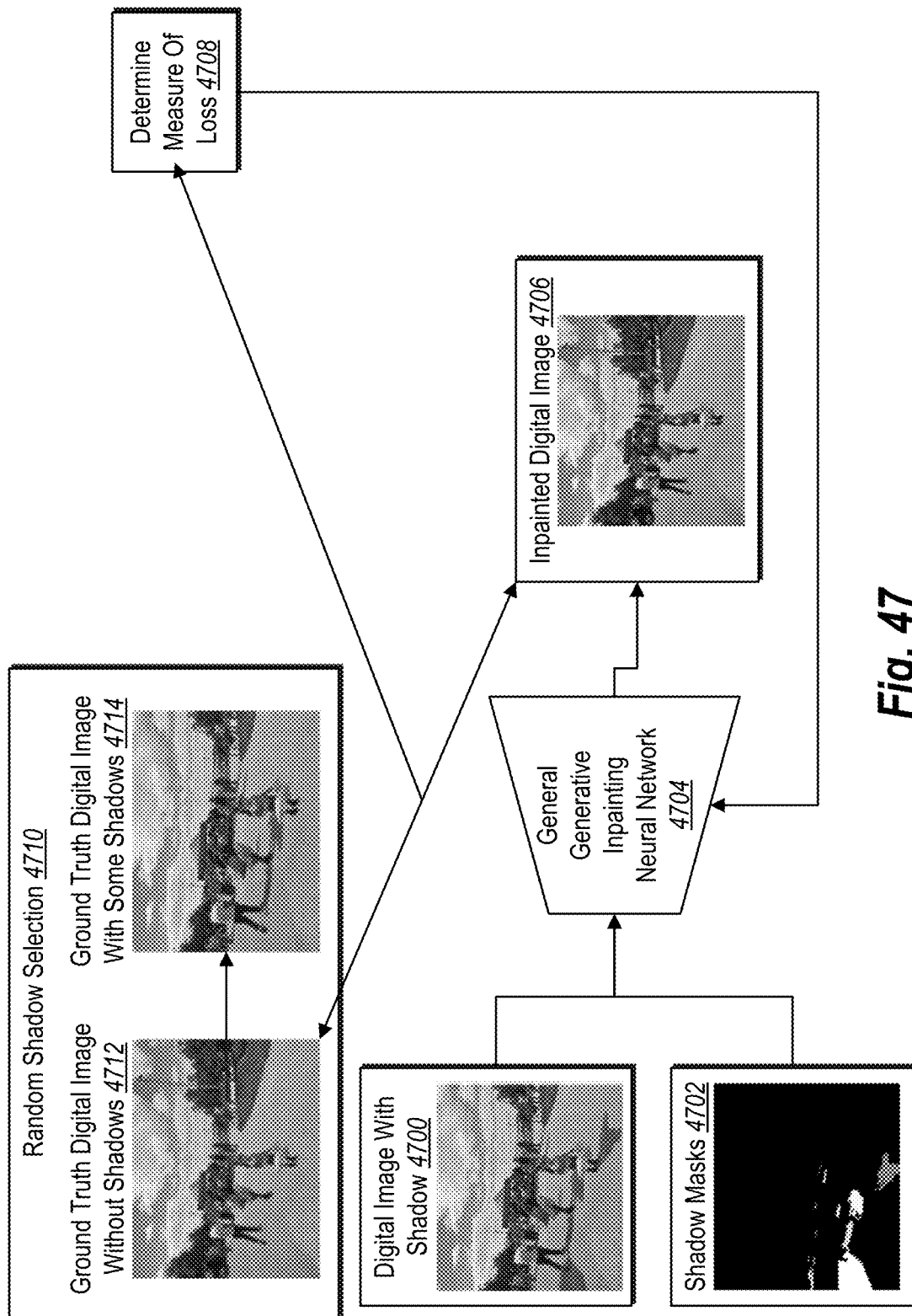
FIG. 47 illustrates a diagram of the scene-based image editing system finetuning a general generative inpainting neural network via random shadow selection in accordance with one or more embodiments.

As mentioned above, FIG. 47 provides additional details regarding the finetuning process. FIG. 47 illustrates the scene-based image editing system 106 utilizing random shadow selection augmentation in accordance with one or more embodiments. For example, the scene-based image editing system 106 augments a training dataset with random shadow selection to enhance the shadow removal generative inpainting neural network's ability to remove and replace shadows from digital images. In particular, in some instances, a training dataset includes an object shadow dataset with an image with all object shadows and a corresponding ground truth digital image without shadows.

Further, in some embodiments, the scene-based image editing system 106 increases data pair combinations during training (e.g., for digital images with multiple objects shown) by randomly selecting a random number of object shadows and replacing the corresponding pixels with those in the ground truth digital image. In doing so, the scene-based image editing system 106 generates multiple paired image samples from a single image pair.

As shown in FIG. 47, the scene-based image editing system 106 utilizes a digital image with shadows 4700 and shadow masks 4702. Further, FIG. 47 shows the scene-based image editing system 106 utilizing a general generative inpainting neural network 4704 to generate an inpainted digital image 4706 without shadows. In particular, the inpainted digital image 4706 includes the scene-based image editing system 106 generating an fill/content fill to replace pixels within a digital image via a generative inpainting neural network. Accordingly, the result generated from the generative inpainting neural network includes the inpainted digital image 4706.

Moreover, FIG. 47 shows the scene-based image editing system 106 performing an act 4710 that includes random shadow selection. Specifically, as mentioned above, the scene-based image editing system 106 randomly adds a number of shadows to a ground truth digital image without shadows 4712 to generate a ground truth digital image with some shadows 4714. Furthermore, as shown, the scene-based image editing system 106 compares the ground truth digital image without shadows 4712 with the inpainted digital image 4706 to determine a measure of loss 4708. Moreover, based on the measure of loss 4708, the scene-based image editing system 106 modifies parameters of the general generative inpainting neural network 4704 as part of the finetuning process. Additionally, the scene-based image editing system 106 repeats the process of random shadow selection (e.g., selecting a different number of shadows to add to the ground truth digital image without shadows 4712) to continue to finetune the general generative inpainting neural network 4704.

Figure 48:
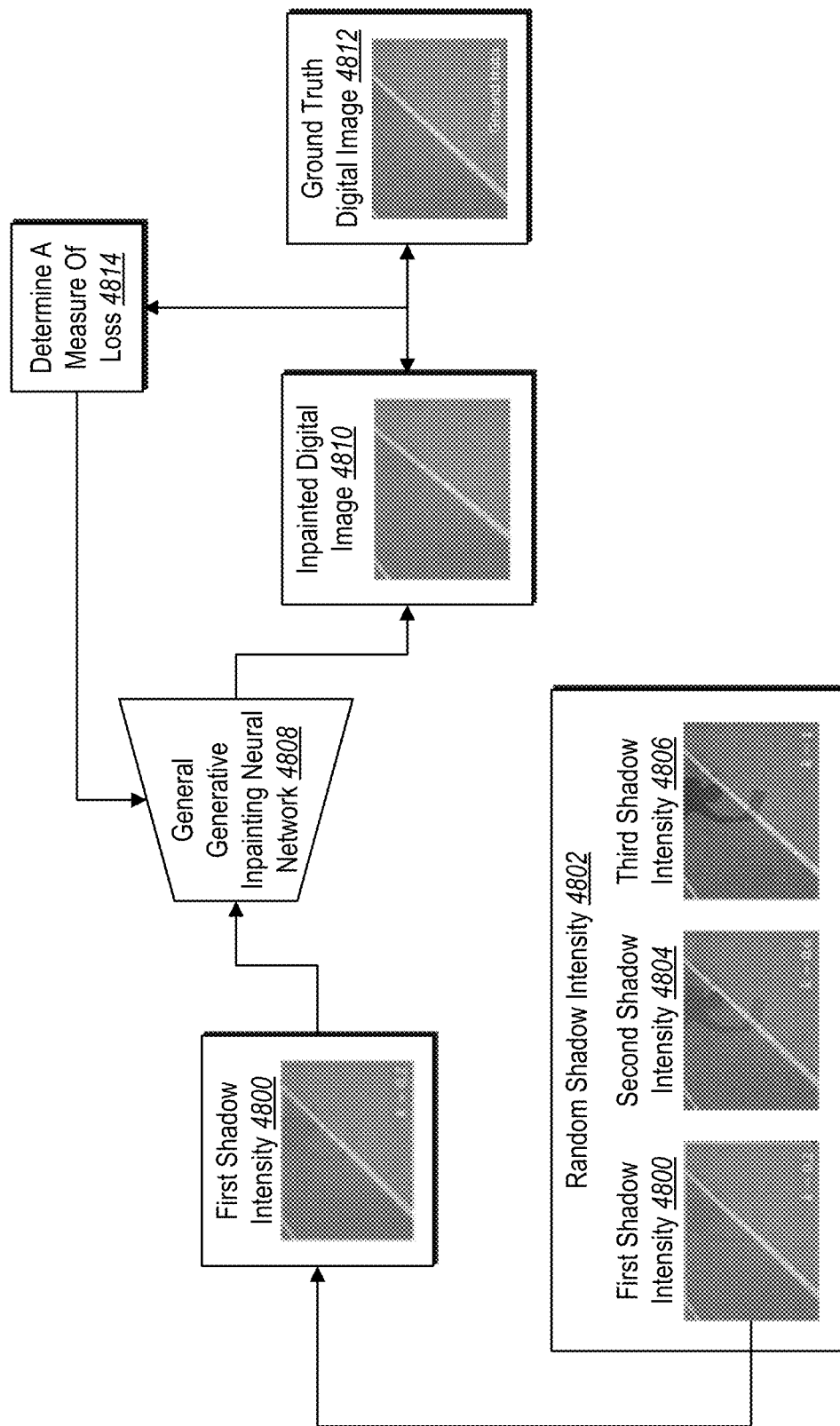
FIG. 48 illustrates a diagram of the scene-based image editing system finetuning a general generative inpainting neural network via random shadow intensity in accordance with one or more embodiments.

As mentioned, FIG. 48 also shows additional details regarding the finetuning process. FIG. 48 illustrates the scene-based image editing system 106 utilizing random shadow intensity to finetune a general generative inpainting neural network in accordance with one or more embodiments. For example, random shadow intensity augmentation includes randomly adjusting the shadow intensity. In particular, in some embodiments the shadow intensity in an initial digital image with a shadow is adjusted to provide a general generative inpainting neural network 4808 with a wide range of shadow intensities. For instance, the scene-based image editing system 106 determines a difference between the digital image with the shadow and a digital image without the shadow. From the difference, the scene-based image editing system 106 multiplies a scaling factor to achieve a range of shadow intensities (e.g., $k \in [1.7, 1.3]$).

In one or more embodiments, shadow intensity within a digital image includes a degree of darkness or lightness of a shadow cast by an object. Specifically, the shadow intensity indicates how the shadow contrasts with the surrounding area in terms of color and brightness. As shown in FIG. 48, the scene-based image editing system 106 performs an act 4802 of inducing random shadow intensity to generate a set of digital images with different shadow intensities (e.g., a first shadow intensity 4800 of k=0.2, a second shadow intensity 4804 of k=0.6, and a third shadow intensity 4806 of k=1).

Furthermore, as shown in FIG. 48, the scene-based image editing system 106 selects one of the digital images with the random shadow intensity, here the scene-based image editing system 106 selects the first shadow intensity 4800. Moreover, as shown, the scene-based image editing system 106 utilizes the general generative inpainting neural network 4808 to generate an inpainted digital image 4810. Specifically, the inpainted digital image 4810 includes the digital image without the shadow. Additionally, the scene-based image editing system 106 compares the inpainted digital image 4810 to a ground truth digital image 4812 to determine a measure of loss 4814. From the measure of loss 4814, the scene-based image editing system 106 modifies parameters of the general generative inpainting neural network 4808. In one or more embodiments, the scene-based image editing system 106 repeats the process of selecting another digital image with a different shadow intensity, generates an inpainted digital image and further modifies parameters of the general generative inpainting neural network 4808.

Figure 49:
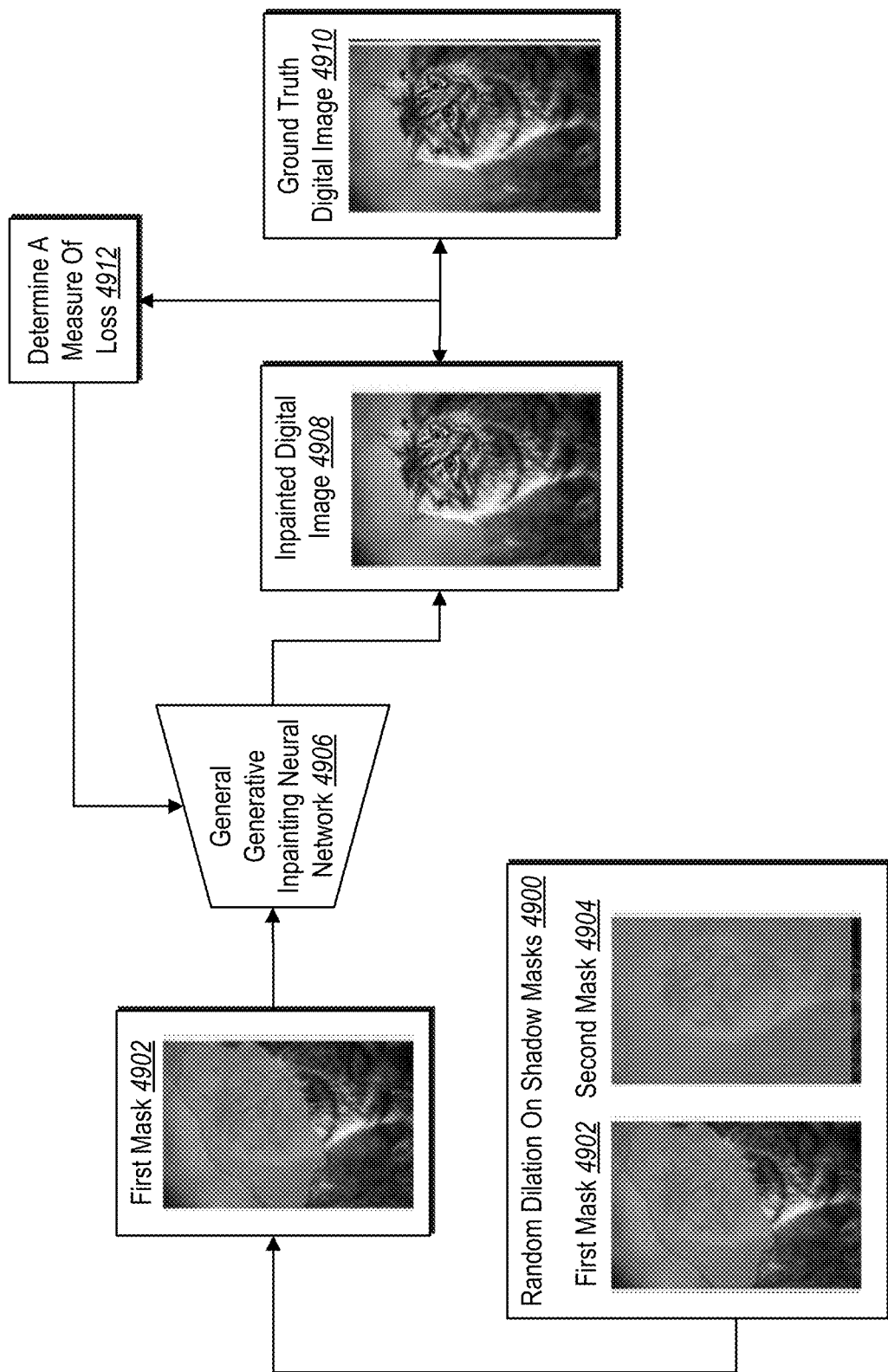
FIG. 49 illustrates a diagram of the scene-based image editing system finetuning a general generative inpainting neural network via random shadow compositing in accordance with one or more embodiments.

As mentioned, FIG. 49 also shows additional details regarding the finetuning process. FIG. 49 illustrates the scene-based image editing system 106 utilizing random shadow mask dilations to finetune a general generative inpainting neural network in accordance with one or more embodiments. For example, the scene-based image editing system 106 randomly dilates an input shadow mask within a digital image during training. In particular, in some embodiments random shadow mask dilations assists a general generative inpainting neural network 4906 to become more robust to coarse (e.g., inaccurate) shadow masks during inference.

As shown in FIG. 49, the scene-based image editing system 106 performs an act 4900 of random dilation on shadow masks. For example, as shown, the scene-based image editing system 106 generates a first mask 4902 and a second mask 4904 within a digital image. As illustrated, the second mask 4904 covers a large portion of the digital image while the second mask 4904 covers a face of the featured object within the digital image. Furthermore, FIG. 49 shows the scene-based image editing system 106 selecting the first mask 4902 to generate an inpainted digital image 4908 via the general generative inpainting neural network 4906.

As shown, the inpainted digital image 4908 has the mask removed and the scene-based image editing system 106 further compares the inpainted digital image 4908 with a ground truth digital image 4910 to determine a measure of loss. Moreover, from the measure of loss 4912, the scene-based image editing system 106 modifies parameters of the general generative inpainting neural network 4906. In one or more embodiments, the scene-based image editing system 106 repeats the process of selecting the second mask 4904 and generating another inpainted digital image to further modify parameters of the general generative inpainting neural network 4906. In some embodiments, the scene-based image editing system 106 continues to generate additional digital images with different mask sizes to further finetune the general generative inpainting neural network 4906.

Figure 50:
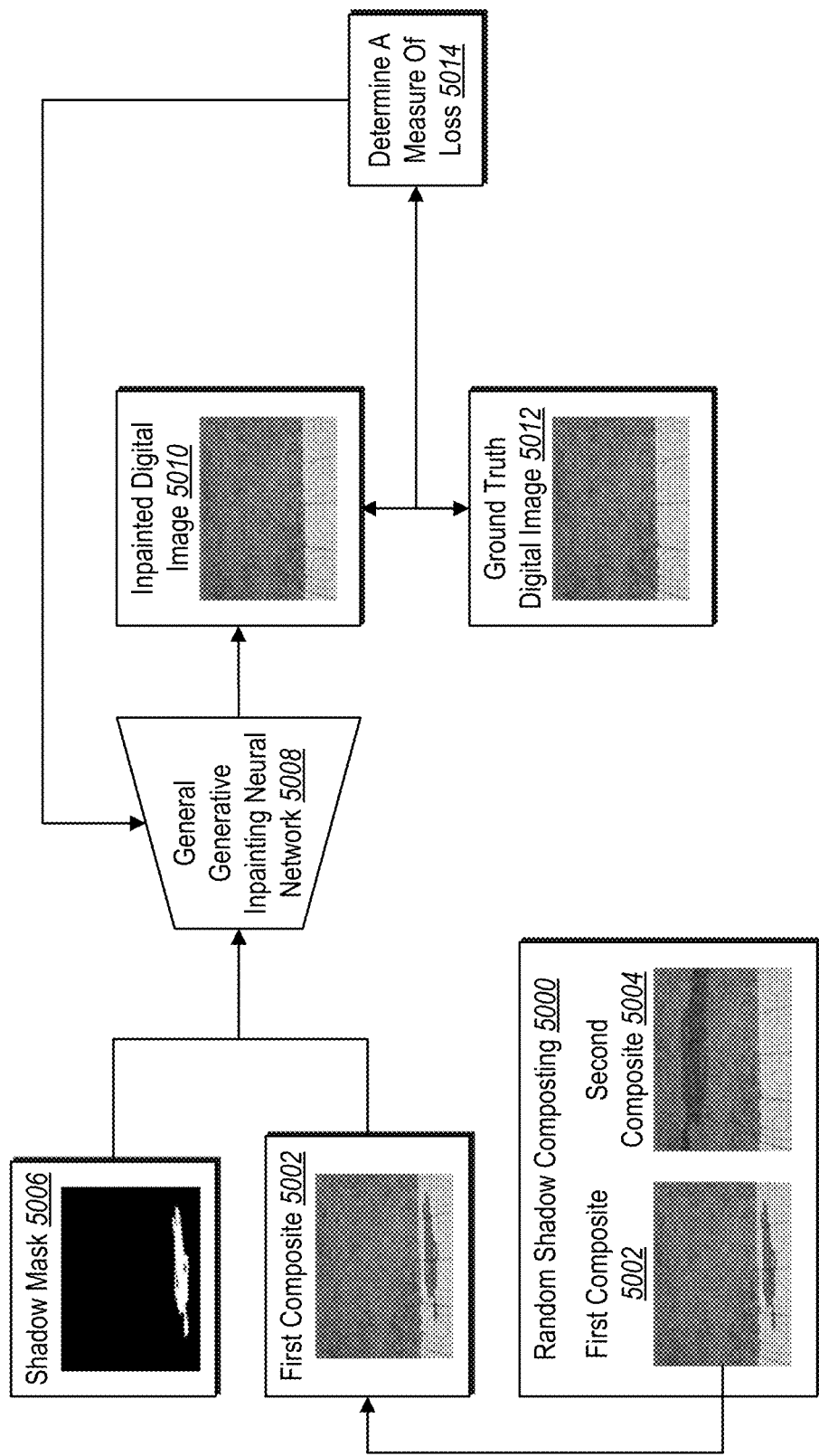
FIG. 50 illustrates a diagram of the scene-based image editing system finetuning a general generative inpainting neural network via random dilation on shadow masks in accordance with one or more embodiments.

As mentioned above, FIG. 50 also provides additional details regarding the finetuning process. FIG. 50 illustrates the scene-based image editing system 106 utilizing random shadow compositing within a digital image in accordance with one or more embodiments. For example, the scene-based image editing system 106 in addition to the dataset augmentation methods discussed above, randomly composites shadows at random locations of shadow-free images. For instance, the scene-based image editing system 106 utilizes a dataset for shadow masks and a dataset for shadow-free images in an unpaired setting (e.g., the images are not paired to each other).

In one or more embodiments, the scene-based image editing system 106 performs random shadow compositing by randomly selecting a shadow mask, cropping a shadow mask patch around the selected shadow, randomly resizing the shadow by a scale between one and two, verifying whether the shadow occupies a significantly large region within the cropped patch, and randomly assigning a color to the shadow by applying a darkening algorithm. For instance, the scene-based image editing system 106 applies a darkening algorithm as described in "Learning from Synthetic Shadows for Shadow Detection and Removal", IEEE TCSVT, 2021 by Naoto Inoue and Toshihiko Yamasaki, which is fully incorporated by reference herein. Moreover, after applying the darkening algorithm, the scene-based image editing system 106 applies a Gaussian blur to the shadow boundary to make the shadow appear more natural.

As shown in FIG. 50, the scene-based image editing system 106 performs an act 5000 that includes random shadow compositing to generate a first composite 5002 (e.g., naïve compositing), and a second composite 5004 (e.g., bigger shadow compositing plus blurring). As shown, the scene-based image editing system 106 further selects the first composite 5002 with a corresponding shadow mask 5006 and generates an inpainted digital image 5010 via a general generative inpainting neural network 5008 (e.g., with the shadow removed). Furthermore, as shown, the scene-based image editing system 106 compares the inpainted digital image 5010 with a ground truth digital image 5012 to determine a measure of loss 5014 and modifies parameters of the general generative inpainting neural network 5008. Additionally, similar to above, the scene-based image editing system 106 repeats this process for other random shadow composites to finetune the general generative inpainting neural network 5008.

As mentioned above, the scene-based image editing system 106 generates digital images with shadows removed in a natural and realistic manner. FIG. 51 illustrates results of the scene-based image editing system 106 versus results of prior systems in accordance with one or more embodiments. For example, FIG. 51 shows an input digital image 5100 with a shadow cast from the umbrella object. Furthermore, the shadow cast by the umbrella object further covers two additional sets of chairs.

In one or more embodiments, the scene-based image editing system 106 receives the input digital image 5100 and utilizes a content-aware hole filling machine learning model as discussed above in FIG. 7. As mentioned in FIG. 7, the scene-based image editing system 106 utilizes the content-aware hole filling machine learning model to generate a content fill for objects. In one or more embodiments, the content fill also includes a backfill. In doing so, the scene-based image editing system 106 generates a backfill for non-visible region obstructed by the object(s) in the digital image. Hence, the scene-based image editing system 106 generates a backfill for the beach scene behind the umbrella in the input digital image 5100. Furthermore, in the instance an object is deleted from the input digital image 5100, the scene-based image editing system 106 exposes the backfill behind the deleted object as part of the input digital image 5100.

Figure 51:
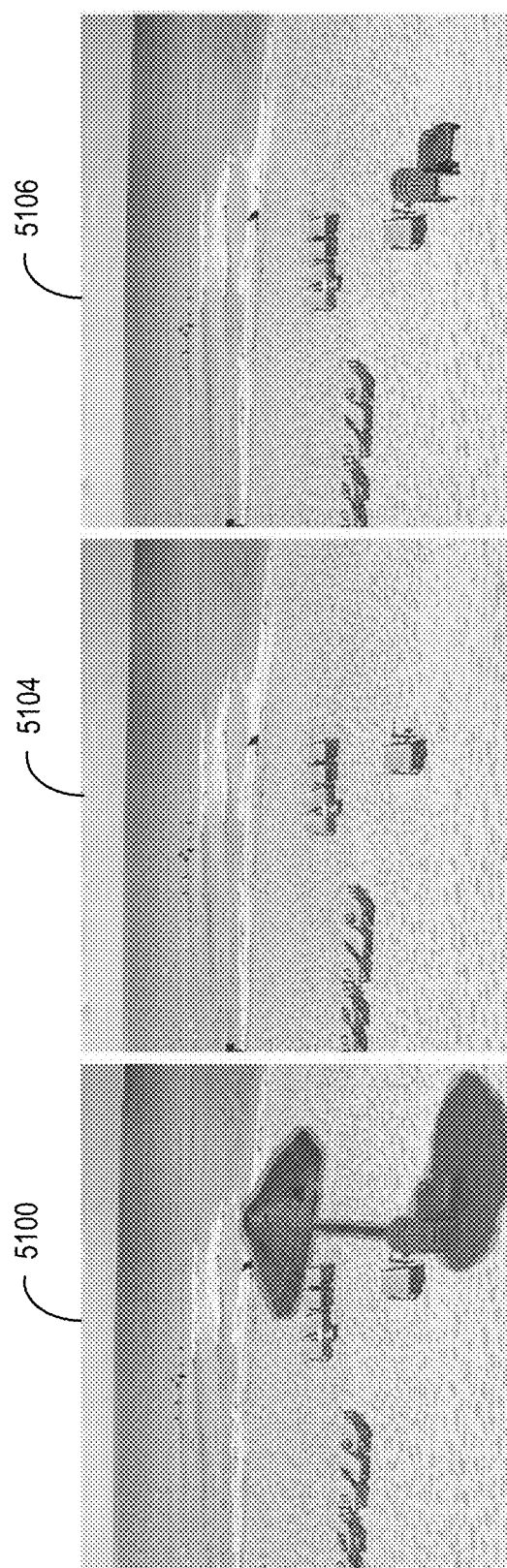
FIG. 51 illustrates results of the scene-based image editing system removing a shadow compared to prior systems in accordance with one or more embodiments.

As shown in FIG. 51, the scene-based image editing system 106 receives a selection of the umbrella object in the input digital image 5100 for removal. In both the scene-based image editing system 106 and prior systems, removing the umbrella object removes an associated shadow of the object. As shown, a modified digital image 5104 for prior systems shows the umbrella object removed along with the shadow, however the objects underneath the shadow fail to be preserved. Specifically, the modified digital image 5104 for prior systems fails to preserve the two sets of chairs. On the other hand, however, a modified digital image 5106 of the scene-based image editing system 106 preserves the two sets of chairs in removing the umbrella object and the associated shadow.

Figure 52A:
FIGS. 52A-52B illustrates results of the scene-based image editing system removing a shadow and preserving a visible texture in accordance with one or more embodiments.
Figure 52B:

FIGS. 52A-52B further show the scene-based image editing system 106 preserving a visible texture underneath a shadow. For example, FIG. 52A shows a digital image with a plurality of objects with associated shadows. Moreover, as mentioned above in FIGS. 3 and 33, the scene-based image editing system 106 utilizes an object detection neural network and a shadow detection neural network (e.g., an object segmentation model includes the object detection neural network and a shadow segmentation model includes the shadow detection neural network). Further, the scene-based image editing system 106 utilizes the object detection neural network to detect each object in the digital image shown in FIG. 52A (e.g., the umbrella objects). Moreover, the scene-based image editing system 106 utilizes the shadow detection neural network to detect each shadow for each object (e.g., which umbrella shadow is associated with which umbrella object).

Furthermore, as shown in FIG. 52B, the scene-based image editing system 106 receives a selection to remove all the shadows shown in the digital image in FIG. 52A. In response to this selection, the scene-based image editing system 106 deletes all the shadows from the digital image and preserves the visible texture previously present underneath the shadows. As shown in FIG. 52B, the digital image still contains the various contours within the sand and the scene-based image editing system 106 does not merely replace the removed shadows with generic pixels.

Figure 53:
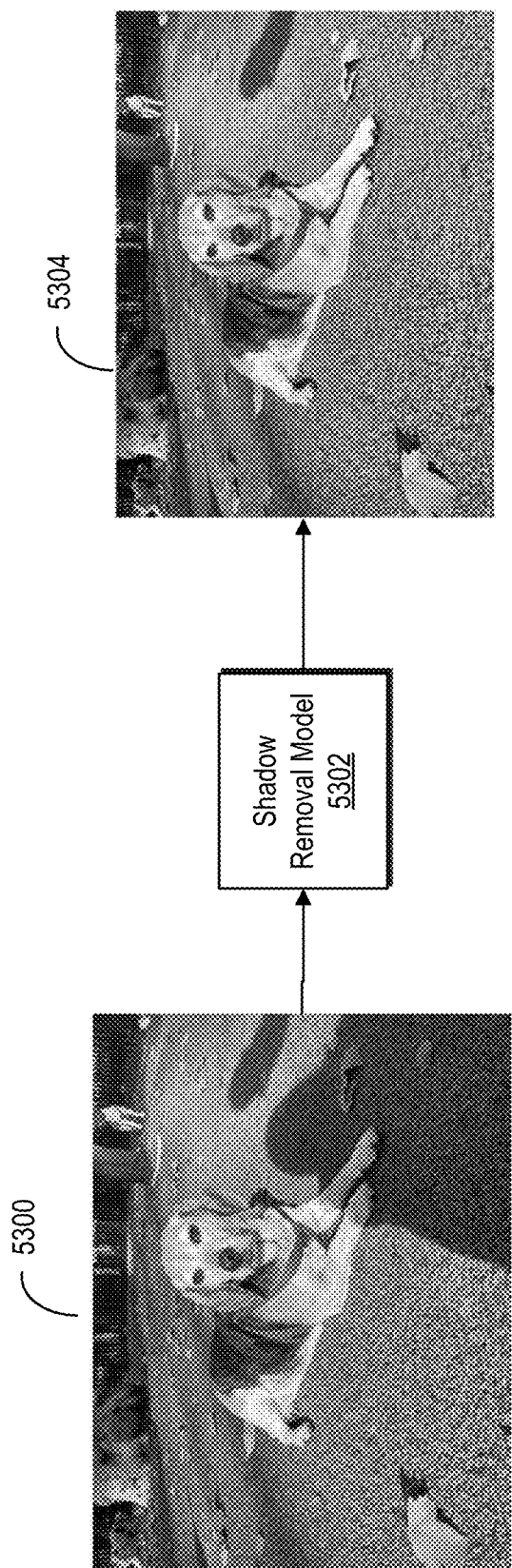
FIG. 53 illustrates results of the scene-based image editing system removing a shadow for an object not shown in a digital image in accordance with one or more embodiments.

As mentioned earlier, the scene-based image editing system 106 removes shadows from objects for objects not necessarily depicted within the digital image. FIG. 53 show an example of removing a shadow from a digital image cast from an object not shown in the digital image in accordance with one or more embodiments. For example, shadows shown in a digital image without an associated object depicted are typically unwanted shadows.

FIG. 53 shows a digital image 5300 with a shadow cast from a person capturing the digital image of the dog. Accordingly, the digital image 5300 includes an unwanted shadow cast from an unseen object. As further shown, the scene-based image editing system 106 utilizes a shadow removal model 5302 to remove the unwanted shadow cast from the person taking the picture to generate a modified digital image 5304. Accordingly, the modified digital image 5304 removes the shadow and preserves the visible grass texture and dog object.

One or more embodiments described herein include the scene-based image editing system 106 that implements scene-based image editing techniques using intelligent image understanding. Indeed, in one or more embodiments, the scene-based image editing system 106 provides to a client device, a graphical user interface experience that allows for the re-positioning or removal of objects within a digital image and associated re-positioning or removal of associated shadows. For example, in some embodiments, the scene-based image editing system 106 receives a selection input for an object within a digital image, and without further user input, repositions or removes the object. Specifically, the scene-based image editing system 106 intelligently fills non-visible regions behind objects within the digital image such that upon repositioning or removing an object, it exposes a previously non-visible backfill. Further, in repositioning an object, the scene-based image editing system 106 also generates a new shadow that is consistent with the scene of the digital image. Moreover, in some embodiments, in removing an object, the scene-based image editing system 106 also removes a corresponding shadow while preserving the underlying visible texture.

As mentioned previously, in one or more embodiments, the scene-based image editing system 106 utilizes a content-aware fill machine learning model. For example, the scene-based image editing system 106 utilizes the content-aware fill machine learning model to generate backfills for objects depicted within a digital image. Specifically, the scene-based image editing system 106 generates backfills such that when an object within the digital image is moved, the previously non-visible region is exposed, and is naturally and realistically consistent with the rest of the digital image.

Further, in one or more embodiments, the scene-based image editing system 106 further utilizes a shadow detection neural network to detect various shadows portrayed within the digital image. Moreover, in some embodiments the scene-based image editing system 106 receives input to move an object. In some such embodiments, as soon as the scene-based image editing system 106 receives the input to move the object, the scene-based image editing system 106 utilizes the shadow removal model discussed above to remove the shadow associated with the object.

As just mentioned, in some embodiments, the scene-based image editing system 106 receives input to move the object. For example, the input to move the object includes a drag-and-drop selection performed within a graphical user interface. Further, in some embodiments the drag-and-drop selection in the graphical user interface includes the experience of the initial shadow being removed, and the scene-based image editing system 106 further generating a proxy shadow. For instance, in some embodiments, the scene-based image editing system 106 generates the proxy shadow that shows an approximation of the shadow as the object is being dragged across various regions of the digital image.

Moreover, in one or more embodiments, the scene-based image editing system 106 receives an indication of the user of the client device ending the drag-and-drop selection. For example, upon completing the drag-and-drop selection, this indicates to the scene-based image editing system 106 a new location of the object. Furthermore, in some embodiments, the scene-based image editing system 106 generates a proxy shadow, exposes a backfill, and a new shadow for the object in the new location in real-time or near real-time.

As suggested, in one or more embodiments, the scene-based image editing system 106 provides several advantages over conventional systems. For example, in one or more embodiments, the scene-based image editing system 106 improves inefficiencies over prior systems. For instance, in some embodiments the scene-based image editing system 106 receives a digital image depicting a scene from a client device and positions objects within the digital image and generates a new shadow for the object consistent with the scene of the digital image. Specifically, the scene-based image editing system 106 generates backfills for non-visible regions behind objects in the digital image, detects objects and shadows, and removes shadows for objects in response to selecting an object to move. Moreover, the scene-based image editing system 106 does not require computationally heavy (explicit) three-dimensional information to provide these real-time graphical user interface experiences.

Relatedly, in one or more embodiments, the scene-based image editing system 106 improves upon operational inflexibilities relative to conventional systems. For example, in some embodiments, the scene-based image editing system 106 allows a user of a client device to directly drag and drop objects around a digital image depicting a scene. Furthermore, in some embodiments, the scene-based image editing system 106 also allows a user of a client device to drop an object from a different digital image into the digital image depicting the scene. In both scenarios, the scene-based image editing system 106 removes shadows, generates proxy shadows, and generates new shadows for various objects in real-time or near real-time. Thus, in contrast to conventional systems which only allows a user to indicate a general location, the scene-based image editing system 106 allows for specific and tailored restructuring of a digital image (e.g., in a real-time or near real-time fashion without additional user input besides performing the drag-and-drop action).

As mentioned above, the scene-based image editing system 106 provides a graphical user interface experience that generates backfills, fills, and shadows in real-time or near real-time. FIGS. 54A-54D show a graphical user interface with a series of actions within a drag-and-drop selection in accordance with one or more embodiments.

Figure 54A:
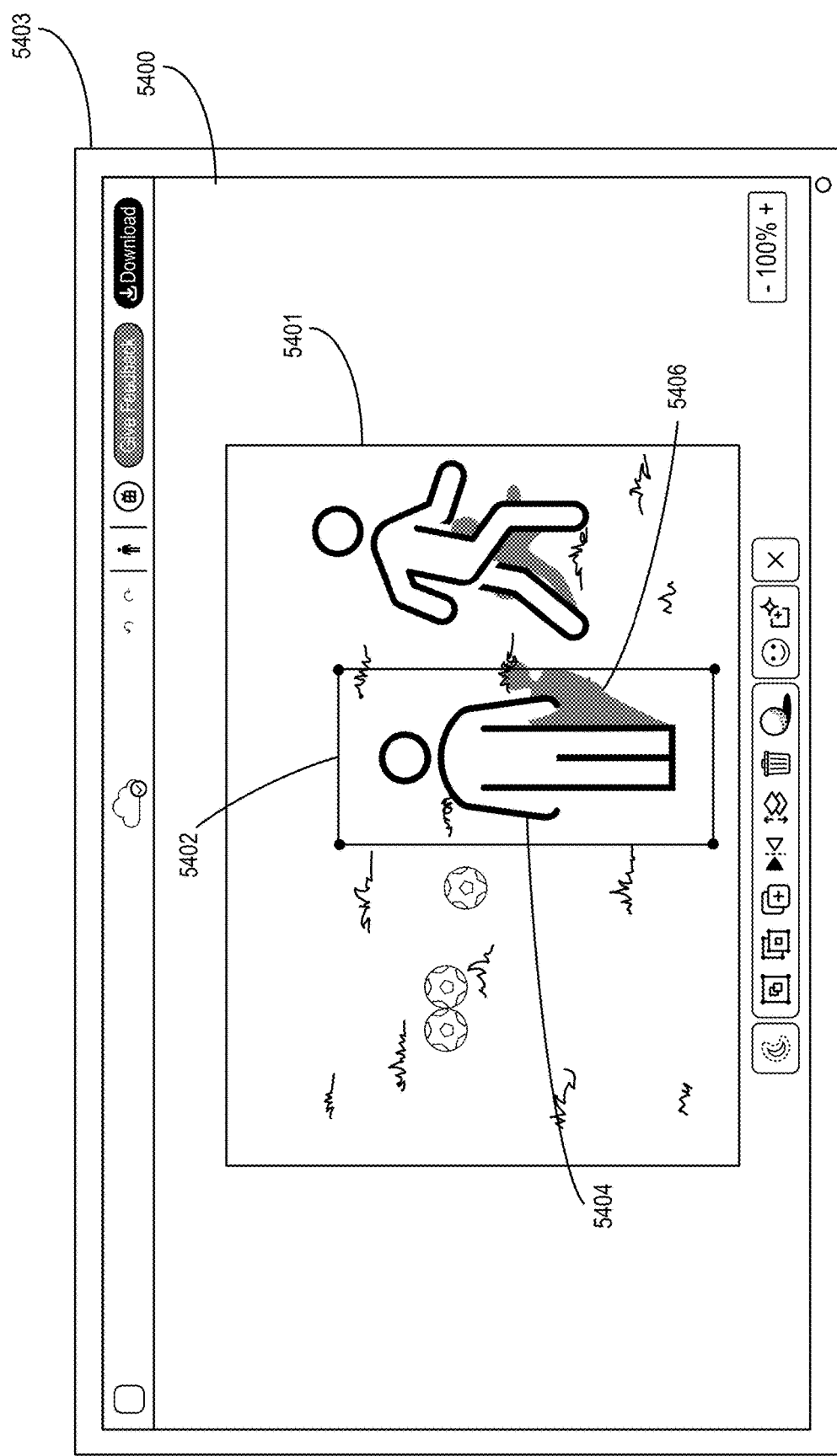
FIGS. 54A-54D illustrates a graphical user interface of a user dragging-and-dropping an object with a shadow in accordance with one or more embodiments.

For example, FIG. 54A shows the scene-based image editing system 106 receiving a selection of an object 5404 within a graphical user interface 5400 of a client device 5403. Specifically, the scene-based image editing system 106 receives a selection of the person playing soccer on the grass field. Further, in some embodiments the selection of the object 5404 also includes an associated shadow 5406 of the object 5404 in a digital image 5401. Moreover, as shown, upon selection, the scene-based image editing system 106 causes the graphical user interface 5400 to show a selector shape 5402 around the object 5404 and the associated shadow 5406. Furthermore, upon selection, a user of the graphical user interface 5400 can drag-and-drop the object 5404 and the associated shadow 5406 to a different location within the digital image 5401 of the graphical user interface 5400.

Figure 54B:
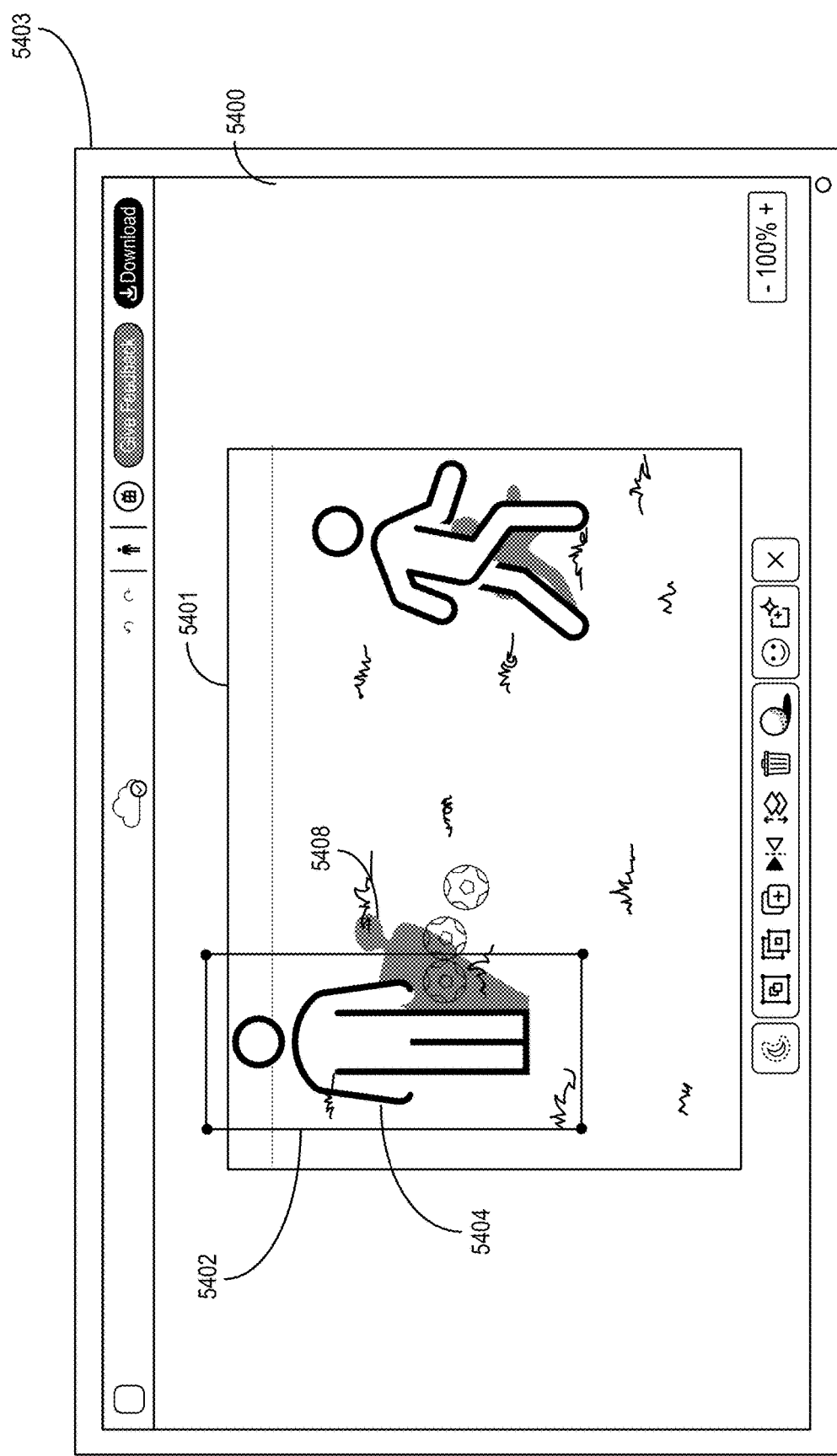

Further, FIG. 54B shows the selector shape 5402 containing the object 5404 dragged to a different location within the digital image 5401 in the graphical user interface 5400. Moreover, FIG. 54B shows the object with a first additional shadow 5408 (e.g., because the object is dragged to a different location, the first additional shadow 5408 is different from the associated shadow 5406) where the first additional shadow 5408 encompasses soccer balls shown in FIG. 54A. As shown in FIG. 54B, although the scene-based image editing system 106 synthesizes the first additional shadow 5408 for the object 5404, the scene-based image editing system 106 manages to preserve the objects (e.g., the two soccer balls) underneath the shadow. For instance, in some embodiments, the scene-based image editing system 106 utilizes a shadow synthesis model (e.g., the shadow synthesis diffusion model) as discussed above to generate the first additional shadow 5408. While in some embodiments, if the user of the client device 5403 is in the process of dragging-and-dropping, the scene-based image editing system 106 utilizes a shadow proxy generation model discussed below to generate the first additional shadow 5408.

Figure 54C:
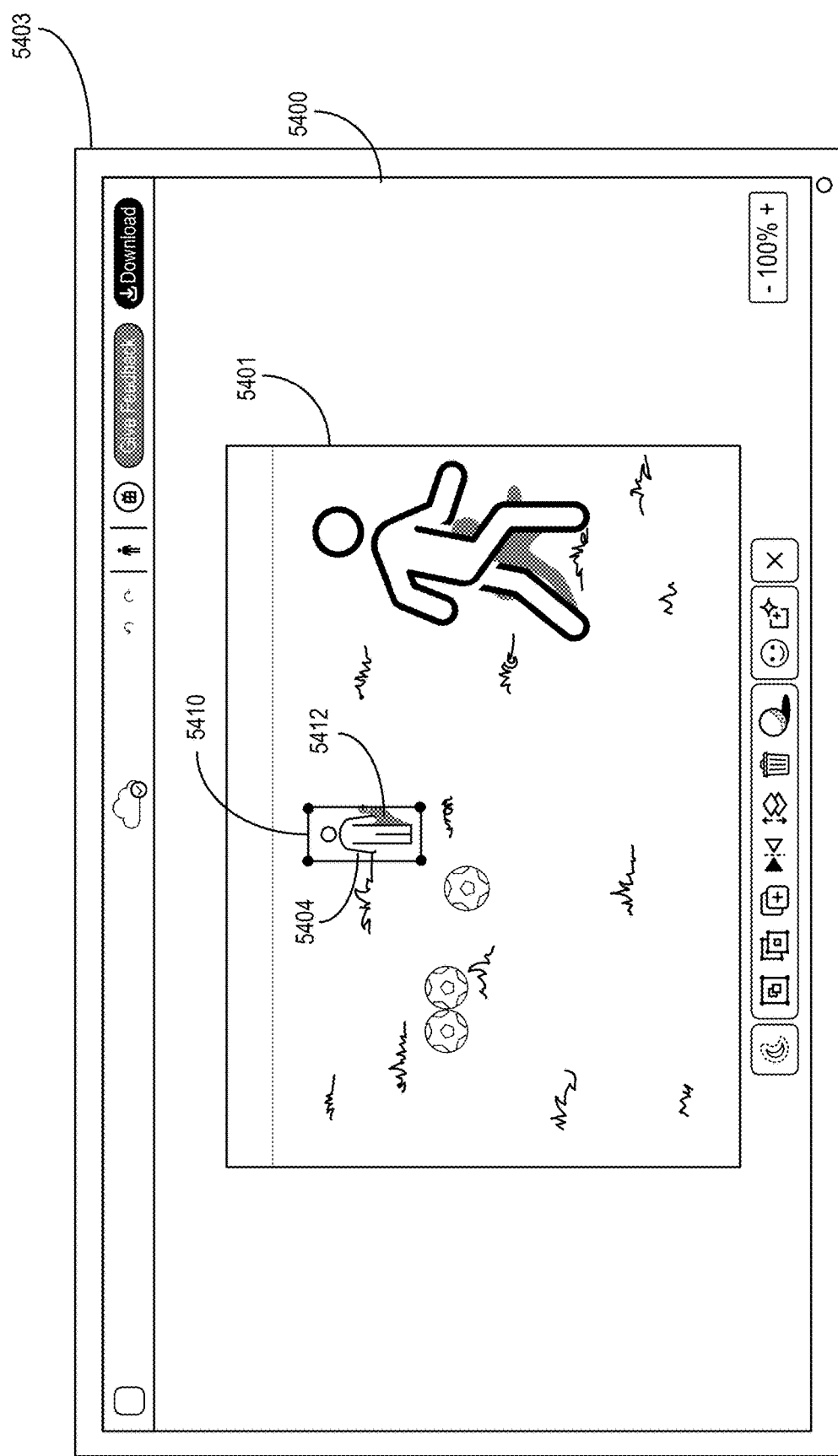

As further shown in FIG. 54C, the scene-based image editing system 106 receives a selection to shrink the object 5404. Accordingly, FIG. 54C shows the object 5404 with an additional selector shape 5410 and a second additional shadow 5412. Moreover, FIG. 54C shows the second additional shadow 5412 also conforms with the new location and preserves the visible texture underneath (e.g., various grass patterns of the grass field). Like above, in some embodiments, the scene-based image editing system 106 also utilizes a shadow synthesis model (discussed above) to generate the second additional shadow 5412. While in some embodiments, the scene-based image editing system 106 utilizes a shadow proxy generation model if the user is performing a drag-and-drop operation.

Figure 54D:
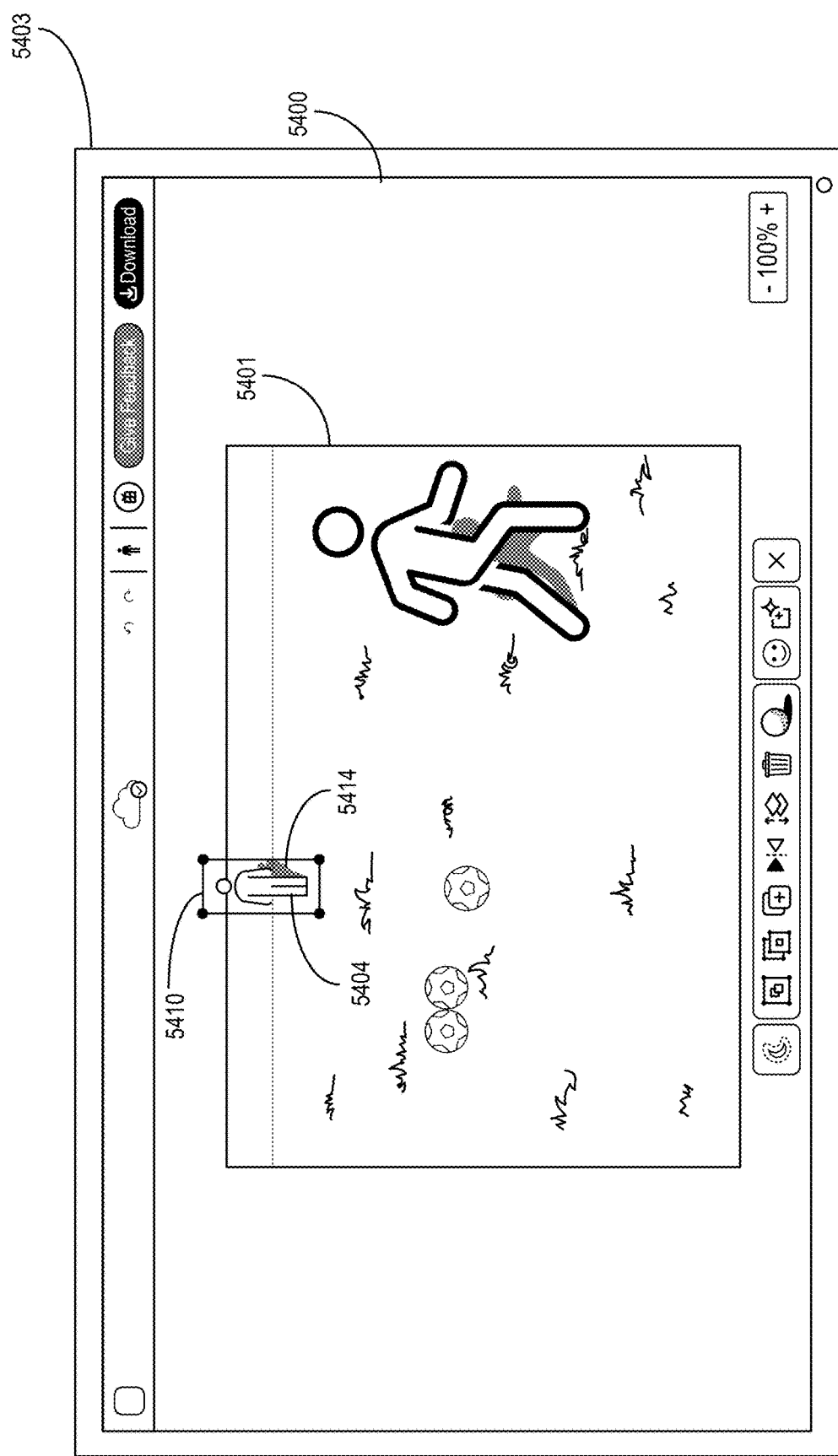

Moreover, as shown in FIG. 54D the scene-based image editing system 106 receives a selection to drag the selector shape 5410 to the back of the depicted scene of the digital image 5401 in the graphical user interface 5500. For instance, FIG. 54D shows the object 5404 with a third additional shadow 5414 (e.g., generated by a shadow synthesis model if a drag-and-drop action is complete or generated by a shadow proxy generation model if a drag-and-drop action is in process), where the third additional shadow 5414 spans across the ground floor and the vertical floor (e.g., the vertical object). In one or more embodiments, the graphical user interface 5400 shown in FIGS. 54A-54D happens in real-time or near real-time while a user drags-and-drops the object 5404 to different locations within the digital image in the graphical user interface 5400. Specifically, the scene-based image editing system 106 causes the graphical user interface to display the object in a different location (in response to receiving a selection to drag the object 5404) and immediately shows the backfill for the previously non-visible region, shows a proxy shadow for the object 5404, and shows a new shadow when the drag-and-drop option is completed. In particular, for generating a new shadow when the drag-and-drop option is completed, the scene-based image editing system 106 utilizes a shadow synthesis model discussed above.

Figure 55A:
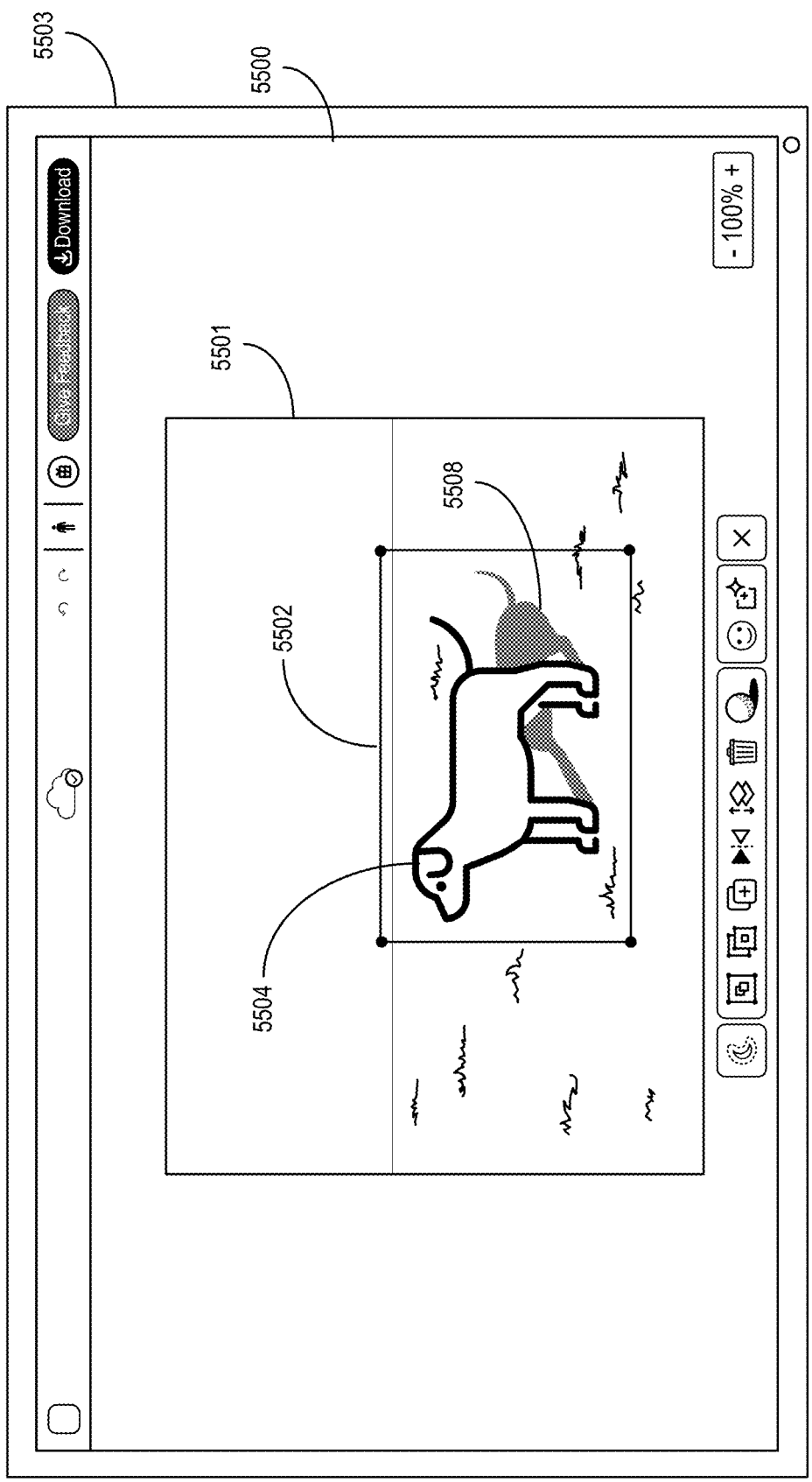
FIGS. 55A-55D illustrates a graphical user interface of a user dragging-and-dropping an object with a shadow with a shadow proxy in accordance with one or more embodiments.

As mentioned above, the scene-based image editing system 106 also generates a proxy shadow when performing moving an object and an associated shadow. FIGS. 55A-55D illustrates an object being dragged to various parts of the digital image within a graphical user interface in accordance with one or more embodiments. For example, FIG. 55A shows an object 5504 (e.g., the dog) with a shadow 5508 associated with the object 5504. Furthermore, FIG. 55A shows a selection of the object 5504 which causes a client device 5503 to display via a graphical user interface 5500 a selector shape 5502.

Figure 55B:
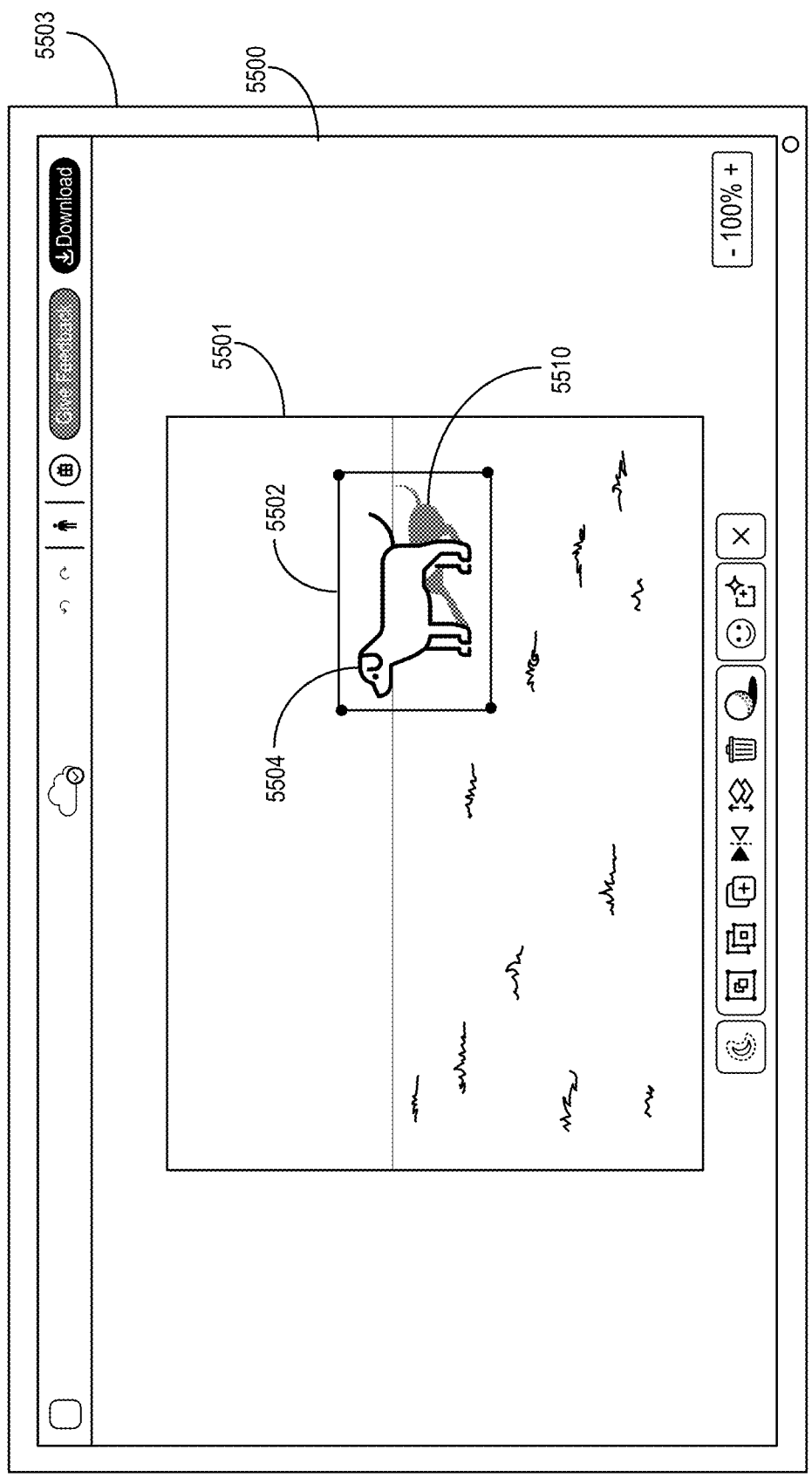

Moreover, FIG. 55B shows the scene-based image editing system 106 receiving a drag-and-drop selection to move the selector shape 5502 to a different location (e.g., an intermediate location). As shown in FIG. 55B, the scene-based image editing system 106 receives the indication to move the selector shape 5502 to the back right corner of a digital image 5501, and the scene-based image editing system 106 causes the graphical user interface 5500 to display the selector shape 5502 moving in real time. Moreover, the scene-based image editing system 106 causes the graphical user interface 5500 to display a backfill (e.g., a content fill) for the location previously occupied by the selector shape

5502. In addition, FIG. 55B shows the object 5504 with a proxy shadow 5510 while the drag-and-drop action is being performed, where the proxy shadow 5510 preserves the visible grass texture. Additional details regarding the proxy shadow are given below starting at FIG. 57.

Figure 55C:
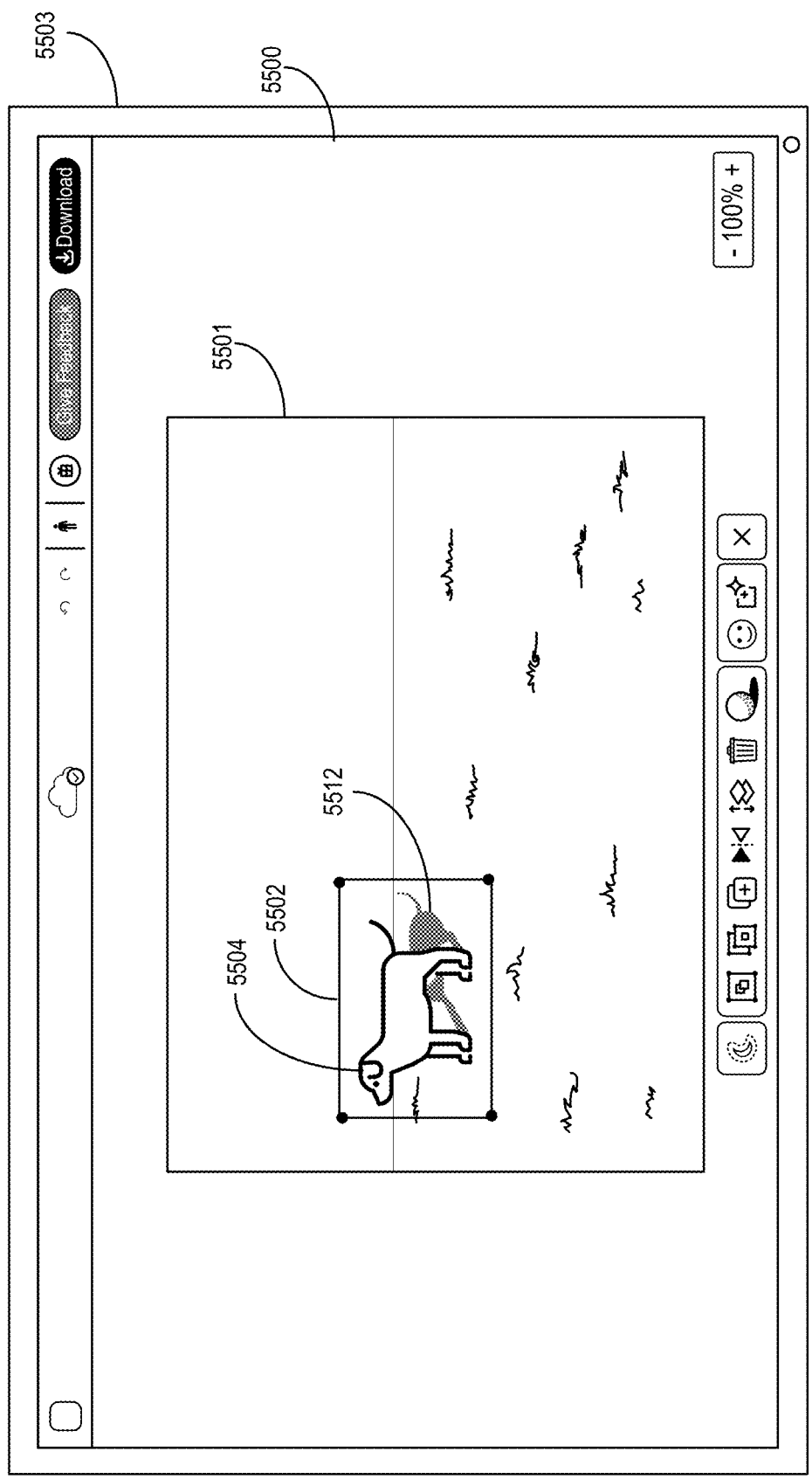

FIG. 55C illustrates the scene-based image editing system 106 further receiving an indication to move the selector shape 5502 to the back left corner of the digital image 5501. As shown in FIG. 55B, the scene-based image editing system 106 causes the graphical user interface 5500 to display the selector shape 5502 moving in real-time or near real-time and further exposing the location previously covered by the selector shape 5502. As also shown, FIG. 55C shows a new proxy shadow 5512 for the new location of the object 5504 (e.g., generated by a shadow proxy generation model discussed below).

Figure 55D:
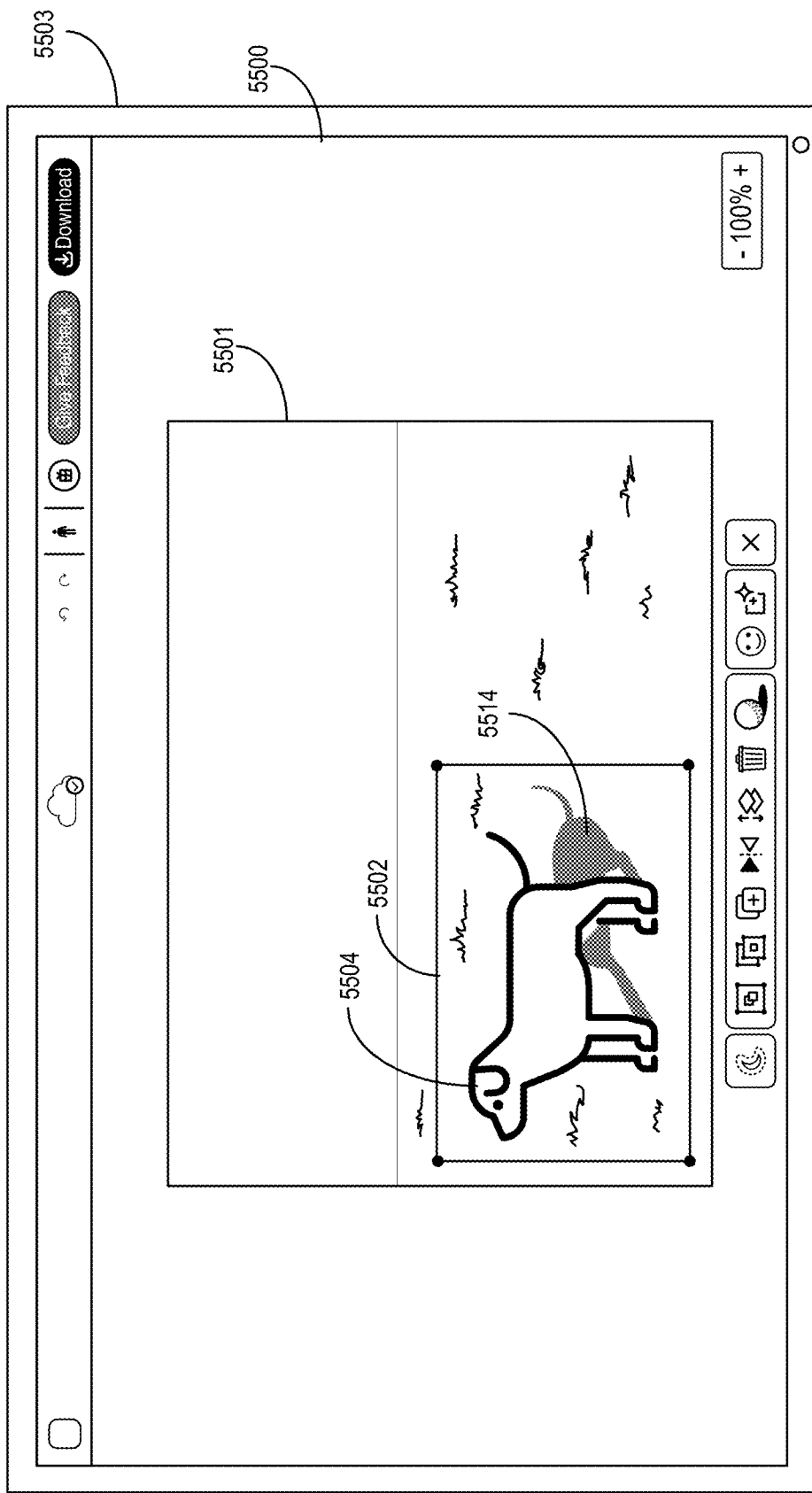

Moreover, FIG. 55D shows the scene-based image editing system 106 further receiving another indication to move the selector shape 5502 to the front left corner of the digital image 5501. Further, FIG. 55D shows a completion of the drag-and-drop selection (e.g., the location of the object 5504 shown in FIG. 55D includes a new location). Moreover, because FIG. 55D shows a completion of the drag-and-drop selection, the scene-based image editing system 106 also generates a new shadow 5514 for the object 5504 in the new location (e.g., generates the new shadow 5514 by utilizing a shadow synthesis model discussed above). Accordingly, the scene-based image editing system 106 causes the graphical user interface 5500 to display in real-time or near real-time, the movement of the selector shape 5502 in FIG. 55A to the new location in FIG. 55D. Moreover, in doing so, the scene-based image editing system 106 also causes the graphical user interface 5500 to display the various backfills and the new shadow 5514 for the object 5504.

In one or more embodiments, the process of FIGS. 55A-55D involves receiving user input to paste the object 5504 and an associated shadow 5508 into the digital image. In such implementations, the scene-based image editing system 106 provides, in a graphical user interface of the client device as the object is moved about the digital image, a proxy shadow of the object that approximates a new shadow. The scene-based image editing system 106 also generates, utilizing the shadow synthesis diffusion model, a new shadow in place of the associated shadow when the location of the object is determined. In particular, the scene-based image editing system 106 generates the new shadow so that it the new shadow is consistent with the scene and the second location in the digital image rather than an image from which the object and the shadow were copied or otherwise obtained.

Figure 56A:
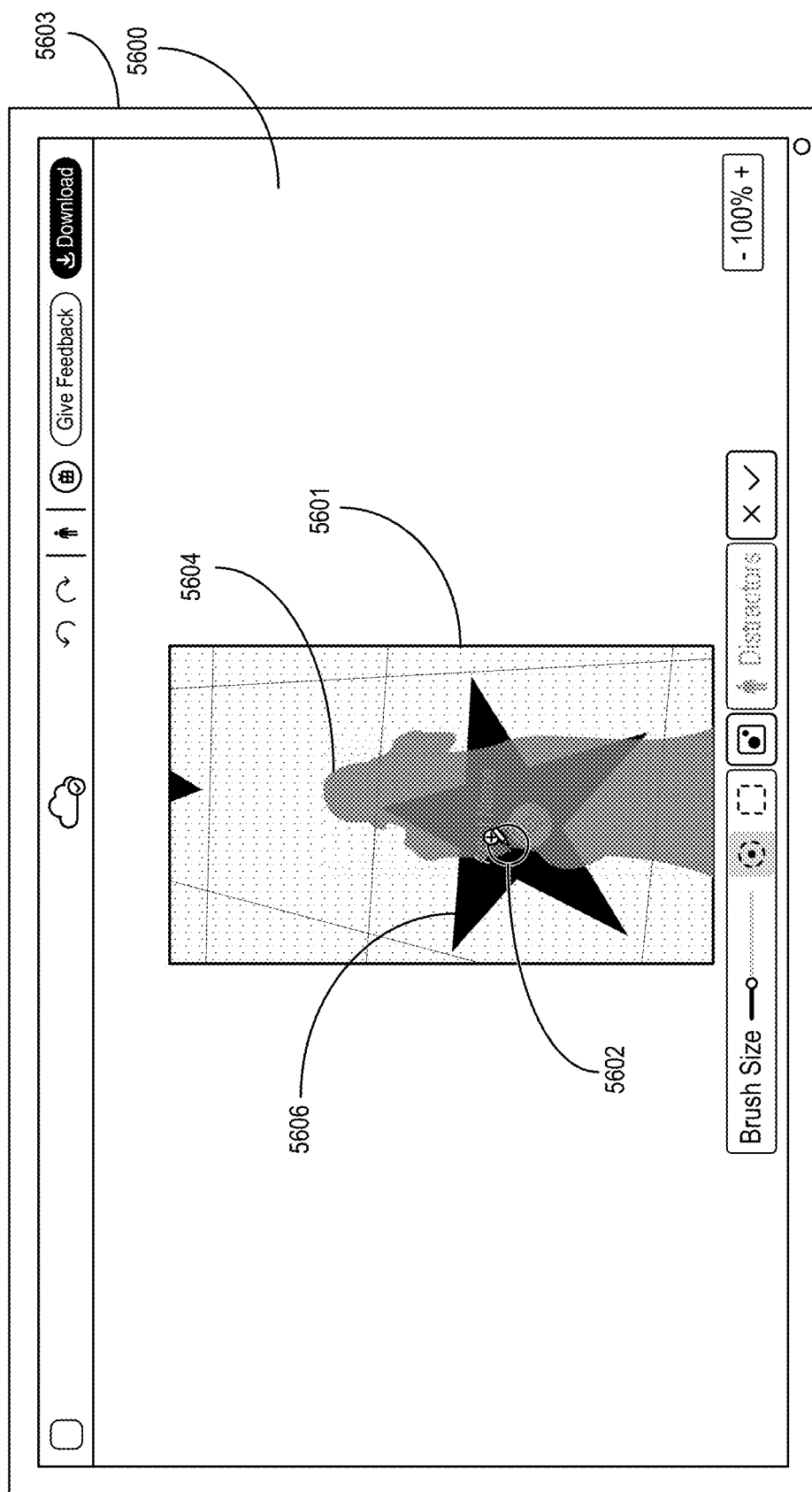
FIGS. 56A-56C illustrates a graphical user interface of a user removing a shadow cast from a person outside of the digital image while preserving a visible texture in accordance with one or more embodiments.
Figure 56B:
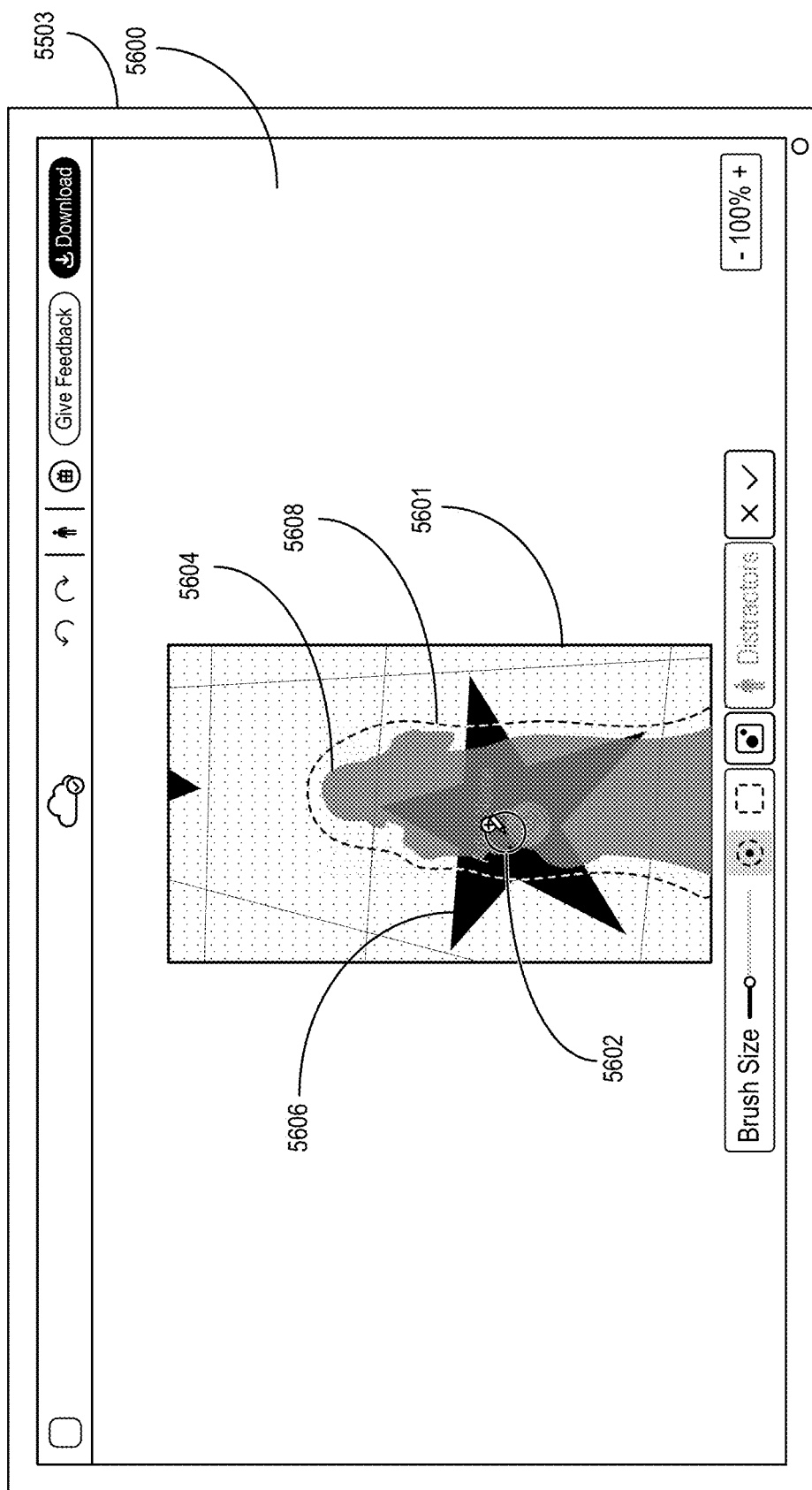
Figure 56C:
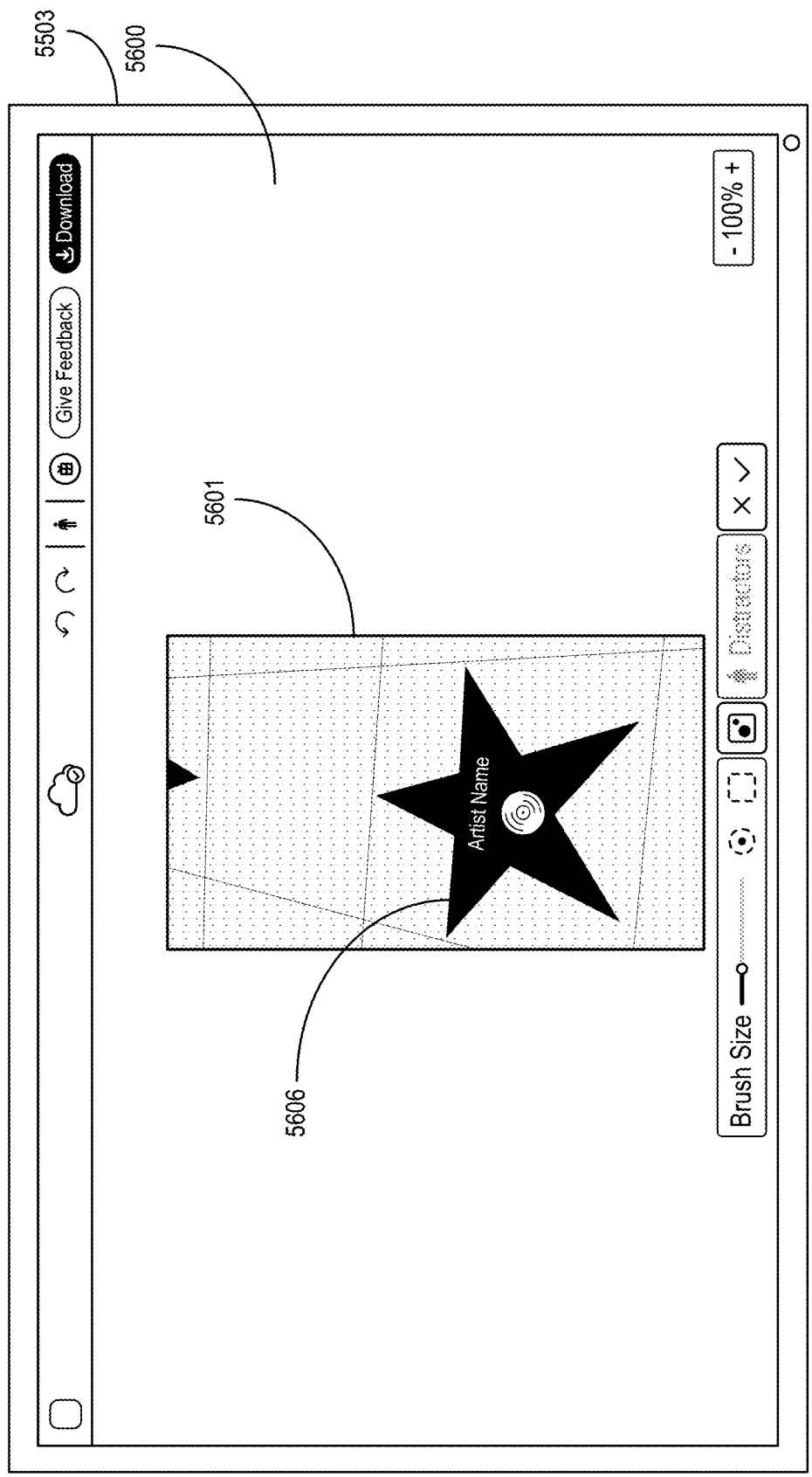

As also mentioned above, the scene-based image editing system 106 removes shadows and preserves the visible texture underneath the shadows removed. FIGS. 56A-56C illustrates the scene-based image editing system 106 receiving an indication to remove a shadow in accordance with one or more embodiments. For example, FIG. 56A shows a graphical user interface 5600 of a client device 5603 with a digital image 5601 that depicts a shadow 5604 cast from an object not shown in the digital image 5601. Furthermore, as shown, the shadow 5604 covers a visible texture 5606 which includes textual elements (e.g., "ARTIST NAME"). As further shown, FIG. 56A also shows a selector tool 5602 present in the graphical user interface 5600.

FIG. 56B further shows the scene-based image editing system 106 receiving an indication 5608 via the selector tool 5602. Specifically, the indication includes a user of the graphical user interface 5600 marking the shadow 5604 for removal. Moreover, upon marking the shadow 5604 for removal, the scene-based image editing system 106 further receives an indication to remove the shadow 5604. Additionally, FIG. 56C shows the scene-based image editing system 106 causing the graphical user interface 5600 to display the shadow 5604 removed from the digital image while preserving the visible texture 5606 underneath the shadow. As shown, the modified digital image in the graphical user interface 5600 clearly displays the text "ARTIST NAME" along with any other previously visible textures/patterns. Moreover, in one or more embodiments, rather than a user of the graphical user interface 5600 marking the shadow, the scene-based image editing system automatically (e.g., as opposed to manually) selects the shadow based on utilizing a shadow detection model discussed above.

Figure 57:
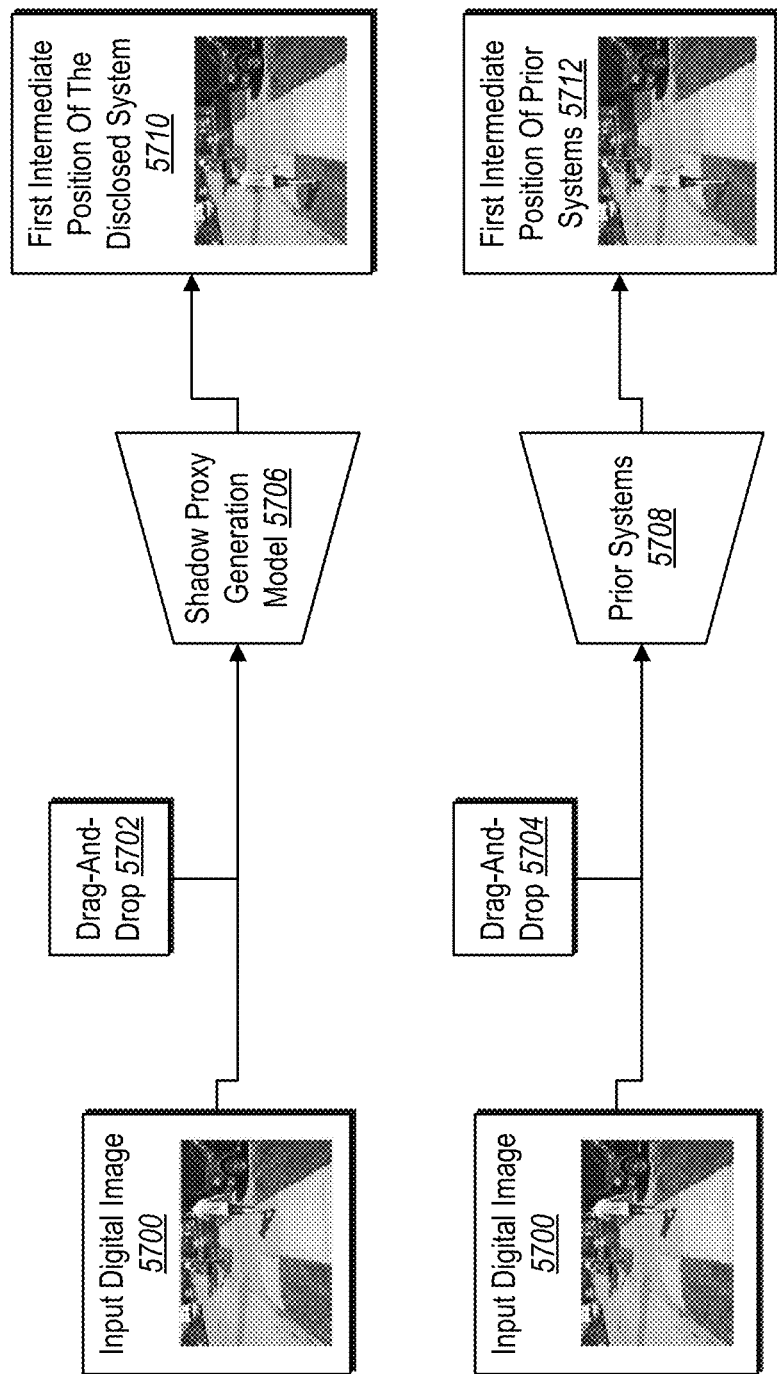
FIG. 57 illustrates a diagram of the scene-based image editing system generating a proxy shadow as compared to prior systems in accordance with one or more embodiments.

As mentioned above, the scene-based image editing system 106 generates a proxy shadow for an object in a digital image as the object is being moved around the digital image. FIG. 57 illustrates the scene-based image editing system 106 generating proxy shadows compared to prior systems in accordance with one or more embodiments. In one or more embodiments, the scene-based image editing system 106 further generates a proxy shadow for an object during the drag-and-drop selection. Specifically, while dragging the object to various locations within the digital image, the scene-based image editing system 106 removes the initial shadow of the object and generates a proxy shadow. For instance, the proxy shadow approximates a shape and size of the shadow as the object is moved around the digital image.

In one or more embodiments, shadow proxies aim to recreate shadows observed in an image while an object is being dragged around a digital image. In other words, a shadow proxy serves as a temporary visual effect as a shadow and its associated object are moved around a scene of a digital image. For instance, a shadow proxy includes properties such as shape, color, and transparency. Similar to shadow synthesis, the scene-based image editing system 106 in generating a shadow proxy obviates the need for explicit three-dimensional information. Unlike shadow synthesis however, the scene-based image editing system 106 utilizes a shadow proxy generation model 5706 to avoid the heavy computational costs of continuously generating a new shadow as an object is moved. Rather, the scene-based image editing system 106 via the shadow proxy generation model 5706 generates a proxy shadow within milliseconds as an object is moved around a digital image.

As shown in FIG. 57, the scene-based image editing system 106 receives an input digital image 5700 depicting a person walking along the cement with a shadow associated with the person. Further, as shown, the scene-based image editing system 106 further receives an indication via a drag-and-drop action 5702 to move the person and the associated shadow in the input digital image 5700. As also shown, the scene-based image editing system 106 utilizes a shadow proxy generation model 5706 to generate a proxy shadow for the person in a first intermediate position 5710 within the digital image.

In contrast to the scene-based image editing system 106, FIG. 57 also shows a first intermediate position 5712 for prior systems. Specifically, FIG. 57 also shows prior systems 5708 receiving the input digital image 5700 and receiving an indication of a drag-and-drop action 5704. In response to the drag-and-drop action 5704, the prior systems 5708 generates the first intermediate position 5712 which shows the proxy shadow carrying over pixels from the cement onto the grass. The first intermediate position 5710 of the scene-based image editing system 106 shows that the generated proxy shadow maintains the visible texture of the grass and does not carry over the pixels from the cement.

Moreover, in one or more embodiments, the scene-based image editing system 106 receives an additional object and an associated shadow for the additional object to transfer to the input digital image 5700 from an additional digital image. In some such embodiments, the scene-based image editing system 106 generates a proxy shadow in place of the shadow for the additional object. For instance, the scene-based image editing system 106 generates the proxy shadow by utilizing the shadow proxy generation model 5706 which is also discussed in more detail below.

In other words, rather than the scene-based image editing system 106 generating a new shadow for the additional object transferred to the input digital image 5700, in some embodiments, the scene-based image editing system 106 utilizes a proxy shadow in place of the shadow for the additional object. In doing so, the scene-based image editing system 106 provides for a visualization of the shadow (e.g., using the proxy shadow) of the additional object without expending the computational resources to generate a new shadow (e.g., until the additional object is placed, or a drag-and-drop action is completed).

Figure 58:
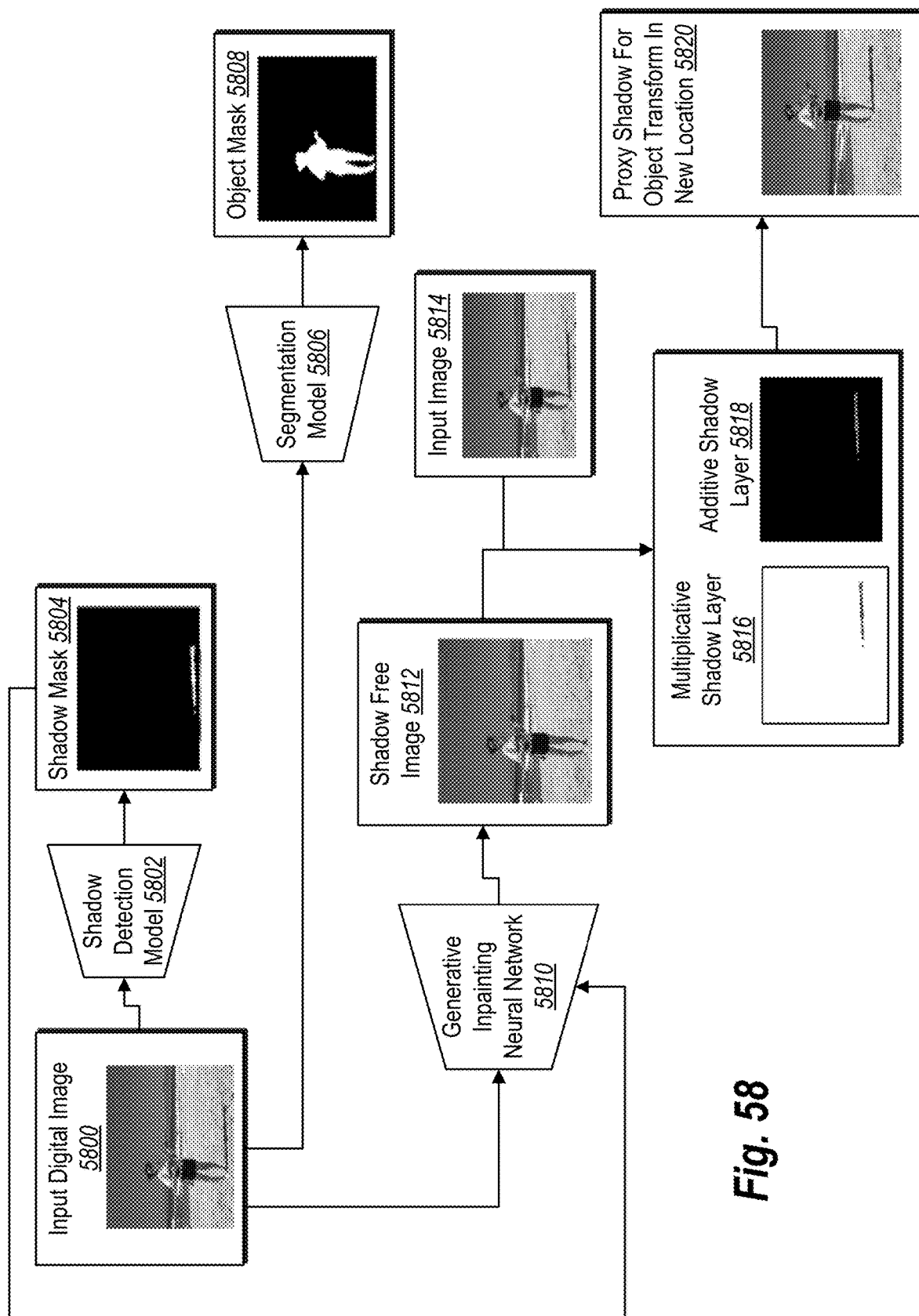
FIG. 58 illustrates a diagram of the scene-based image editing system generating a proxy shadow with a first technique in accordance with one or more embodiments.

In one or more embodiments, the scene-based image editing system 106 generates a proxy shadow using several different components of a digital image. As mentioned above, the scene-based image editing system 106 generating a proxy shadow via a shadow proxy generation model achieves faster processing time and generates more consistent shadows of the object. FIG. 58 illustrates the scene-based image editing system 106 utilizing a first technique to generate a proxy shadow for an object in accordance with one or more embodiments. For example, the first technique includes computing a shadow layer from an input digital image 5800 and a shadow free digital image 5812.

As shown in FIG. 58, the scene-based image editing system 106 from the input digital image 5800 utilizes a shadow detection model 5802 (discussed above) to access a shadow mask 5804. Furthermore, the scene-based image editing system 106 utilizes a segmentation model 5806 (discussed above) to access an object mask 5808 of the object in the input digital image 5800. Moreover, the scene-based image editing system 106 utilizes a generative inpainting neural network 5810 (e.g., either a general generative inpainting neural network or a shadow removal generative inpainting neural network) to generate the shadow free digital image 5812. As shown, the scene-based image editing system 106 further compares (e.g., to determine an image ratio or an image difference) the shadow free digital image 5812 with the input digital image 5814 and generates a shadow layer to utilizes as a shadow proxy.

In particular, as shown, the scene-based image editing system 106 generates a multiplicative shadow layer 5816 and/or an additive shadow layer 5818. For instance, in some embodiments the scene-based image editing system 106 represents the various digital image components as the input digital image 5800 (I), shadow mask (M), and the shadow free digital image 5812 (J). Moreover, in some embodiments, the scene-based image editing system 106 computes the shadow layer from I and J. To illustrate, to generate the multiplicative shadow layer 5816, the scene-based image editing system 106 divides I by J (e.g., an image ratio) with an epsilon value added to the denominator to avoid zero division represented as follows:

$$S_M = \frac{I}{J}.$$

Further, in some embodiments, the scene-based image editing system 106 computes the shadow layer by subtracting I from J (e.g., an image difference) represented as follows: $S_A = I - J$.

In one or more embodiments, $S_M$ and $S_A$ indicates shadow layers based on the multiplicative and additive assumptions respectively. Further, in some embodiments, the scene-based image editing system 106 generates the shadow layers with a pixel-wise and per color-space component. Accordingly, in some embodiments, the scene-based image editing system 106 generates a shadow layer with a potentially different vector at each pixel. Thus, as shown in FIG. 58, the scene-based image editing system 106 generates a proxy shadow 5820 for object transform in a new location within the input digital image 5800.

Figure 59:
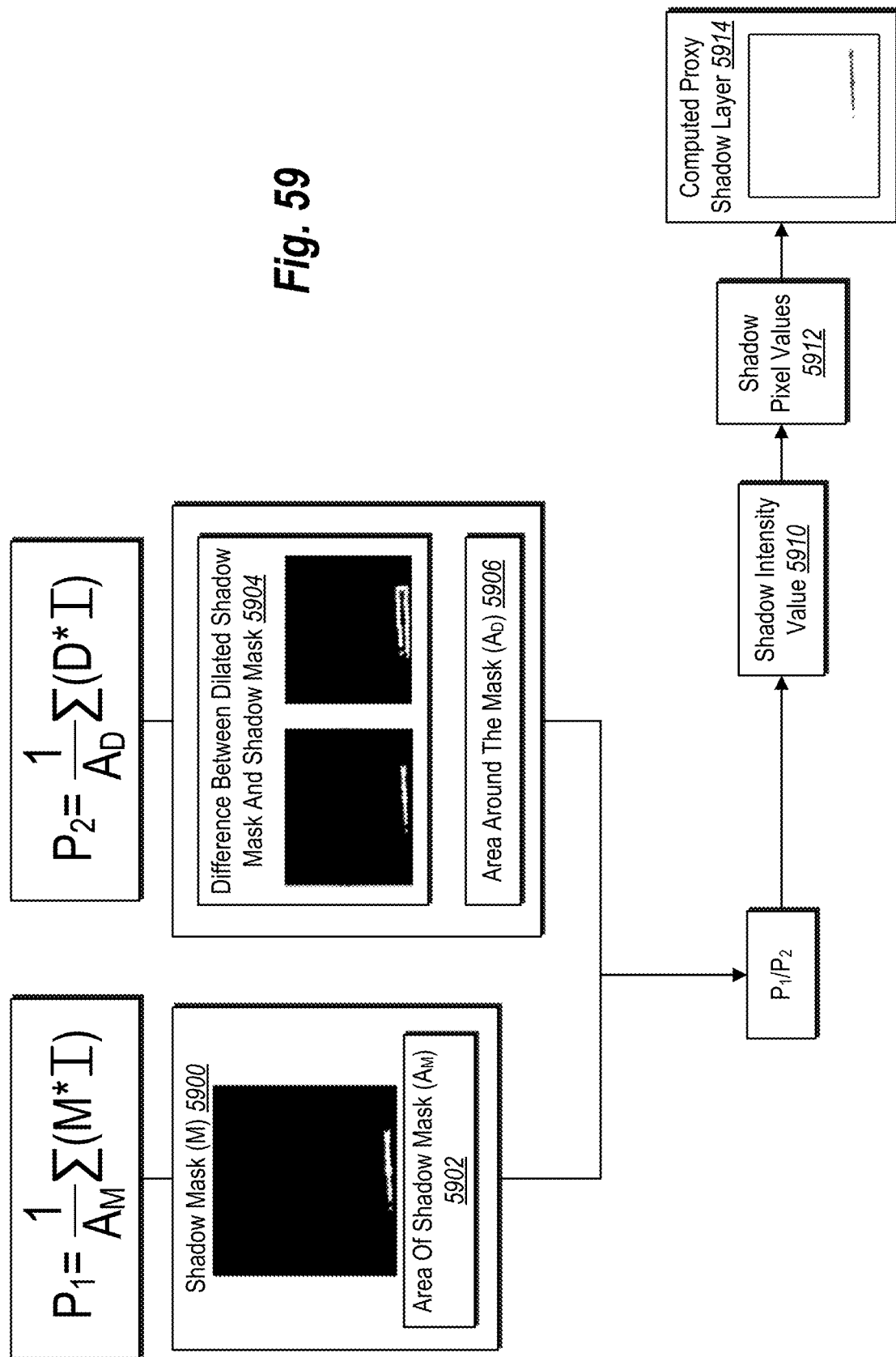
FIG. 59 illustrates a diagram of the scene-based image editing system generating a proxy shadow with a second technique in accordance with one or more embodiments.

FIG. 59 illustrates the scene-based image editing system 106 utilizing a second technique to generate a proxy shadow for an object in accordance with one or more embodiments. For example, FIG. 59 shows the scene-based image editing system 106 utilizing a detected binary mask to compute an approximate shadow intensity from the input digital image and a shadow free digital image. Further, the second technique includes the scene-based image editing system 106 determining a ratio (e.g., multiplicative assumption) or a residual (additive assumption) of mean pixel values within and around the shadow mask to be further used for determining a shadow intensity value. Additionally, in some embodiments, the scene-based image editing system 106 applies a Gaussian blur to the mask to make the shadow layer appear more natural around the edges.

As shown in FIG. 59, the scene-based image editing system 106 processes a shadow mask 5900 (M) and an area 5902 ($A_M$) of the shadow mask 5900 to determine mean pixel values within the shadow mask. For instance, the scene-based image editing system 106 represents the mean pixel values within the shadow mask as $P_1$, where $$P_1 = \frac{1}{A_M}\sum(M*I).$$

Accordingly, in some embodiments, the mean pixel values within the shadow mask are equivalent to the summation of the shadow mask multiplied by the input digital image. Furthermore, the result of the summation operation is represented as 1 divided by the result, as indicated in the above notation.

Moreover, as shown in FIG. 59, the scene-based image editing system 106 processes a difference 5904 between a dilated shadow mask and the shadow mask 5900 and an area 5906 around the shadow mask 5900. For instance, the scene-based image editing system 106 represents the mean pixel values around the shadow mask as $P_2$, where $$P_2 = \frac{1}{A_D}\sum(D*I).$$

Accordingly, in some embodiments, the mean pixel values around the shadow mask are equivalent to the summation of the difference between a dilated shadow mask and the shadow mask 5900 and an area 5906 around the shadow mask 5900 multiplied by the input digital image. Further, in some embodiments, the result of the summation operation is represented as 1 divided by the result.

Additionally, as shown in FIG. 59, the scene-based image editing system 106 determines an approximate shadow intensity value by dividing the mean pixels within the shadow mask ($P_1$) by the mean pixel values around the shadow mask ($P_2$). Furthermore, as shown, the scene-based image editing system 106 computes a proxy shadow layer 5914 by assigning a shadow intensity value 5910 to shadow pixel values 5912. Accordingly, the scene-based image editing system 106 generates the proxy shadow layer 5914 to be as close to the correct shadow (e.g., the initial shadow) as possible while being efficient enough to compute (e.g., such that the scene-based image editing system 106 causes a graphical use interface to display the proxy shadow layer 5914 as an object is being moved). Thus, the second technique has a correct overall brightness of the initial shadow without including the texture under the initial shadow location (e.g., the second techniques preserve the visible texture).

Figure 60:
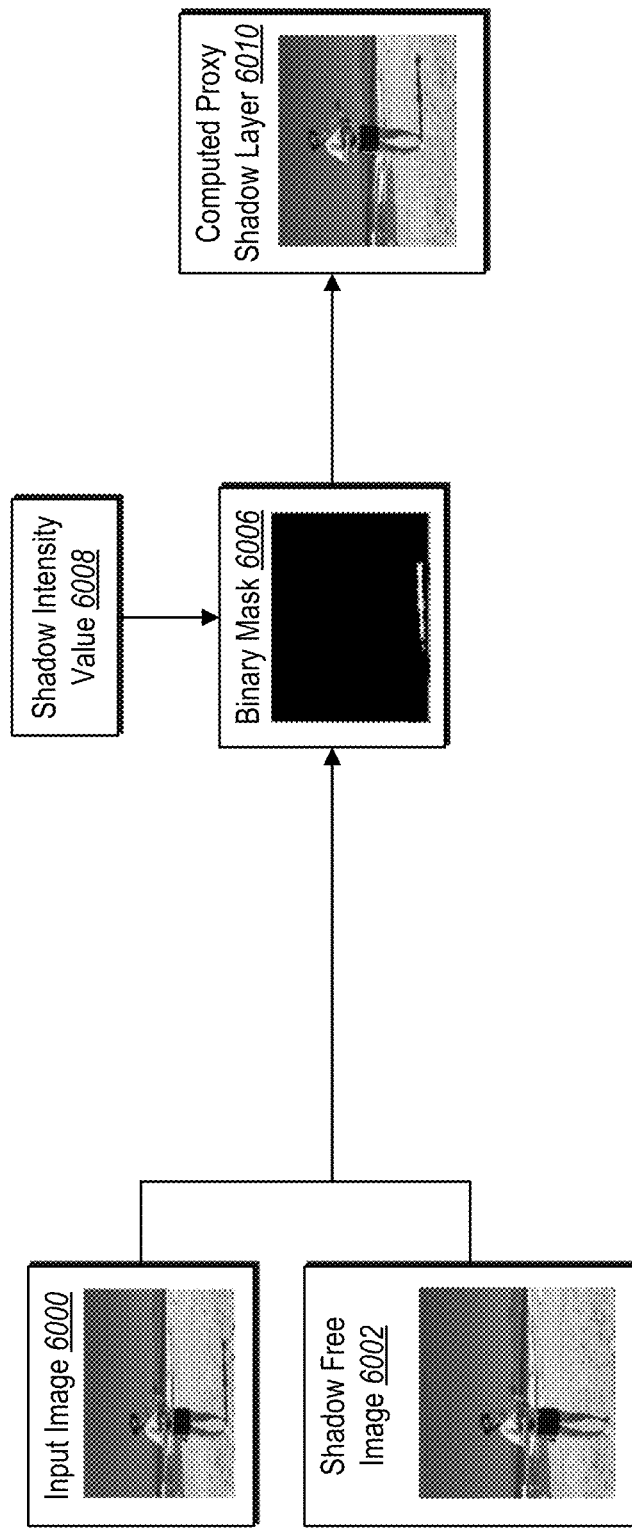
FIG. 60 illustrates a diagram of the scene-based image editing system generating a proxy shadow with a third technique in accordance with one or more embodiments.

Furthermore, FIG. 60 illustrates the scene-based image editing system 106 utilizing a third technique to generate a shadow proxy. For example, the scene-based image editing system 106 utilizes a combination of the first technique and the second technique in performing the third technique. For instance, the scene-based image editing system 106 computes a binary mask 6006 from an input digital image 6000 and a shadow free digital image 6002 in the same manner described in FIG. 58. Further, the scene-based image editing system 106 then applies a shadow intensity value 6008 and blur to the binary mask 6006 in the same manner described in FIG. 59.

Moreover, in some embodiments, rather than using a shadow detection model, the scene-based image editing system 106 derives a shadow mask by binarizing pixels of the shadow layer computed via the first technique. Further, the scene-based image editing system 106 generates the shadow proxy by adding or multiplying the computed shadow layer on the new location. Accordingly, the third technique results in a more accurate shadow shape and a more consistent shadow intensity.

As mentioned above, the scene-based image editing system 106 detects distractor objects and removes them. FIG. 61A illustrates the scene-based image editing system 106 utilizing a distractor detection neural network and removing objects and shadows associated with the shadows while still preserving the underlying visible texture. For example, FIG. 61A shows a client device 6104 and a graphical user interface 6102 of the client device 6104. Further, as shown in FIG. 61A, for a digital image 6106, the scene-based image editing system 106 utilizes a distractor neural network (discussed in FIG. 26) to detect distractions 6110a-6110d and shadows 6111a-6111d associated with the distractions 6110a-6110d. In the digital image 6106, a featured object 6108 features a picture of a woman at the beach. Moreover, as shown in FIG. 61A, the scene-based image editing system 106 causes the graphical user interface 6102 to display an analyzing 6112 option to trigger the detection of distractions 6110a-6110d.

Figure 61B:
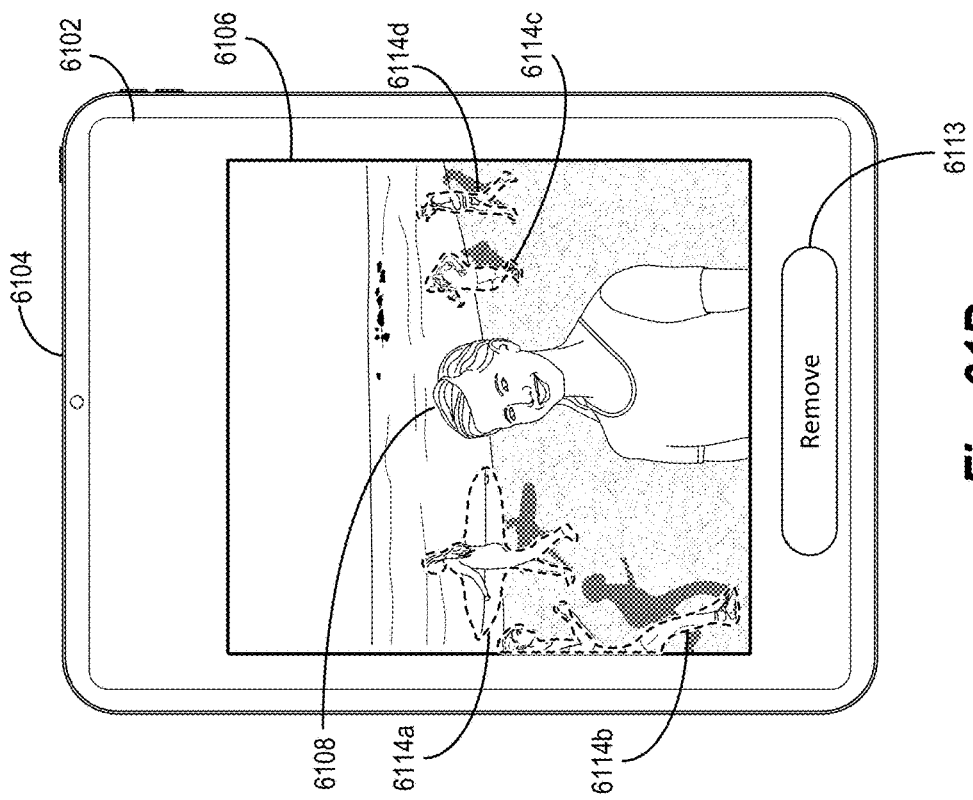
FIGS. 61A-61C illustrates a graphical user interface of a user removing distractor objects and shadows from a digital image while preserving a visible texture in accordance with one or more embodiments.
Figure 61A:
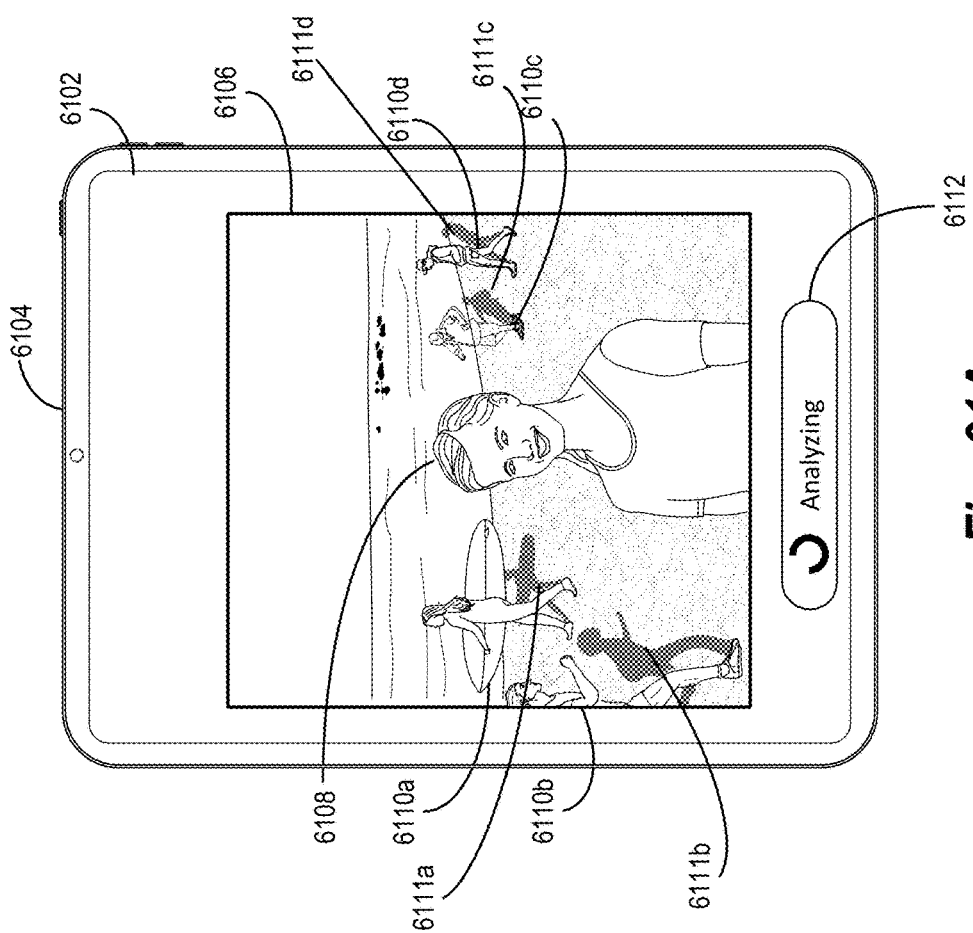
Figure 61C:
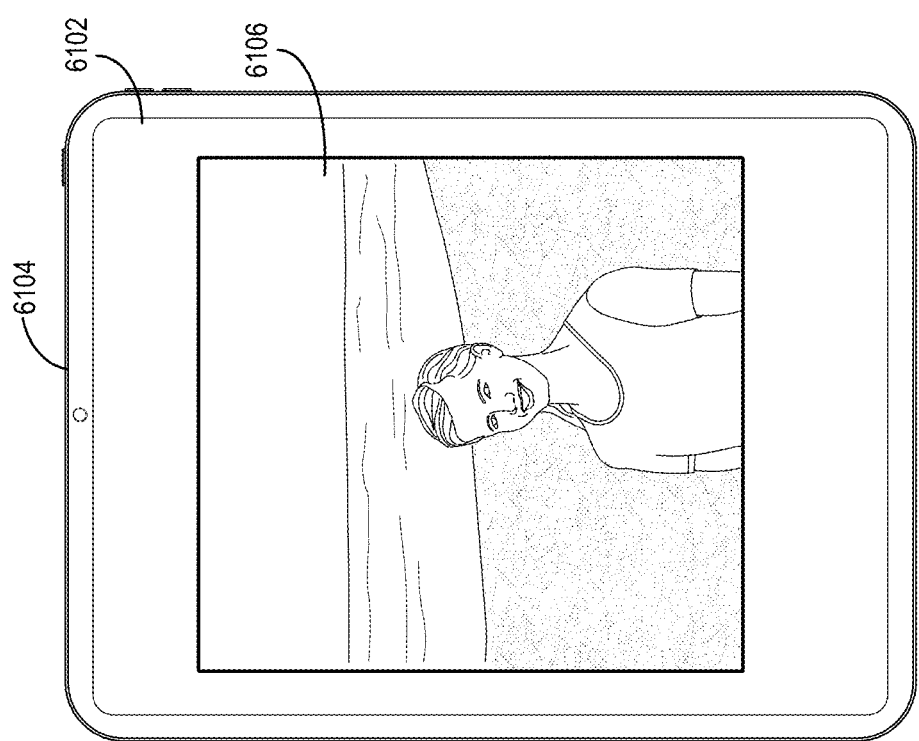

FIG. 61B further shows the digital image 6106 with a selection of the distractors 6110a-6110d in accordance with one or more embodiments. For example, FIG. 61B shows a selection of the distractors 6110a-6110d and indicators 6114a-6114d surrounding the distractors 6110a-6110d. In particular, the scene-based image editing system 106 causes the graphical user interface 6102 to display a remove 6113 option. Upon selection of the remove 6113 option, FIG. 61C shows the digital image 6106 without the distractors 6110a-6110d and without the shadows 6111a-6111d. Furthermore, with the distractors 6110a-6110d and the shadows 6111a-6111d removed, the scene-based image editing system 106 maintains the visible texture underneath the previous location of the shadows 6111a-6111d.

Figure 62:
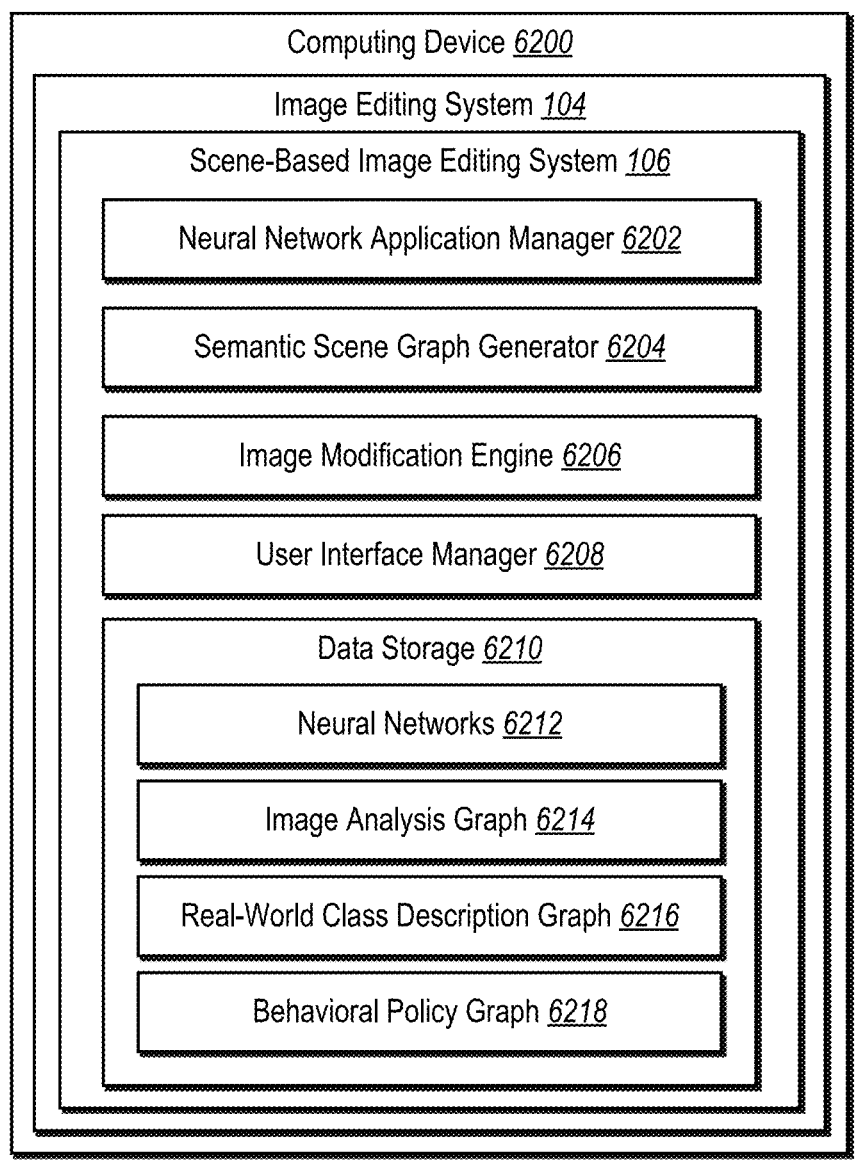
FIG. 62 illustrates an example schematic diagram of a scene-based image editing system in accordance with one or more embodiments.

Turning to FIG. 62, additional detail will now be provided regarding various components and capabilities of the scene-based image editing system 106. In particular, FIG. 62 shows the scene-based image editing system 106 implemented by the computing device 6200 (e.g., the server(s) 102 and/or one of the client devices 110a-110n). Additionally, the scene-based image editing system 106 is also part of the image editing system 104. As shown, in one or more embodiments, the scene-based image editing system 106 includes, but is not limited to, a neural network application manager 6202, a semantic scene graph generator 6204, an image modification engine 6206, a user interface manager 6208, and data storage 6210 (which includes neural networks 6212, an image analysis graph 6214, a real-world class description graph 6216, and a behavioral policy graph 6218).

As just mentioned, and as illustrated in FIG. 62, the scene-based image editing system 106 includes the neural network application manager 6202. In one or more embodiments, the neural network application manager 6202 implements one or more neural networks used for editing a digital image, such as a segmentation neural network, an inpainting neural network, a shadow detection neural network, an attribute classification neural network, or various other machine learning models used in editing a digital image. In some cases, the neural network application manager 6202 implements the one or more neural network automatically without user input. For instance, in some cases, the neural network application manager 6202 utilizes the one or more neural networks to pre-process a digital image before receiving user input to edit the digital image. Accordingly, in some instances, the neural network application manager 6202 implements the one or more neural networks in anticipation of modifying the digital image.

Additionally, as shown in FIG. 62, the scene-based image editing system 106 includes the semantic scene graph generator 6204. In one or more embodiments, the semantic scene graph generator 6204 generates a semantic scene graph for a digital image. For instance, in some cases, the scene-based image editing system 106 utilizes information about a digital image gathered via one or more neural networks (e.g., as implemented by the neural network application manager 6202) and generates a semantic scene graph for the digital image. In some cases, the semantic scene graph generator 6204 generates a semantic scene graph for a digital image automatically without user input (e.g., in anticipation of modifying the digital image). In one or more embodiments, the semantic scene graph generator 6204 generates a semantic scene graph for a digital image using an image analysis graph, a real-world class description graph, and/or a behavioral policy graph.

As shown in FIG. 62, the scene-based image editing system 106 also includes the image modification engine 6206. In one or more embodiments, the image modification engine 6206 modifies a digital image. For instance, in some cases, the image modification engine 6206 modifies a digital image by modifying one or more objects portrayed in the digital image. For instance, in some cases, the image modification engine 6206 deletes an object from a digital image or moves an object within the digital image. In some implementations, the image modification engine 6206 modifies one or more attributes of an object. In some embodiments, the image modification engine 6206 modifies an object in a digital image based on a relationship between the object and another object in the digital image.

Further, as shown in FIG. 62, the scene-based image editing system 106 includes the user interface manager 6208. In one or more embodiments, the user interface manager 6208 manages the graphical user interface of a client device. For instance, in some cases, the user interface manager 6208 detects and interprets user interactions with the graphical user interface (e.g., detecting selections of objects portrayed in a digital image). In some embodiments, the user interface manager 6208 also provides visual elements for display within the graphical user interface, such as visual indications of object selections, interactive windows that display attributes of objects, and/or user interactions for modifying an object.

Additionally, as shown in FIG. 62, the scene-based image editing system 106 includes data storage 6210. In particular, data storage 6210 includes neural networks 6212 (e.g., which further includes a shadow synthesis diffusion model, a shadow removal generative inpainting neural network, and a general generative inpainting neural network), an image analysis graph 6214, a real-world class description graph 6216, and a behavioral policy graph 6218.

Each of the components 6202-6218 of the scene-based image editing system 106 optionally include software, hardware, or both. For example, the components 6202-6218 include one or more instructions stored on a computer-readable storage medium and executable by processors of one or more computing devices, such as a client device or server device. When executed by the one or more processors, the computer-executable instructions of the scene-based image editing system 106 cause the computing device(s) to perform the methods described herein. Alternatively, the components 6202-6218 include hardware, such as a special-purpose processing device to perform a certain function or group of functions. Alternatively, the components 6202-6218 of the scene-based image editing system 106 include a combination of computer-executable instructions and hardware.

Furthermore, the components 6202-6218 of the scene-based image editing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 6202-6218 of the scene-based image editing system 106 may be implemented as a stand-alone application, such as a desktop or mobile application. Furthermore, the components 6202-6218 of the scene-based image editing system 106 may be implemented as one or more web-based applications hosted on a remote server. Alternatively, or additionally, the components 6202-6218 of the scene-based image editing system 106 may be implemented in a suite of mobile device applications or "apps." For example, in one or more embodiments, the scene-based image editing system 106 comprises or operates in connection with digital software applications such as ADOBE® PHOTOSHOP® or ADOBE® ILLUSTRATOR®. The foregoing are either registered trademarks or trademarks of Adobe Inc. in the United States and/or other countries.

FIGS. 1-62, the corresponding text, and the examples provide a number of different methods, systems, devices, and non-transitory computer-readable media of the scene-based image editing system 106. In addition to the foregoing, one or more embodiments can also be described in terms of flowcharts comprising acts for accomplishing the particular result, as shown in FIGS. 63-69. FIGS. 63-69 may be performed with more or fewer acts. Further, the acts may be performed in different orders. Additionally, the acts described herein may be repeated or performed in parallel with one another or in parallel with different instances of the same or similar acts.

Figure 63:
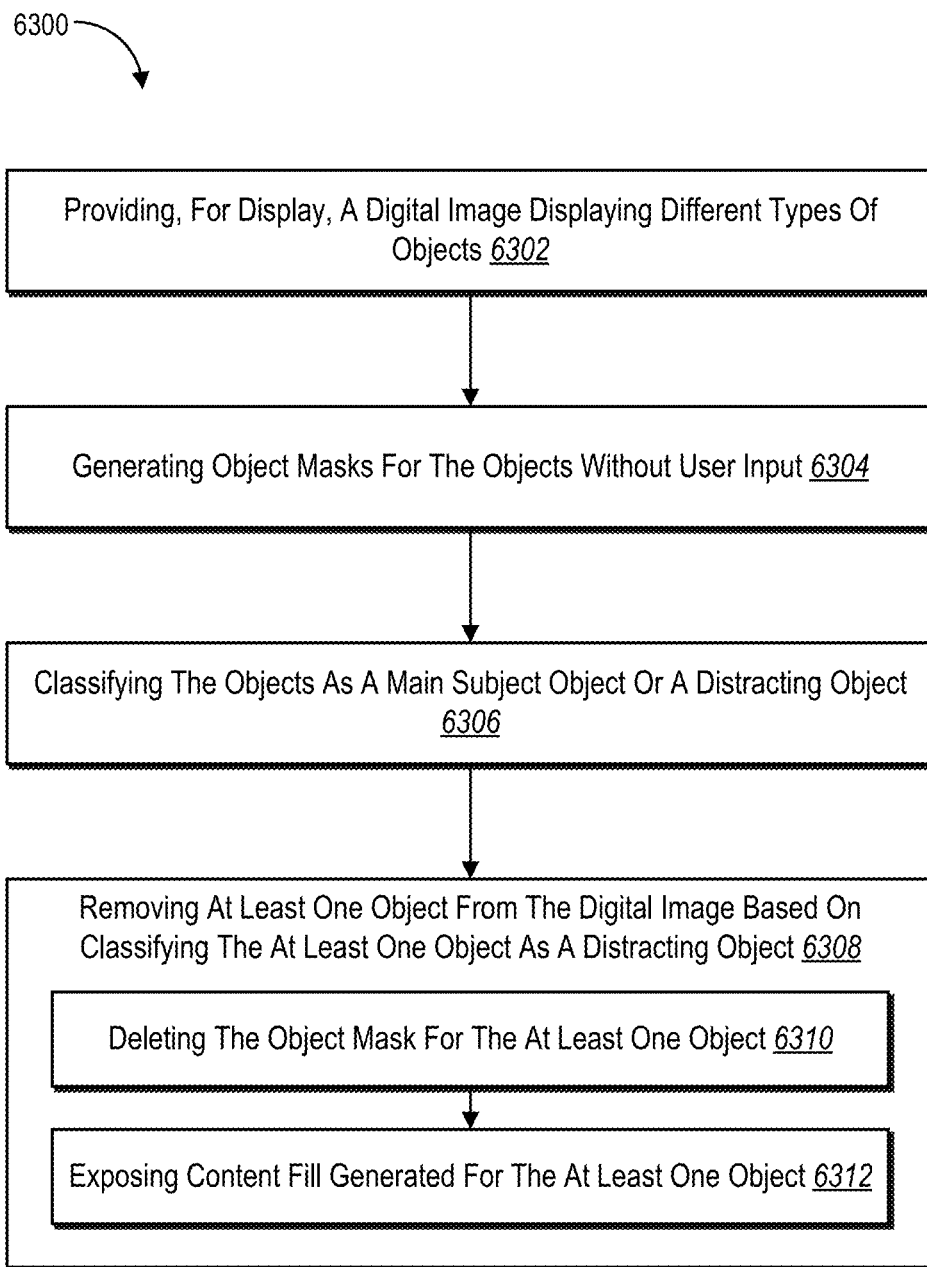
FIG. 63 illustrates a flowchart for a series of acts for removing distracting objects from a digital image in accordance with one or more embodiments.

FIG. 63 illustrates a flowchart for a series of acts 6300 for removing distracting objects from a digital image in accordance with one or more embodiments. FIG. 63 illustrates acts according to one embodiment, alternative embodiments may omit, add to, reorder, and/or modify any of the acts shown in FIG. 63. In some implementations, the acts of FIG. 63 are performed as part of a method. For example, in some embodiments, the acts of FIG. 63 are performed as part of a computer-implemented method. Alternatively, a non-transitory computer-readable medium can store instructions thereon that, when executed by at least one processor, cause the at least one processor to perform operations comprising the acts of FIG. 63. In some embodiments, a system performs the acts of FIG. 63. For example, in one or more embodiments, a system includes at least one memory device comprising a distractor detection neural network and an object detection machine learning model. The system further includes at least one processor configured to cause the system to perform the acts of FIG. 63.

The series of acts 6300 includes an act 6302 for providing, for display, a digital image displaying different types of objects. For instance, in one or more embodiments, the act 6302 involves providing, for display within a graphical user interface of a client device, a digital image displaying a plurality of objects, the plurality of objects comprising a plurality of different types of objects. In one or more embodiments, generating, utilizing the segmentation neural network, the object mask for the objects of the plurality of objects comprises generating, utilizing the segmentation neural network, one or more object masks for one or more non-human objects from the plurality of objects.

The series of acts 6300 also includes an act 6304 for generating object masks for the objects without user input. For example, in some embodiments, the act 6304 involves generating, utilizing a segmentation neural network and without user input, an object mask for objects of the plurality of objects.

Additionally, the series of acts 6300 includes an act 6306 for classifying the objects as a main subject object or a distracting object. To illustrate, in one or more embodiments, the act 6306 involves determining, utilizing a distractor detection neural network, a classification for the objects of the plurality of objects, wherein the classification for an object comprises a main subject object or a distracting object.

Further, the series of acts 6300 includes an act 6308 for removing at least one object from the digital image based on classifying the object as a distracting object. For instance, in some implementations, the act 6308 involves removing at least one object from the digital image, based on classifying the at least one object as a distracting object.

As shown in FIG. 63, the act 6308 includes a sub-act 6310 for deleting the object mask for the at least one object. Indeed, in one or more embodiments, the scene-based image editing system 106 removes the at least one object from the digital image, based on classifying the at least one object as a distracting object, by deleting the object mask for the at least one object. As further shown, the act 6308 further includes a sub-act 6312 for exposing content fill generated for the at least one object. Indeed, in one or more embodiments, the scene-based image editing system 106 generates, utilizing a content-aware fill machine learning model and without user input, a content fill for the at least one object; and places the content fill behind the object mask for the at least one object within the digital image so that removing the at least one object from the digital image exposes the content fill.

In one or more embodiments, the scene-based image editing system 106 provides, for display via the graphical user interface of the client device, at least one visual indication for the at least one object indicating that the at least one object is a distracting object. In some instances, the scene-based image editing system 106 further receives, via the graphical user interface, a user interaction within an additional object portrayed in the digital image, indicating that the additional object includes an additional distracting object; and provides, for display via the graphical user interface, an additional visual indication for the additional object indicating that the additional object includes an additional distracting object. In some instances, the scene-based image editing system 106 removes, based on the user interaction indicating that the additional object includes an additional distracting object, the additional object from the digital image by deleting an additional object mask for the additional object.

In some instances, the scene-based image editing system 106 facilitates the removal of arbitrary portions of a digital image selected by the user. For instance, in some cases, the scene-based image editing system 106 receives, via the graphical user interface of the client device, a user selection of a portion of the digital image including pixels unassociated with the objects of the plurality of objects; and modifies the digital image by removing the portion of the digital image selected by the user selection. In some embodiments, the scene-based image editing system 106 further generates, utilizing a content-aware fill machine learning model, a content fill for the portion of the digital image selected by the user selection; and modifies, in response to removing the portion of the digital image selected by the user selection, the digital image by replacing the portion of the digital image with the content fill.

In one or more embodiments, the scene-based image editing system 106 also determines, utilizing a shadow detection neural network and without user input, a shadow associated with the at least one object within the digital image; and removes the shadow from the digital image along with the at least one object.

To provide an illustration, in one or more embodiments, the scene-based image editing system 106 determines, utilizing a distractor detection neural network, one or more non-human distracting objects in a digital image; provides, for display within a graphical user interface of a client device, a visual indication of the one or more non-human distracting objects with a selectable option for removing the one or more non-human distracting objects; detects, via the graphical user interface, a user interaction with the selectable option for removing the one or more non-human distracting objects from the digital image; and modifies, in response to detecting the user interaction, the digital image by removing the one or more non-human distracting objects.

In one or more embodiments, determining the one or more non-human distracting objects comprises determining a set of non-human distracting objects portrayed in the digital image; and providing the visual indication of the one or more non-human distracting objects comprises providing, for each non-human distracting object from the set of non-human distracting objects, a corresponding visual indication. In some instances, the scene-based image editing system 106 detects, via the graphical user interface of the client device, a user interaction with a non-human distracting object from the set of non-human distracting objects. The scene-based image editing system 106 removes, from display via the graphical user interface, the corresponding visual indication for the non-human distracting object in response to detecting the user interaction with the non-human distracting object. Accordingly, in some embodiments, modifying the digital image by removing the one or more non-human distracting objects comprises modifying the digital image by removing at least one non-human distracting object from the set of non-human distracting objects while maintaining the non-human distracting object based on detecting the user interaction with the non-human distracting object.

Further, in some cases, the scene-based image editing system 106 detects, via the graphical user interface, a user selection of an additional non-human object portrayed in the digital image; and adds the additional non-human object to the set of non-human distracting objects in response to detecting the user selection of the additional non-human object. Accordingly, in some embodiments, modifying the digital image by removing the one or more non-human distracting objects comprises modifying the digital image by removing the set of non-human distracting objects including the additional non-human object selected via the user selection.

In some implementations, the scene-based image editing system 106 determines, utilizing the distractor detection neural network, at least one non-human main subject object in the digital image. As such, in some instances, modifying the digital image by removing the one or more non-human distracting objects comprises maintaining the at least one non-human main subject object within the digital image while removing the one or more non-human distracting objects.

To provide another illustration, in one or more embodiments, the scene-based image editing system 106 determines, utilizing the object detection machine learning model, a plurality of objects portrayed in a digital image, the plurality of objects comprising at least one human object and at least one non-human object; determines, utilizing the distractor detection neural network, classifications for the plurality of objects by classifying a subset of objects from the plurality of objects as distracting objects; provides, for display within a graphical user interface of a client device, visual indications that indicate the subset of objects have been classified as distracting object; receives, via the graphical user interface, a user interaction modifying the subset of objects by adding an object to the subset of objects or removing at least one object from the subset of objects; and modifies the digital image by deleting the modified subset of objects from the digital image.

In some embodiments, the scene-based image editing system 106 determines the classifications for the plurality of objects by classifying an additional subset of object from the plurality of objects as main subject objects. In some cases, the scene-based image editing system 106 provides the visual indications that indicate the subset of objects have been classified as distracting objects by highlighting the subset of objects or generating borders around the subset of objects within the digital image. Further, in some implementations, the scene-based image editing system 106 further determines, utilizing a shadow detection neural network, shadows for the subset of objects classified as distracting objects; provides, for display within the graphical user interface of a client device, additional visual indications for the shadows for the subset of objects; and modifies the digital image by deleting a modified subset of shadows corresponding to the modified subset of objects.

Figure 64:
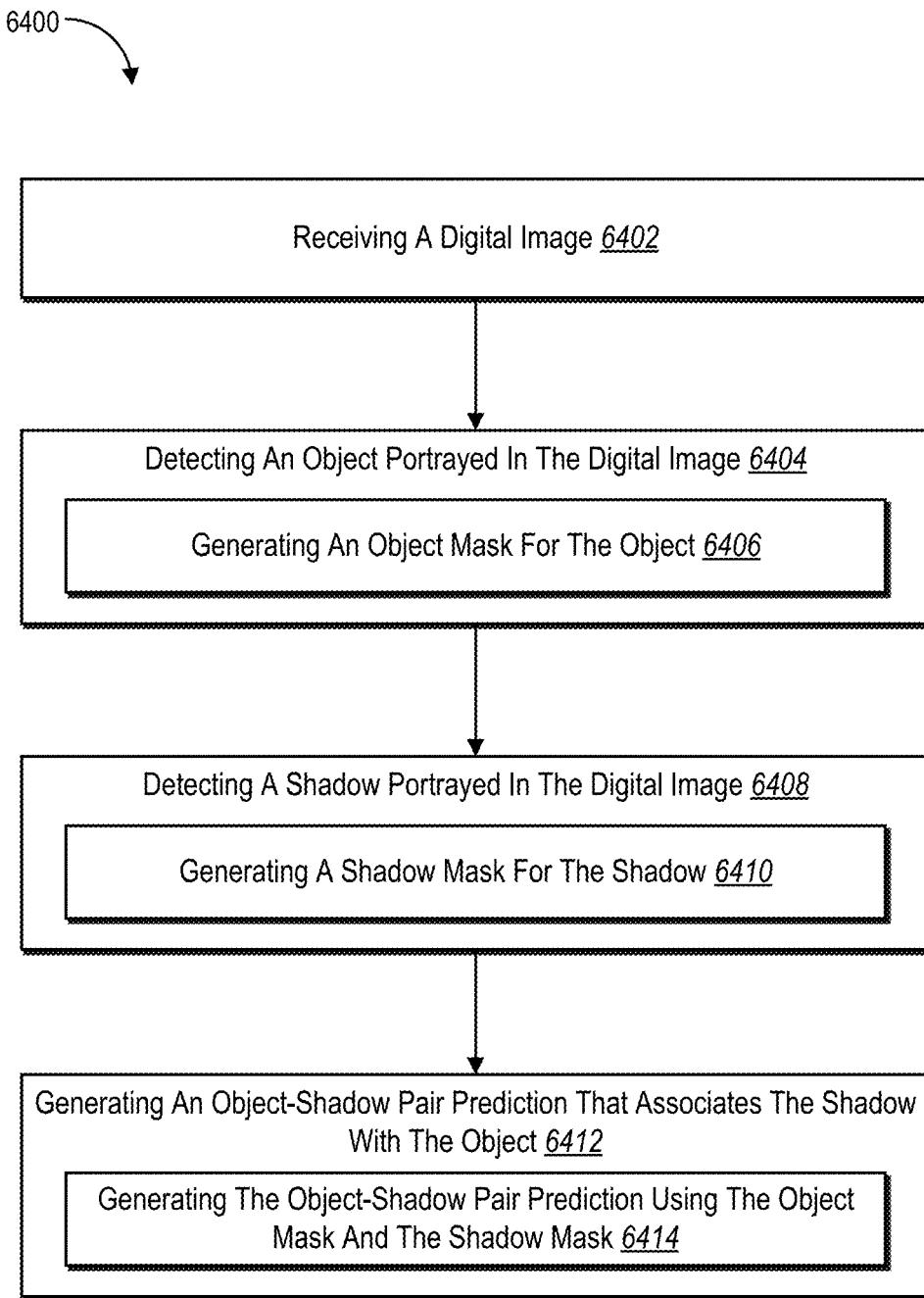
FIG. 64 illustrates a flowchart for a series of acts for detecting shadows cast by objects in a digital image in accordance with one or more embodiments.

FIG. 64 illustrates a flowchart for a series of acts 6400 for detecting shadows cast by objects in a digital image in accordance with one or more embodiments. FIG. 64 illustrates acts according to one embodiment, alternative embodiments may omit, add to, reorder, and/or modify any of the acts shown in FIG. 64. In some implementations, the acts of FIG. 64 are performed as part of a method. For example, in some embodiments, the acts of FIG. 64 are performed as part of a computer-implemented method. Alternatively, a non-transitory computer-readable medium can store instructions thereon that, when executed by at least one processor, cause the at least one processor to perform operations comprising the acts of FIG. 64. In some embodiments, a system performs the acts of FIG. 64. For example, in one or more embodiments, a system includes at least one memory device comprising a shadow detection neural network. The system further includes at least one processor configured to cause the system to perform the acts of FIG. 64.

The series of acts 6400 includes an act 6402 for receiving a digital image. For instance, in some cases, the act 6402 involves receiving a digital image from a client device.

The series of acts 6400 also includes an act 6404 for detecting an object portrayed in the digital image. For example, in some embodiments, the act 6404 involves detecting, utilizing a shadow detection neural network, an object portrayed in the digital image.

As shown in FIG. 64, the act 6404 includes a sub-act 6406 for generating an object mask for the object. For example, in some instances, the sub-act 6406 involves generating, utilizing the shadow detection neural network, an object mask for the object.

The series of acts 6400 further includes an act 6408 for detecting a shadow portrayed in the digital image. To illustrate, in some implementations, the act 6408 involves detecting, utilizing the shadow detection neural network, a shadow portrayed in the digital image.

As shown in FIG. 64, the act 6408 includes a sub-act 6410 for generating a shadow mask for the shadow. For instance, in some cases, the sub-act 6410 involves generating, utilizing the shadow detection neural network, a shadow mask for the shadow.

Further, the series of acts 6400 includes an act 6412 for generating an object-shadow pair prediction that associates the object with the shadow. For example, in one or more embodiments, the act 6412 involves generating, utilizing the shadow detection neural network, an object-shadow pair prediction that associates the shadow with the object.

As illustrated by FIG. 64, the act 6412 includes a sub-act 6414 for generating the object-shadow pair prediction using the object mask and the shadow mask. To instance, in some cases, the sub-act 6414 involves generating, utilizing the shadow detection neural network, the object-shadow pair prediction that associates the shadow with the object by generating, utilizing the shadow detection neural network, the object-shadow pair prediction based on the object mask and the shadow mask.

In one or more embodiments, the scene-based image editing system 106 further provides the digital image for display within a graphical user interface of the client device; receives, via the graphical user interface, a selection of the object portrayed in the digital image; and in response to receiving the selection of the object: provides, for display within the graphical user interface, a visual indication of the selection of the object; and provides, for display within the graphical user interface, an additional visual indication indicating that the shadow is included in the selection based on the object-shadow pair prediction that associates the shadow with the object. In some cases, the scene-based image editing system 106, in response to receiving the selection of the object, provides, for display within the graphical user interface, a suggestion to add the shadow to the selection. Accordingly, in some instances, providing the additional visual indication indicating the shadow is included in the selection comprises providing the additional visual indication in response to receiving an additional user interaction for including the shadow in the selection.

In some implementations, the scene-based image editing system 106 receives one or more user interactions for modifying the digital image by modifying the object portrayed in the digital image; and modifies the digital image by modifying the object and the shadow in accordance with the one or more user interactions based on the object-shadow pair prediction.

Additionally, in some embodiments, detecting, utilizing the shadow detection neural network, the object portrayed in the digital image comprises detecting, utilizing the shadow detection neural network, a plurality of objects portrayed in the digital image; detecting, utilizing the shadow detection neural network, the shadow portrayed in the digital image comprises detecting, utilizing the shadow detection neural network, a plurality of shadows portrayed in the digital image; and generating, utilizing the shadow detection neural network, the object-shadow pair prediction that associates the shadow with the object, the object-shadow pair prediction that associates each object from the plurality of objects with a shadow from the plurality of shadows cast by the object within the digital image.

To provide an illustration, in one or more embodiments, the scene-based image editing system 106 generates, utilizing a shadow detection neural network, object masks for a plurality of objects portrayed in a digital image; generates, utilizing the shadow detection neural network, shadow masks for a plurality of shadows portrayed in the digital image; determines, utilizing the shadow detection neural network, an association between each shadow from the plurality of shadows and each object from the plurality of objects using the object masks and the shadow masks; and provides, to a client device, an object-shadow pair prediction that provides object-shadow pairs using the association between each shadow and each object.

In some embodiments, generating, utilizing the shadow detection neural network, the object masks for the plurality of objects portrayed in the digital image comprises generating, via a first stage of the shadow detection neural network and for each object of the plurality of objects, an object mask corresponding to the object and a combined object mask corresponding to other objects of the plurality of objects. Further, in some cases, the scene-based image editing system 106 generates, for each object of the plurality of objects, a second stage input by combining the object masks corresponding to the object, the combined object mask corresponding to the other objects, and the digital image. Accordingly, in some instances, generating, utilizing the shadow detection neural network, the shadow masks for the plurality of shadows portrayed in the digital image comprises generating, via a second stage of the shadow detection neural network, the shadow masks for the plurality of shadows using the second stage input for each object.

In one or more embodiments, generating, utilizing the shadow detection neural network, the shadow masks for the plurality of shadows portrayed in the digital image comprises generating, utilizing the shadow detection neural network and for each shadow portrayed in the digital image, a shadow mask corresponding to the shadow and a combined shadow mask corresponding to other shadows of the plurality of shadows. Also, in some embodiments, determining, utilizing the shadow detection neural network, the association between each shadow and each object using the object masks and the shadow masks comprises determining the association between each shadow and each object utilizing the shadow mask and the combined shadow mask generated for each shadow. Further, in some instances, providing, to the client device, the object-shadow pair prediction that provides the object-shadow pairs using the association between each shadow and each object comprises providing, for display within a graphical user interface of the client device, a visual indication indicating the association for at least one object-shadow pair.

In one or more embodiments, the scene-based image editing system 106 further receives one or more user interactions to move an object of the plurality of objects within the digital image; and modifies, in response to receiving the one or more user interactions, the digital image by moving the object and a shadow associated with the object within the digital image based on the object-shadow pair prediction. Further, in some cases, the scene-based image editing system 106 receives one or more user interactions to delete an object of the plurality of objects from the digital image; and modifies, in response to receiving the one or more user interactions, the digital image by removing the object and a shadow associated with the object from the digital image based on the object-shadow pair prediction. In some instances, the scene-based image editing system 106 generates, before receiving the one or more user interactions to delete the object, a first content fill for the object and a second content fill for the shadow associated with the object utilizing a content-aware fill machine learning model; and provides the first content fill and the second content fill within the digital image so that removal of the object exposes the first content fill and removal of the shadow exposes the second content fill.

To provide another illustration, in one or more embodiments, the scene-based image editing system 106 generates, utilizing an instance segmentation model of the shadow detection neural network, object masks for a plurality of objects portrayed in a digital image; determines input to a shadow segmentation model of the shadow detection neural network by combining the object masks for the plurality of objects and the digital image; generates, utilizing the shadow segmentation model and the input, shadow masks for shadows associated with the plurality of objects within the digital image; and provides, for display on a graphical user interface of a client device, a visual indication associating an object from the plurality of objects and a shadow from the shadows utilizing the shadow masks.

In one or more embodiments, the scene-based image editing system 106 generates the object masks for the plurality of objects by generating an object mask corresponding to each object of the plurality of objects; generates combined object masks for the plurality of objects, each combined object mask corresponding to two or more objects from the plurality of objects; and determines the input to the shadow segmentation model by combining the combined object masks with the object masks and the digital image. In some cases, combining the combined object masks with the object masks and the digital image comprises, for each object of the plurality of objects, concatenating an object mask corresponding to the object, a combined object mask corresponding to other objects of the plurality of objects, and the digital image.

Further, in some cases, the scene-based image editing system 106 generates the shadow masks for the shadows by generating a shadow mask corresponding to each shadow of the shadows; generates, utilizing the shadow segmentation model and the input, combined shadow masks for the shadows, each combined shadow mask corresponding to two or more shadows from the shadows; and determines associations between the plurality of objects and the shadows utilizing the shadow masks and the combined shadow masks.

Figure 65:
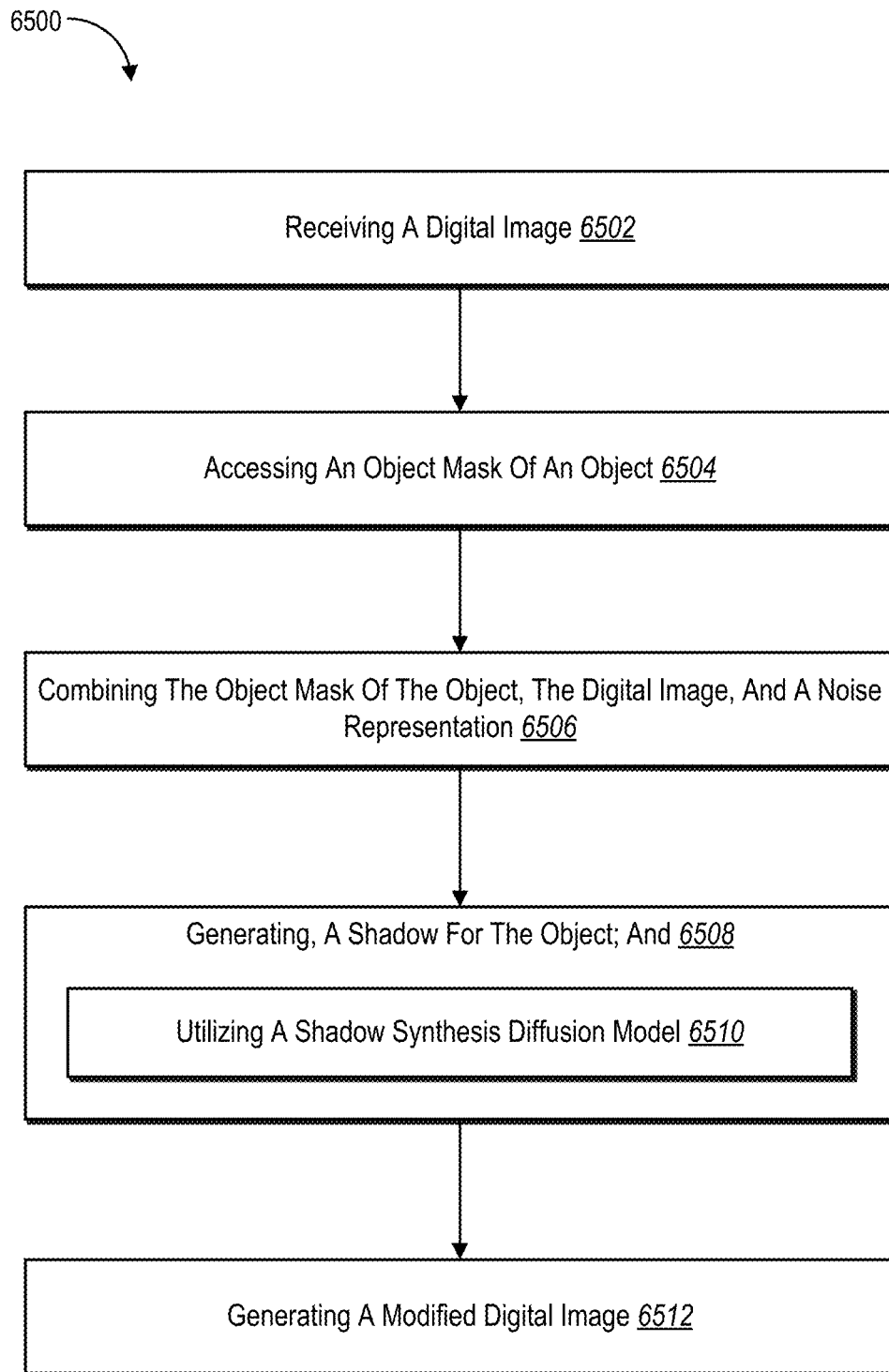
FIG. 65 illustrates a flowchart for a series of acts for generating a modified digital image with a synthesized shadow in accordance with one or more embodiments.

FIG. 65 illustrates a flowchart for a series of acts 6500 for generating a modified digital image with a shadow in accordance with one or more embodiments. FIG. 65 illustrates acts according to one embodiment, alternative embodiments may omit, add to, reorder, and/or modify any of the acts shown in FIG. 65. In some implementations, the acts of FIG. 65 are performed as part of a method. For example, in some embodiments, the acts of FIG. 65 are performed as part of a computer-implemented method. Alternatively, a non-transitory computer-readable medium can store instructions thereon that, when executed by at least one processor, cause the at least one processor to perform operations comprising the acts of FIG. 65. In some embodiments, a system performs the acts of FIG. 65. For example, in one or more embodiments, a system includes at least one memory device comprising a shadow detection neural network. The system further includes at least one processor configured to cause the system to perform the acts of FIG. 65.

The series of acts 6500 includes an act 6502 for receiving a digital image, an act 6504 for accessing an object mask of an object, and an act 6506 of combining the object mask of the object, the digital image, and a noise representation, an act 6508 of generating, a shadow for the object, a sub-act 6510 of utilizing a shadow synthesis diffusion model and an act 6512 of generating a modified digital image.

In some embodiments, the act 6502 includes receiving a digital image depicting a scene. Further, in some embodiments, the act 6504 accessing an object mask of an object depicted within the digital image. Moreover, in some embodiments, the act 6506 includes combining the object mask of the object, the digital image, and a noise representation to generate a combined representation. Further, in some embodiments, the act 6508 includes generating, from the combined representation and utilizing a shadow synthesis diffusion model, a shadow for the object that is consistent with the scene of the digital image. Additionally, in some embodiments, the act 6512 includes generating a modified digital image by combining the shadow for the object and the digital image.

In one or more embodiments, the series of acts 6500 includes compositing an additional object onto the modified digital image depicting the scene. Further, in some embodiments, the series of acts 6500 includes combining an additional object mask of the additional object, the modified digital image, and an additional noise representation to generate an additional combined representation. Moreover, in some embodiments the series of acts 6500 includes generating, from the additional combined representation and utilizing the shadow synthesis diffusion model, an additional shadow for the additional object consistent with the scene of the modified digital image.

In one or more embodiments, the series of acts 6500 includes compositing an additional object onto the digital image depicting the scene. Further, in some embodiments the series of acts 6500 includes combining an additional object mask of the additional object to generate the combined representation. Moreover, in some embodiments the series of acts 6500 includes wherein generating, from the combined representation and utilizing the shadow synthesis diffusion model, the shadow for the object that is consistent with the scene of the digital image further comprising generating an additional shadow for the additional object consistent with the scene of the digital image in tandem with generating the shadow.

In one or more embodiments, the series of acts 6500 includes utilizing an iterative denoising process to generate a denoised representation of the combined representation. Further, in some embodiments the series of acts 6500 includes generating the modified digital image from the denoised representation. Moreover, in some embodiments the series of acts 6500 includes conditioning the iterative denoising process with a text prompt. Additionally, in some embodiments the series of acts 6500 includes preserving a previously existing visible texture of a location within the scene where the shadow is generated.

In one or more embodiments, the series of acts 6500 includes compositing a shadow layer of the shadow with the digital image. Further, in some embodiments the series of acts 6500 includes generating, from the combined representation and utilizing the shadow synthesis diffusion model, the shadow for the object that is consistent with the scene of the digital image. Moreover, in some embodiments the series of acts 6500 includes generating the shadow along a ground floor and a vertical object in the digital image.

Figure 66:
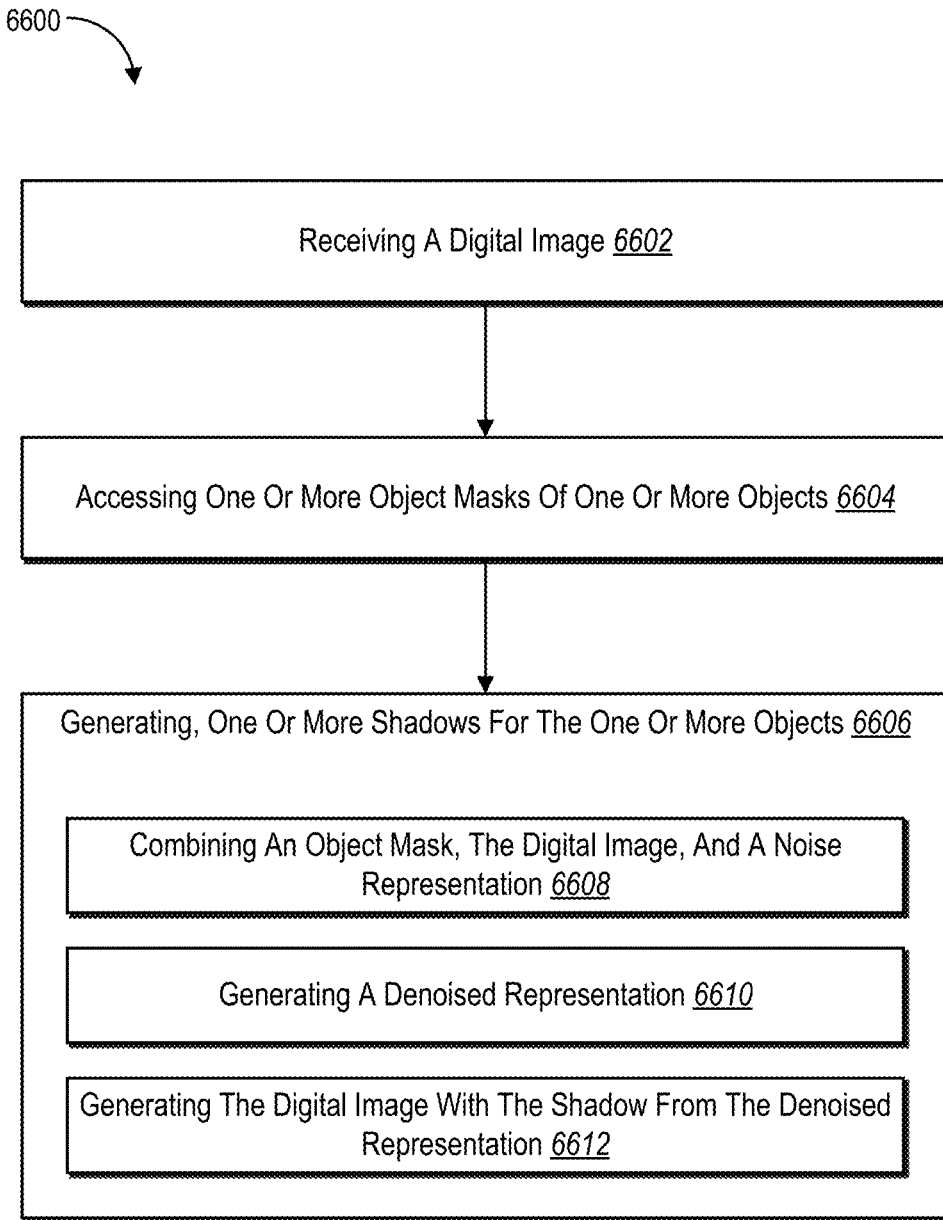
FIG. 66 illustrates a flowchart for a series of acts for generating the digital image with the shadow from the denoised representation in accordance with one or more embodiments.

FIG. 66 illustrates a flowchart for a series of acts 6600 also for generating a modified digital image with a shadow in accordance with one or more embodiments. For example, the series of acts 6600 includes an act 6602 of receiving a digital image, an act 6604 of accessing one or more object masks of one or more objects, an act 6606 of generating, one or more shadows for the one or more objects, a sub-act 6608 for combining an object mask, the digital image, and a noise representation, a sub-act 6610 for generating a denoised representation, and a sub-act 6612 for generating the digital image with the shadow from the denoised representation.

Furthermore, in one or more embodiments, the series of acts 6600 includes receiving a digital image depicting a scene. Further, in some embodiments the series of acts 6600 includes accessing one or more object masks from one or more objects corresponding to one or more locations with visible textures. Moreover, in some embodiments the series of acts 6600 includes generate, utilizing the shadow synthesis diffusion model, the digital image with one or more shadows for the one or more objects consistent with the scene by combining an object mask of the one or more object masks, the digital image, and a noise representation to generate a combined representation. In some such embodiments, the series of acts 6600 also includes generating, utilizing an iterative denoising process of the shadow synthesis diffusion model, a denoised representation of the combined representation and generating, from the denoised representation, the digital image comprising a shadow for an object of the one or more objects with a visible texture in a location of the one or more locations preserved.

In one or more embodiments, the series of acts 6600 includes utilizing a plurality of denoising steps of the iterative denoising process. Further, in some embodiments the series of acts 6500 includes conditioning a denoising step of the plurality of denoising steps with a text prompt that indicates a shadow. Moreover, in some embodiments the series of acts 6600 includes generating a proxy shadow for the object while moving the object in response to an indication to move the object.

In one or more embodiments, the series of acts 6600 includes generating the proxy shadow by comparing the digital image comprising the object with the shadow in the location with a version of the digital image comprising the object without the shadow in the location. Further, in some embodiments the series of acts 6600 includes wherein the comparison comprises determining one of an image ratio or an image difference. Moreover, in some embodiments the series of acts 6600 includes generating a shadow layer based on the image ratio or the image difference. Moreover, in some embodiments the series of acts 6600 includes utilizing the shadow layer to further generate the proxy shadow for the object while moving the object within the digital image. In one or more embodiments, the series of acts 6600 includes compositing a soft shadow layer of the one or more shadows with the digital image.

Furthermore, in one or more embodiments, the series of acts 6600 includes receiving a digital image depicting a scene. Further, in some embodiments the series of acts 6600 includes accessing an object mask of an object in a location depicted within the digital image. Moreover, in some embodiments the series of acts 6600 includes combining the object mask of the object, the digital image, and a noise representation to generate a combined representation. In some such embodiments, the series of acts 6600 also includes generating, utilizing a shadow synthesis diffusion model, a composite digital image that includes a shadow of the object with a visible texture of the location preserved.

In one or more embodiments, the series of acts 6600 includes wherein the digital image comprises a plurality of objects. Further, in some embodiments the series of acts 6600 includes generating the shadow of the object is in response to user input selecting the object from the plurality of objects. Moreover, in some embodiments the series of acts 6600 includes utilizing an iterative denoising process of the shadow synthesis diffusion model to receive as input the combined representation. In one or more embodiments, the series of acts 6600 includes generating, utilizing denoising steps of the iterative denoising process, a denoised representation of the combined representation. Additionally, in some embodiments the series of acts 6600 includes generating the composite digital image from the denoised representation.

In one or more embodiments, the series of acts 6600 includes generating the shadow of the object so the shadow of the object overlaps with an additional object within the digital image and a visible texture of the additional object is preserved. Further, in some embodiments the series of acts 6500 includes directly synthesizing the shadow within the digital image.

FIG. 67 illustrates a flowchart for a series of acts 6700 for generating a modified digital image without a shadow in accordance with one or more embodiments. FIG. 67 illustrates acts according to one embodiment, alternative embodiments may omit, add to, reorder, and/or modify any of the acts shown in FIG. 67. In some implementations, the acts of FIG. 67 are performed as part of a method. For example, in some embodiments, the acts of FIG. 67 are performed as part of a computer-implemented method. Alternatively, a non-transitory computer-readable medium can store instructions thereon that, when executed by at least one processor, cause the at least one processor to perform operations comprising the acts of FIG. 67. In some embodiments, a system performs the acts of FIG. 67. For example, in one or more embodiments, a system includes at least one memory device comprising a shadow detection neural network. The system further includes at least one processor configured to cause the system to perform the acts of FIG. 67.

The series of acts 6700 includes an act 6702 for receiving a digital image depicting a scene comprising an object with a shadow, an act 6704 for accessing a shadow mask of the shadow, an act 6706 for generating a modified digital image without the shadow, a sub-act 6710 of generating, utilizing a generative inpainting neural network, a fill, and a sub-act 6712 of combining the fill for the first location and the digital image without the shadow.

In some embodiments, the act 6702 includes receiving a digital image depicting a scene comprising an object with a shadow of the object in a first location. Further, in some embodiments, the act 6704 accessing an shadow mask of the shadow in the first location. Moreover, in some embodiments, the sub-act 6706 includes generating a modified digital image without the shadow. Further, in some embodiments the act 6710 further includes generating, utilizing a generative inpainting neural network, a fill for the first location to preserve a visible texture of the first location without the shadow. Moreover, in some embodiments the act 6712 includes combining the fill for the first location and the digital image without the shadow to generate the modified digital image.

In one or more embodiments, the series of acts 6700 includes utilizing an object detection neural network to detect the object. Further, in some embodiments, the series of acts 6700 includes utilizing a shadow detection neural network to detect the shadow of the object. Moreover, in some embodiments the series of acts 6700 includes generating a backfill corresponding to a non-visible region behind the object. Additionally, in some embodiments the series of acts 6700 includes receiving an indication to delete the object with the shadow from the digital image.

In one or more embodiments, the series of acts 6700 includes removing the object from the digital image to expose the backfill which corresponds to the non-visible region behind the object to be a visible region within the digital image. Further, in some embodiments, the series of acts 6700 includes generating, utilizing the generative inpainting neural network, pixel values consistent with the scene and without the shadow by modulating the generative inpainting neural network with the shadow mask of the shadow. Moreover, in some embodiments the series of acts 6700 includes determining a size of the shadow and an intensity of the shadow in the first location satisfies a threshold. Additionally, in some embodiments the series of acts 6700 includes based on the size of the shadow and the intensity of the shadow satisfying the threshold, utilizing a shadow removal generative inpainting neural network to generate the fill for the shadow removed in the first location.

In one or more embodiments, the series of acts 6700 includes learning parameters of the shadow removal generative inpainting neural network. Further, in some embodiments, the series of acts 6700 includes randomly dilating shadow masks in a training dataset. Moreover, in some embodiments the series of acts 6700 includes generating, utilizing the shadow removal generative inpainting neural network, inpainted digital images from the randomly dilated shadow masks. Additionally, in some embodiments the series of acts 6700 includes comparing the inpainted digital images with ground truth digital images. Moreover, in some embodiments the series of acts 6700 includes modifying parameters of the shadow removal generative inpainting neural network according to comparing the inpainted digital images with the ground truth digital images.

In one or more embodiments, the series of acts 6700 includes learning parameters of the shadow removal generative inpainting neural network. Further, in some embodiments, the series of acts 6700 includes randomly selecting a shadow mask to apply to a digital image part of a training dataset. Moreover, in some embodiments the series of acts 6700 includes randomly assigning a color to the shadow mask within the digital image. Additionally, in some embodiments the series of acts 6700 includes generating, utilizing the shadow removal generative inpainting neural network, an inpainted digital image from the digital image with the shadow mask applied to compare against a ground truth digital image. Moreover, in some embodiments the series of acts 6700 includes modifying parameters of the shadow removal generative inpainting neural network according to comparing the inpainted digital image with the ground truth digital image.

In one or more embodiments, the series of acts 6700 includes learning parameters of the shadow removal generative inpainting neural network. Further, in some embodiments, the series of acts 6700 includes randomly selecting a subset of multiple object shadows from a training dataset comprising a digital image with multiple objects and multiple object shadows and a corresponding ground truth digital image to place within the corresponding ground truth digital image. Moreover, in some embodiments the series of acts 6700 includes generating, utilizing the shadow removal generative inpainting neural network, an inpainted digital image from the digital image. Additionally, in some embodiments the series of acts 6700 includes comparing the inpainted digital image with the corresponding ground truth digital image. Moreover, in some embodiments the series of acts 6700 includes modifying parameters of the shadow removal generative inpainting neural network according to comparing the inpainted digital image with the corresponding ground truth digital image.

In one or more embodiments, the series of acts 6700 includes learning parameters of the shadow removal generative inpainting neural network. Further, in some embodiments, the series of acts 6700 includes generating an additional digital image with an additional shadow of a second intensity from a training dataset comprising a digital image with a shadow of a first intensity. Moreover, in some embodiments the series of acts 6700 includes generating, utilizing the shadow removal generative inpainting neural network, an inpainted digital image from the additional digital image. Additionally, in some embodiments the series of acts 6700 includes comparing the inpainted digital image with a ground truth digital image. Moreover, in some embodiments the series of acts 6700 includes modifying parameters of the shadow removal generative inpainting neural network according to comparing the inpainted digital image with the ground truth digital image.

In one or more embodiments, the series of acts 6700 includes accessing a digital image depicting a scene comprising a shadow, the shadow being located in a region of the digital image. Further, in some embodiments, the series of acts 6700 includes generating an shadow mask of the shadow utilizing the shadow detection neural network.

Additionally, in some embodiments the series of acts 6700 includes generating an fill for the region that preserves a visible texture of the region by inpainting the region utilizing the generative inpainting neural network. Moreover, in some embodiments the series of acts 6700 includes combine the fill for the region and the digital image without the shadow to generate a modified digital image that comprises the visible texture without the shadow.

In one or more embodiments, the series of acts 6700 includes generating the fill for the region that preserves the visible texture by modulating the generative inpainting neural network with the shadow mask of the shadow. Further, in some embodiments, the series of acts 6700 includes wherein an object casting the shadow is not visible within the digital image. Moreover, in some embodiments the series of acts 6700 includes accessing the digital image depicting the scene comprising the shadow located in the region, the shadow covering an object. Moreover, in some embodiments the series of acts 6700 includes generating the fill for the region that preserves the object previously covered by the shadow.

In one or more embodiments, the series of acts 6700 includes accessing a digital image depicting a scene with an object and a shadow of the object, the shadow encompassing a region with a visible texture. Further, in some embodiments, the series of acts 6700 includes generating, utilizing a content-aware machine learning model, a backfill corresponding to a non-visible region behind the object in the digital image. Moreover, in some embodiments the series of acts 6700 includes in response to receiving a selection to delete the object, removing the object from the digital image to expose the backfill. Additionally, in some embodiments the series of acts 6700 includes generating, utilizing a generative inpainting neural network, a fill for the region that preserves the visible texture with the object removed from the digital image.

In one or more embodiments, the series of acts 6700 includes utilizing an object segmentation model to detect the object within the digital image. Further, in some embodiments, the series of acts 6700 includes identifying pixels of the shadow of the object utilizing a shadow segmentation model.

In one or more embodiments, the series of acts 6700 includes receiving an additional selection to delete an additional shadow without an object located in an additional region within the digital image. Further, in some embodiments, the series of acts 6700 includes generating, utilizing the generative inpainting neural network, an additional fill for the additional region that preserves a visible texture of the additional shadow removed from the digital image. Moreover, in some embodiments the series of acts 6700 includes modulating a shadow removal generative inpainting neural network with an shadow mask of the shadow to generate the fill for the region that preserves the visible texture.

Additionally, in some embodiments the series of acts 6700 includes determining a size of the shadow in the region satisfies a threshold. Further, in some embodiments, the series of acts 6700 includes if the size of the shadow satisfies the threshold, utilize a shadow removal generative inpainting neural network to generate the fill for the region. Moreover, in some embodiments the series of acts 6700 includes if the size of the shadow does not satisfy the threshold, utilize a general generative inpainting neural network to generate the fill for the region.

Figure 68:
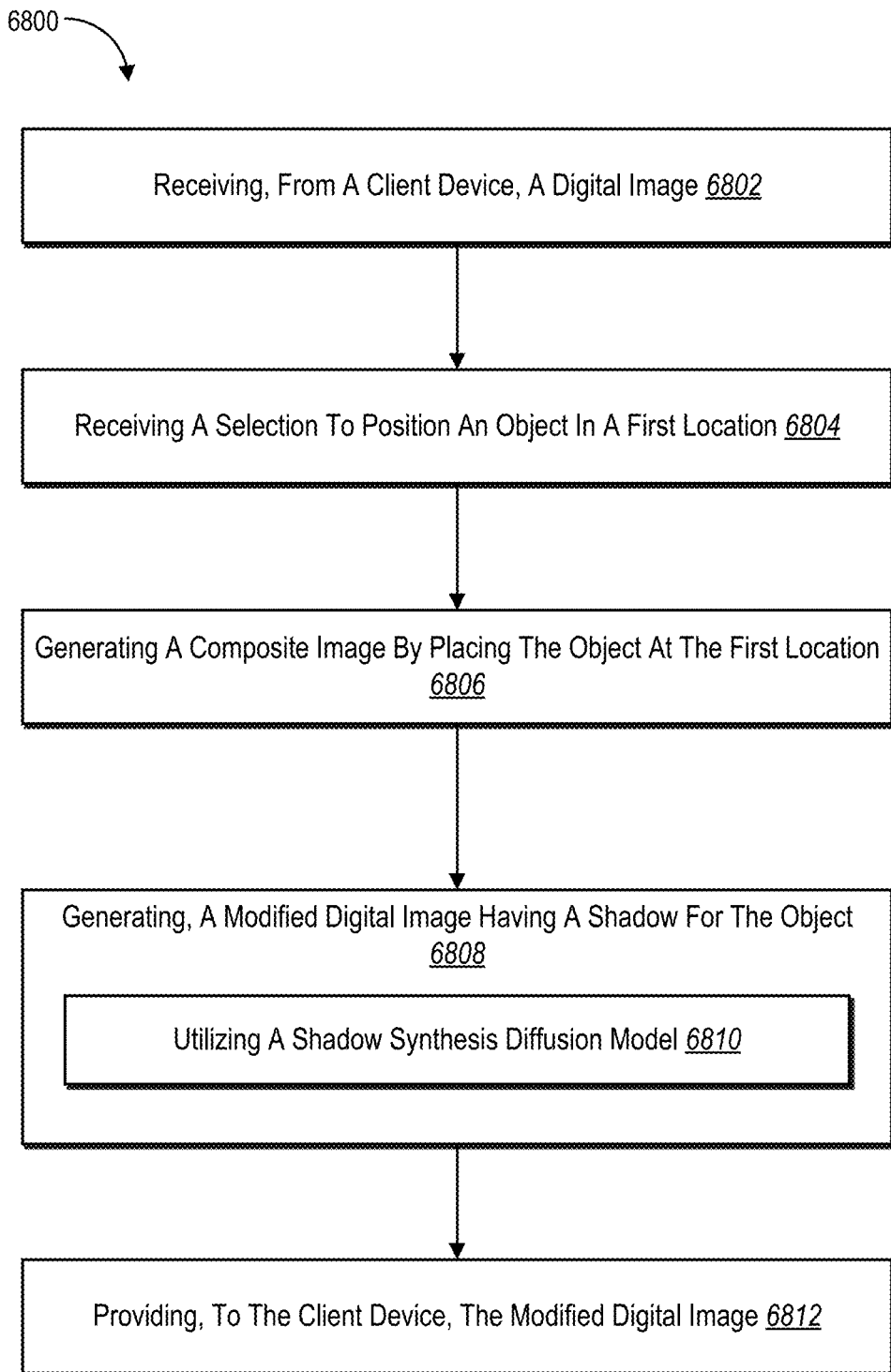
FIG. 68 illustrates a flowchart for a series of acts for generating a modified digital image having a shadow from a selection to position an object in a first location in accordance with one or more embodiments.

FIG. 68 illustrates a flowchart for a series of acts 6800 for generating a modified digital image without a shadow in accordance with one or more embodiments. FIG. 68 illustrates acts according to one embodiment, alternative embodiments may omit, add to, reorder, and/or modify any of the acts shown in FIG. 68. In some implementations, the acts of FIG. 68 are performed as part of a method. For example, in some embodiments, the acts of FIG. 68 are performed as part of a computer-implemented method. Alternatively, a non-transitory computer-readable medium can store instructions thereon that, when executed by at least one processor, cause the at least one processor to perform operations comprising the acts of FIG. 68. In some embodiments, a system performs the acts of FIG. 68. For example, in one or more embodiments, a system includes at least one memory device comprising a shadow detection neural network. The system further includes at least one processor configured to cause the system to perform the acts of FIG. 68.

The series of acts 6800 includes an act 6802 for receiving, from a client device, a digital image, an act 6804 for receiving a selection to position an object in a first location, an act 6806 for generating a composite image by placing the object at the first location, an act 6808 for generating, a modified digital image having a shadow for the object, a sub-act 6810 for utilizing a shadow synthesis diffusion model, and, an act 6812 for providing, to the client device, the modified digital image.

In some embodiments, the act 6802 includes receiving, from a client device, a digital image depicting a scene. Further, in some embodiments, the act 6804 includes receiving a selection to position an object in a first location within the scene of the digital image. Moreover, in some embodiments, the act 6808 includes generating a composite image by placing the object at the first location within the scene of the digital image. Further, in some embodiments, the sub-act 6810 includes generating, utilizing a shadow synthesis diffusion model and based on the composite image, a modified digital image having a shadow for the object, the shadow being consistent with the scene of the digital image and the object. Further, in some embodiments the act 6812 further includes providing, to the client device, the modified digital image with the object in the first location and the shadow for the object.

In one or more embodiments, the series of acts 6800 includes receiving the object from an additional digital image. Further, in some embodiments, the series of acts 6800 includes detecting a visible texture corresponding to a region where the shadow of the object will be generated. Moreover, in some embodiments the series of acts 6800 includes preserving the visible texture corresponding to the region where the shadow is generated. Additionally, in some embodiments the series of acts 6800 includes receiving an additional object in the first location.

In one or more embodiments, the series of acts 6800 includes generating a backfill corresponding to a non-visible region behind the additional object in the first location. Further, in some embodiments, the series of acts 6800 includes receiving a drag-and-drop selection to move the additional object in the first location to a second location within the scene of the digital image. Moreover, in some embodiments the series of acts 6800 includes regenerating the shadow for the object to be consistent with the backfill exposed in response to moving the additional object to the second location.

In one or more embodiments, the series of acts 6800 includes removing a shadow of the additional object in the first location. Further, in some embodiments, the series of acts 6800 includes generating a proxy shadow for the additional object while the drag-and-drop selection is being performed. Moreover, in some embodiments the series of acts 6800 includes utilizing an iterative denoising process to generate the modified digital image having the shadow for the object.

In one or more embodiments, the series of acts 6800 includes receiving, from a client device, a selection of an object to be moved, the object having an associated shadow from a first location to a second location in a digital image, the digital image depicting a scene. Further, in some embodiments, the series of acts 6800 includes in response to the selection to move the object, removing the associated shadow from the digital image. Moreover, in some embodiments the series of acts 6800 includes generating, utilizing a generative inpainting neural network, a fill consistent with the scene in a location previously occupied by the associated shadow. Additionally, in some embodiments the series of acts 6800 includes generating, utilizing a shadow synthesis diffusion model, a modified digital image comprising the object in the second location, a new shadow that is consistent with the scene and the second location, and the fill in the location previously occupied by the associated shadow. Further, in some embodiments the series of acts 6800 includes providing the modified digital image to the client device.

In one or more embodiments, the series of acts 6800 includes generating the modified digital image by receiving the selection to move the object having an associated shadow from the first location to the second location in the digital image without further user input from the client device. Further, in some embodiments, the series of acts 6800 includes receiving the selection to move the object comprising a drag-and-drop action. Moreover, in some embodiments the series of acts 6800 includes as the drag-and-drop action is being performed, showing, in a graphical user interface of the client device, the fill consistent with the scene in the location previously occupied by the associated shadow.

In one or more embodiments, the series of acts 6800 includes receiving the selection to move the object comprising a drag-and-drop action e. Further, in some embodiments, the series of acts 6800 includes as the drag-and-drop action is being performed, showing, in a graphical user interface of the client device, a proxy shadow of the object that approximates a new shadow in a location where the drag-and-drop action is hovering over in the digital image. Moreover, in some embodiments the series of acts 6800 includes receiving the selection to move the object comprising a drag-and-drop action. Additionally, in some embodiments the series of acts 6800 includes upon completing the drag-and-drop action, showing, in a graphical user interface of the client device.

In one or more embodiments, the series of acts 6800 includes receiving an additional object and an associated shadow of the additional object to transfer from an additional digital image to the digital image. Further, in some embodiments, the series of acts 6800 includes generating a proxy shadow in place of the associated shadow for the additional object by utilizing a shadow proxy generation model.

Figure 69:
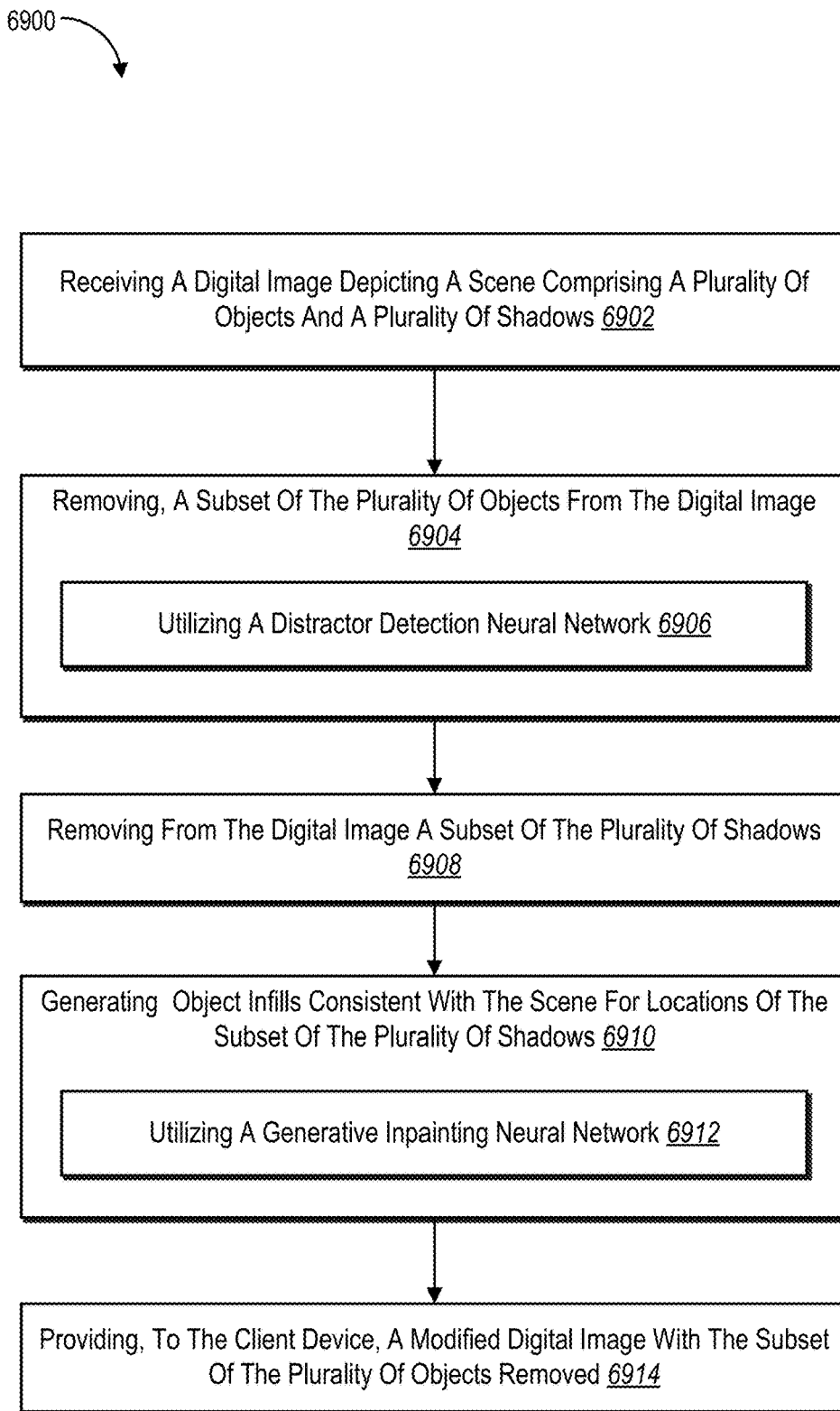
FIG. 69 illustrates a flowchart for a series of acts for generating object infills after removing distractor objects and shadows in accordance with one or more embodiments.

FIG. 69 illustrates a flowchart for a series of acts 6900 for generating a modified digital image without a shadow in accordance with one or more embodiments. FIG. 69 illustrates acts according to one embodiment, alternative embodiments may omit, add to, reorder, and/or modify any of the acts shown in FIG. 69. In some implementations, the acts of FIG. 69 are performed as part of a method. For example, in some embodiments, the acts of FIG. 69 are performed as part of a computer-implemented method. Alternatively, a non-transitory computer-readable medium can store instructions thereon that, when executed by at least one processor, cause the at least one processor to perform operations comprising the acts of FIG. 69. In some embodiments, a system performs the acts of FIG. 69. For example, in one or more embodiments, a system includes at least one memory device comprising a shadow detection neural network. The system further includes at least one processor configured to cause the system to perform the acts of FIG. 69.

The series of acts 6900 includes an act 6902 for receiving a digital image depicting a scene comprising a plurality of objects and a plurality of shadows, an act 6904 for removing a subset of the plurality of objects from the digital image, a sub-act 6906 of utilizing a distractor detection neural network, an act 6908 of removing a subset of a plurality of shadows, an act 6910 of generating object infills consistent with the scene for locations of the subset of the plurality of shadows, a sub-act 6912 of utilizing a generative inpainting neural network, and an act 6914 of providing, to the client device, a modified digital image with the subset of the plurality of objects removed.

In some embodiments, the act 6902 includes receiving, from a client device, a digital image depicting a scene comprising a plurality of objects and a plurality of shadows for the plurality of objects. Further, in some embodiments, the act 6904 includes removing, utilizing a distractor detection neural network, a subset of the plurality of objects from the digital image. Moreover, in some embodiments, the act 6908 includes removing from the digital image a subset of the plurality of shadows determined to be associated with the subset of the plurality of objects. Further, in some embodiments, the act 6910 includes generating, utilizing a generative inpainting neural network, object infills consistent with the scene for locations of the subset of the plurality of shadows removed from the digital image. Further, in some embodiments the act 6812 further includes providing, to the client device, a modified digital image with the subset of the plurality of objects removed, the subset of the plurality of shadows removed, and the object infills consistent with the scene in place of the subset of the plurality of shadows.

In one or more embodiments, the series of acts 6900 includes utilizing an object detection neural network to detect the plurality of objects. Further, in some embodiments, the series of acts 6900 includes utilizing a shadow detection neural network to detect the plurality of shadows for the plurality of objects. Moreover, in some embodiments the series of acts 6900 includes generating a plurality of backfills corresponding to non-visible regions behind the plurality of objects. Additionally, in some embodiments the series of acts 6900 includes exposing a subset of the plurality of backfills for the subset of the plurality of objects. Additionally, in some embodiments the series of acts 6900 includes modulating the generative inpainting neural network with object masks of the subset of the plurality of shadows removed from the digital image. Moreover, in some embodiments the series of acts 6900 includes preserving previously existing visible textures.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 70:
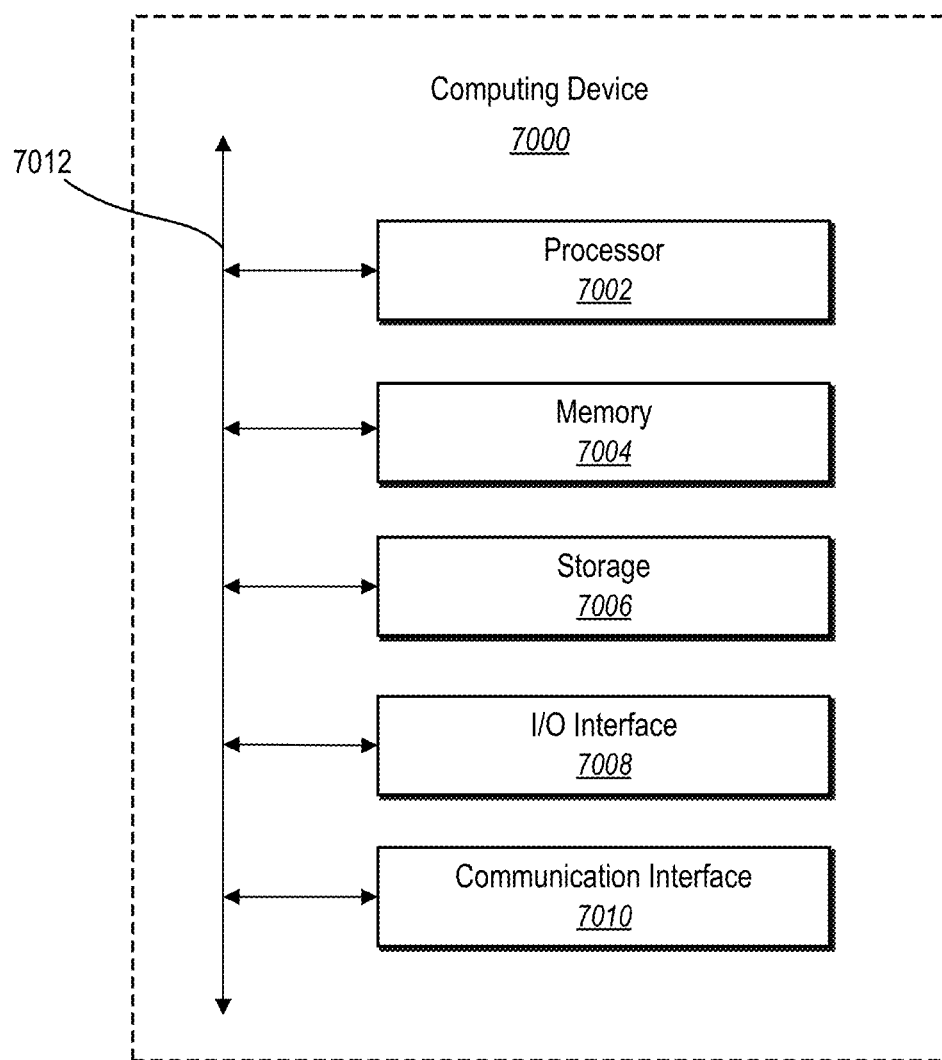
FIG. 70 illustrates a block diagram of an exemplary computing device in accordance with one or more embodiments.

FIG. 70 illustrates a block diagram of an example computing device 7000 that may be configured to perform one or more of the processes described above. One will appreciate that one or more computing devices, such as the computing device 7000 may represent the computing devices described above (e.g., the server(s) 102 and/or the client devices 110a-110n). In one or more embodiments, the computing device 7000 may be a mobile device (e.g., a mobile telephone, a smartphone, a PDA, a tablet, a laptop, a camera, a tracker, a watch, a wearable device). In some embodiments, the computing device 7000 may be a non-mobile device (e.g., a desktop computer or another type of client device). Further, the computing device 7000 may be a server device that includes cloud-based processing and storage capabilities.

As shown in FIG. 70, the computing device 7000 can include one or more processor(s) 7002, memory 7004, a storage device 7006, input/output interfaces 7008 (or "I/O interfaces 7008"), and a communication interface 7010, which may be communicatively coupled by way of a communication infrastructure (e.g., bus 7012). While the computing device 7000 is shown in FIG. 70, the components illustrated in FIG. 70 are not intended to be limiting. Additional or alternative components may be used in other embodiments. Furthermore, in certain embodiments, the computing device 7000 includes fewer components than those shown in FIG. 70. Components of the computing device 7000 shown in FIG. 70 will now be described in additional detail.

In particular embodiments, the processor(s) 7002 includes hardware for executing instructions, such as those making up a computer program. As an example, and not by way of limitation, to execute instructions, the processor(s) 7002 may retrieve (or fetch) the instructions from an internal register, an internal cache, memory 7004, or a storage device 7006 and decode and execute them.

The computing device 7000 includes memory 7004, which is coupled to the processor(s) 7002. The memory 7004 may be used for storing data, metadata, and programs for execution by the processor(s). The memory 7004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 7004 may be internal or distributed memory.

The computing device 7000 includes a storage device 7006 including storage for storing data or instructions. As an example, and not by way of limitation, the storage device 7006 can include a non-transitory storage medium described above. The storage device 7006 may include a hard disk drive (HDD), flash memory, a Universal Serial Bus (USB) drive or a combination these or other storage devices.

As shown, the computing device 7000 includes one or more I/O interfaces 7008, which are provided to allow a user to provide input to (such as user strokes), receive output from, and otherwise transfer data to and from the computing device 7000. These I/O interfaces 7008 may include a mouse, keypad or a keyboard, a touch screen, camera, optical scanner, network interface, modem, other known I/O devices or a combination of such I/O interfaces 7008. The touch screen may be activated with a stylus or a finger.

The I/O interfaces 7008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 7008 are configured to provide graphical data to a display for presentation to a user. The graphical data may be representative of one or more graphical user interfaces and/or any other graphical content as may serve a particular implementation.

The computing device 7000 can further include a communication interface 7010. The communication interface 7010 can include hardware, software, or both. The communication interface 7010 provides one or more interfaces for communication (such as, for example, packet-based communication) between the computing device and one or more other computing devices or one or more networks. As an example, and not by way of limitation, communication interface 7010 may include a network interface controller (NIC) or network adapter for communicating with an Ethernet or other wire-based network or a wireless NIC (WNIC) or wireless adapter for communicating with a wireless network, such as a WI-FI. The computing device 7000 can further include a bus 7012. The bus 7012 can include hardware, software, or both that connects components of computing device 7000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
receiving a digital image depicting a scene comprising an object with a shadow of the object in a first location;
accessing a shadow mask of the shadow in the first location; and
generating a modified digital image without the shadow by:
determining a size of the shadow and an intensity of the shadow in the first location satisfies a threshold;
based on the size of the shadow and the intensity of the shadow satisfying the threshold, utilizing a shadow removal generative inpainting model to generate a fill for the shadow removed in the first location that preserves a visible texture of the first location; and
combining the fill for the first location and the digital image without the shadow to generate the modified digital image.

2. The computer-implemented method of claim 1, further comprising:
utilizing an object segmentation model to detect the object; and
utilizing a shadow segmentation model to detect the shadow of the object.

3. The computer-implemented method of claim 1, further comprises:
generating a backfill corresponding to a non-visible region behind the object; and
receiving an indication to delete the object with the shadow from the digital image.

4. The computer-implemented method of claim 3, further comprises removing the object from the digital image to expose the backfill which corresponds to the non-visible region behind the object to be a visible region within the digital image.

5. The computer-implemented method of claim 1, wherein generating the fill further comprises generating, utilizing the shadow removal generative inpainting model, pixel values consistent with the scene and without the shadow by modulating the shadow removal generative inpainting model with the shadow mask of the shadow.

6. The computer-implemented method of claim 1, wherein utilizing the shadow removal generative inpainting model comprises:
    based on the size of the shadow and the intensity of the shadow satisfying the threshold, selecting the shadow removal generative inpainting model from a plurality of models that includes a general generative inpainting neural network and the shadow removal generative inpainting model.

7. The computer-implemented method of claim 6, further comprises learning parameters of the shadow removal generative inpainting model by:
    randomly dilating shadow masks in a training dataset;
    generating, utilizing the shadow removal generative inpainting model, inpainted digital images from the randomly dilated shadow masks;
    comparing the inpainted digital images with ground truth digital images; and
    modifying parameters of the shadow removal generative inpainting model according to comparing the inpainted digital images with the ground truth digital images.

8. The computer-implemented method of claim 6, further comprises learning parameters of the shadow removal generative inpainting model by:
    randomly selecting a shadow mask to apply to a digital image part of a training dataset;
    randomly assigning a color to the shadow mask within the digital image;
    generating, utilizing the shadow removal generative inpainting model, an inpainted digital image from the digital image with the shadow mask applied to compare against a ground truth digital image; and
    modifying parameters of the shadow removal generative inpainting model according to comparing the inpainted digital image with the ground truth digital image.

9. The computer-implemented method of claim 6, further comprises learning parameters of the shadow removal generative inpainting model by:
    randomly selecting a subset of multiple object shadows from a training dataset comprising a digital image with multiple objects and multiple object shadows and a corresponding ground truth digital image to place within the corresponding ground truth digital image;
    generating, utilizing the shadow removal generative inpainting model, an inpainted digital image from the digital image;
    comparing the inpainted digital image with the corresponding ground truth digital image; and
    modifying parameters of the shadow removal generative inpainting model according to comparing the inpainted digital image with the corresponding ground truth digital image.

10. The computer-implemented method of claim 6, further comprises learning parameters of the shadow removal generative inpainting model by:
    generating an additional digital image with an additional shadow of a second intensity from a training dataset comprising a digital image with a shadow of a first intensity;
    generating, utilizing the shadow removal generative inpainting model, an inpainted digital image from the additional digital image;
    comparing the inpainted digital image with a ground truth digital image; and
    modifying parameters of the shadow removal generative inpainting model according to comparing the inpainted digital image with the ground truth digital image.

11. A system comprising:
    one or more memory devices comprising a generative inpainting model and a shadow detection model; and
    one or more processors configured to cause the system to:
        access a digital image depicting a scene comprising a shadow, the shadow being located in a region of the digital image;
        generate a shadow mask of the shadow utilizing the shadow detection model, wherein the shadow mask of the shadow in the region encompasses a visible texture indicating patterns or contours;
        generate a fill for the region that preserves a visible texture of the region by inpainting the region utilizing the generative inpainting model to predict pixels in place of the shadow mask in the region to be the fill by using the shadow mask and the digital image as inputs to the generative inpainting model; and
        combine the fill for the region and the digital image without the shadow to generate a modified digital image that comprises the visible texture without the shadow.

12. The system of claim 11, wherein the one or more processors are configured to cause the system to generate the fill for the region that preserves the visible texture by modulating the generative inpainting model with the shadow mask of the shadow.

13. The system of claim 11, wherein an object casting the shadow is not visible within the digital image.

14. The system of claim 11, wherein the one or more processors are configured to cause the system to:
    access the digital image depicting the scene comprising the shadow located in the region, the shadow covering an object; and
    generate the fill for the region that preserves the object previously covered by the shadow.

15. A non-transitory computer-readable medium storing executable instructions which, when executed by a processing device, cause the processing device to perform operations comprising:
    accessing a digital image depicting a scene with an object and a shadow of the object, the shadow encompassing a region with a visible texture;
    generating, utilizing a content-aware machine learning model, a backfill corresponding to a non-visible region behind the object in the digital image;
    in response to receiving a selection to delete the object, removing the object from the digital image to expose the backfill;
    determining a size of the shadow in the region satisfies a threshold;
    if the size of the shadow satisfies the threshold, utilize a shadow removal generative inpainting model to generate a fill for the region; or
    if the size of the shadow does not satisfy the threshold, utilize a general generative inpainting model to generate the fill for the region.

16. The non-transitory computer-readable medium of claim 15, further comprising utilizing an object detection model to detect the object within the digital image.

17. The non-transitory computer-readable medium of claim 15, wherein removing the object further comprises:
    identifying pixels of the shadow of the object utilizing a shadow detection model; and generating the fill for the region that preserves the visible texture to replace the identified pixels of the shadow of the object.

18. The non-transitory computer-readable medium of claim 15, wherein the operations further comprise:
  receiving an additional selection to delete an additional shadow without an object located in an additional region within the digital image; and
  generating, utilizing the shadow removal generative inpainting model, an additional fill for the additional region that preserves a visible texture of the additional shadow removed from the digital image.

19. The non-transitory computer-readable medium of claim 15, wherein generating, utilizing the shadow removal generative inpainting model, the fill for the region that preserves the visible texture further comprises modulating a shadow removal generative inpainting model with an shadow mask of the shadow to generate the fill for the region that preserves the visible texture.

20. The non-transitory computer-readable medium of claim 15, wherein the operations further comprise learning parameters of the shadow removal generative inpainting model by:
  randomly dilating shadow masks in a training dataset;
  generating, utilizing the shadow removal generative inpainting model, inpainted digital images from the randomly dilated shadow masks; and
  modifying parameters of the shadow removal generative inpainting model according to comparing the inpainted digital images with ground truth digital images.

* * * * *